United States Patent [19]

Izzi et al.

[11] Patent Number: 5,371,517

[45] Date of Patent: Dec. 6, 1994

[54] VIDEO INTERFACE PALETTE, SYSTEMS AND METHOD

[75] Inventors: Louis Izzi, Plano; William R. Krenik, Garland; Henry T. Yung; Chenwei J. Yin, both of Richardson; Carrell R. Killebrew, Jr., Sugar Land; Karl Guttag, Missouri City; Jerry R. Van Aken, Sugar Land; Jeffrey Nye, Houston, all of Tex.; Richard Simpson, Bedford, England; Mike Asal, Sugar Land, Tex.

[73] Assignee: Texas Instruments Incorporated, Dallas, Tex.

[21] Appl. No.: 791,757

[22] Filed: Nov. 8, 1991

[51] Int. Cl.$^5$ ............................................. G09G 1/28
[52] U.S. Cl. ..................................... 345/199; 345/150
[58] Field of Search ............... 340/701, 703, 798, 799; 395/164; 345/199, 186, 187, 189, 150

[56] References Cited

U.S. PATENT DOCUMENTS

| | | | |
|---|---|---|---|
| 4,769,632 | 9/1988 | Work | 390/701 |
| 4,803,464 | 2/1989 | Holme et al. | 340/701 |
| 4,815,033 | 3/1989 | Harris | 364/900 |
| 4,933,878 | 6/1990 | Guttag et al. | 340/701 |
| 5,038,300 | 8/1991 | Seiler et al. | 340/701 |

OTHER PUBLICATIONS

Brooktree, "BT459", *Product Data Book 1989*, 1989 pp. 5-85 through 5-115.
Texas Instruments Incorporated, "TMS34070-20 Color Pallette" *Production Data*, 1986, pp. 1-15.
Brooktree, "RAMDAC Products" *Winter 1990 Product Selection Guide*, Winter, 1990, pp. 9-15.

*Primary Examiner*—Ulysses Weldon
*Assistant Examiner*—Doon Chow
*Attorney, Agent, or Firm*—Robert D. Marshall, Jr.; James C. Kesterson; Richard L. Donaldson

[57] ABSTRACT

A color palette selects a master clock from plural clock signals received at clock input terminals in response to a master clock selection control word received at control data terminals. A circuit forms a plurality of divided down clock signals from selected divide ratios of the master clock. A circuit selects a shift clock from among the divided down clock signals in response to at least some bits of an output clock selection control word received at the control data terminals. A circuit selectively enables and disables the shift clock in response to blanking data. A circuit selects a video clock from among the divided down clock signals in response to at least some bits of the output clock selection control word. A circuit synchronizes multiple bit words of color code received at color code input terminals with the master clock. A circuit outputs at least one memory recall address in response to receiving each multiple bit word of color code. A circuit stores color data words in a plurality of data storage locations, having associated memory recall addresses, and outputs a color data word upon receipt of an associated memory recall address. A circuit selectively writes color data words into these plural locations. A circuit synchronizes video control signals received at video control terminals with the master clock and provides the blanking data. A circuit selects for output between said color data words and true color data words received at said color code input terminals.

27 Claims, 113 Drawing Sheets

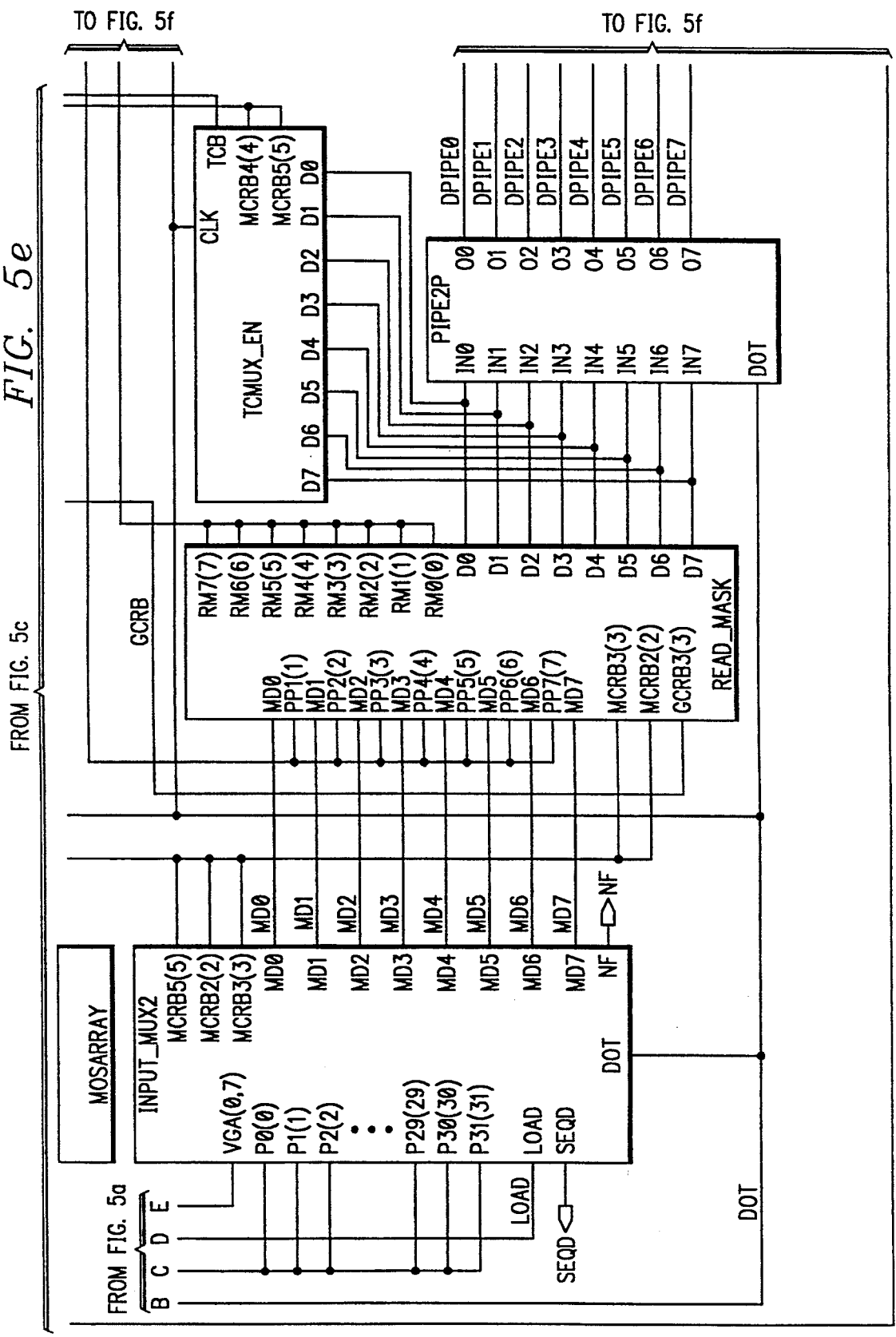

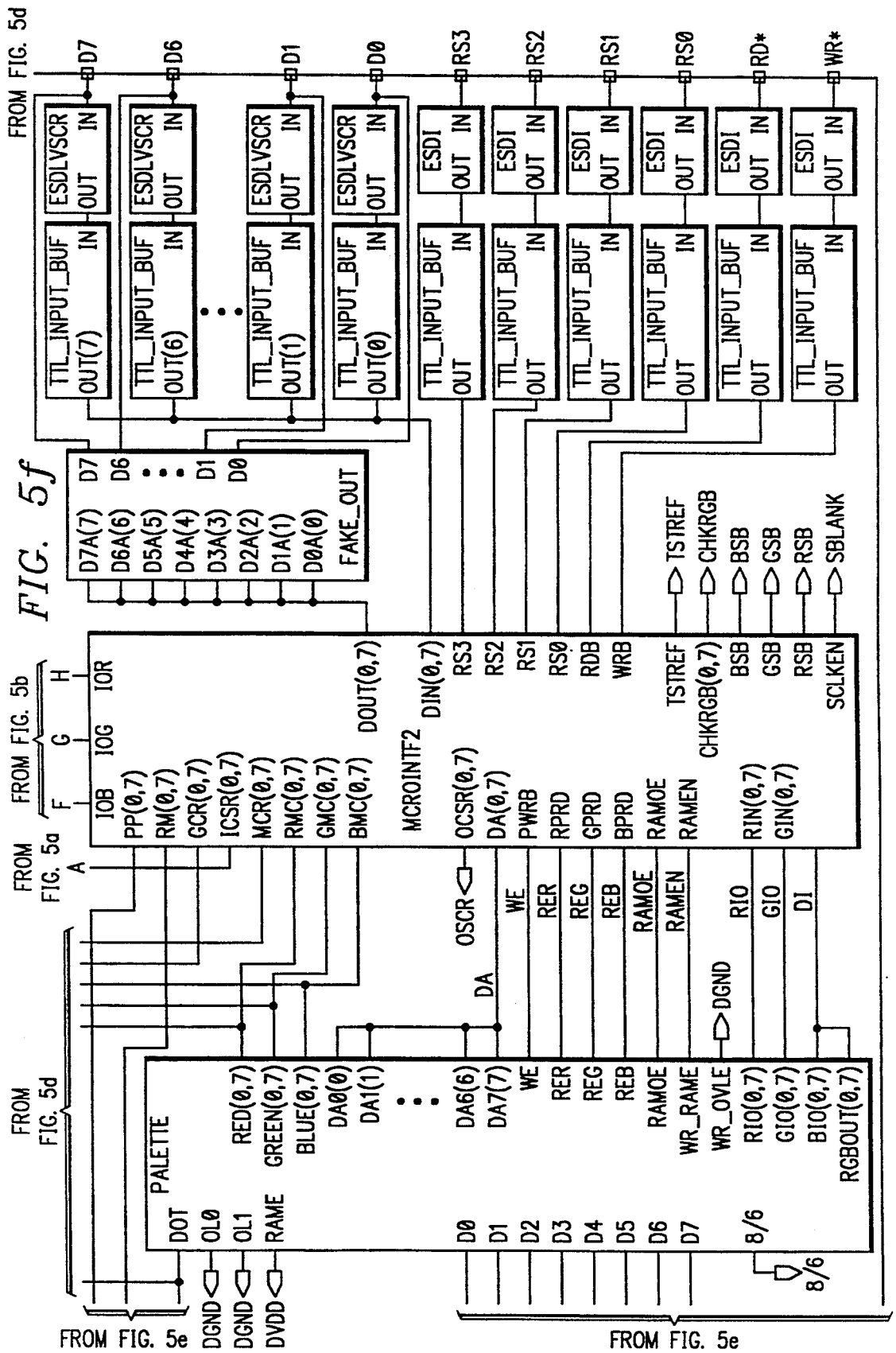

FIG. 5m
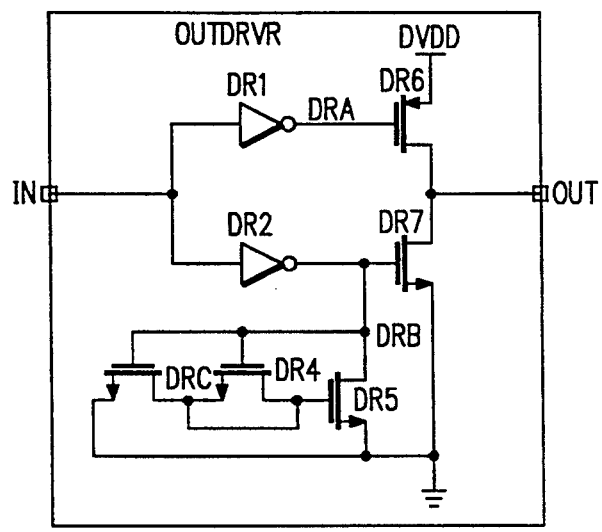
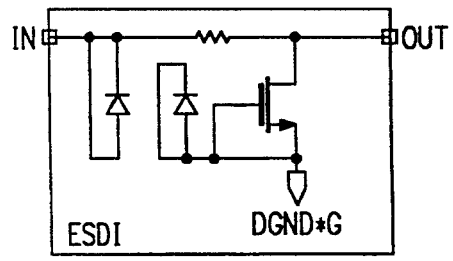
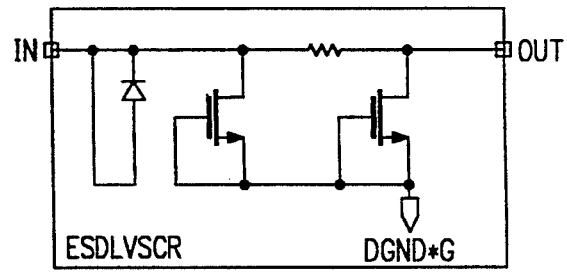
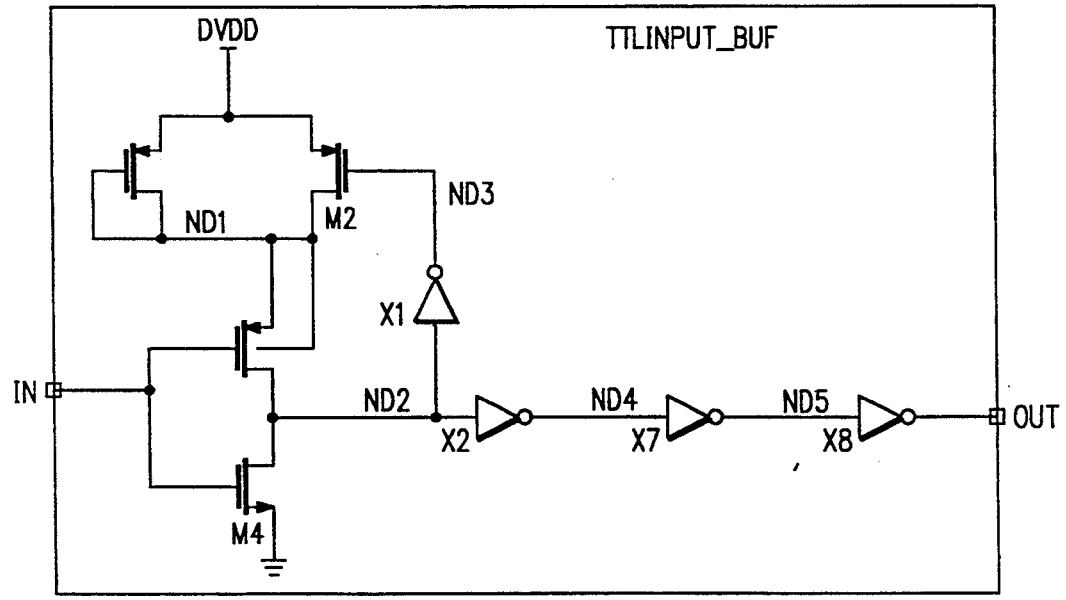

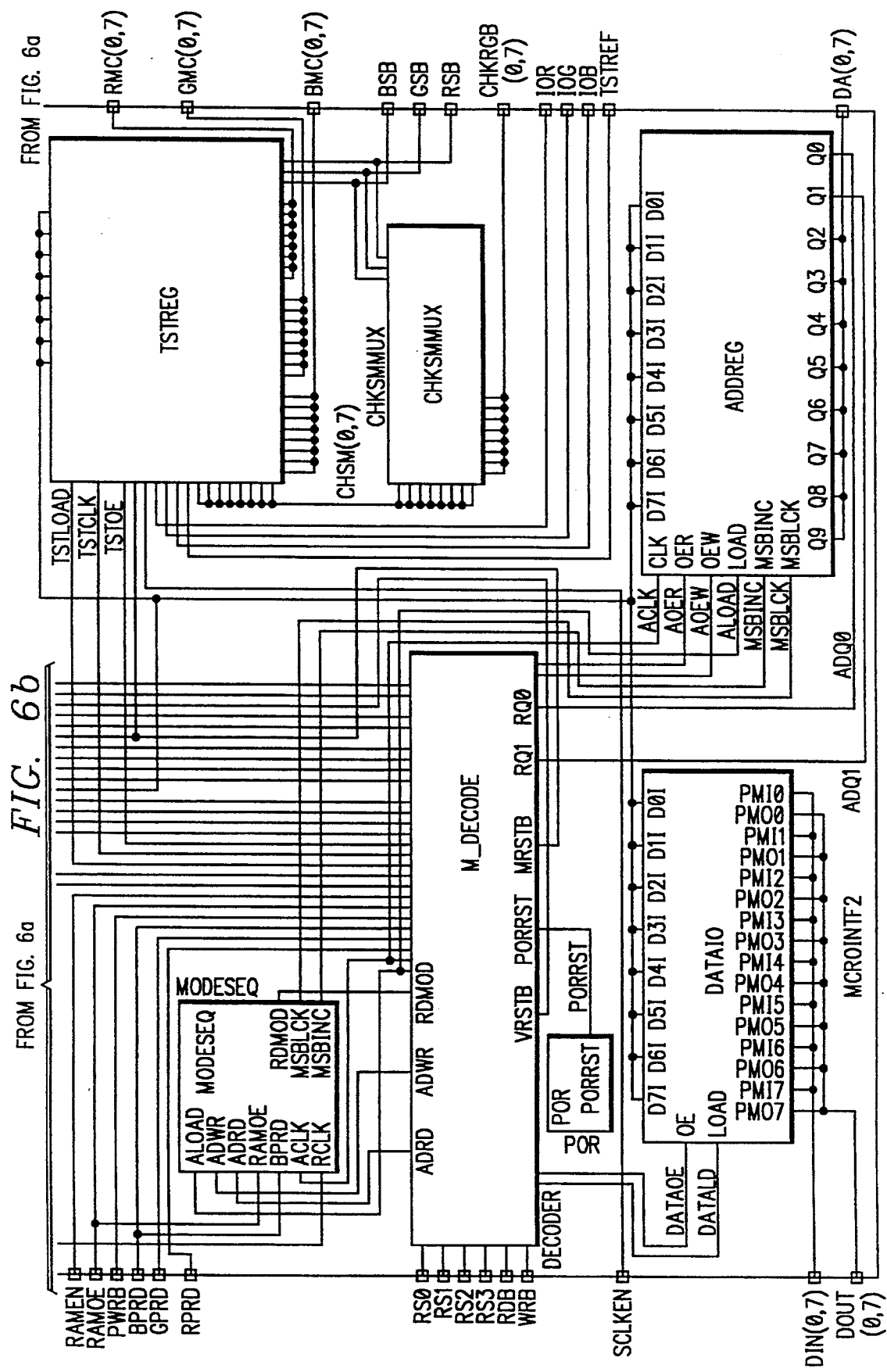

FIG. 6i

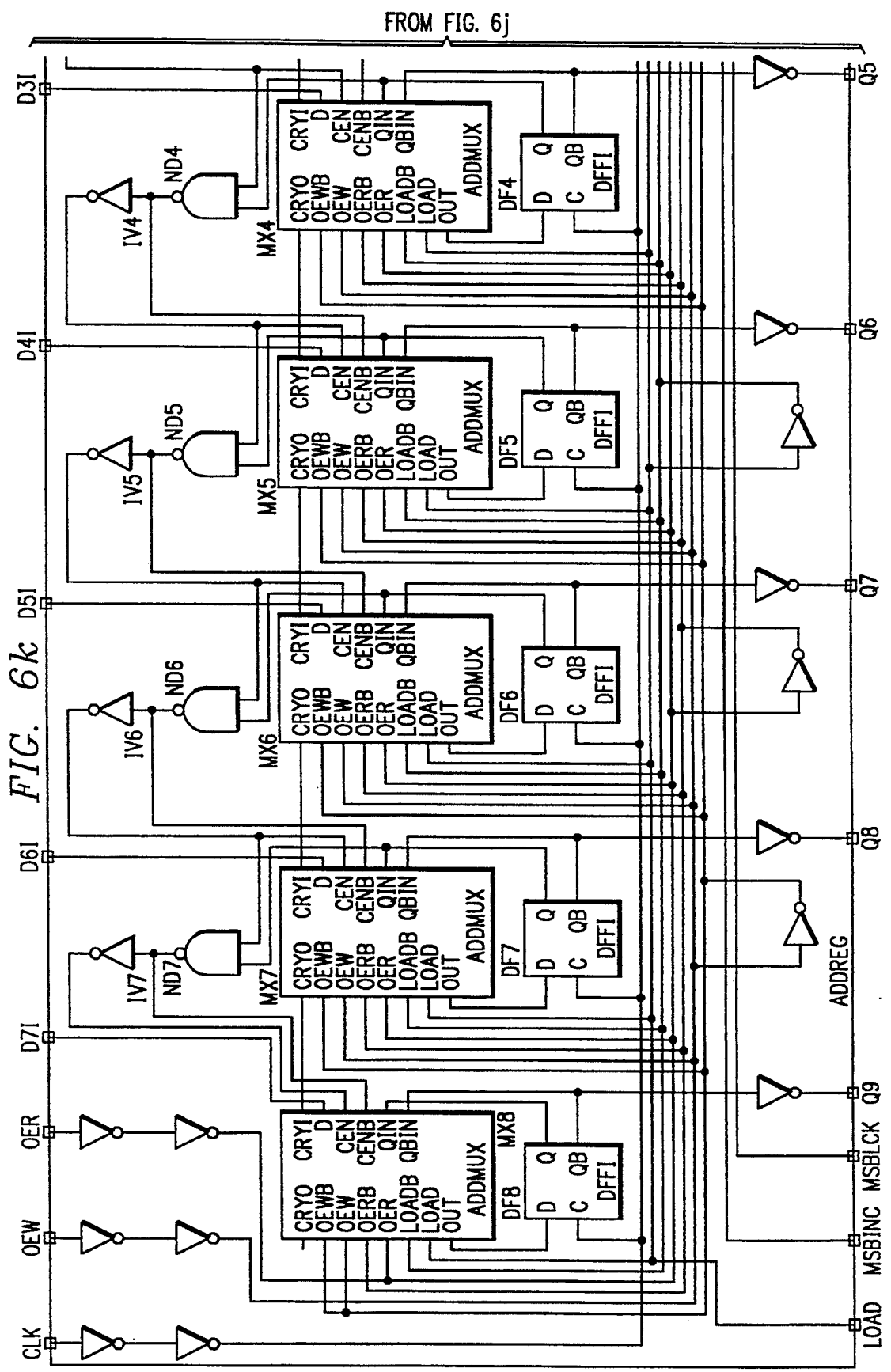

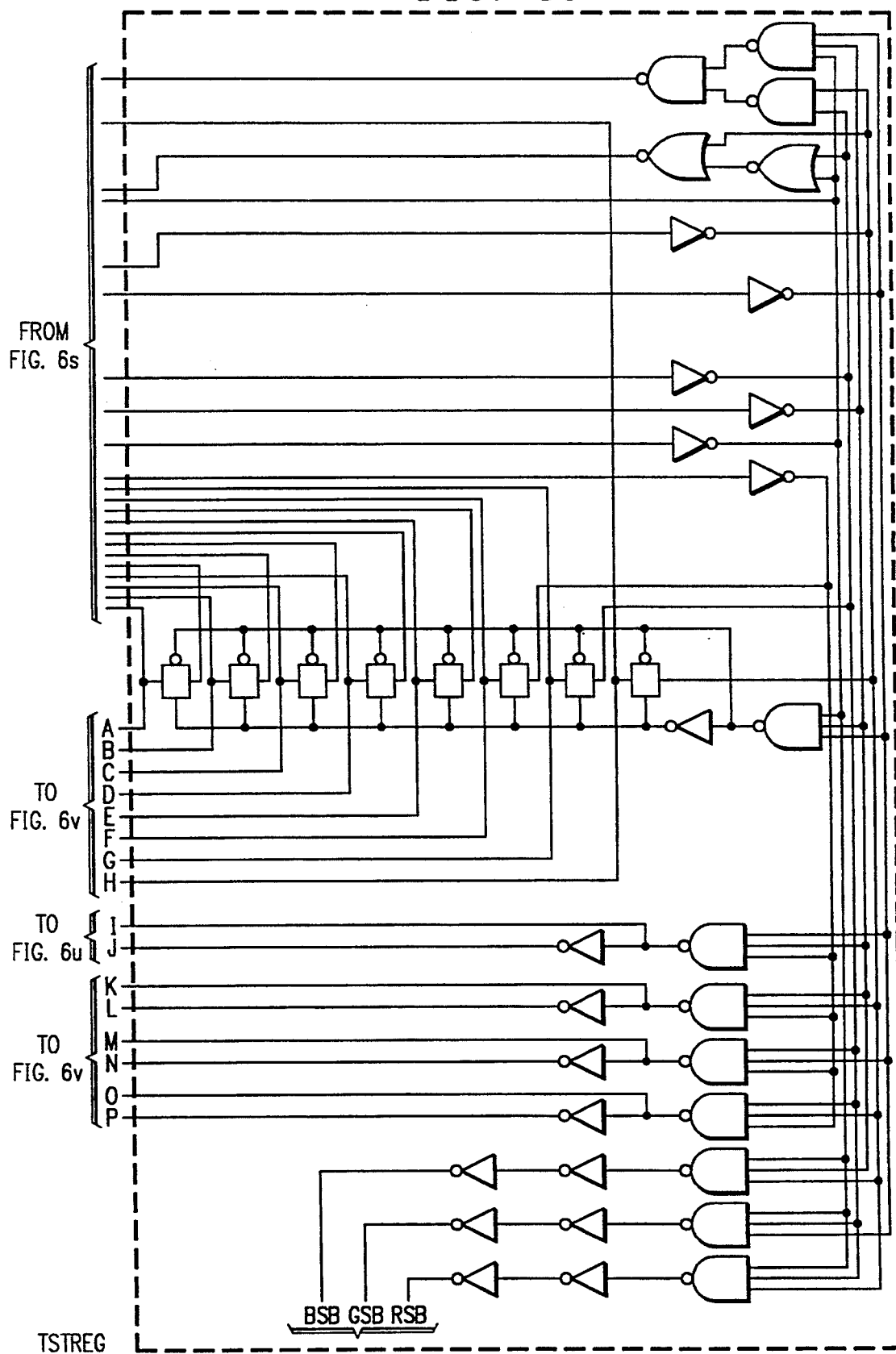

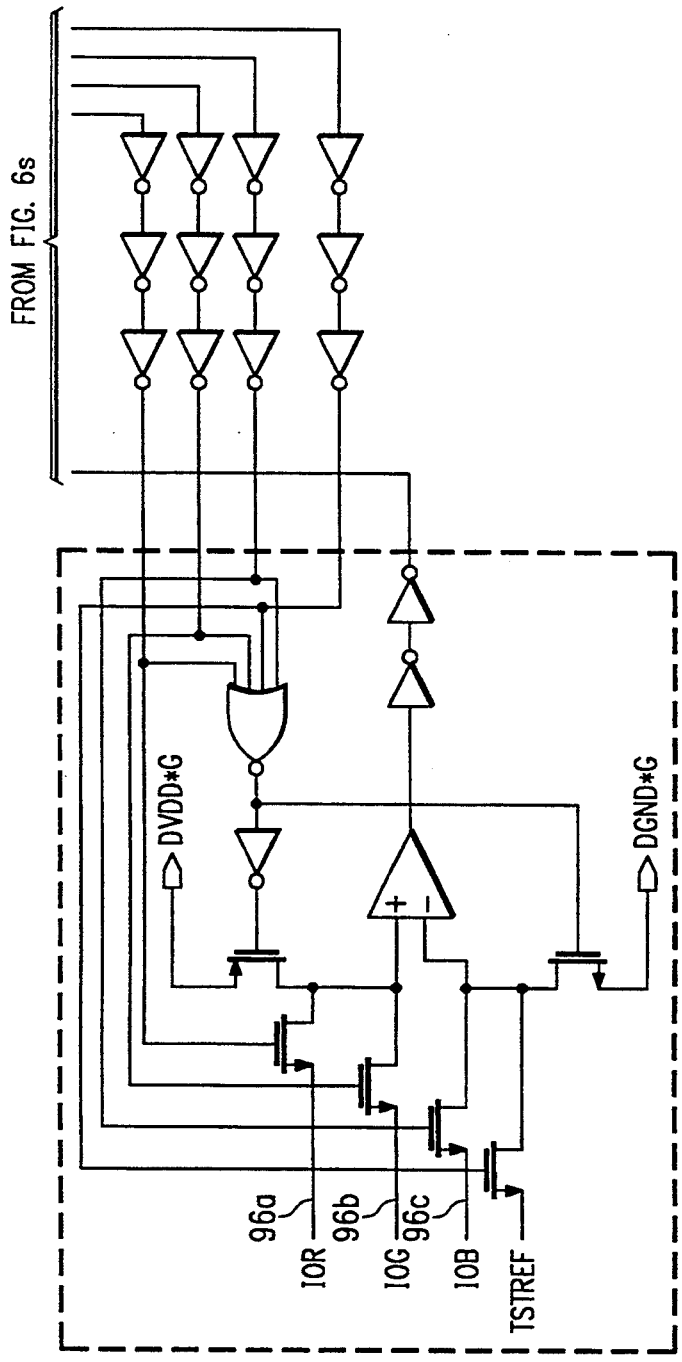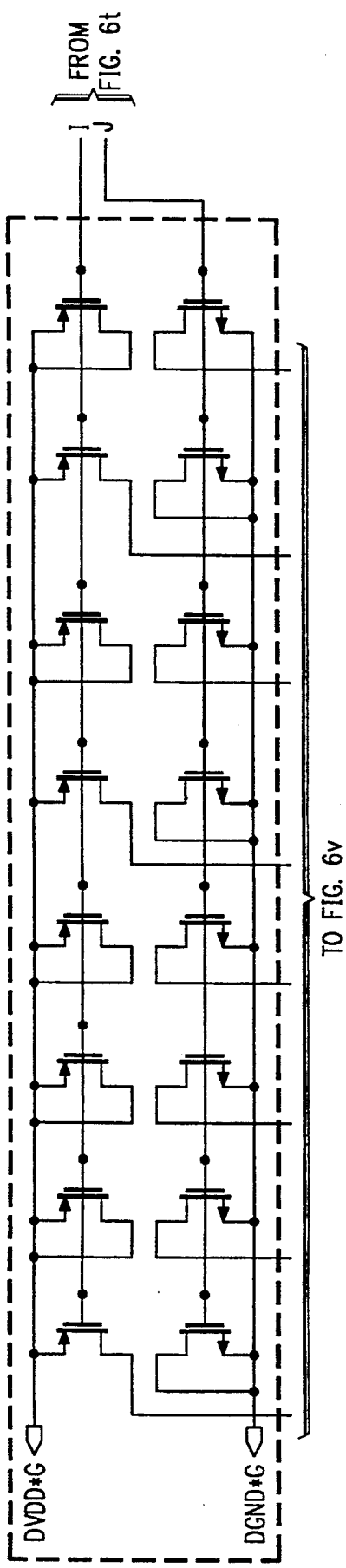
FIG. 6u

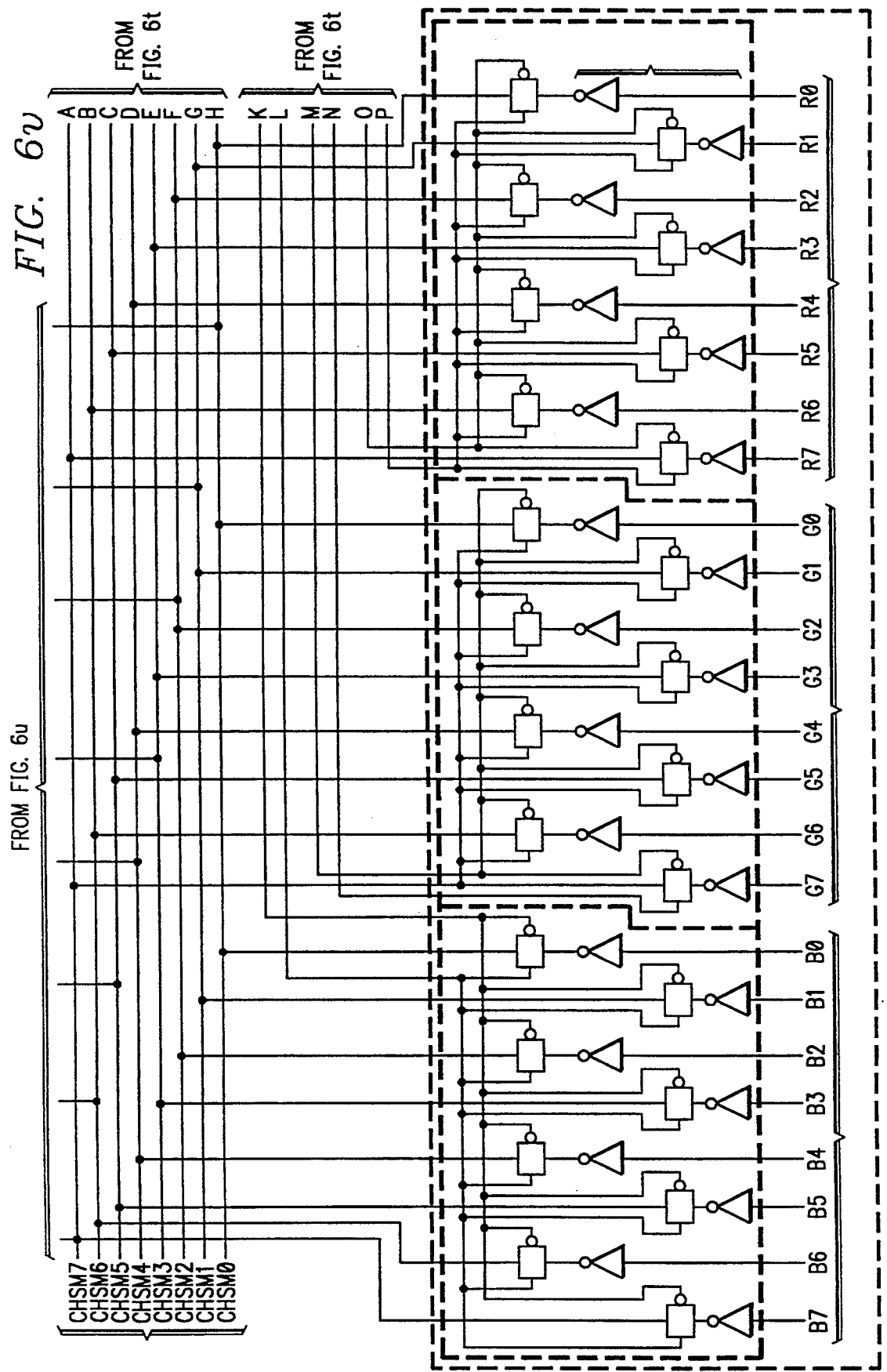

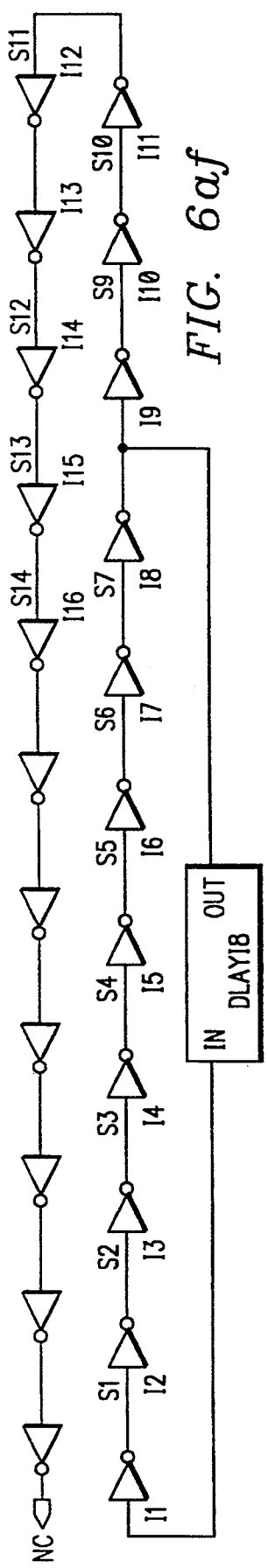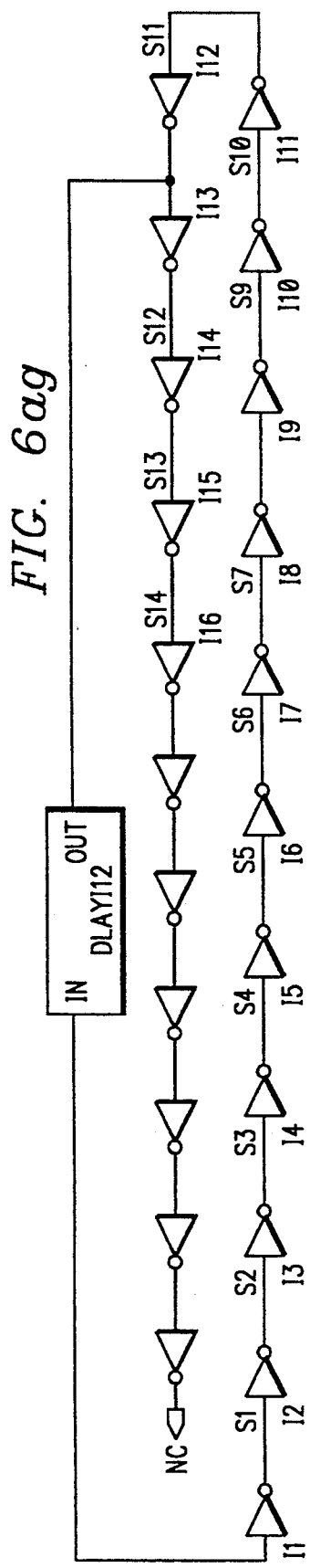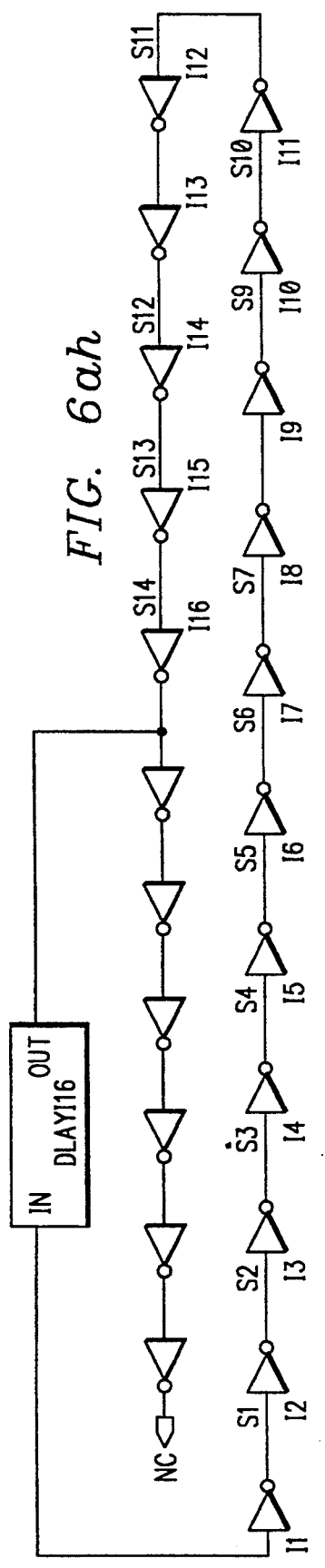
FIG. 6af  FIG. 6ag  FIG. 6ah

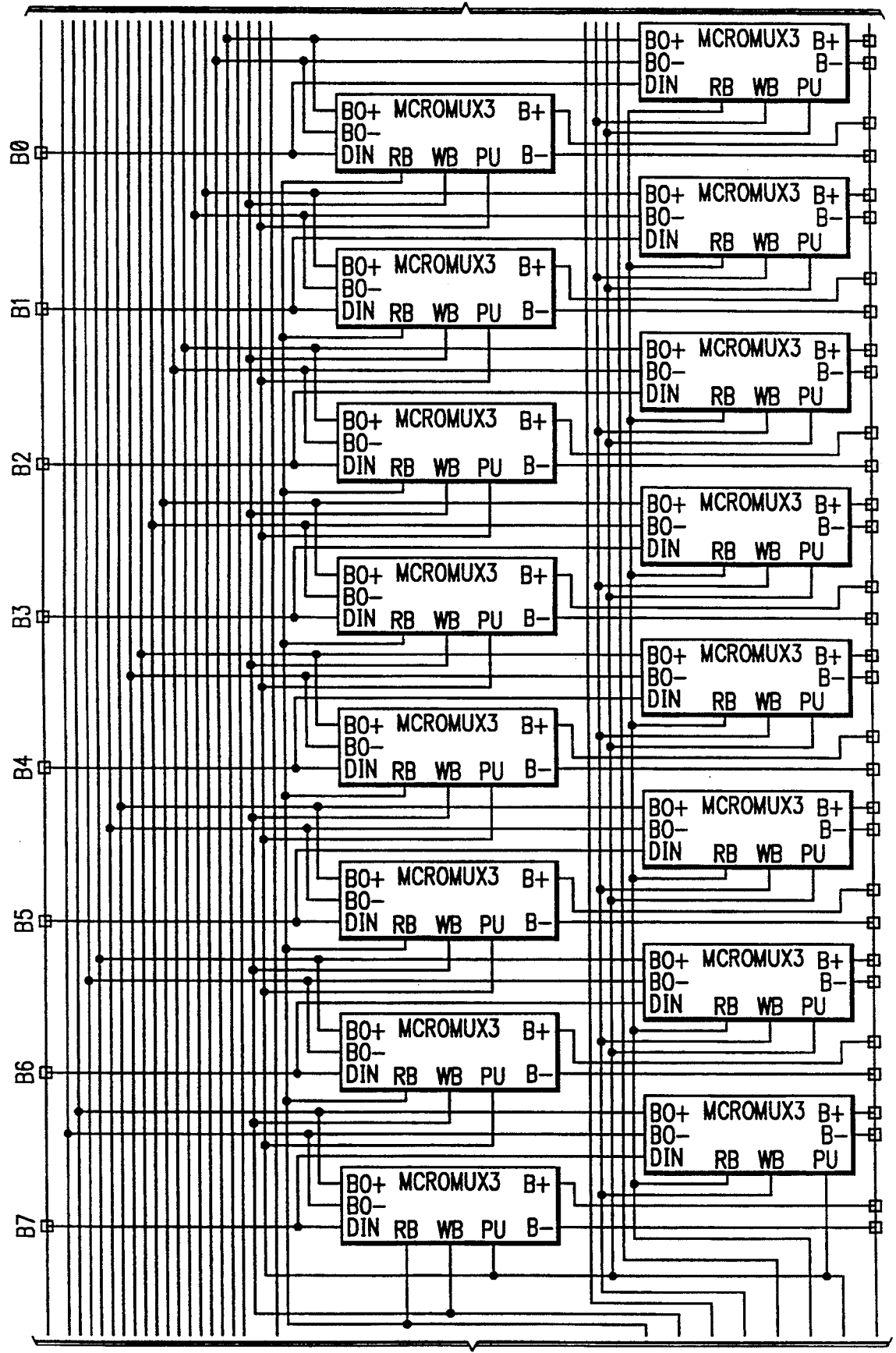
FIG. 7d    FROM FIG. 7c
TO FIG. 7e

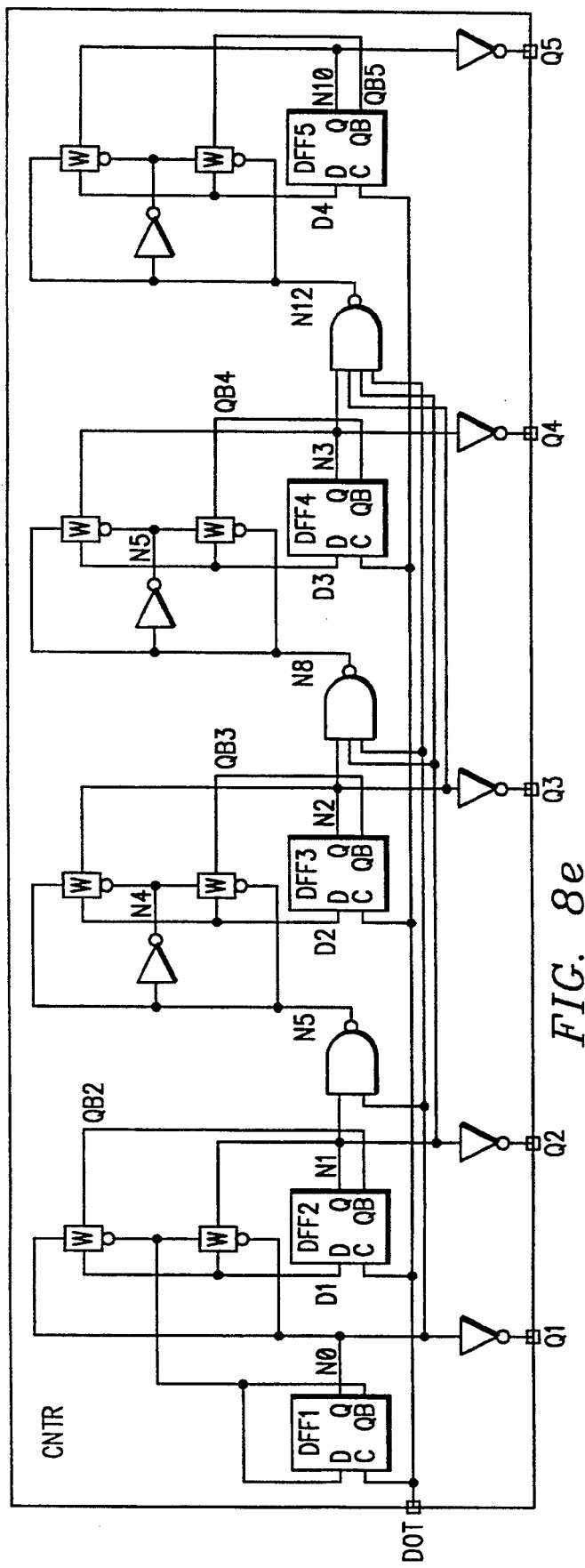
FIG. 8e
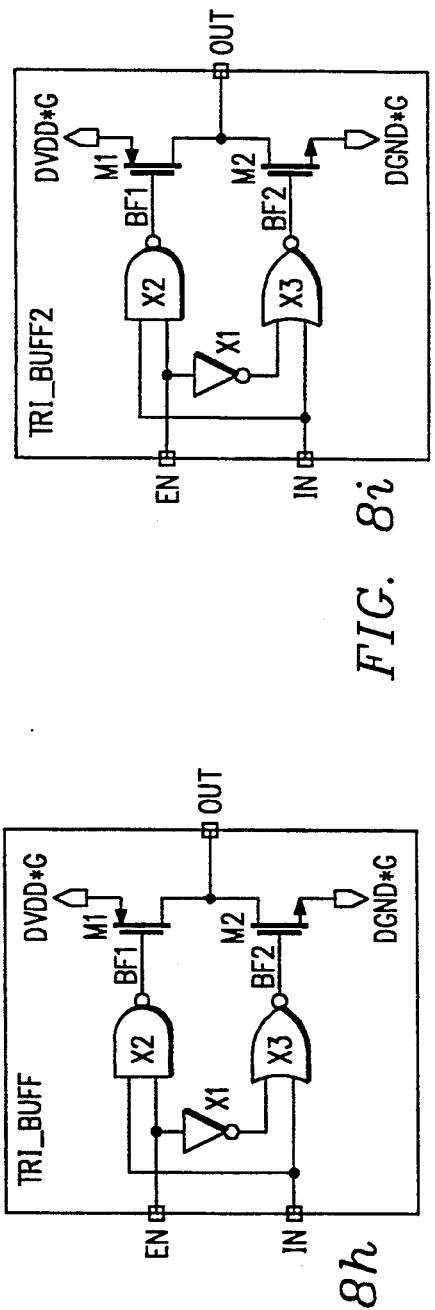
FIG. 8i
FIG. 8h

FIG. 8l
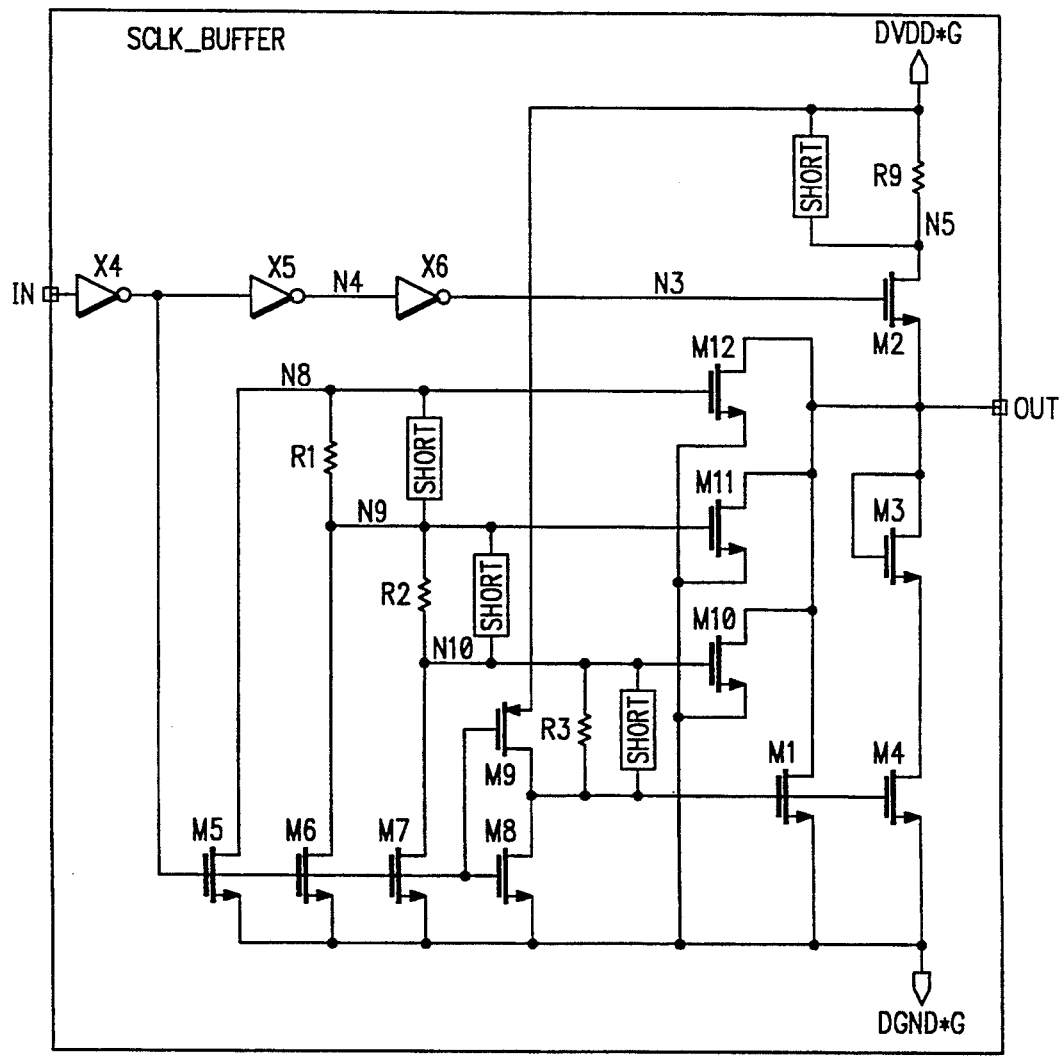
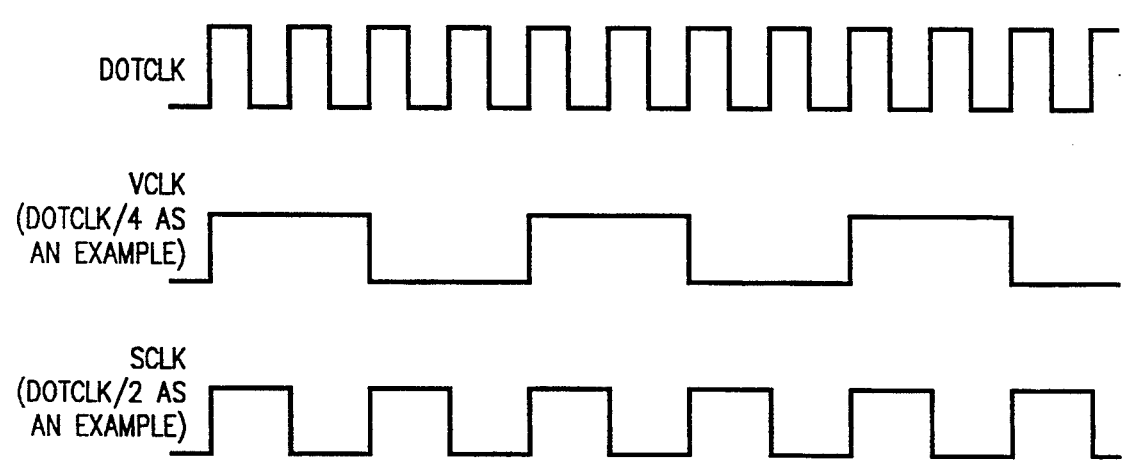
FIG. 9

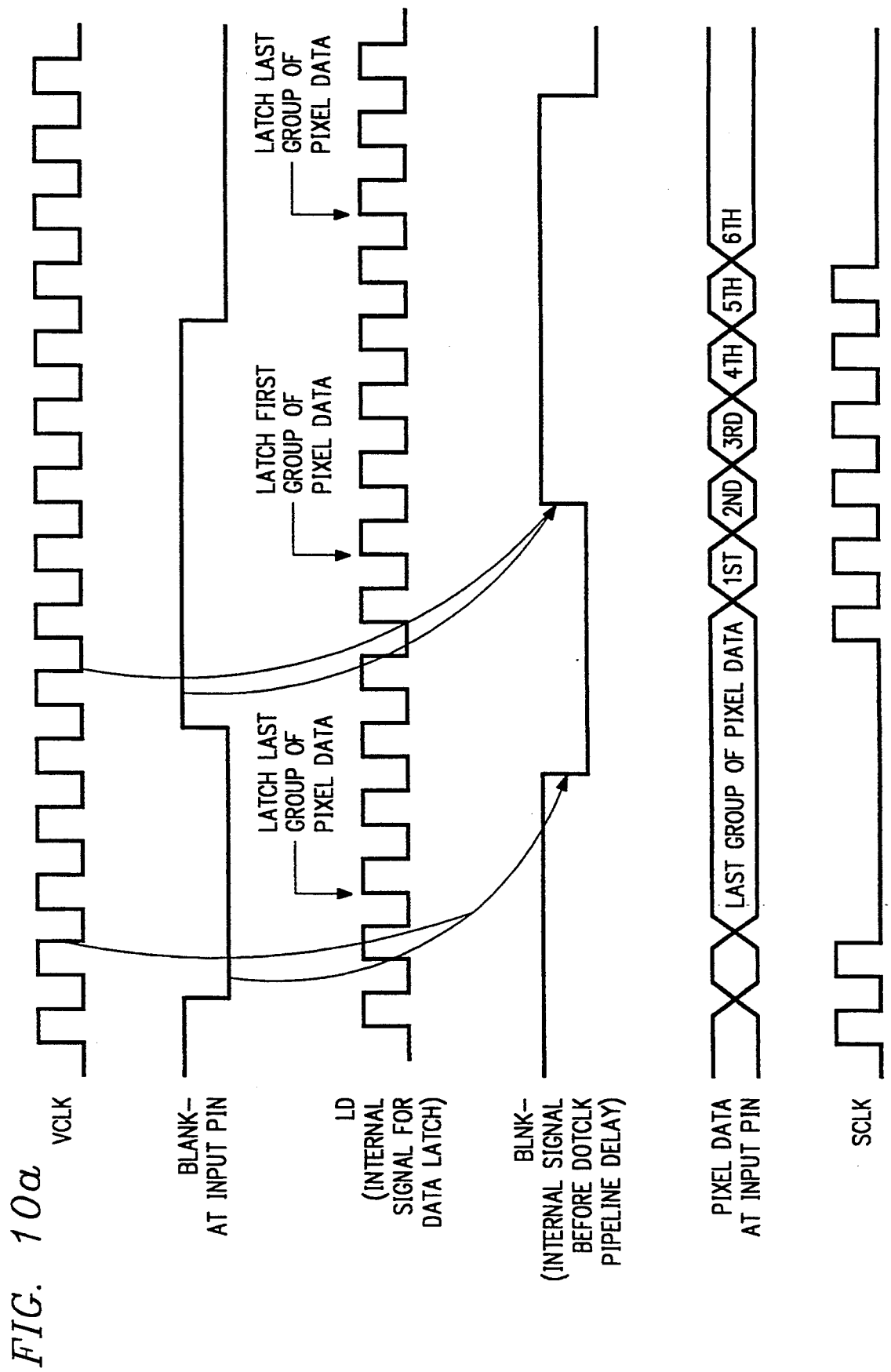

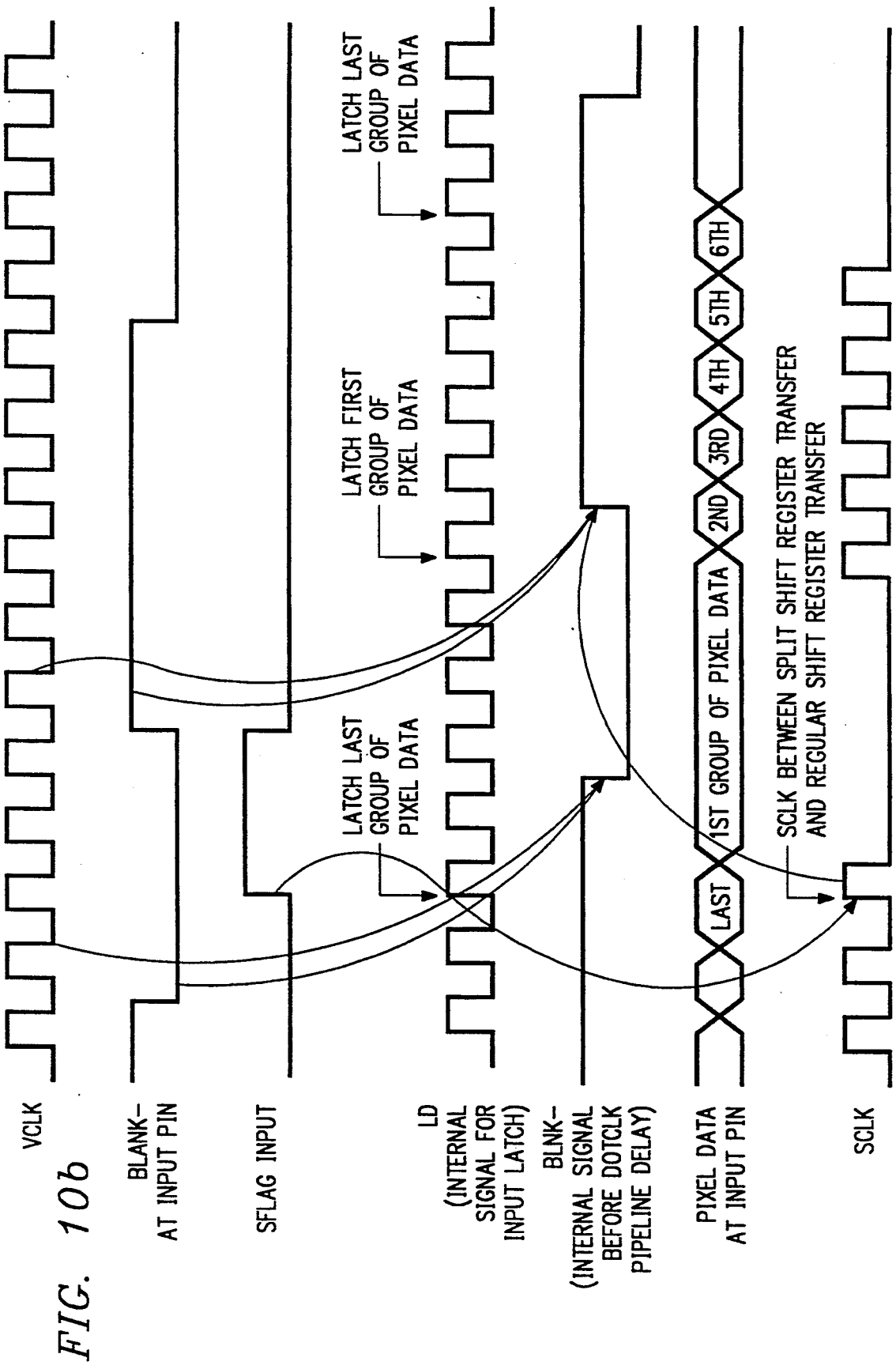

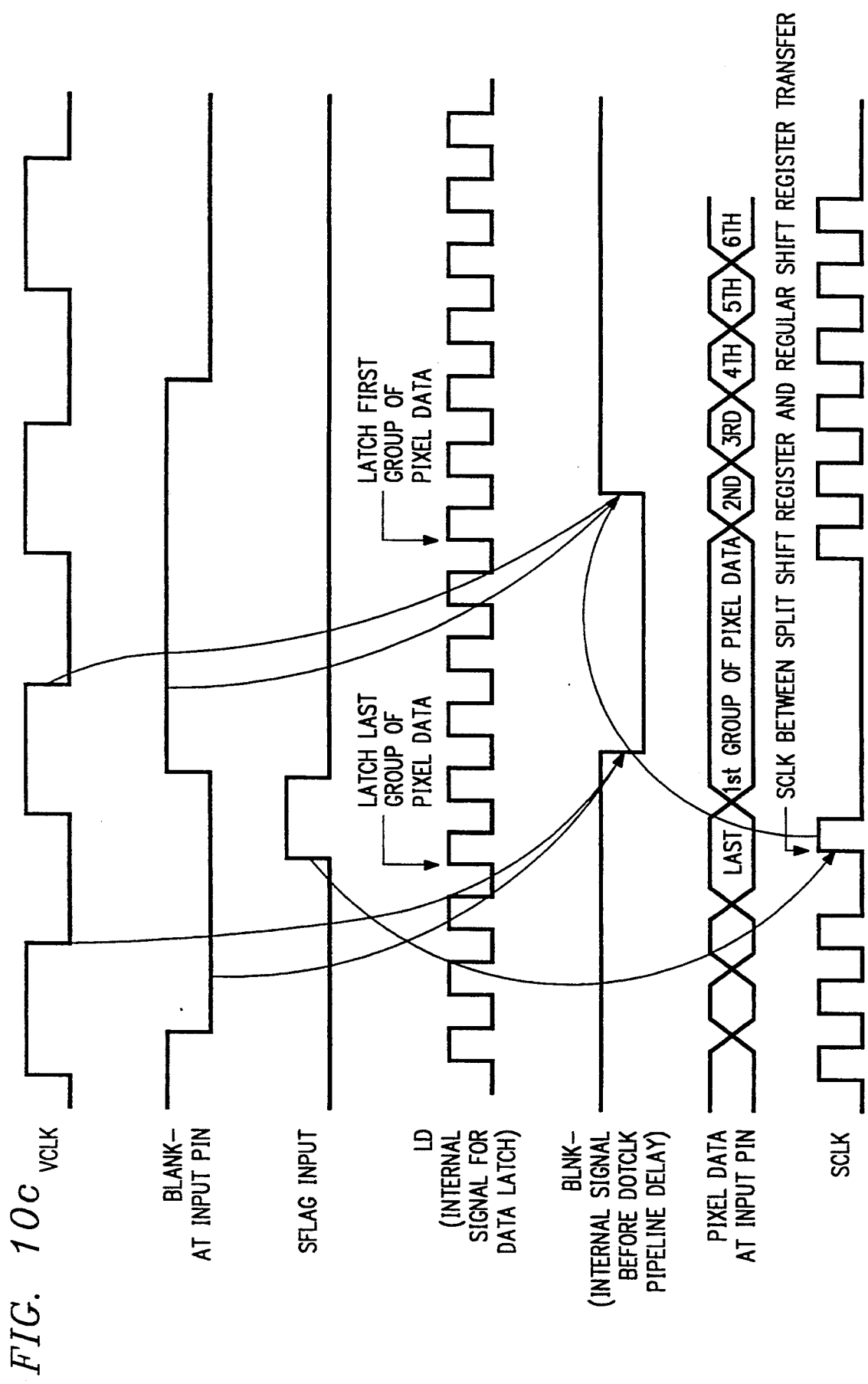

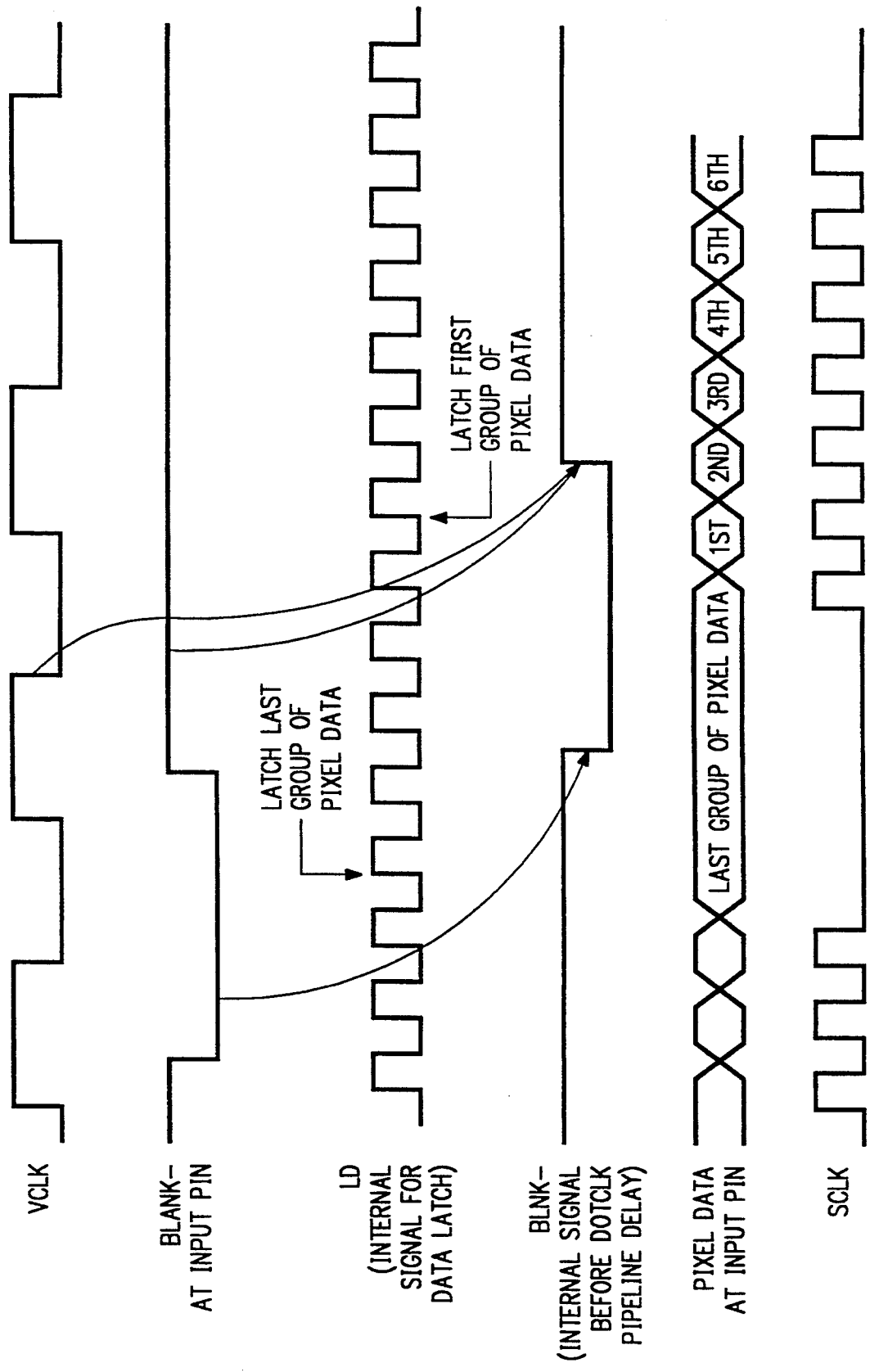

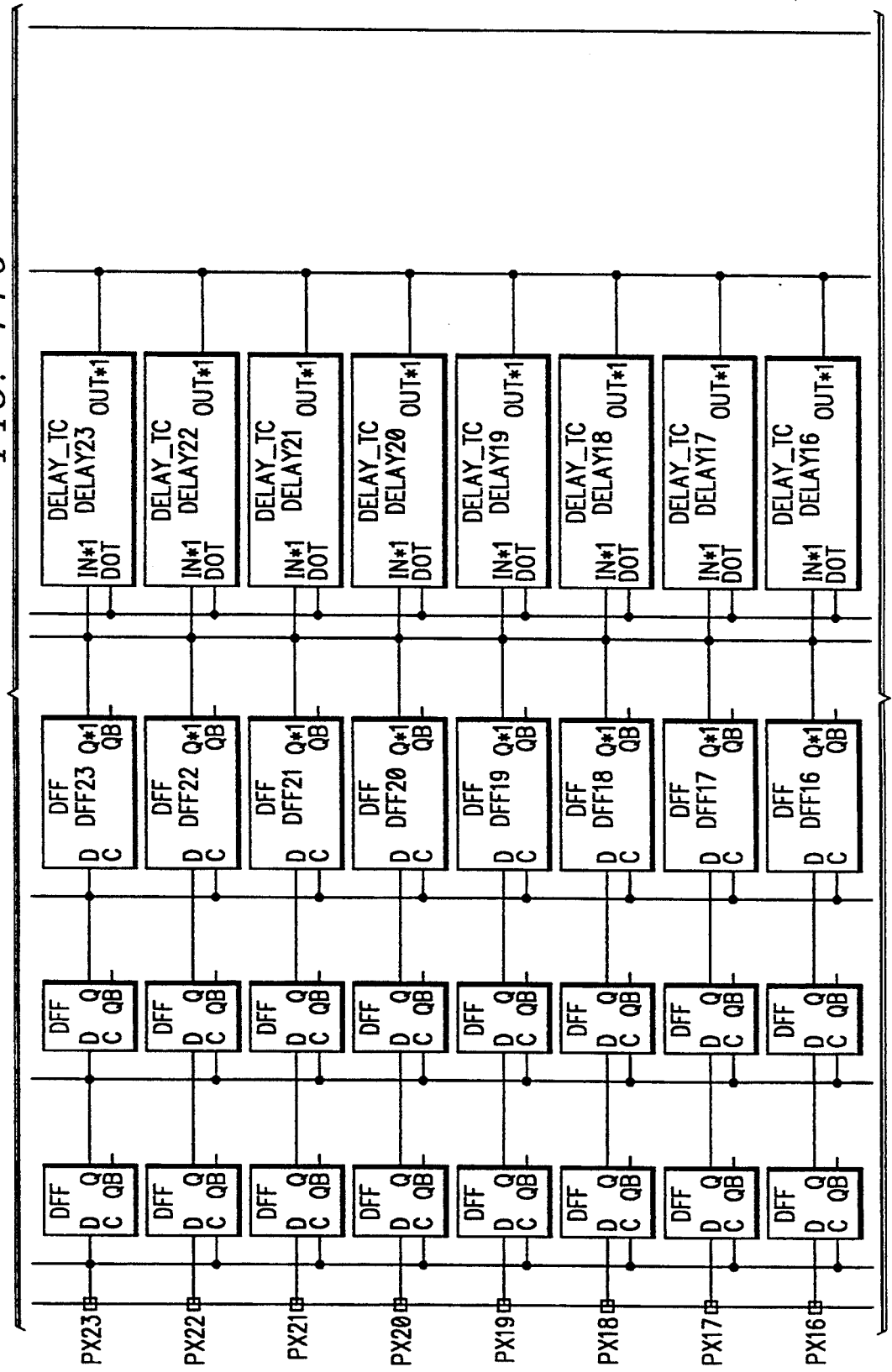

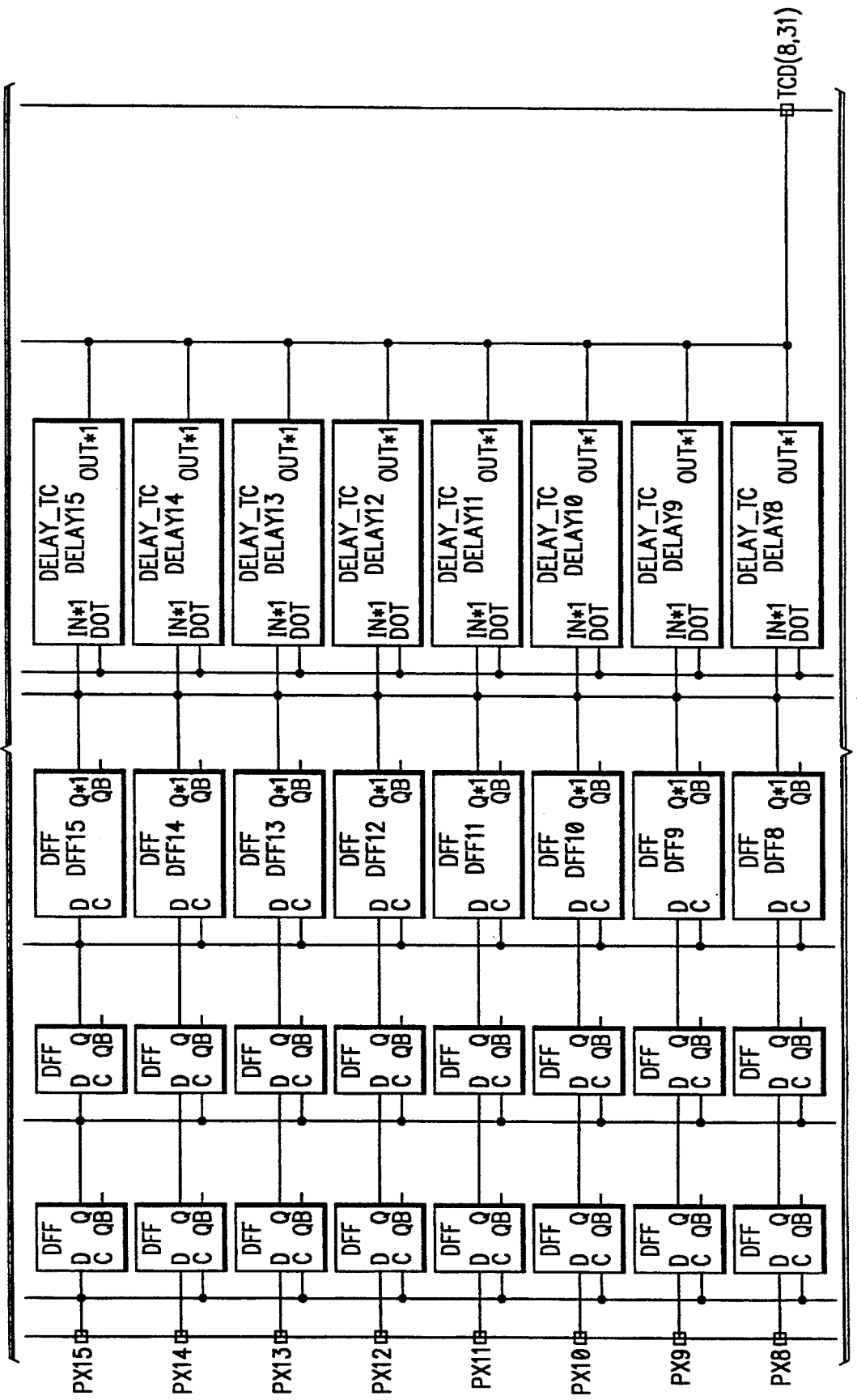

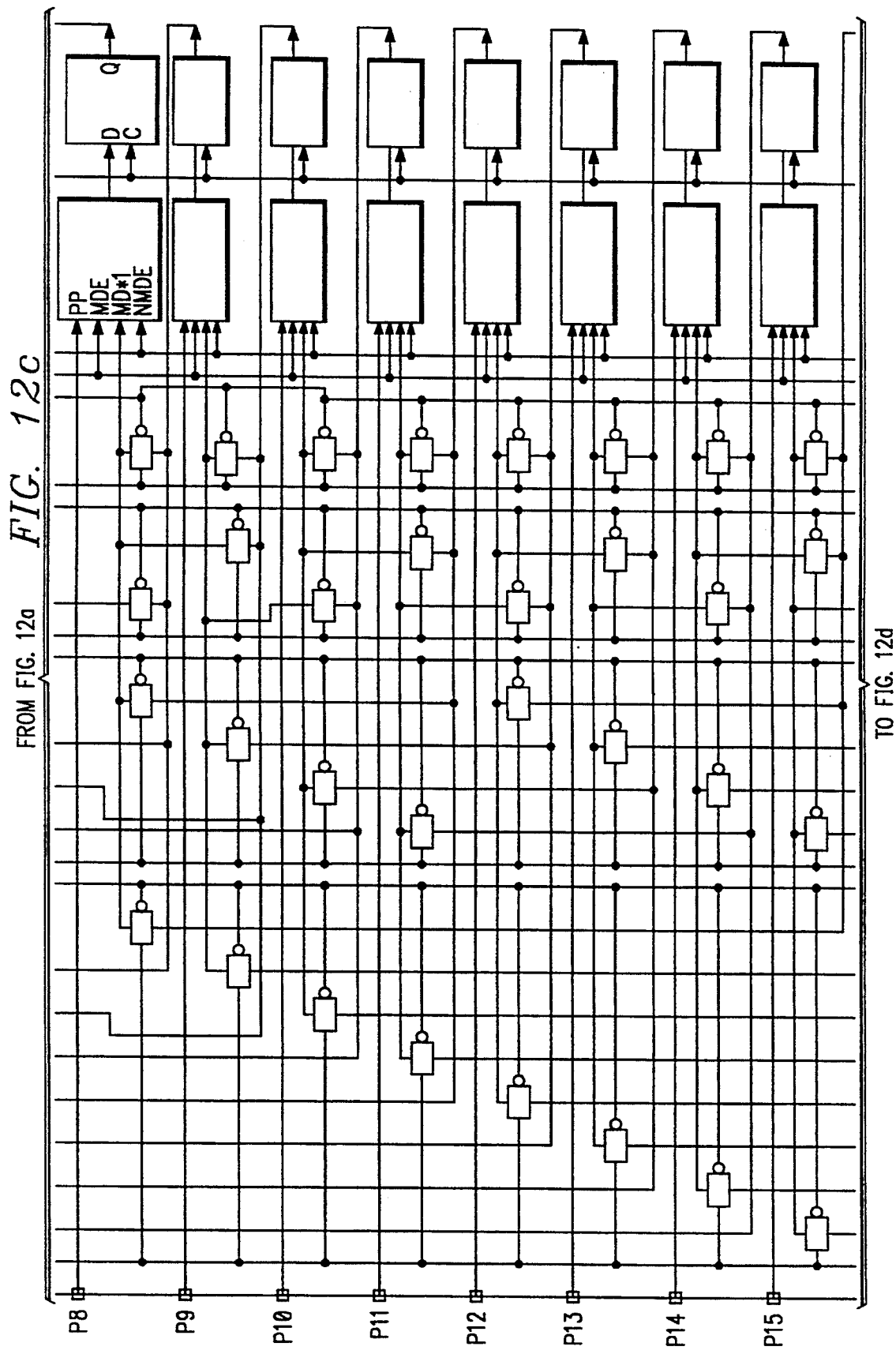

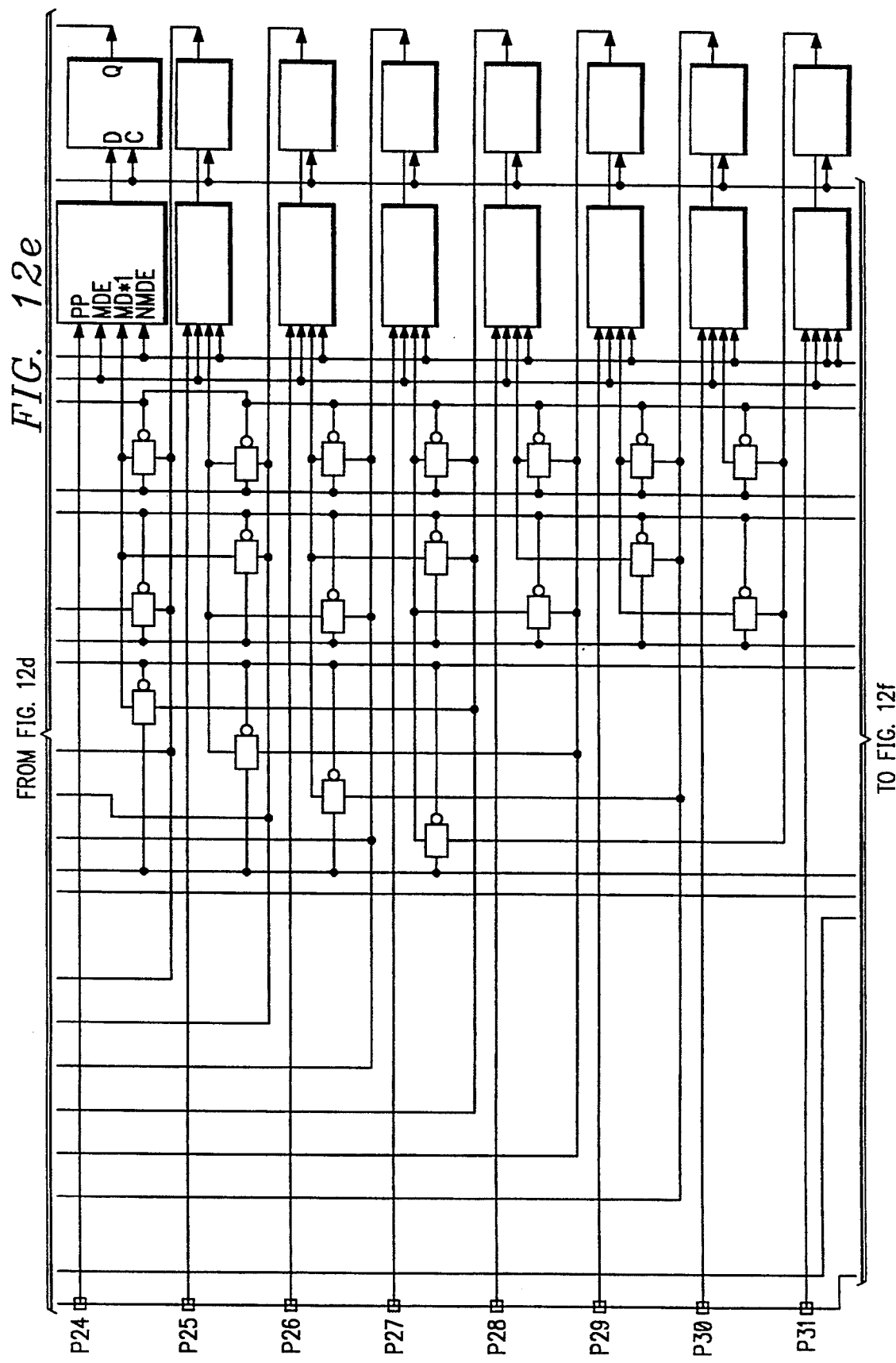

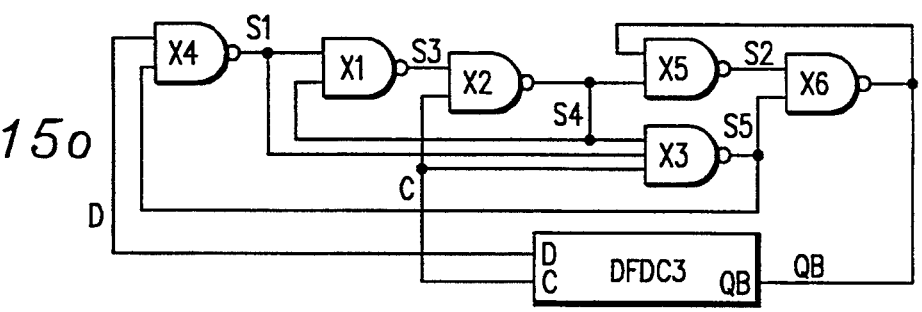
FIG. 15o
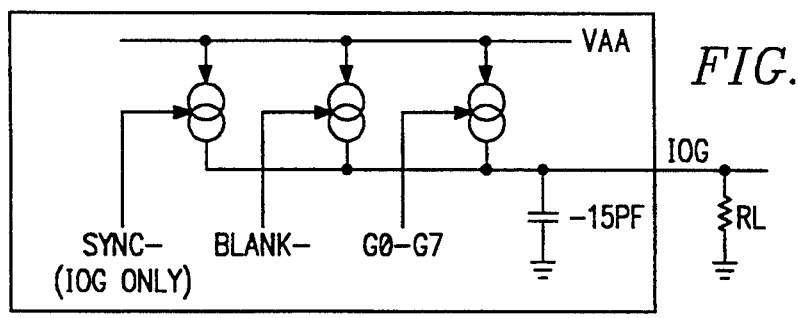
FIG. 16a
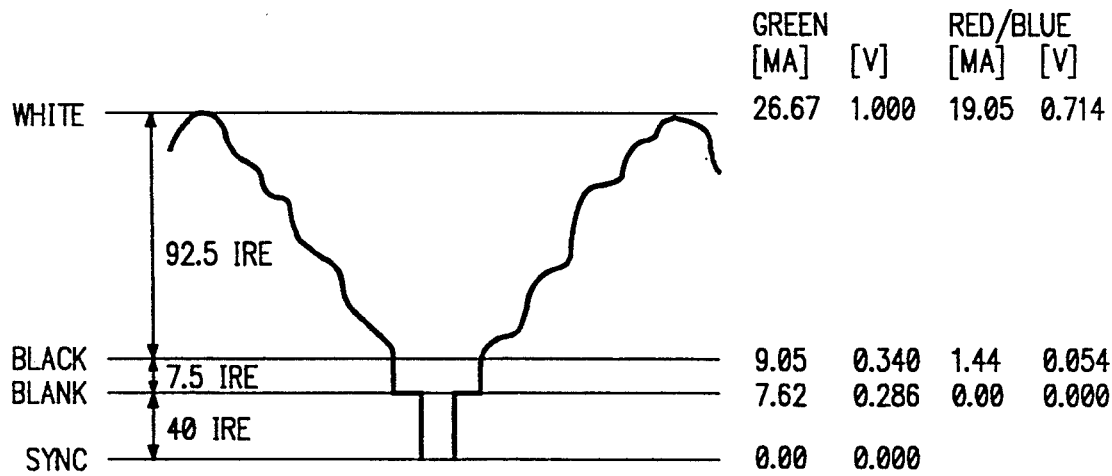
FIG. 16b
FIG. 16c

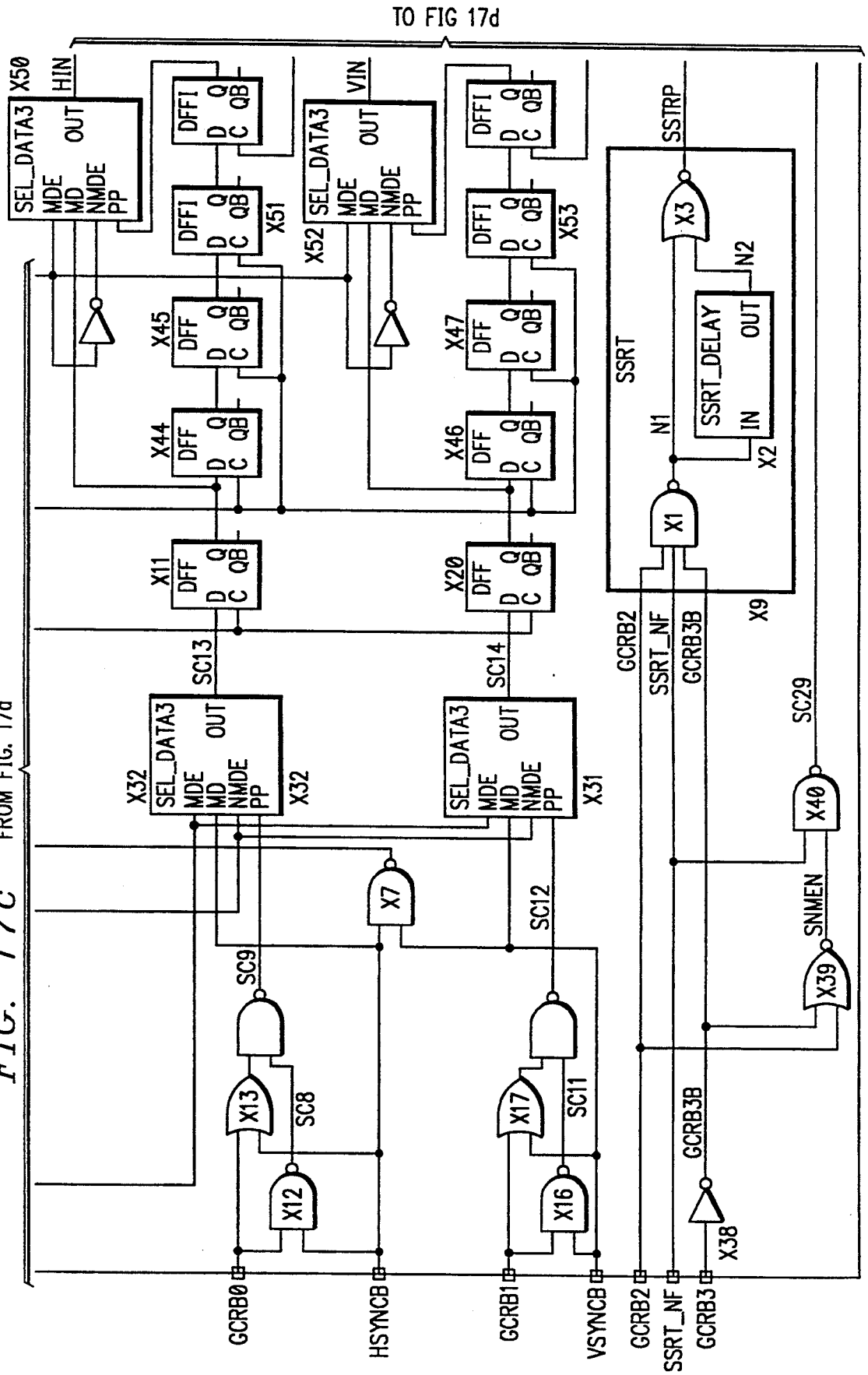

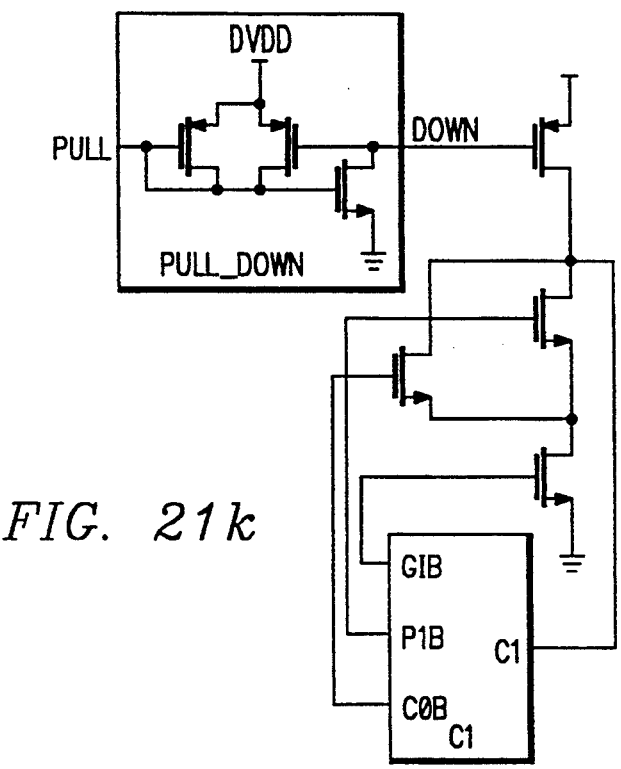
FIG. 21k
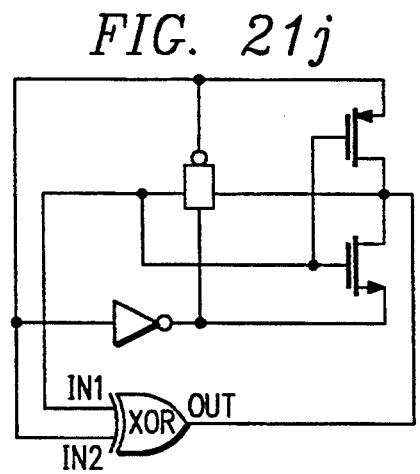
FIG. 21j
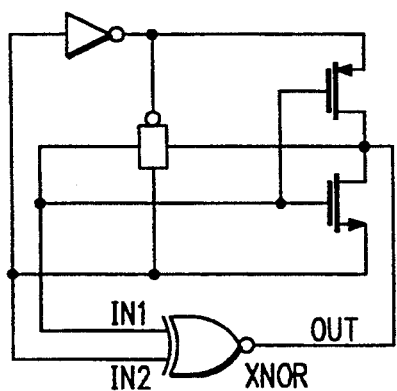
FIG. 21p
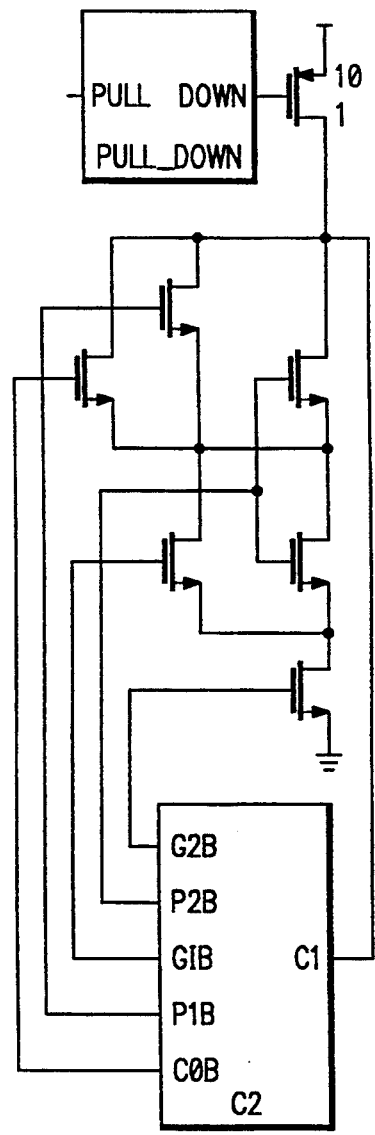
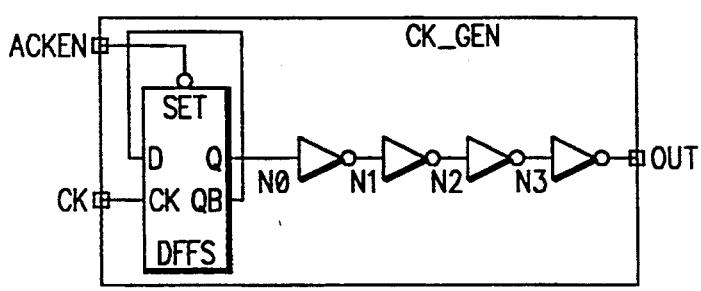
FIG. 21o
FIG. 21l

VIDEO INTERFACE PALETTE, SYSTEMS AND METHOD

NOTICE (C) Copyright, Texas Instruments Incorporated, 1990. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

CROSS-REFERENCE TO RELATED APPLICATIONS

U.S. patent application Ser. No. 07/544,775, filed Jun. 27, 1990, entitled "PACKED BUS SELECTION OF MULTIPLE PIXEL DEPTHS IN PALETTE DEVICES, SYSTEM AND METHODS";

U.S. patent application Ser. No. 07/334,344, filed Jul. 19, 1991, entitled "TEST CIRCUITRY, SYSTEMS AND METHODS";

U.S. patent application Ser. No. 07/720,100, filed Jun. 22, 1991, entitled "SEQUENTIAL ACCESS MEMORIES, SYSTEMS AND METHODS";

U.S. patent application Ser. No. 07/723,342, filed Jun. 28, 1991, entitled "AN IMPROVED FRAME BUFFER, SYSTEMS AND METHODS";

U.S. patent application Ser. No. 07/544,779, filed Jun. 27, 1990, entitled "COMPUTER GRAPHICS SYSTEMS, PALETTE DEVICES AND METHODS FOR SHIFT CLOCK PULSE INSERTION DURING BLANKING";

U.S. patent application Ser. No. 07/884,263, filed May 8, 1992, a continuation of Ser. No. 07/545,422, filed Jun. 27, 1990, entitled "PALETTE DEVICES, COMPUTER GRAPHICS SYSTEMS AND METHODS WITH PARALLEL LOOK-UP AND INPUT SIGNAL SPLITTING";

U.S. patent application Ser. No. 07/544,774, filed Jun. 27, 1990, entitled "PALETTE DEVICES, SYSTEMS AND METHODS FOR TRUE COLOR MODE";

U.S. patent application Ser. No. 07/545,421, filed Jun. 27, 1990, entitled "DEVICES, SYSTEMS AND METHODS FOR PALETTE PASS THROUGH MODE";

U.S. patent application Ser. No. 07/544,771, filed Jun. 27, 1990, entitled "INTEGRATED CIRCUIT INTERNAL TEST CIRCUITS AND METHODS";

U.S. patent application Ser. No. 07/546,172, filed Jun. 27, 1990, entitled "CONTROLLED DELAY DEVICES, SYSTMES AND METHODS";

U.S. patent application Ser. No. 07/545,424 filed Jun. 27, 1990, entitled "GRAPHICS SYSTEMS, PALETTES AND METHODS WITH COMBINED VIDEO AND SHIFT CLOCK CONTROL", all of the above are assigned to Texas Instruments Incorporated, the assignee of the present application, and are cross-referenced and incorporated into the present application by reference herein.

TECHNICAL FIELD OF THE INVENTION

The present invention relates in general to graphics processors and in particular to a video interface palette, systems and methods.

BACKGROUND OF THE INVENTION

Without limiting the general scope of the invention, its background is described in connection with computer graphics, as an example only.

In computer graphics systems, the low cost of dynamic random access memories (DRAM) has made it economical to provide a bit map or pixel map system memory. In such a bit map or pixel map memory, a color code is stored in a memory location corresponding to each pixel to be displayed. A video system is provided which recalls the color codes for each pixel and generates a raster scan video signal corresponding to the recalled color codes. Thus, the data stored in the memory determine the display by determining the color generated for each pixel (picture element) of the display.

The requirement for a natural looking display and the minimization of required memory are conflicting. In order to have a natural looking display, it is necessary to have a large number of available colors. This, in turn, necessitates a large number of bits for each pixel in order to specify the particular color desired from among a large number of possibilities. The provision of a large number of bits per pixel, however, requires a large amount of memory for storage. Since a number of bits must be provided for each pixel in the display, even a modest size display would therefore require a large memory. Thus, it is advantageous to provide some method to reduce the amount of memory needed to store the display while retaining the capability of choosing among a large number of colors.

The provision of a circuit called a color palette enables a compromise between these conflicting requirements. The color palette stores color data words which specify colors to be displayed in a form that is ready for digital-to-analog conversion directly from the color palette. Corresponding color codes having a limited number of bits are stored in the memory for each pixel have a limited number of bits, thereby reducing the memory requirements. The color codes are employed to select one of a number of color registers or palette locations. Thus, the color codes do not themselves define colors, but instead, identify preselected palette locations. These color registers or palette locations each store color data words which are longer than the color codes in the pixel map memory. The number of such color registers or palette locations provided in the color palette is equal to the number of selections provided by the color codes. For example, a 4-bit color code can be used to select $2^4$ or 16 palette locations. Significantly, the color data words can be redefined in the palette from frame to frame to provide many more colors in an ongoing sequence of frames than are present in any one frame. Significantly, the ability to redefine the color data words in the palette allow for the customization of colors on the display from one application to another.

Due to the advantages of color palette devices, systems and methods, any improvement in their implementation is advantageous in computer graphics technology.

SUMMARY OF THE INVENTION

A color palette is provided which includes a plurality of clock input terminals, a plurality of register selection control terminals, a plurality of video control terminals, a plurality of control data terminals, and a plurality of color code input terminals. The register selection circuitry is provided coupled to the register selection control terminals for selecting a register from among a plurality of registers in response to register selection signals received at the register selection control terminals. Clock control circuitry is provided which includes an input clock selection control register coupled to the register selection circuitry and the plurality of control data terminals for receiving and holding an input clock selection control word received at the control data terminals when the input clock selection control circuitry has been selected by the register selection circuitry. Input clock selection circuitry is provided coupled to the input clock selection control register and the clock input terminals which is operable to provide a master clock bypassing an input clock signal received at one of the clock input terminals selected in accordance with the input clock selection control word held in the input clock selection control register. A counter is provided having an input coupled to the input clock select circuitry and a plurality of counter outputs, the counter providing at each counter output a divided down clock signal having a clock frequency of a selected divide ratio of the master clock. An output clock selection control register is coupled to the register selection circuitry and the plurality of control data terminals for receiving and holding an output clock selection control word received at the control data terminals when the output clock selection controls register has been selected by the register selection circuitry. Shift clock select circuitry is provided coupled to the counter outputs and the output clock selection control register, the shift clock select circuitry operable to select a shift clock from among the plurality of divided down clock signals provided at the plurality of counter outputs in accordance with at least some bits of the output clock selection control word held by the output clock selection control register. Shift clock control circuitry is coupled to the shift clock select circuitry and is operable to enable the output of the shift clock in response to first blanking data and disable the output of the shift clock in response to a second blanking data. Video clock select circuitry is coupled to the outputs of the counter and the output clock selection control register, the video clock select circuitry operable to select a video clock from among the plurality of divided down clock signals provided at the counter outputs in accordance with at least some bits of the output clock selection control word held in the output selection control register. Input clock generation circuitry is coupled to the shift clock select circuitry for generating at least one data input clock. Input latching circuitry is coupled to the plurality of color code input terminals and the clock control circuitry for receiving multiple bit words of color codes and synchronizing each word of color code with at least one of the data input clocks and the master clock. A selector is coupled to the input latching circuitry and the clock control circuitry, the selector operable to output at least one memory recall address a first preselected number of periods of said master clock after receiving a word of color code. Color palette memory circuitry is coupled to the selector and the clock control circuit and includes a memory array having a plurality of data storage locations, each location having an associated memory recall address, the color palette memory circuitry operable to output a color data word written into a location a second preselected number of periods of the master clock after receiving an associated recall address from the selector. Memory write circuitry is coupled to the plurality of control data input terminals for selectively writing the color data words into the locations in the memory array, the memory write circuitry including at least one color data holding register coupled to the register select circuitry and the control data terminals for receiving and holding at least some bits of a color data word received at the control data terminals when the data holding register has been selected by the register selection circuitry. An address register is coupled to the control data terminals and the memory circuitry for receiving and storing a write address corresponding to a said location in the memory array. Circuitry is coupled to the holding register and the control data terminals for transferring a color data word, including bits received at the control data terminals and bits being held in the at least one color data holding register to a location in the memory addressed by the write address being held in the address register. Video control circuitry is coupled to the video control terminals and the clock control circuitry, the video control circuitry operable to receive video control signals applied to the video control terminals and synchronize the video control signals with the video clock and the master clock, the video control circuitry further operable to provide the first and second blanking data to the shift clock control circuitry. Digital data output control circuitry is provided which includes first array circuitry coupled to the input latching circuitry and operable to delay true color data received at least some of the plurality of color code inputs by a number of periods of the master clock signal equal to the total of the first number and the second number of periods of the master clock signal. An output multiplexer is coupled to the memory circuitry and the delay circuitry which is operable to select for output delayed true color data from the delay circuitry in response to a first control signal and color data words from the memory in response to a second control signal. Output select circuitry operable to provide the first and second control signals is included having discriminator circuitry coupled to the selector and operable to output the first control signal in response to a first value of the recall address output from the selector and the second control signal in response to a second value of the recall address output from the selector. Second delay circuitry is coupled to the discriminator circuitry and the output multiplexer which is operable to delay the first and second control signals by the second number of periods of the master clock signal. Analog output circuitry including a plurality of digital to analog converters is coupled to the output multiplexer for converting the color data words and the true color data words to analog color data. Finally, test circuitry is provided which includes a test register coupled to the control data terminals and the register selection circuitry which is operable to receive and hold a test selection control word when the test register has been selected by the register selection circuitry. Data flow test circuitry is coupled to the test register and the memory circuitry for passing the color data words output from the memory array to the control data terminals in accordance with a first test selection control word being held in the test register. One's accumulation test circuitry is coupled to the test register and the memory circuitry for performing one's accumulation on the color data words output from the memory array and passing a result to the control data terminals in response to a second test selection control word being held in the test register. Analog output test circuitry is coupled to the test register and the digital to analog converters for comparing a voltage output from a selected one of the digital to analog converters with a reference in accordance with a third test selection control word held in the test register.

BRIEF DESCRIPTION OF THE DRAWINGS

For a more complete understanding of the illustrated embodiments of the present invention, and the advantageous thereof, reference is now made to the following descriptions, taken in conjunction with the accompanying drawings, in which:

FIG. 5a–5m are upper level schematic diagrams of the color palette shown in FIG. 4;

FIGS. 8a–8l are a complete set of electrical schematic diagrams of the clock control circuitry 90 shown in FIG. 4 and as labelled THE_CLK_MUX in FIG. 5;

FIG. 9 is a timing diagram depicting the relationship between the master clock (DOTCLK), the video clock (VCLK) and the system shift clock (SCLK);

FIG. 10a–10c are a series of timing diagrams depicting the control timing of the system shift and video clocks;

FIG. 11a–11h are a complete set of electrical schematic diagrams of the input latches 74 as shown in FIG. 4 and labeled INPUT_LATCHES in FIG. 5;

FIGS. 12a–12f are a complete electrical schematic diagrams of selector 78 as shown in FIG. 4 and as labeled INPUT_MUX2 in FIG. 5;

FIGS. 16a–16b depict the equivalent electrical circuit for the green digital to analog converter 88 as shown in FIGS. 4 and 5 and the typical analog output from digital to analog converters 88;

DETAILED DESCRIPTION OF THE INVENTION

The preferred embodiment of the present invention and its advantages are best understood by referring to FIGS. 1–22 of the drawings, like numerals being used for like and corresponding parts of the various drawings.

Figure 1:
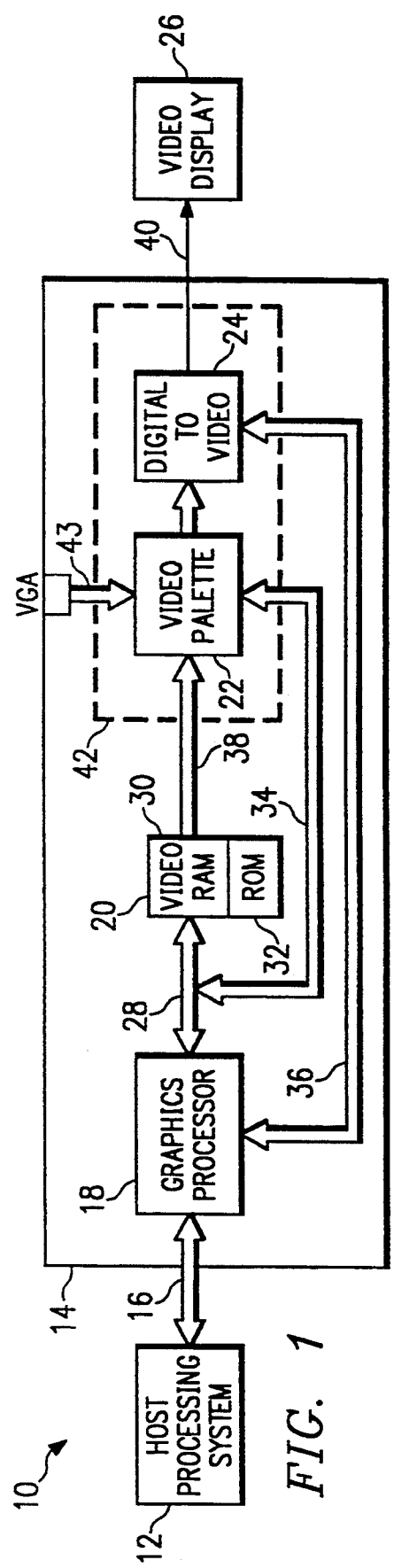
FIG. 1 is a functional block diagram of a graphics processor system utilizing one embodiment of the present invention.

Referring first to FIG. 1, a block diagram of a graphics computer system 10 is depicted as constructed in accordance with the principles of the illustrated embodiment of the present invention. For clarity and brevity in understanding the inventive concepts herein, a detailed description of the complete graphics processing system will not be provided. A more complete detailed discussion, however, can be found in patent application Ser. No. 07/544,775 filed Jun. 24, 1990, (attorneys' docket no. TI-15123), assigned to the assignee of the present application and hereby incorporated by reference. Also incorporated by reference herein are Texas Instruments TMS 34010 User's Guide (August 1988); TIGA-340 (TM) Interface, Texas Instruments Graphics Architecture, User's Guide, 1989; TMS 34020 User's Guide (January 1990); TMS 44C251 Specification; TMS34010 Graphics System Processor Products Application Guide, Texas Instruments., 1988; Texas Instruments 340 Family Third Party Guide (June 1990); and Texas Instruments Graphics Systems Primer, 1989, all of which documents are currently available to the general public from Texas Instruments Incorporated. These documents give a more thorough description of graphics processing systems in general.

Graphics computer system 10 includes a host processing system 12 coupled to a graphics printed wiring board 14 through a bidirectional bus 16. Located on printed wiring board 14 are a graphics processor 18, memory 20, a video palette 22 and a digital-to-video converter 24. Video display 26 is driven by graphics board 14.

Host processing system 12 provides the major computational capacity for graphics computer system 10 and determines the content of the visual display to be presented to the user on video display 26. The details of the construction of host processing system 12 are conventional in nature and known in the art and therefore will not be discussed in further detail herein.

Graphics processor 18 provides the data manipulation capability required to generate the particular video display presented to the user. Graphics processor 18 is bidiectionally coupled to processing system 12 via bus 16. While graphics processor 18 operates as a data processor independent of host processing system 12, graphics processor 18 is fully responsive to requests output from host processing 12. Graphics processor 18 further communicates with memory 20 via video memory bus 28. Graphics processor 12 controls the data stored within video RAM 30, RAM 30 forming a portion of memory 20. In addition, graphics processor 18 may be controlled by programs stored in either video RAM 30 or in read-only memory 32. Read-only memory 32 may also include various types of graphic image data, such as alpha numeric characters in one or more font styles and frequently used icons. Further, graphics processor 12 controls data stored within video palette 22 via bidirectional bus 34. Finally, graphics processor 18 controls digital-to-video converter 24 via video control bus 36.

Video RAM 30 contains bit map graphic data which control the video image presented to the user as manipulated by graphics processor 18. In addition, video data corresponding to the current display screen are output from video RAM 30 on bus 38 to video palette 22. Video RAM 30 may consist of a bank of several separate random access memory integrated circuits, the output of each circuit typically being only one or 4 bits wide as coupled to bus 38.

Video palette 22 receives high speed video data from video random access memory 30 via bus 38 and data from graphics processor 18 via bus 34. In turn, video palette 22 converts the data received on bus 38 into a video level which is output on bus 40. This conversion is achieved by means of a look-up table which is specified by graphics processor 18 via video memory bus 34. The output of video palette 22 may comprise color, hue and saturation signals for each picture element or may comprise red, green and blue primary color levels for each pixel. Digital-to-video converter 24 converts the digital output of video palette 22 into the necessary analog levels for application to video display 26 via bus 40.

Printed wiring board 14 also includes a VGA pass-through port 43 coupled to palette 42. In the VGA pass-through mode, data from the VGA connector of most VGA supported personal computers is fed directly into palette 42 without the need for external data multiplexing. This allows a replacement graphics board to remain "downward compatible" utilizing the existing graphic circuitry often located on the mother board of the associated host processing system 12.

Video palette 22 and digital-to-video converter 24 may be integrated together to form a "programmable palette" 42 or simply "palette" 42. The palette RAM, discussed below, is often referred to as the "look-up" table.

Video display 26 receives the video output from digital-to-video converter 24 and generates the specified video image for viewing by the user of graphics computer system 10. Significantly, video palette 22, digital-to-video converter 24 and video display 26 may operate in accordance with either of two major video techniques. In the first technique, video data are specified in terms of color, hue and saturation for each individual pixel. In the second technique, the individual primary color levels of red, blue and green are specified for each individual pixel. Upon selection of the desired design using either of these two techniques, video palette 22, digital-to-video converter 24 and video display 26 are customized to implement the selected technique. However, the principles of the present invention in regard to the operation of the graphics processor 18 are unchanged regardless of the particular design choice of the video technique. All of the signals that contribute to display color in some way are regarded as color signals even though they may not be of the red, blue, green technique.

Figure 2:
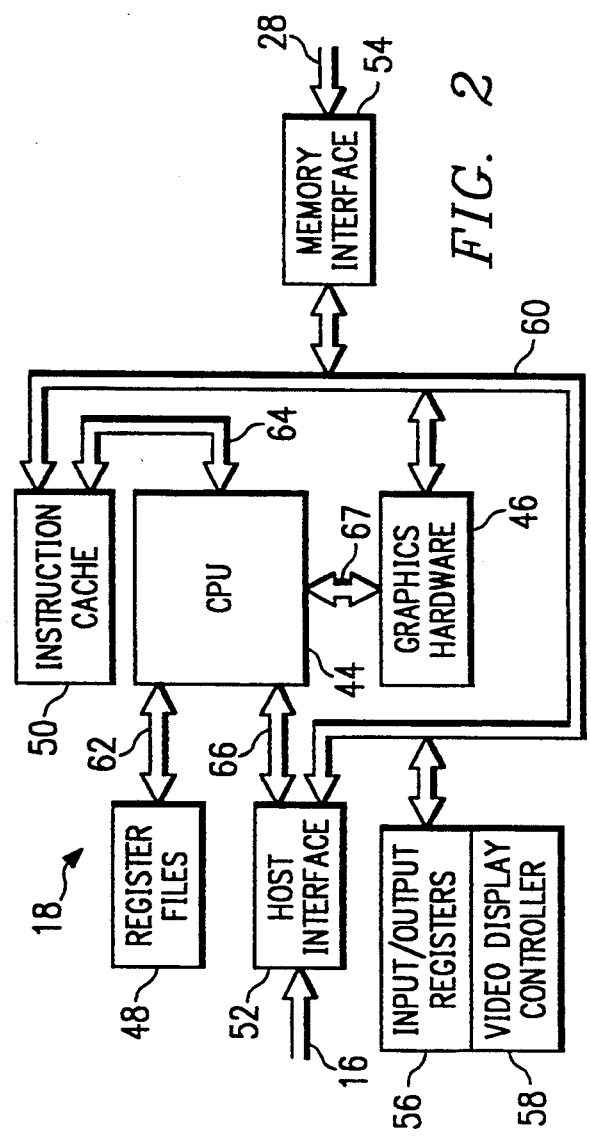
FIG. 2 is a more detailed functional block diagram of a graphics processor for use with the invention.

FIG. 2 generally illustrates graphics processor 18 in further detail. Graphics processor 18 includes central processing unit 44, graphics hardware 46, register files 48, instruction cache 50, host interface 52, memory interface 54, input/output registers 56 and video display controller 58.

The central processing unit 44 performs a number of general purpose data processing functions including arithmetic and logic operations normally included in a general purpose central processing unit. In addition, central processing unit 44 controls a number of special purpose graphics instructions, either alone or in conjunction with graphics hardware 46.

Graphics processor 18 includes a major bus 60 which is connected to most parts of graphics processor 18, including central processing unit 44. Central processing unit 44 is bidirectionally coupled to a set of register files 48, including a number of data registers, via bidirectional register bus 62. Register files 48 serve as the repository of the immediately accessible data used by central processing unit 44.

Central processing unit 44 is also connected to instruction cache 50 by instruction cache bus 64. Instruction cache 50 is further coupled to bus 60 and may be loaded with instruction words from video memory 20 (FIG. 1) via video memory bus 28 and memory interface 54. The purpose of instruction cache 50 is to speed up the execution of certain functions of central processing unit 44. For example, a repetitive function that is often used within a particular portion of the program executed by central processing unit 44 may be stored within instruction cache 50. Access to instruction cache 50 via instruction cache bus 64 is much faster than access to video memory 20 and thus, the overall program executed by central processing unit 44 may be sped up by a preliminary loading of the repeated or often used sequences of instructions within instruction cache 50.

Host interface 52 is coupled to central processing unit 44 via host interface bus 66. Host interface 52 is further connected to host processing system 12 via host system bus 16. Host interface 52 serve to control the communications between host processing system 16 and graphics processor 18. Typically, host interface 52 would communicate graphics requests from the host processing system 16 to graphics processor 18, enabling host system 16 to specify the type of display to be generated by video display 26 and causing graphics processor 18 to perform a desired graphic function.

Central processing unit 44 is further coupled to graphics hardware 46 via graphics hardware bus 68. Graphics hardware 46 is additionally connected to major bus 60. Graphics hardware 46 operates in conjunction with central processing unit 44 to perform graphic processing operations. In particular, graphics hardware 46 under control of central processing 44 is operable to manipulate data within the bit map portion of video RAM 30.

Memory interface 54 is coupled to bus 60 and further coupled to video memory bus 28. Memory interface 54 serves to control the communication of data and instructions between graphics processor 18 and memory 20. Memory 20 includes both the bit map data to be displayed on video display 26 and the instructions and data necessary for the control and operation of graphics processor 18. These functions include control of the timing of memory access, and control of data and memory multiplexing.

Graphics processor 18 also includes input/output registers 56 and a video display controller 58. Input/output registers 56 are bidirectionally coupled to bus 60 to enable reading and writing within these registers. Input/output registers 56 are preferably within the ordinary memory space of central processing unit 44. Input/output registers 56 contain data which specify the control parameters of video display controller 58. In accordance with the data stored within the input/output registers 56, video display controller 58 controls the signals on video control bus 36 for the desired control of palette 42. For example, data within input/output registers 56 may include data for specifying the number of pixels per horizontal line, the horizontal synchronization and blanking intervals, the number of horizontal lines per frame and the vertical synchronization and blanking intervals.

Figure 3:
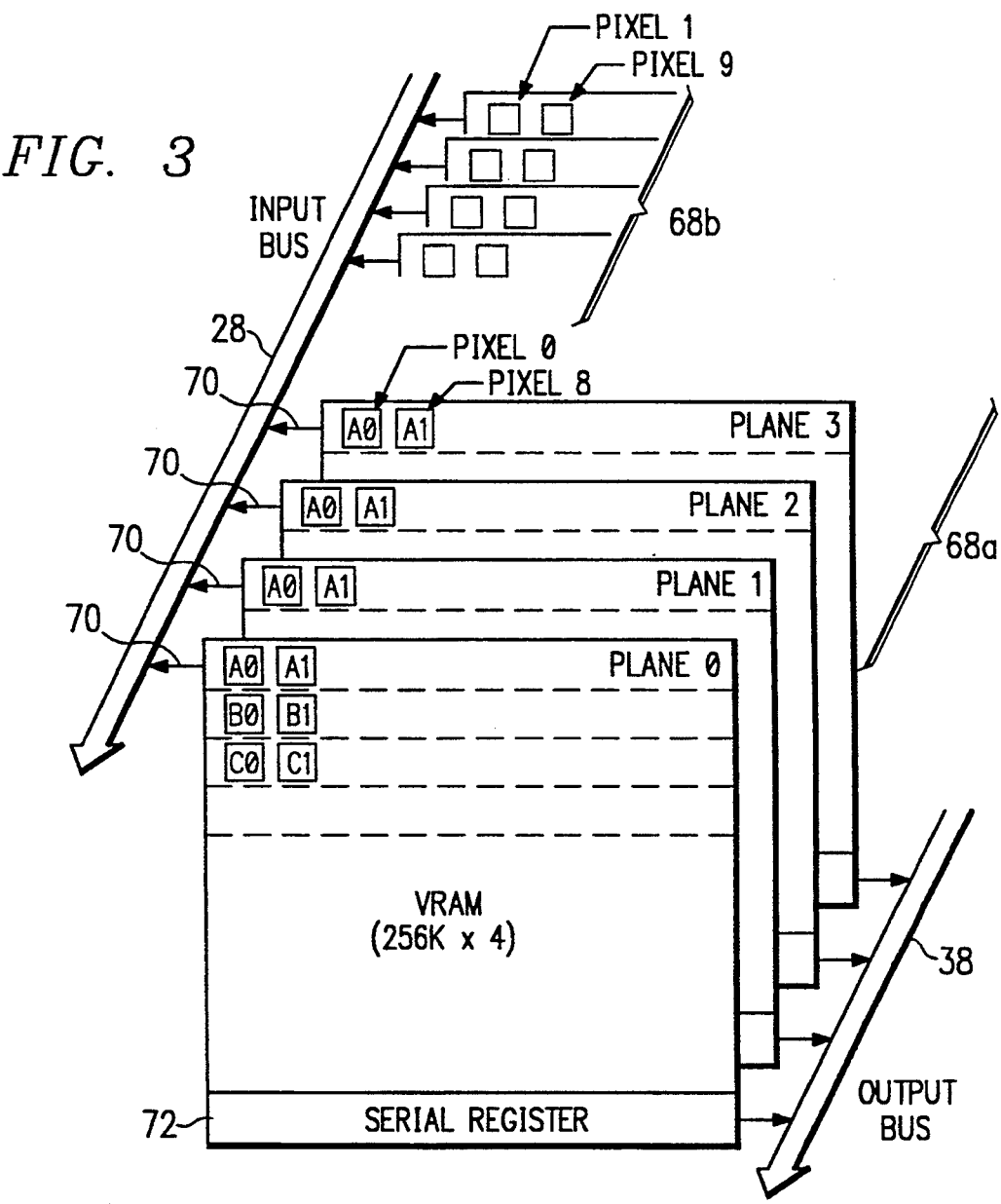
FIG. 3 is a schematic diagram depicting a preferred architecture for video RAM depicted in FIG. 1.

Referring next to FIG. 3 a typical graphics memory system configuration for video RAM 20 is depicted in which eight VRAM memories 68 are used as an array, two of which are depicted as 68a and 68b. Each VRAM memory 68, or unit, includes four sections, or planes, 0, 1, 2 and 3. The construction of each plane is such that a single data lead 70 is used to write information to that plane. In a system which uses a 32-bit data bus, such as data bus 28, there would be eight VRAM memories, each VRAM memory having four data leads connected to the input data bus. For example, for 32-bit data bus 28, VRAM memory 68a would have its four data leads 70 connected to data bus 28 leads 0, 1, 2, and 3, respectively. Likewise, the next VRAM memory 68b would have its four leads 0, 1, 2, and 3 connected to data bus 28 leads 4, 5, 6, and 7, respectively. This pattern continues for the remaining six VRAMs such that the last VRAM has its leads connected to leads 28, 29, 30, 31 (not shown) of bus 28.

The VRAM memories 68 are arranged such that the pixel information for the graphics display is stored serially across the planes in the same row. Assuming a 4-bit per pixel system, then the bits for each pixel are stored in separate VRAM memory. In such a situation, pixel 0 would be the first VRAM 68a and pixel 1 would be the second VRAM 68b. The pixel storage for pixels 2-7 are not shown, but these would be stored in column 1 of VRAMS 68c, d, e, f, g and h. The pixel information for pixel 8 would be stored in the first VRAM 68a, still in row A, but in column 2 thereof.

Each VRAM plane has a serial register 72 for shifting out information from a row of memory. In the preferred embodiment, the shifting out is performed in response to a shift clock signal SCLK (not shown) generated on palette 42 (FIG. 1). The outputs from these registers are connected to bus 38 in the same manner as the data input leads are connected to input bus 28. Thus, data from a row memory, such as row A, would be moved into register 72 and output serially from each register 72 and in parallel on bus 38. This would occur for each plane of the eight VRAM memory array.

The memory configuration depicted in FIG. 3 is not limited to the handling of 4-bit pixel description data. For example, if the information for each pixel was to be described in eight bits, then two VRAMs 68 would be required per pixel. Further, for increased ability in handling data, shift registers 72 would be split in half with each half used to output data onto bus 38. The split register approach allows for differences in the number of pixels required by the display and the number of bits per pixel desired. A more complete description of this feature can be found in co-assigned application Ser. No. 07/544,775 (Attorneys' Docket No. TI-15123) and hence, will not be repeated here.

Returning to FIGS. 1 and 2, graphics processor 18 operates in two different address modes to address memory 20. These two address modes are X-Y addressing and linear addressing. In linear addressing, the start of a field is formed by a single multibit linear address. The field size is determined by the data within a status register within central processing unit 44. In X-Y addressing, the start address is a pair of X and Y coordinate values. The field size is equal to the size of a pixel, that is, the number of bits required to specify the particular data of a particular pixel.

It is important to note that in any event, graphics processor 18 may manipulate data to provide for a variable number of pixels as required by the associate display 26 as well as a variable number of data bits per pixel in each color code. This provides increased flexibility in terms of the size and resolution of display 26 and the number of possible colors available for a given pixel. As will be discussed below in further detail in conjunction with the description of the color palette 42, graphics processor 18 in the illustrated embodiment outputs 32-bit color code words which may provide thirty-two 1-bit, sixteen 2-bit, eight 4-bit, or four 8-bit addresses for each pixel to the lookup table. The more bits that are provided for each address, the more palette locations (i.e., possible colors) are accessible for a given pixel.

Figure 4:
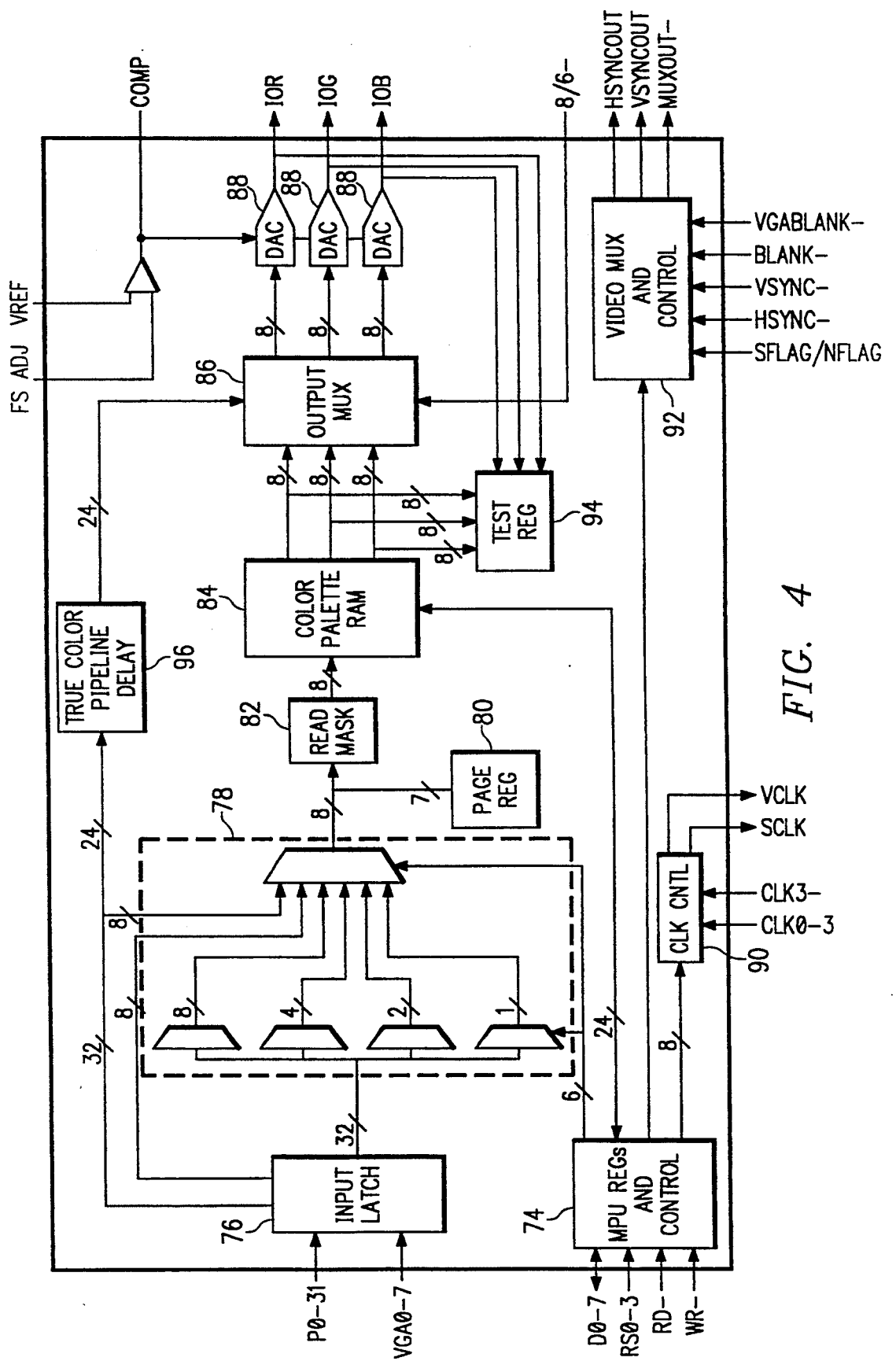
FIG. 4 is a functional block diagram of a video palette depicted in FIG. 1.

FIG. 4 if a functional block diagram depicting the major components of color palette 42 and includes microprocessor unit (MPU) registers and control circuitry 74. MPU registers and control circuitry 74 controls the operation of color palette 42 by loading control data received on inputs D0-D7 into the registers of a register map as selected by register select signals RS0-RS3. Read (RD-) and write (WR-) signals control the reading and writing of color data words into the look-up table contained by palette 42. Input latches 76 receive color codes from video memory 30 through inputs P0-P31 and synchronize the received color codes to the internal clocks generated on color palette 42 (discussed below). Additionally, input latch 76 receives VGA pass through data on VGA inputs VGA0-VGA1.

Selector 78 receives the color code words from input latch 76 and generates at least one recall address in response. Depending on the width of the bus coupled to input latch 76, selector 78 may input code words of one, two, four, eight, sixteen or thirty-two bits from VRAM 30 and output a corresponding number of one, two, four, or eight bit addresses, as selected by MPU registers and control circuitry 74. Since color palette 42 processes eight bit words, page register 80 insures that all recall addresses provided to palette RAM 84 are eight bits wide, even if one, two, or four bit addresses are being output by selector 78. A read mask 82 allows for the selective masking of bits in the recall address following paging.

Color palette RAM 84 maintains the look-up table for color palette 42. Color palette RAM includes a memory array having a plurality of locations in which color data words are written under the control of MPU registers and control circuitry 74 as defined by graphics processor 18. A twenty-four bit color data word (consisting of three eight-bit words of red, blue, and green color data) is output with each read address from selector 78. In the normal mode, the words of red, blue, and green data from color palette RAM 84 pass through output multiplexer 86 to digital to analog converters 88 which drive display 26.

Clock control circuitry 90 provides for the selection and generation of both the internal clocks necessary to drive color palette 42 and the system shift and video clocks. Clock control circuitry 90 allows the selection of a master clock (DOT clock) from the clocks input on terminals CLK0–CLK3 and CLK3- (discussed in further detail below). Clock control circuitry 90 also allows for the selection of the system shift and video clocks as divide ratios of the selected master clock.

Video multiplexer and control circuitry 92 allows for the input of display control signals such as horizontal and vertical synchronization signals (HSYNC- and VSYNC-) and blanking signals (BLANK- and VGA-BLANK-). Video multiplexer and control circuitry 92 synchronizes the video control signals with the clocks used by color palette 42 to generate the desired color data.

The test register 94 provides for data flow testing of the color data words output from color palette RAM 84 as well as for a one's accumulation test of the color data from RAM 84. Further, test register 94 provides for an analog test of the output of digital to analog converters 88 by allowing the outputs of each digital to analog converter 88 to be compared against the output of each of the other digital to analog converters 88 as well as against a test reference voltage VREF.

Finally, in the true color mode, twenty-four bits of each thirty-two bit word received at the input latch 76 is bypassed directly to output multiplexer 86 to be output as "true color data" which is used to drive digital to analog converters 88. The remaining eight bits of the thirty-two bit word received at input latch 76 proceeds through the normal path through color palette RAM 84 to provide overlay data. When the overlay data is a non-zero value, it is passed through output multiplexer 86 to digital to analog converters 88, while when the overlay data is a zero value, the true color data is passed directly from input latch 76 is output by output multiplexer 86 to digital to analog converters 88. True color pipeline delay circuitry 96 insures that the overlay data and the true color data arrive at output multiplexer 86 at the same time for proper timing of the output data.

FIG. 5 is an upper level electrical schematic drawing of the color palette shown in FIG. 4. FIGS. 5a–5m are a complete set of upper level block diagrams and schematics describing color palette 42° FIG. 5a shows a portion of the upper level overall design including the several TTL to CMOS input buffers for receiving input signals (including the input clocks), input latches 76, clock control block 90 (THE_CLK_MUX) and the red digital-to-analog converter 88 (RED). FIG. 5b depicts the green and blue digital analog converters 88, current stearing circuit TBIAS 3 and operational amplifier IAMP3 driving digital analog converters 88, DAC_SYNC3 which provides the sync current for the digital analog converters 88, and the on-board voltage reference REF. FIG. 5c depicts the ones accumulator block ONESCNTR2, the accumulator multiplexer ACCUMULATOR_MUX, and one true color multiplexer TC_MUXR. FIG. 5d illustrates the blue and green true color multiplexers TC_MUXG and TC_MUXB, the timing control circuitry for video control SYNC_CNTL2, and the output driver circuitry for the horizontal and vertical synchronization signals. FIG. 5e depicts the input multiplexer (INPUT_MUX2) 78, the read mask 82, a pipeline delay PIPE2P, and true color multiplexer enable block TCMUX_EN. FIG. 5f includes the palette RAM 84 (PALETTE), the microprocessor interface 74 (MCROINTF2), and several input buffers and output drivers. FIG. 5g depicts the internal sub-blocks of the pipeline delay PIPE2P. FIG. 5h depicts internal transistor test structures. FIG. 5i is an electrical schematic diagram of the voltage reference circuit shown in FIG. 5b. The voltage reference circuitry provides the test reference TSTREF which is used to perform a voltage comparison test of the voltage outputs of digital analog converters 88, discussed further below, and the on-board voltage reference for the digital analog converters 88. FIG. 5j is a detailed schematic of the ECL to CMOS converter ECLTOCMOSA_NEW which allows the input of a differential ECL clock and conversion into a single line CMOS clock. FIGS. 5k and l together depict the microport tri-state output buffer which drives pins D0–D7 when data is being sent to processor 18 from color palette 42. FIG. 5m shows the output driver which drives the horizontal synchronization output, the vertical synchronization output and the MUXOUT from color palette 42. FIG. 5m further depicts the equivalent electrical circuits for the ESD structures on the bond pads and the TTL input buffers used to receive each input signal at a TTL level and convert the same signal at a CMOS level. The circuitry shown in FIGS. 5a–5m is discussed in further detail below.

MPU Interface 74 (MCROINTF2)

The processor interface is controlled via read and write strobes (RD-, WR-), four register select pins (RS0–RS3), and the 8/6-select pin. Control data to be loaded into the selected register is received through eight data input pins (D0–D7). The 8/6-pin is used to select between 8- or 6-bit operation. This operation is carried out in order to utilize the maximum range of the digital to analog converters 88.

Figure 5A:
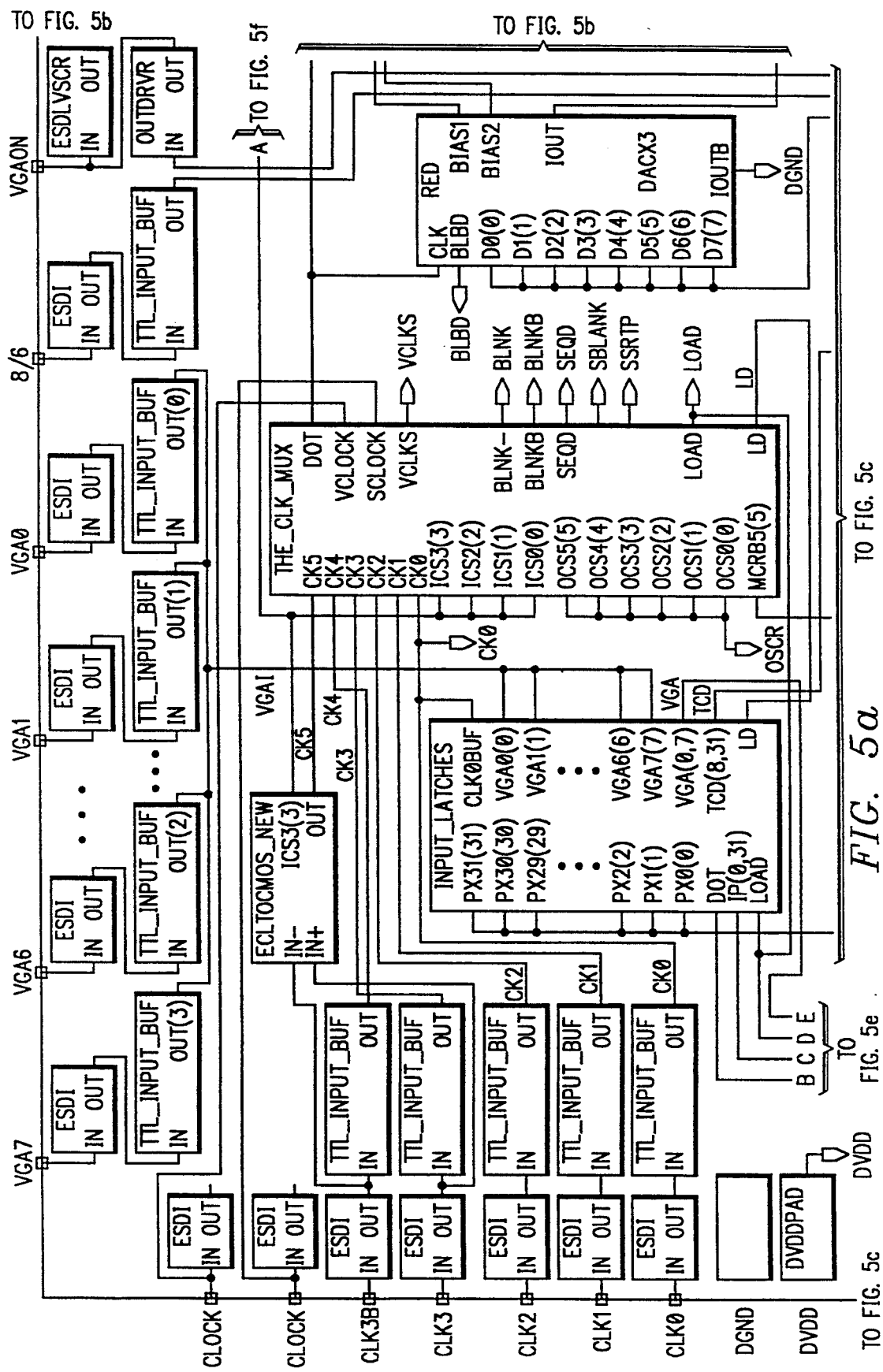
Figure 5B:
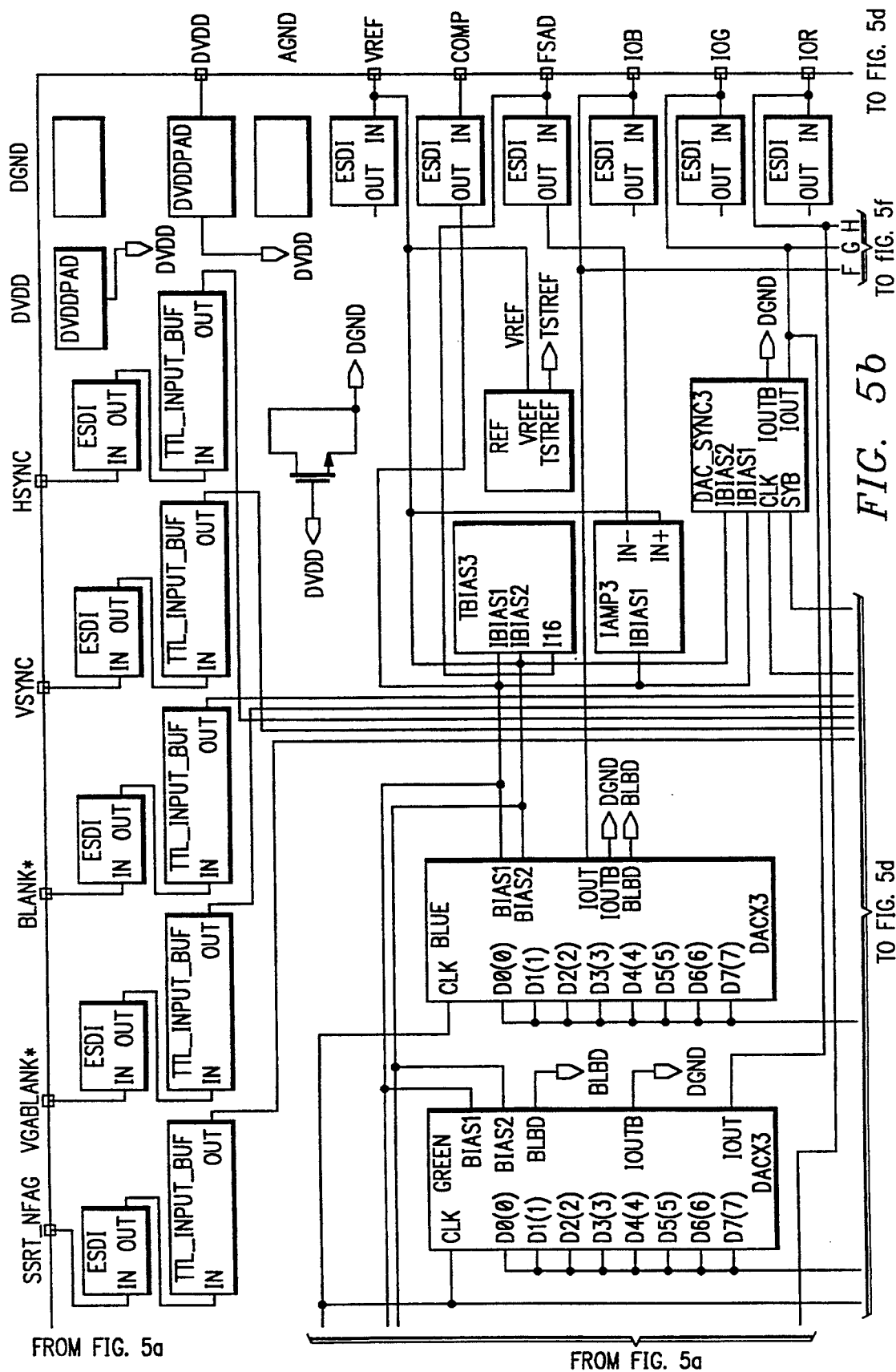
Figure 5C:
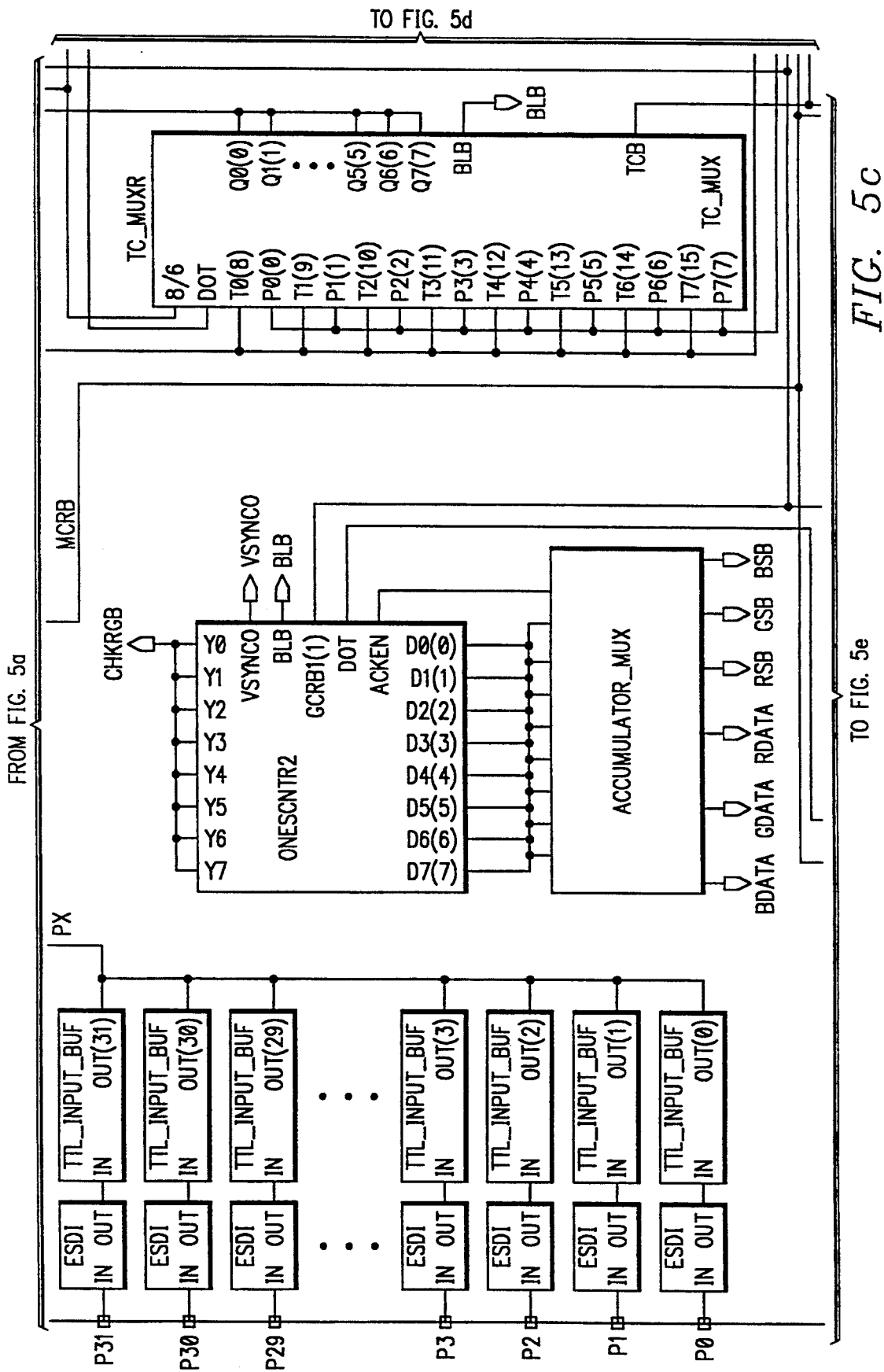
Figure 5D:
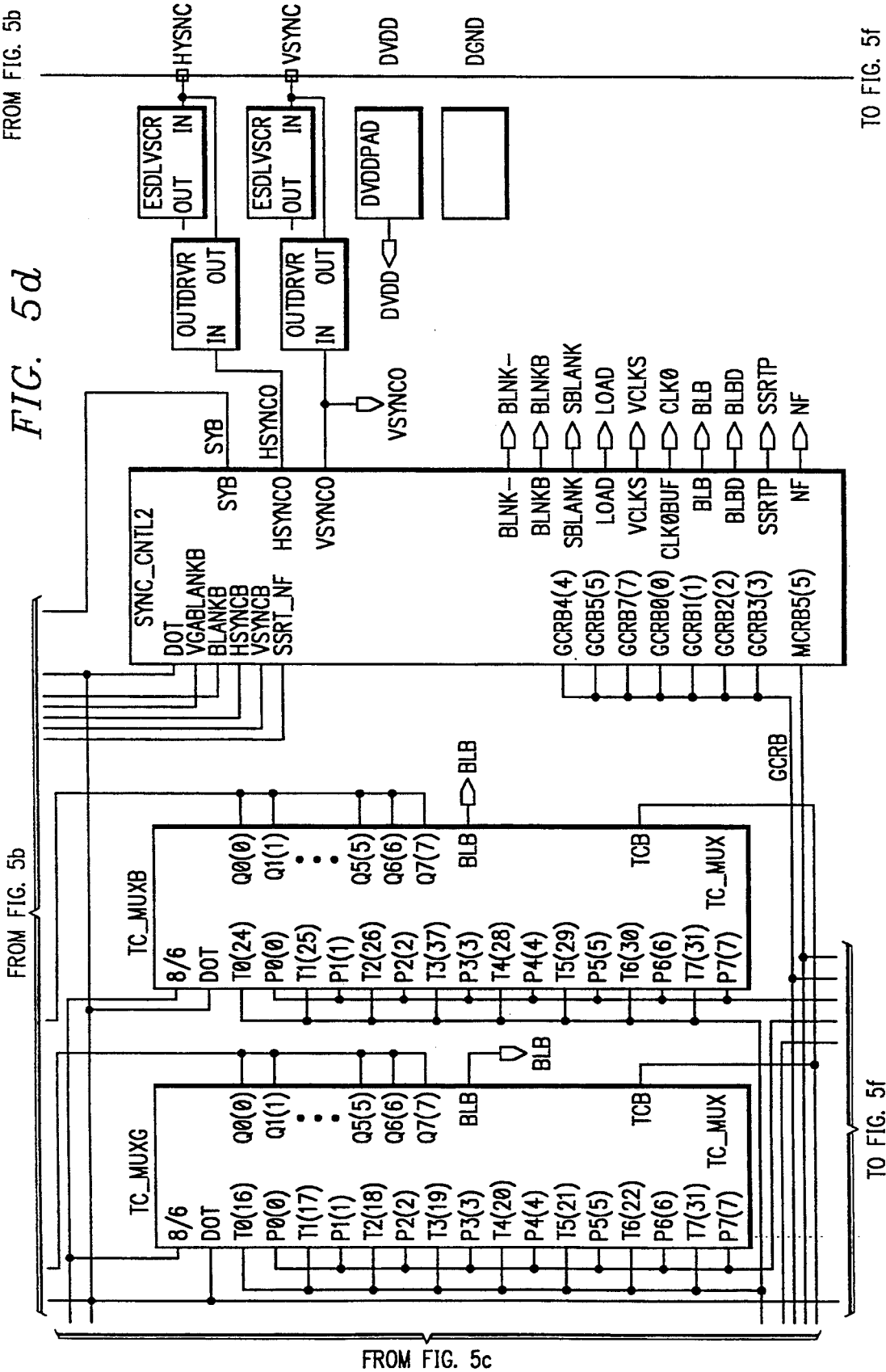
Figure 5G:
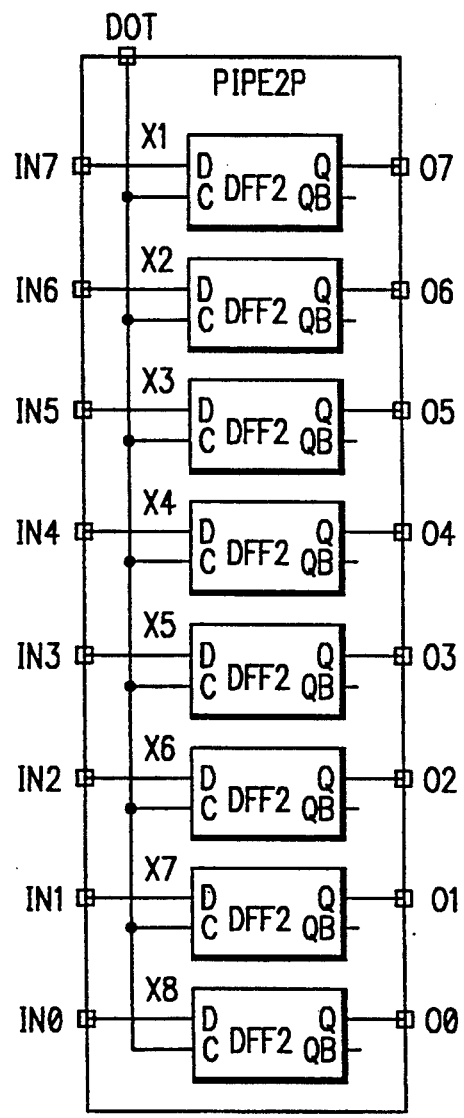
Figure 5H:
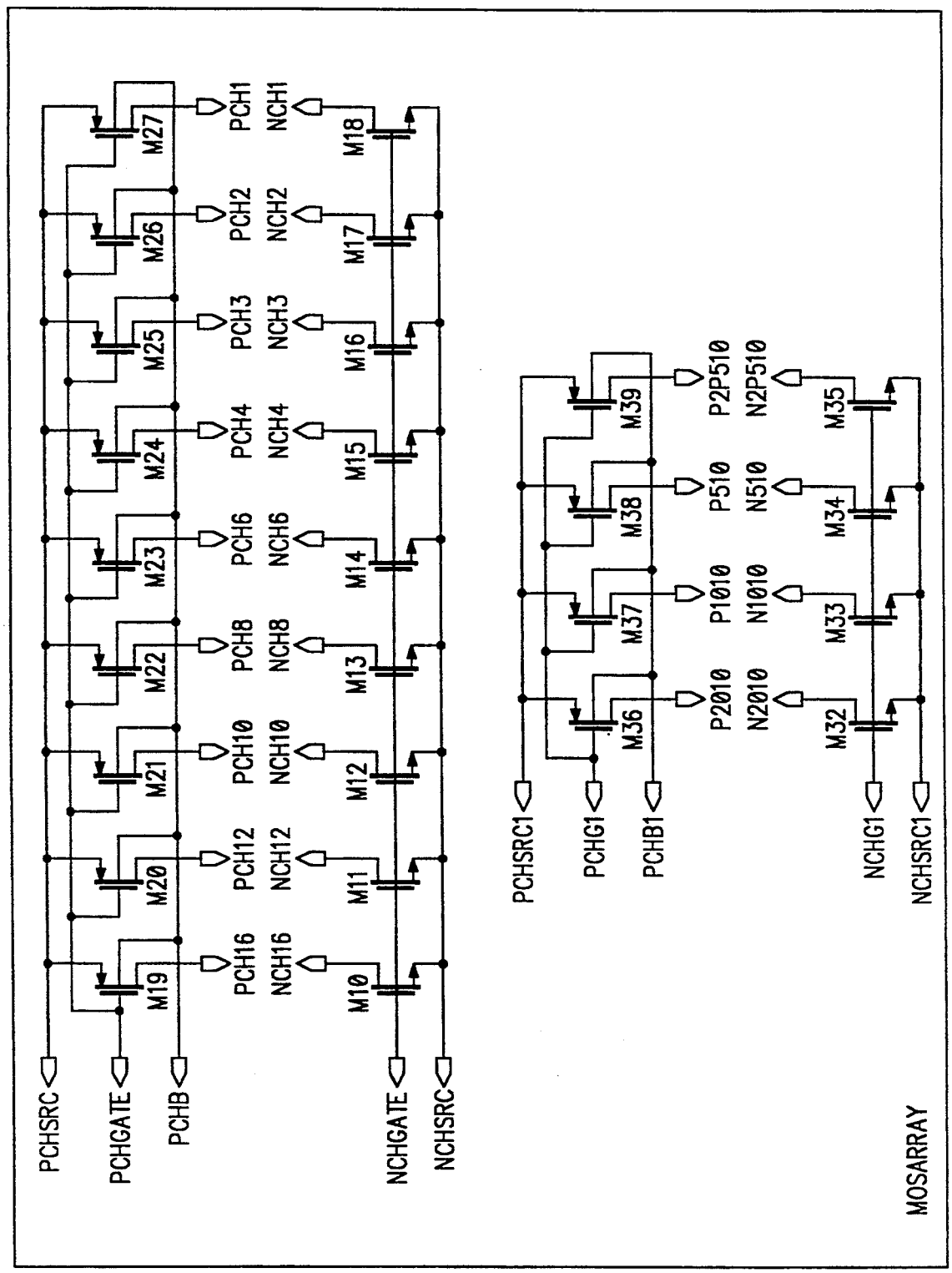
Figure 5I:
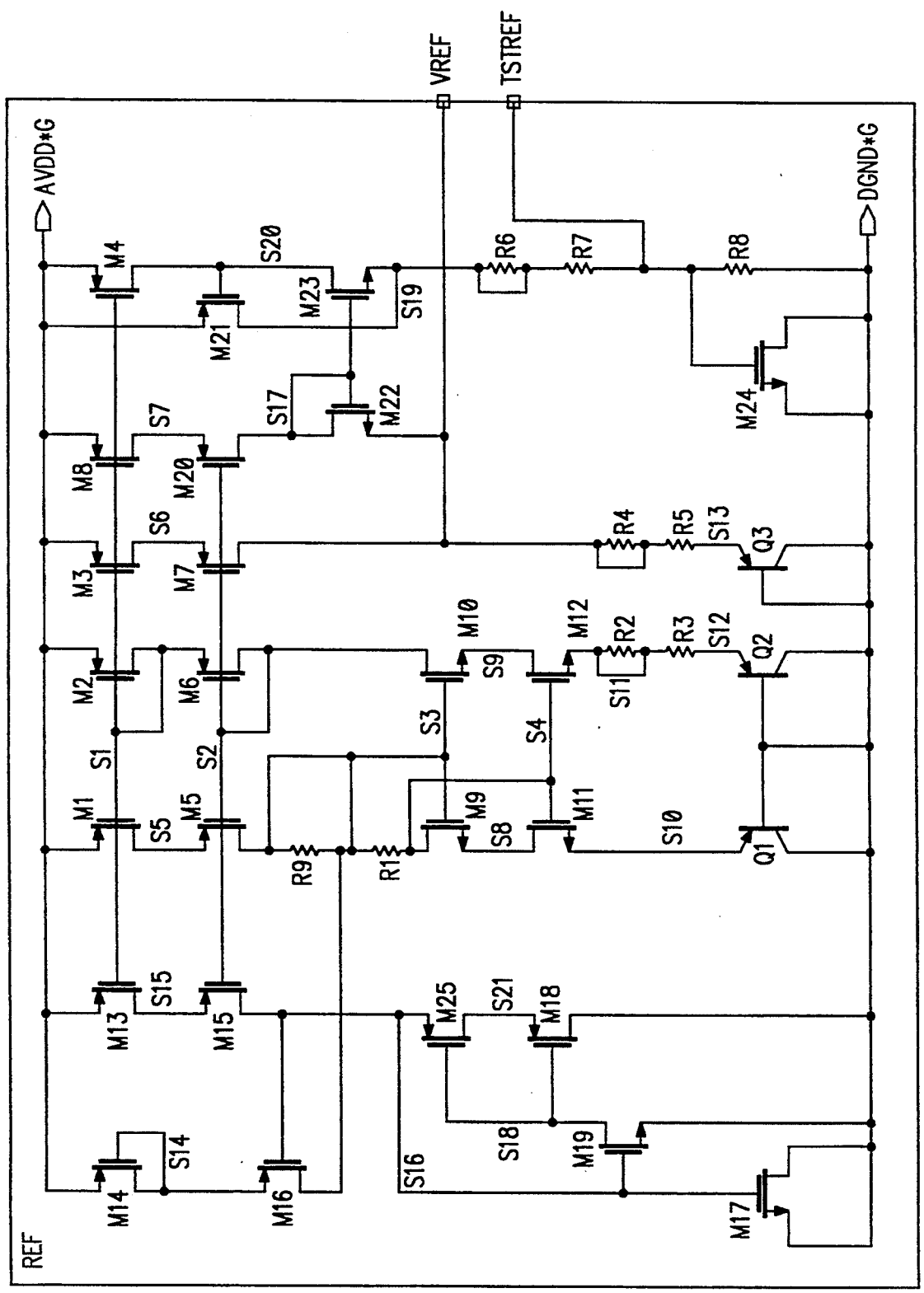
Figure 5J:
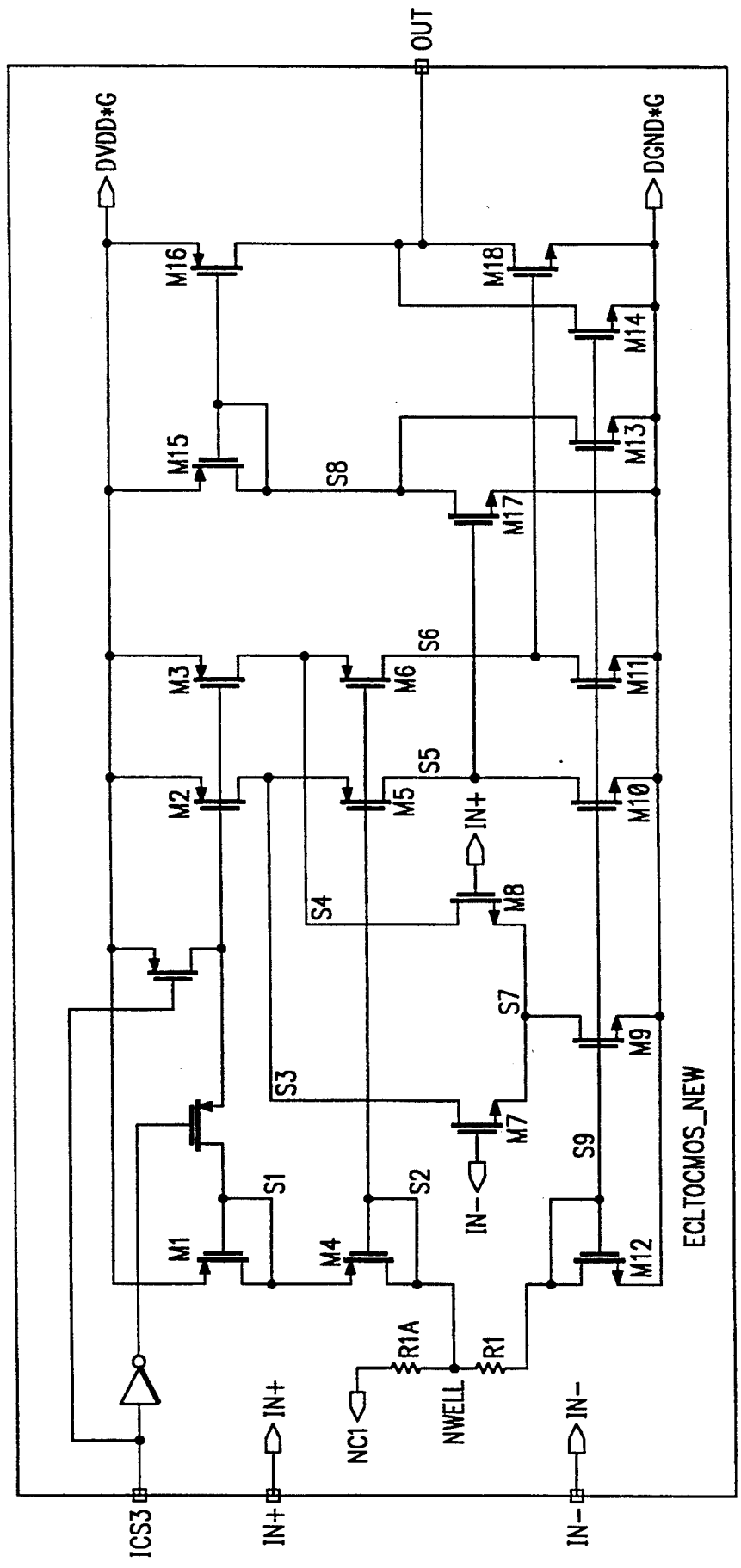
Figure 5K:
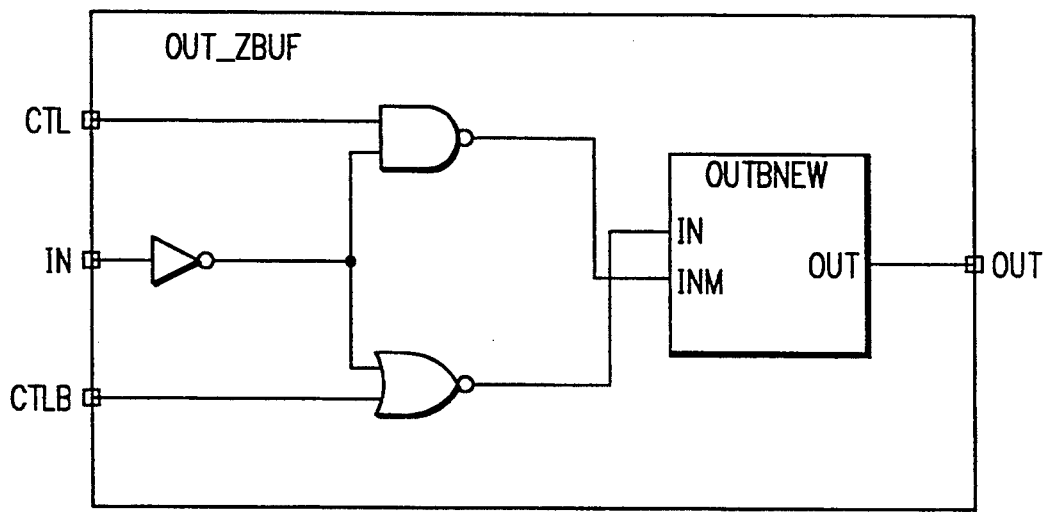
Figure 5L:
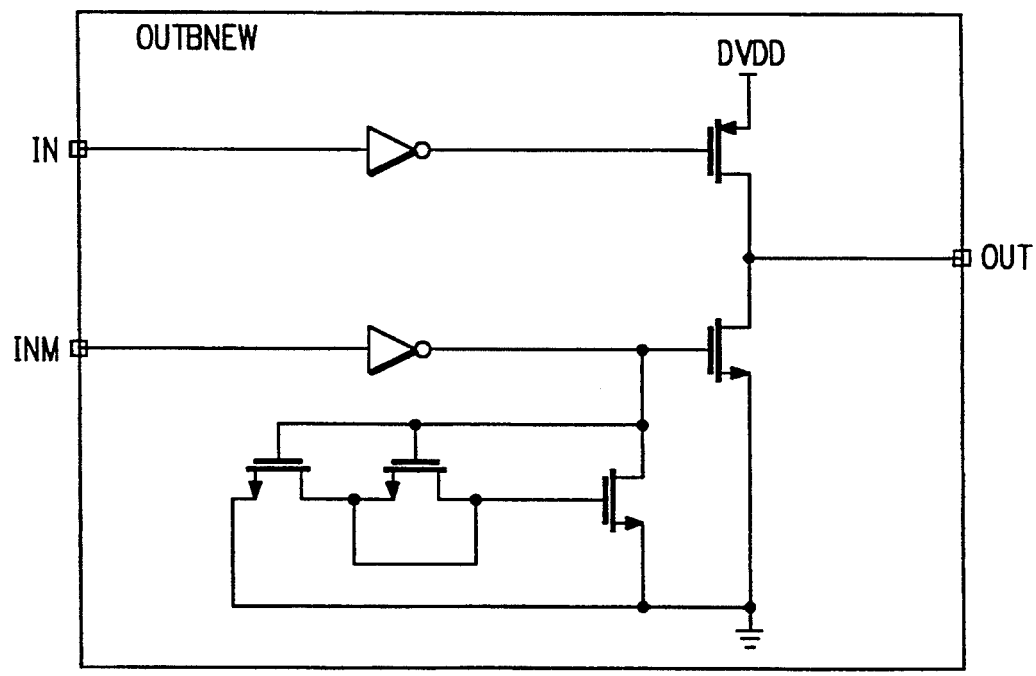
Figure 6A:
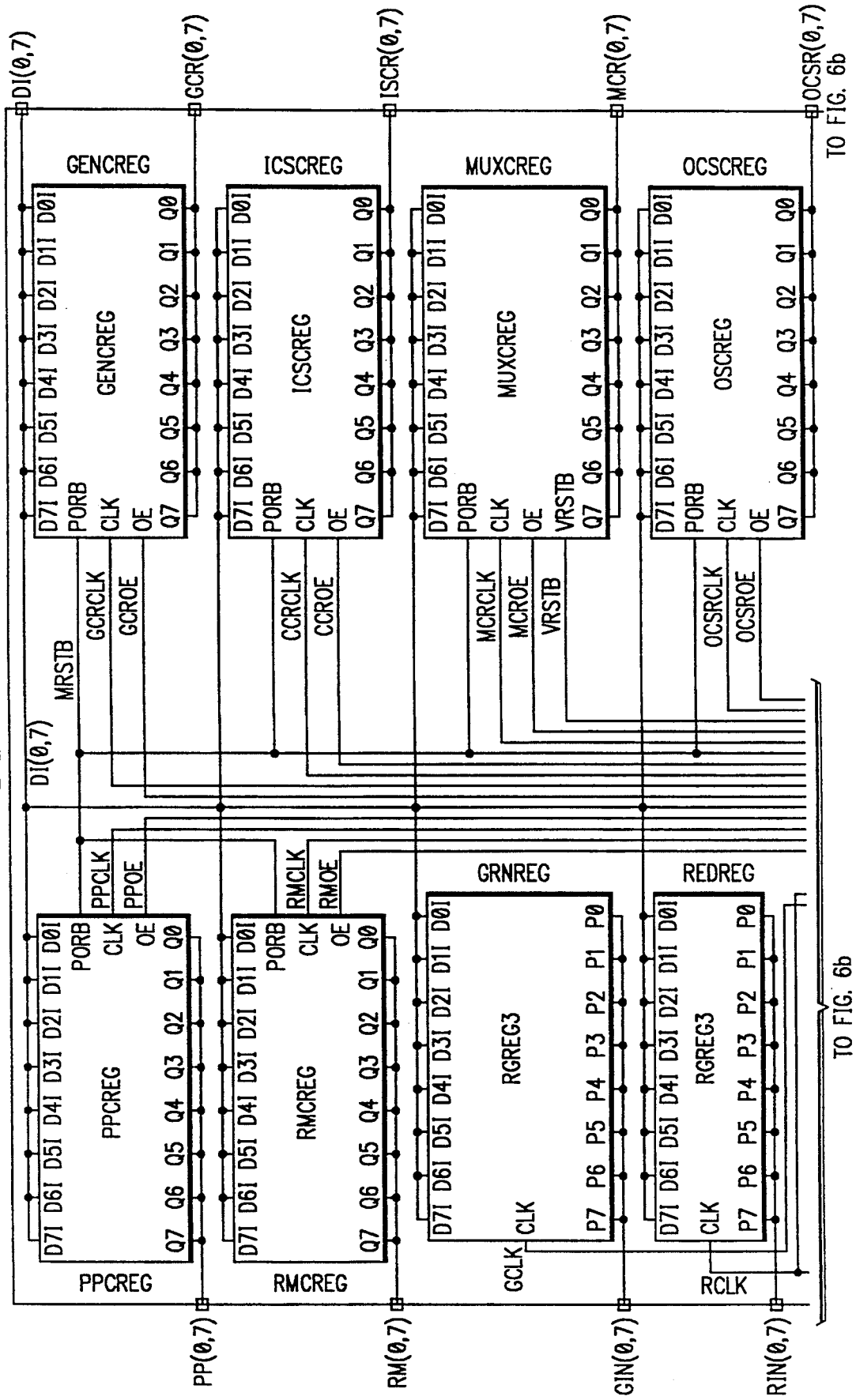
FIGS. 6a–6aj are a complete set of electrical schematic diagrams of MPU registers and control circuitry 74 as shown in FIG. 4 and as labeled MCROINTF2 in FIG. 5.
Figure 6C:
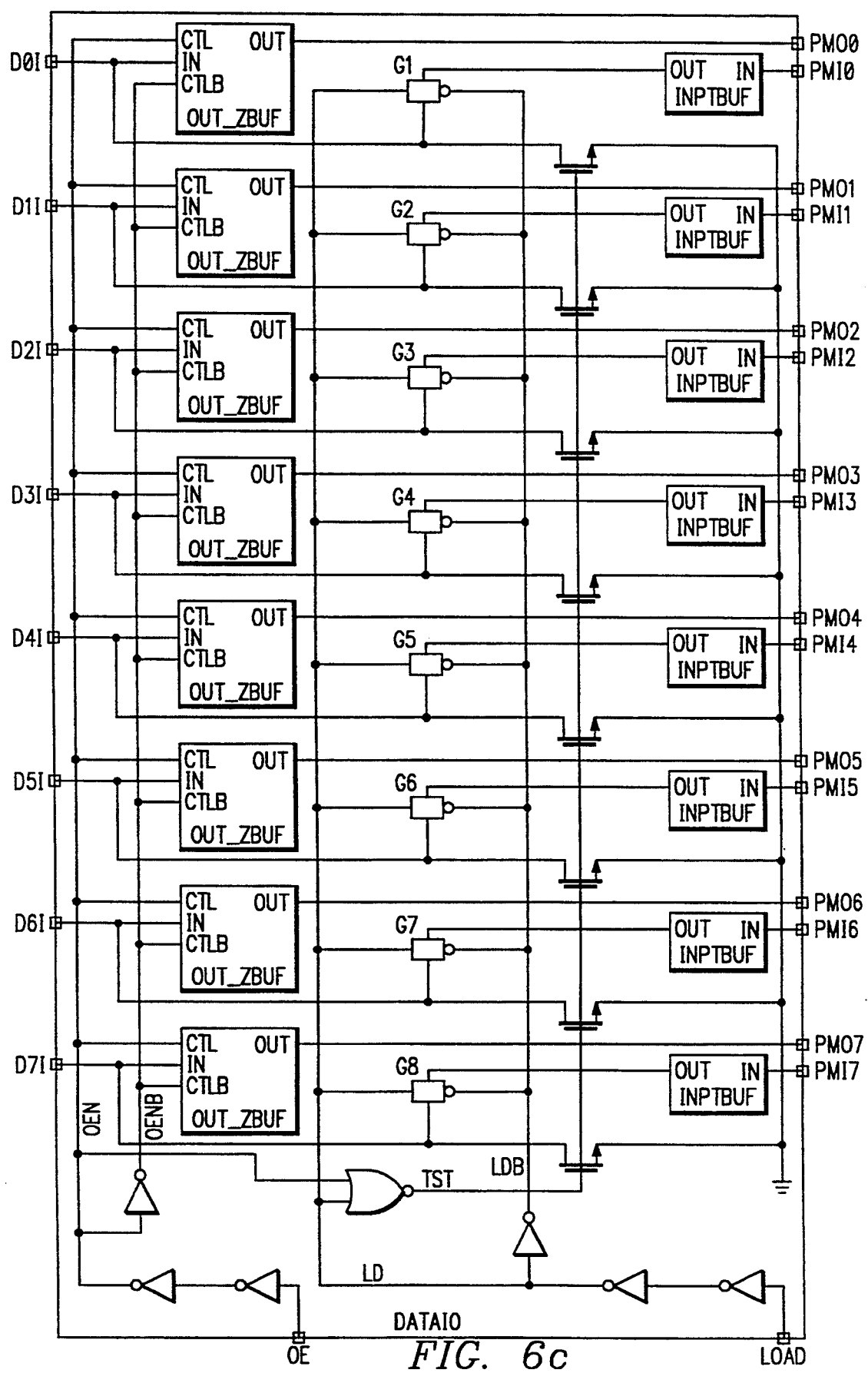
Figure 6D:
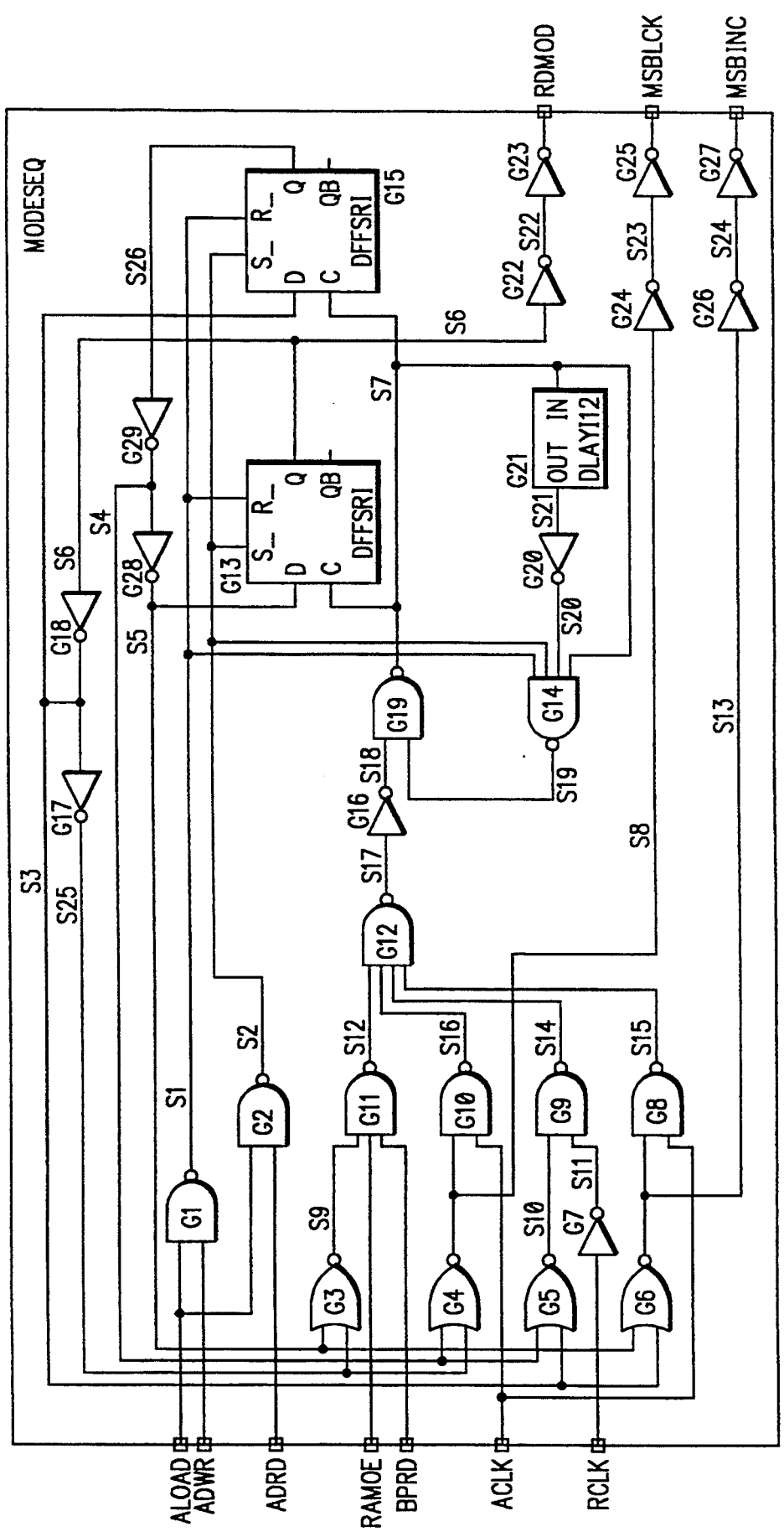
Figure 6E:
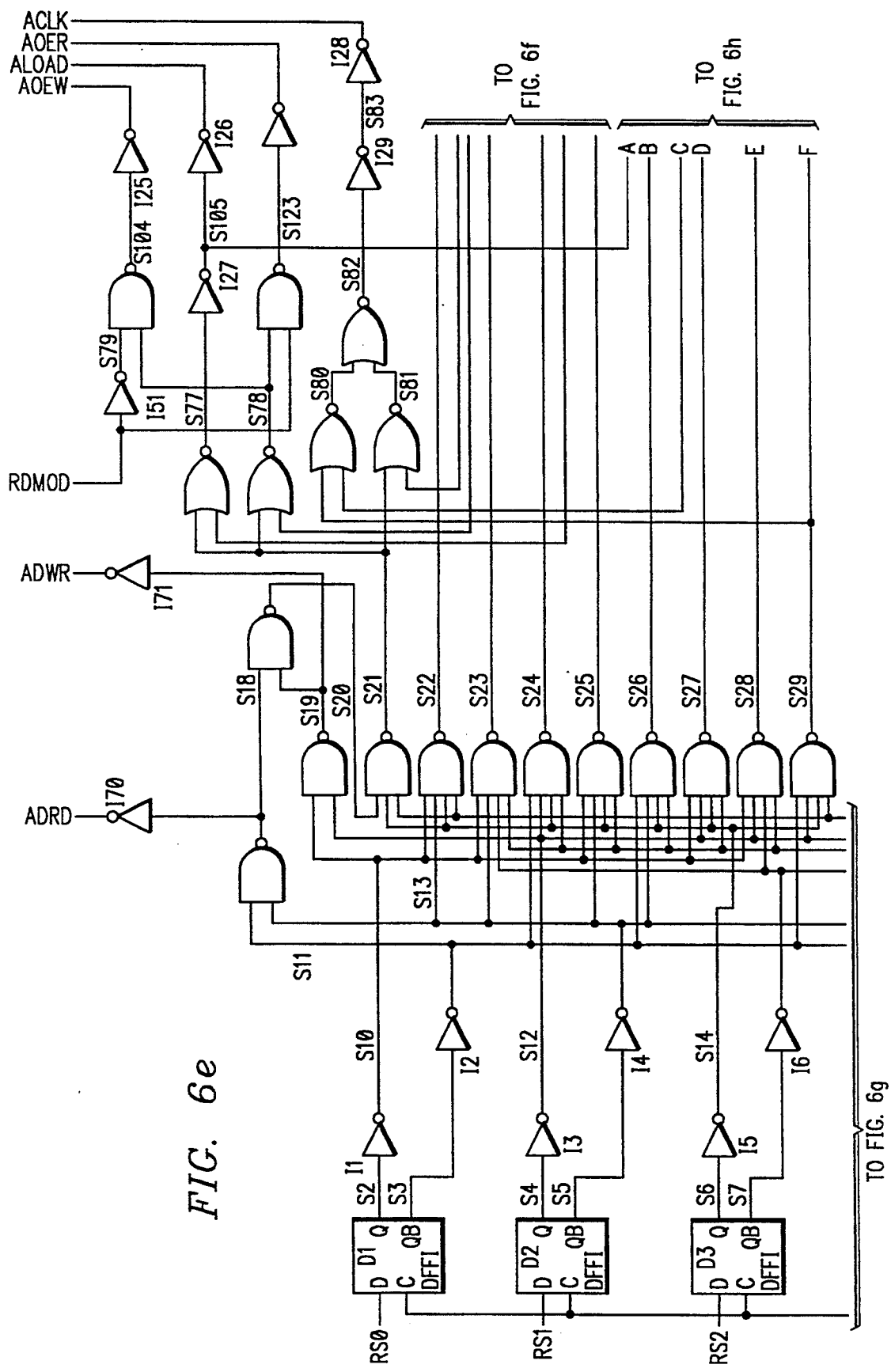
Figure 6F:
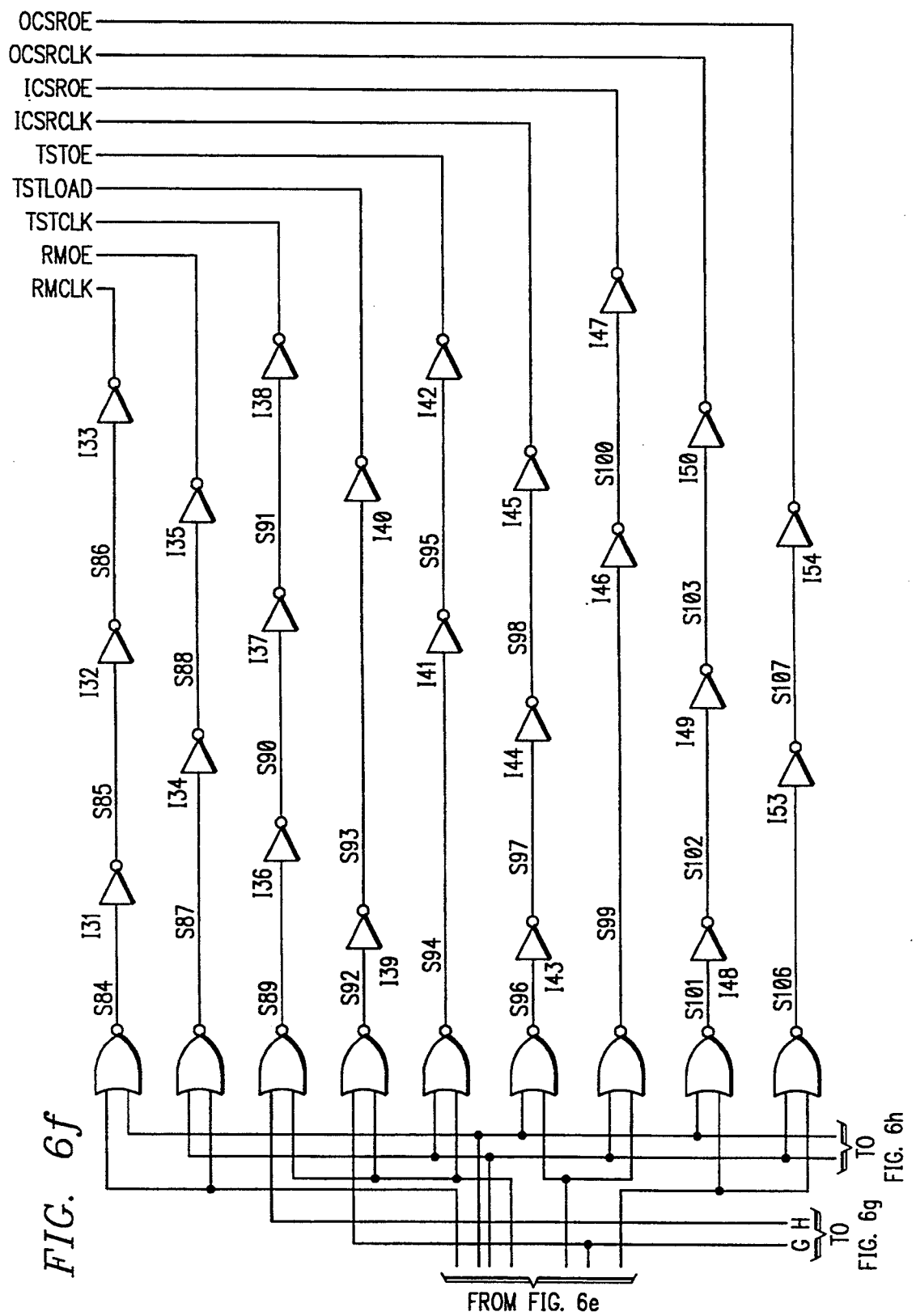
Figure 6G:
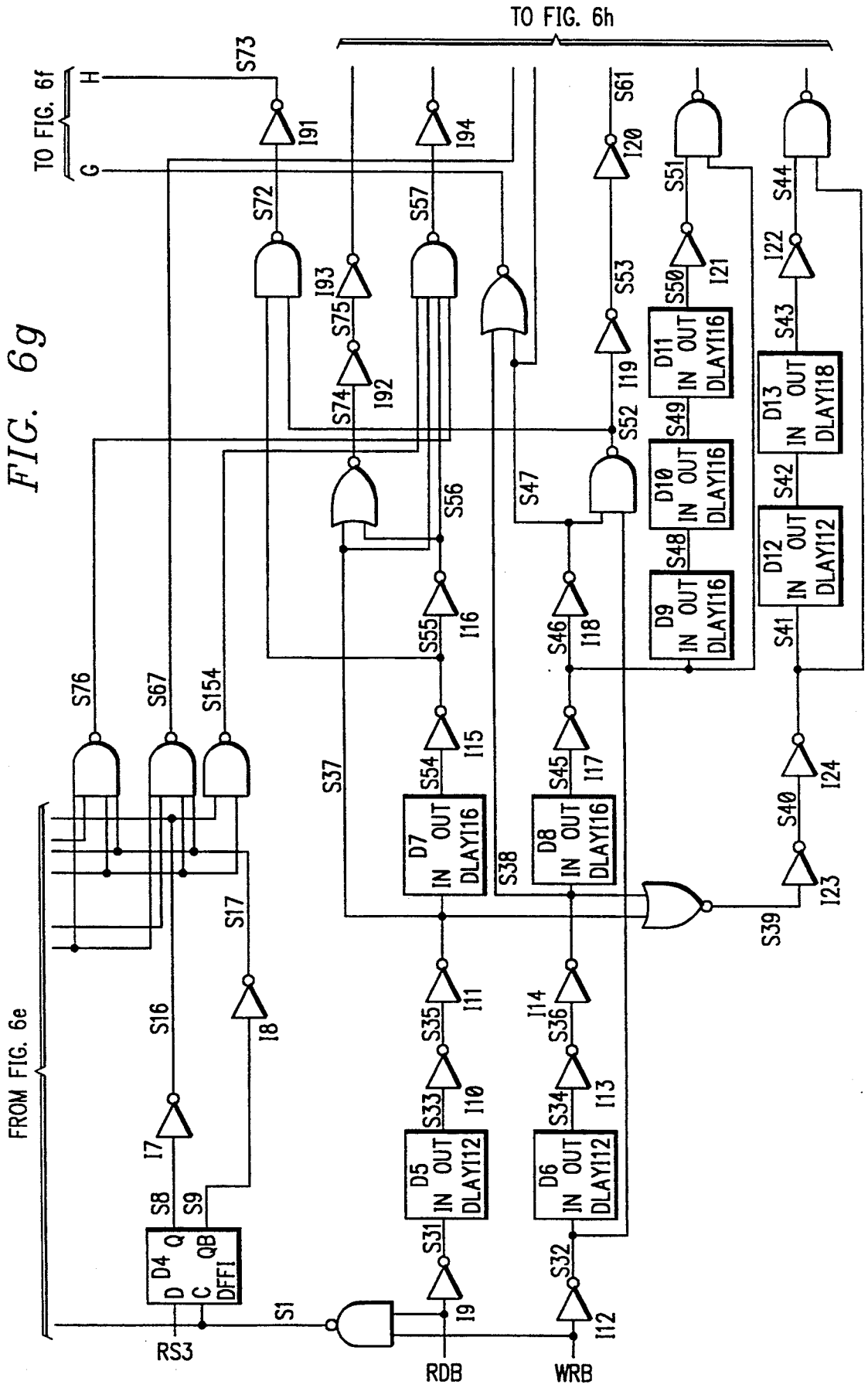
Figure 6H:
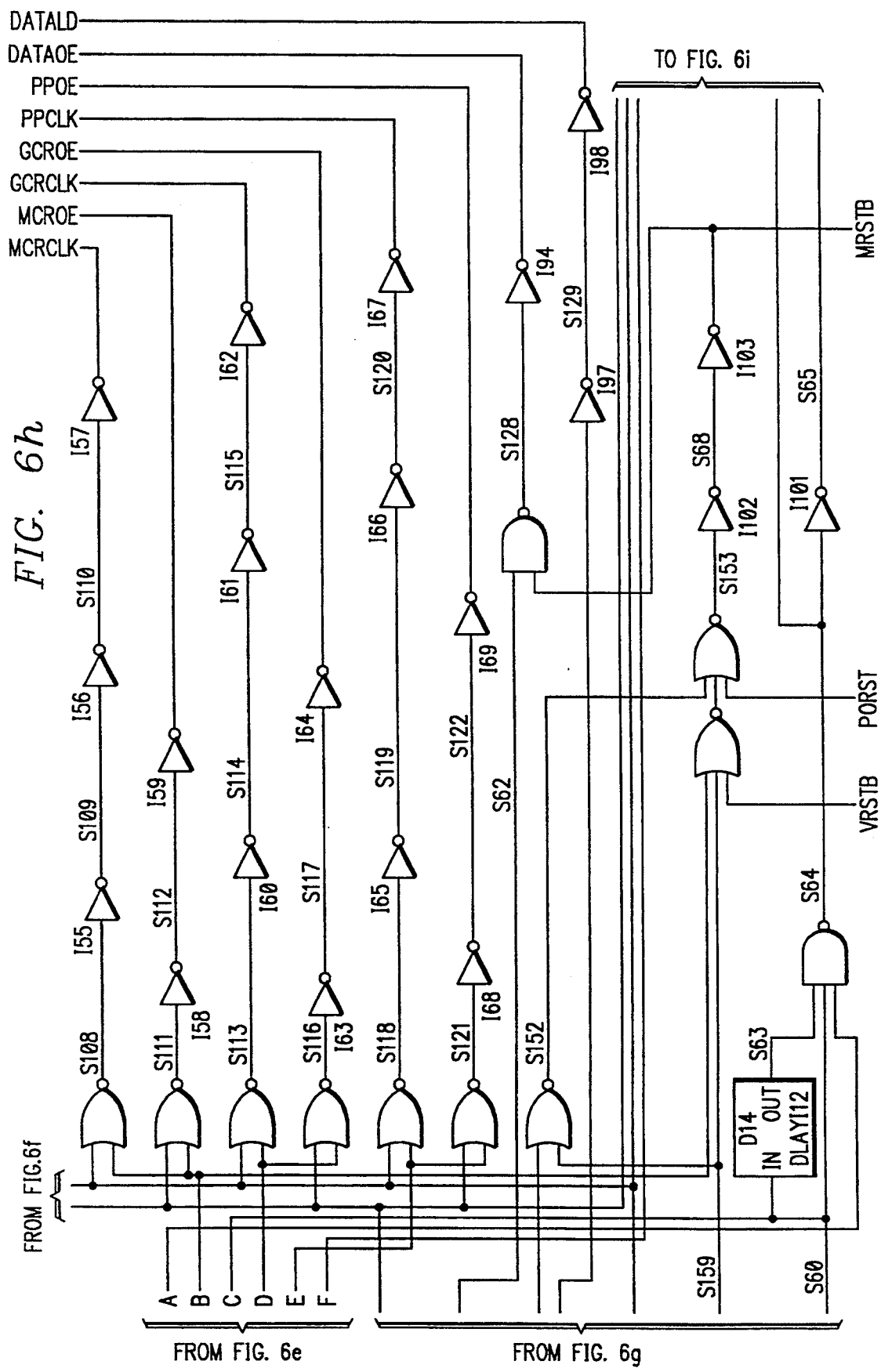
Figure 6I:
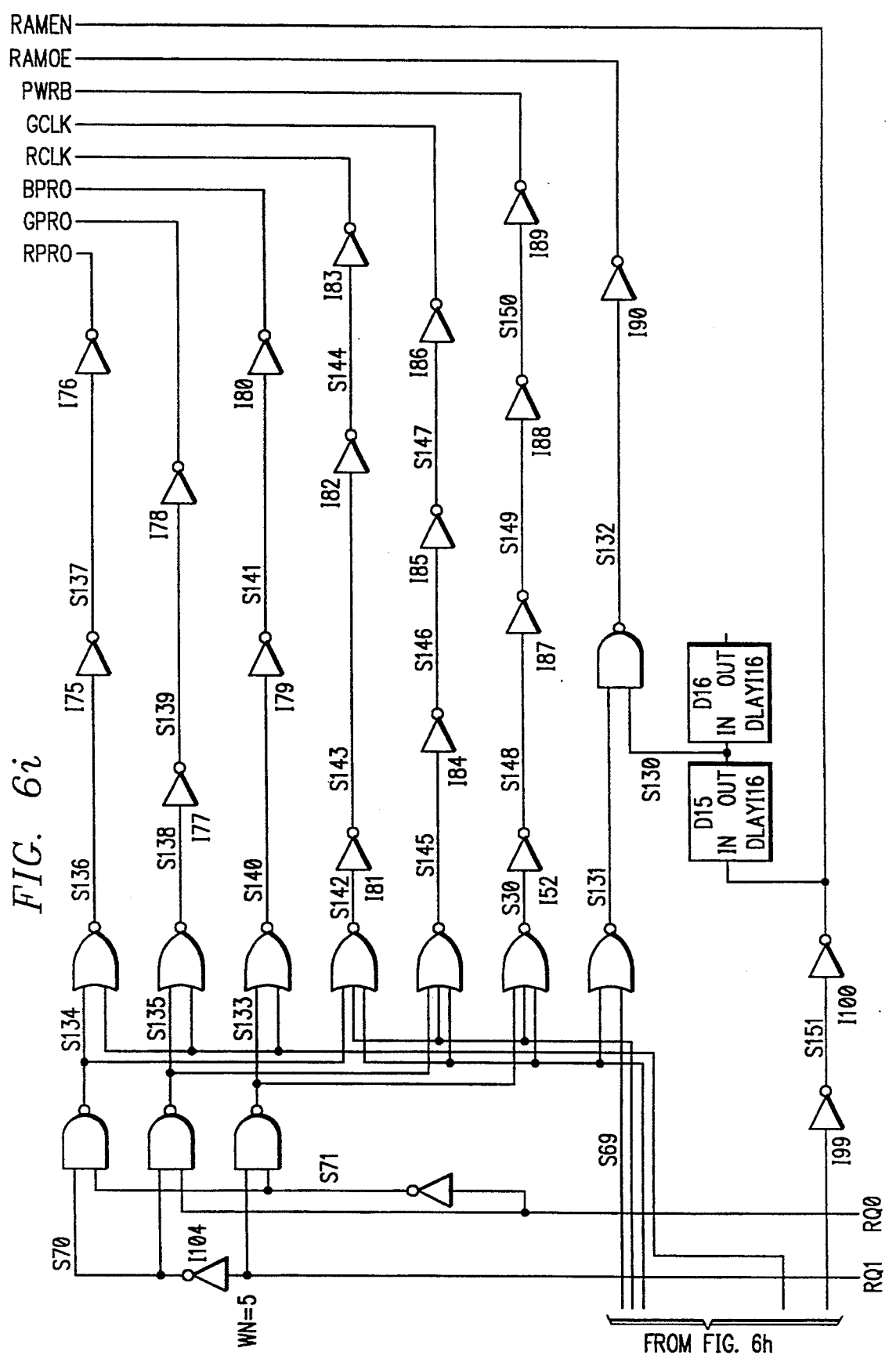
Figure 6J:
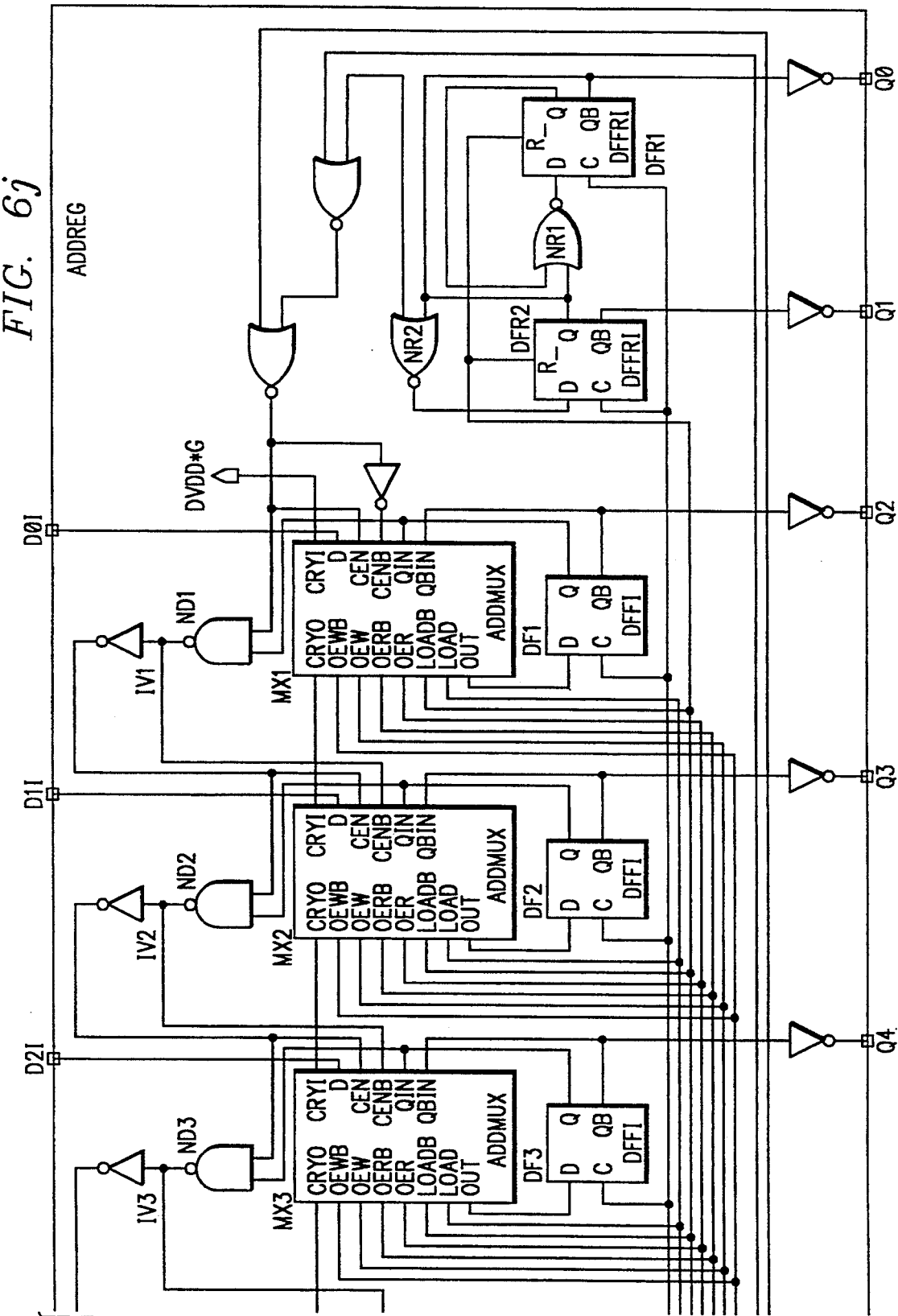
Figure 6L:
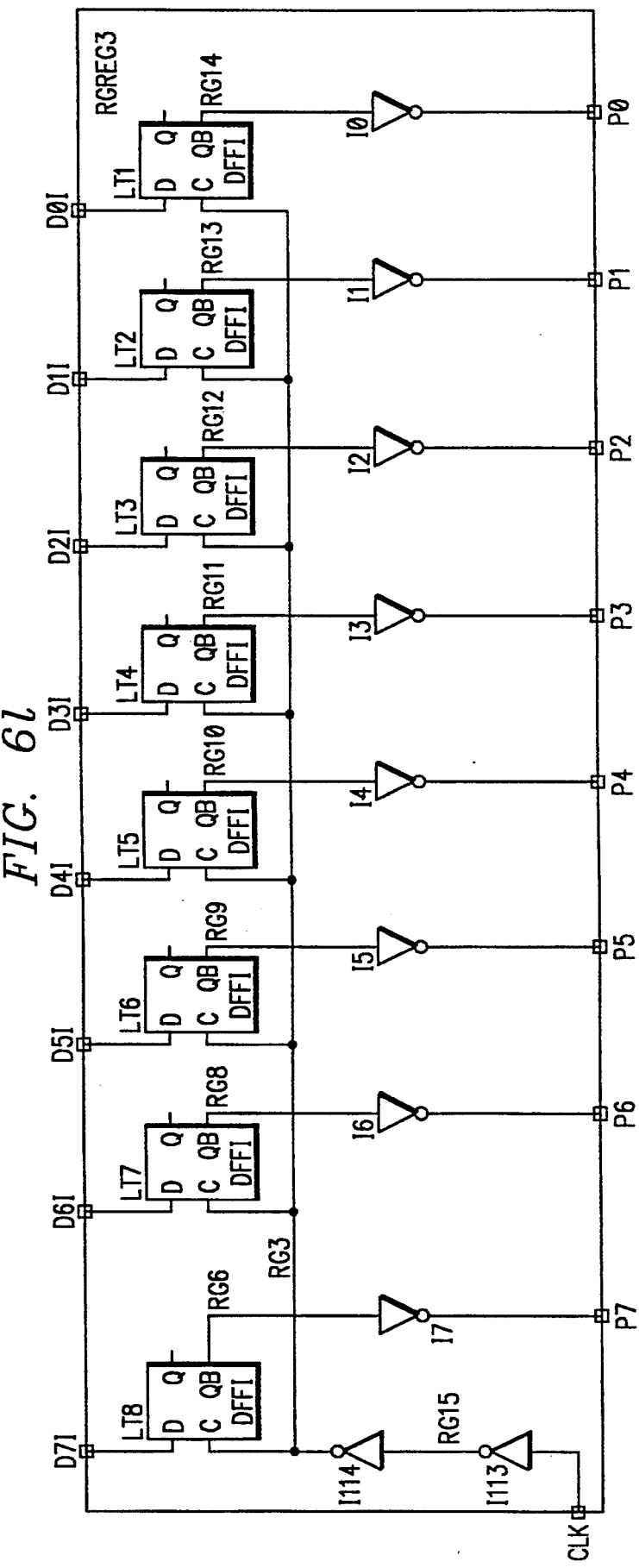
Figure 6M:
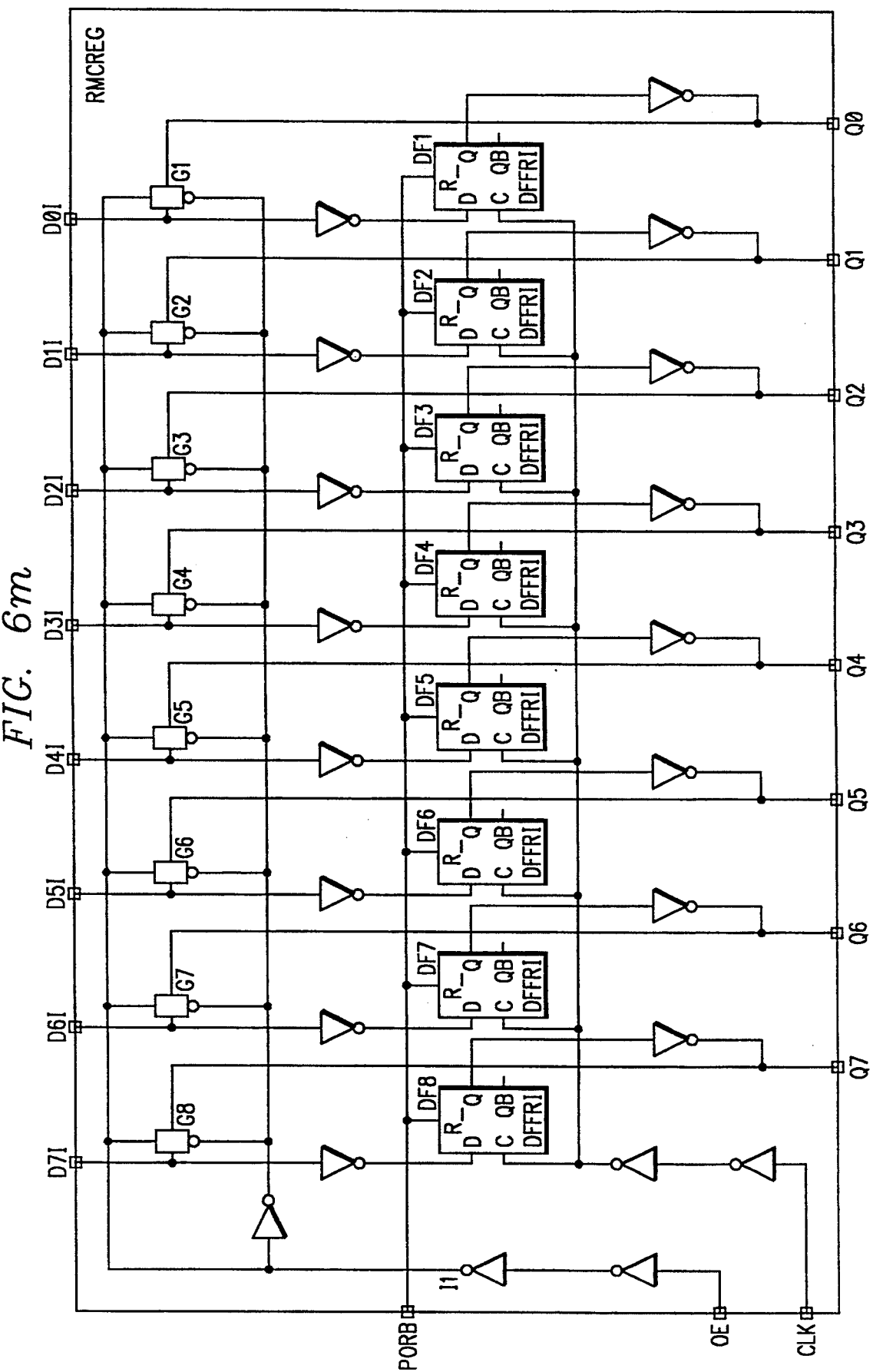
Figure 6N:
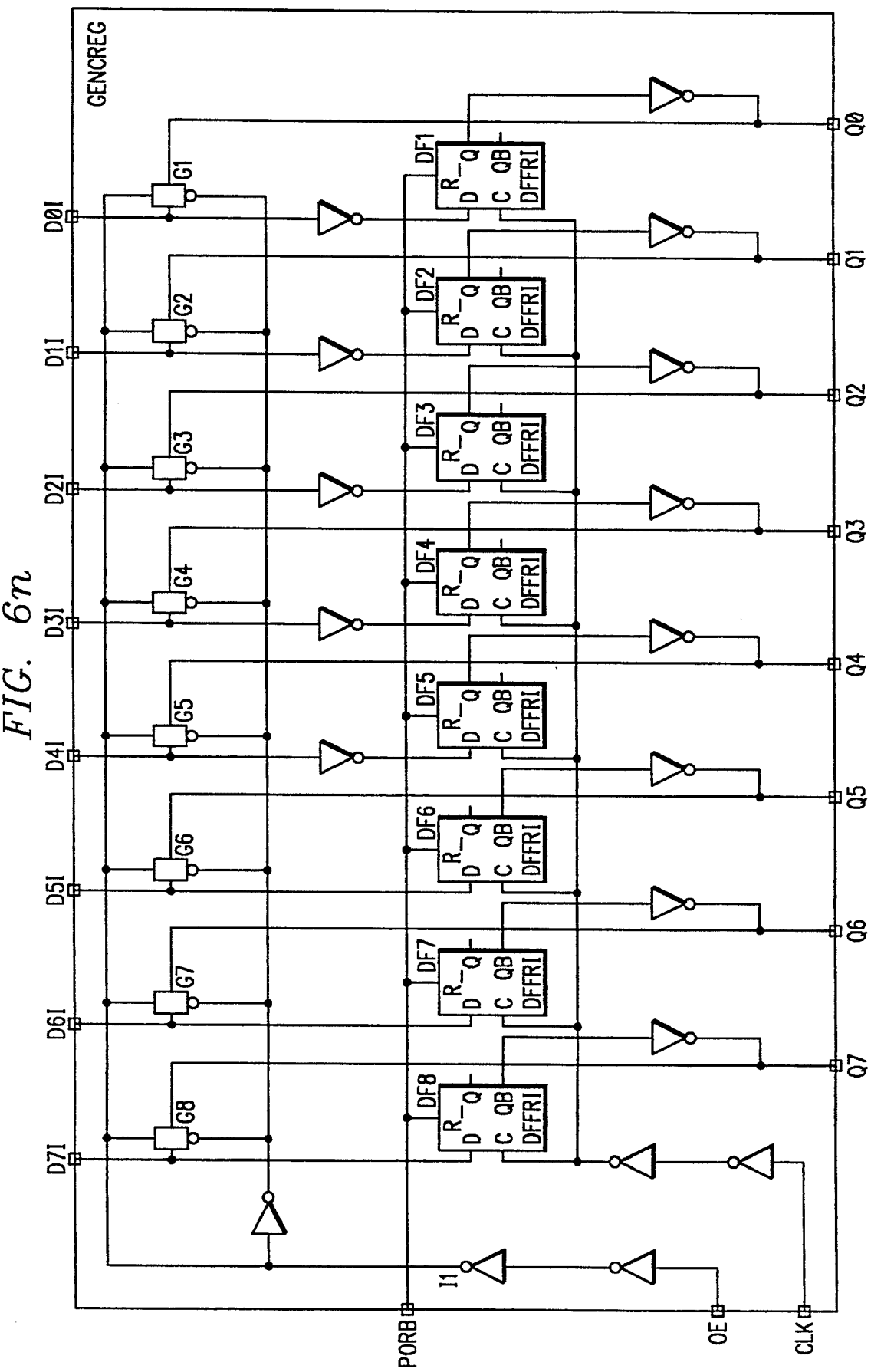
Figure 6O:
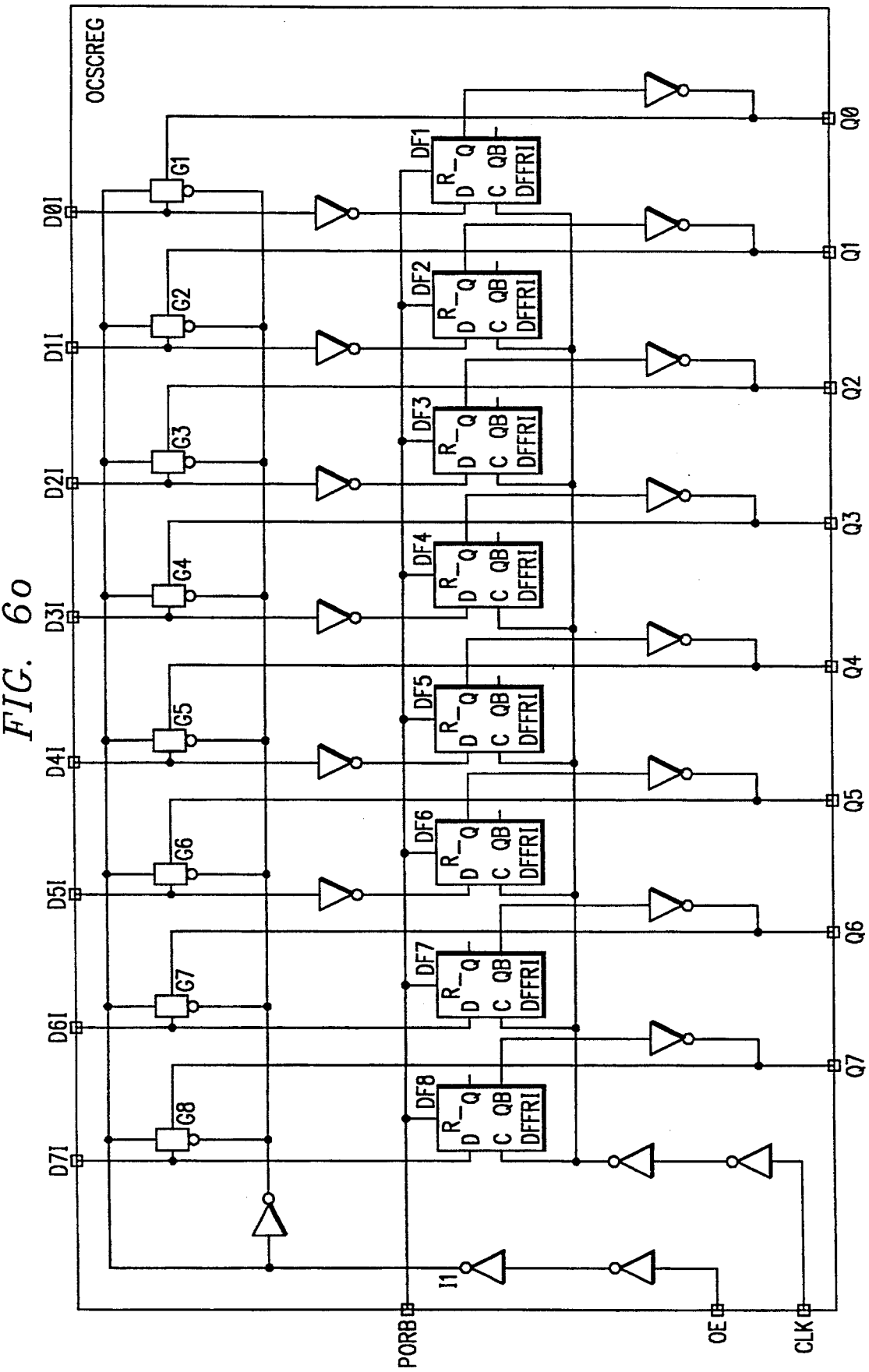
Figure 6P:
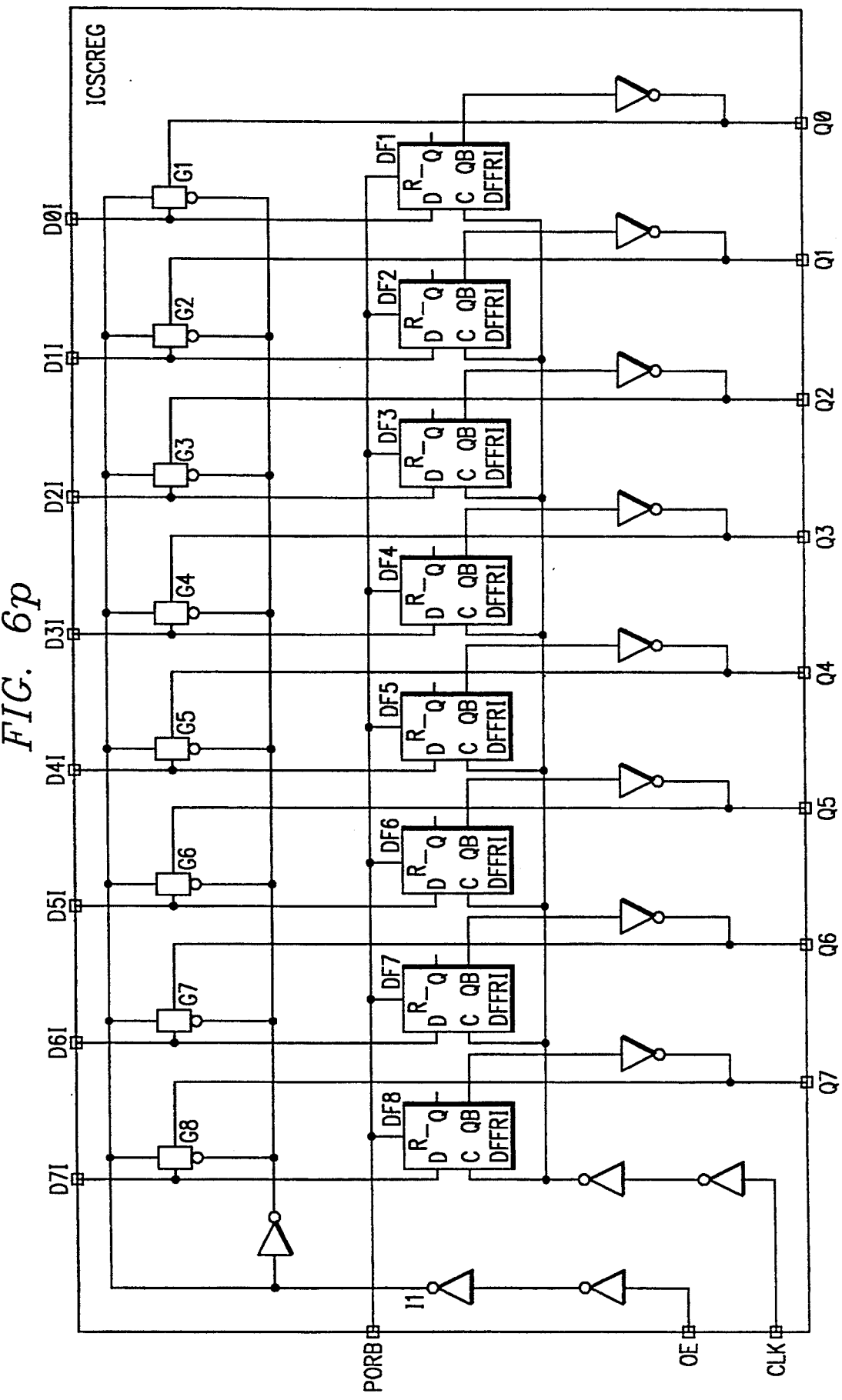
Figure 6Q:
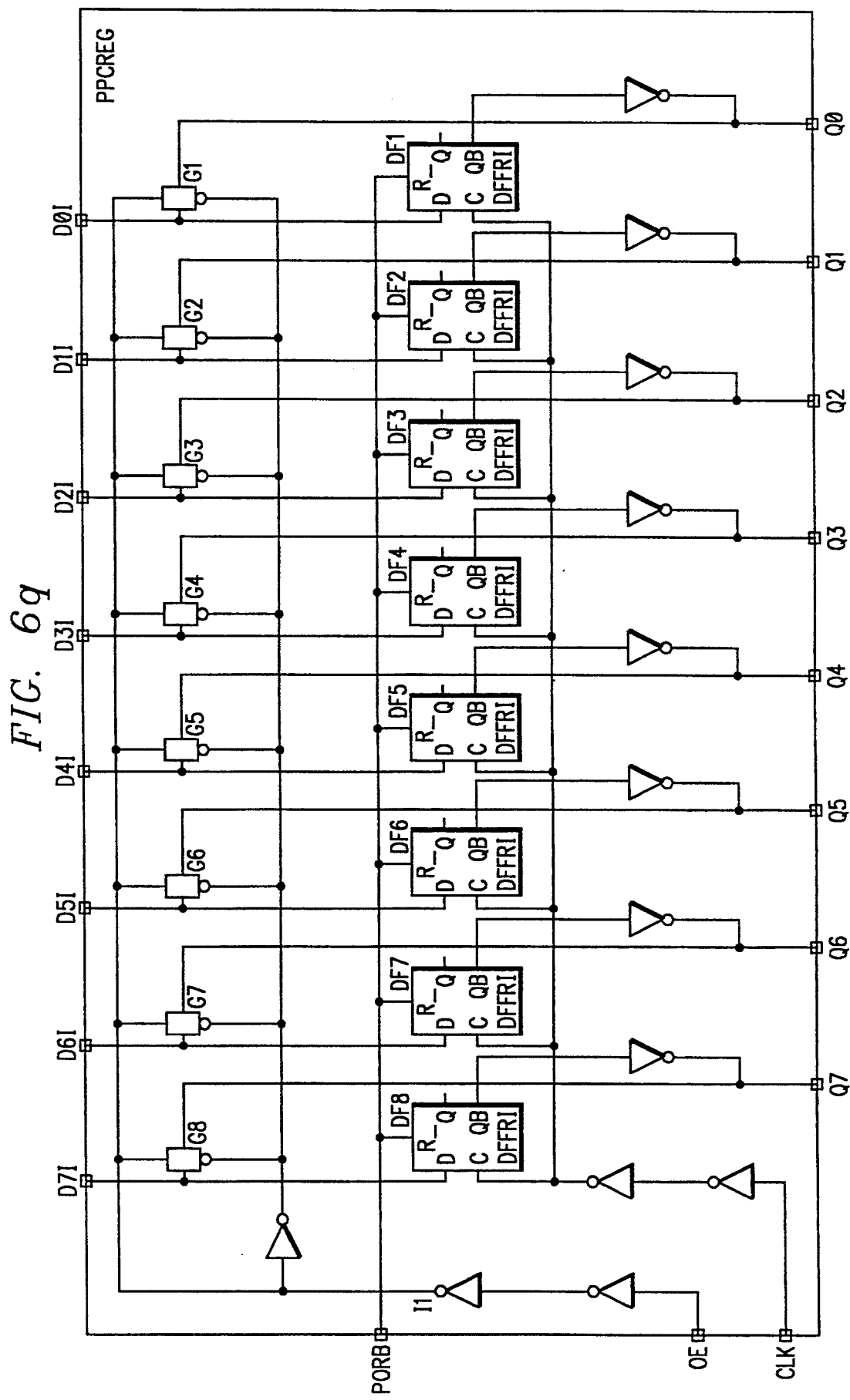
Figure 6R:
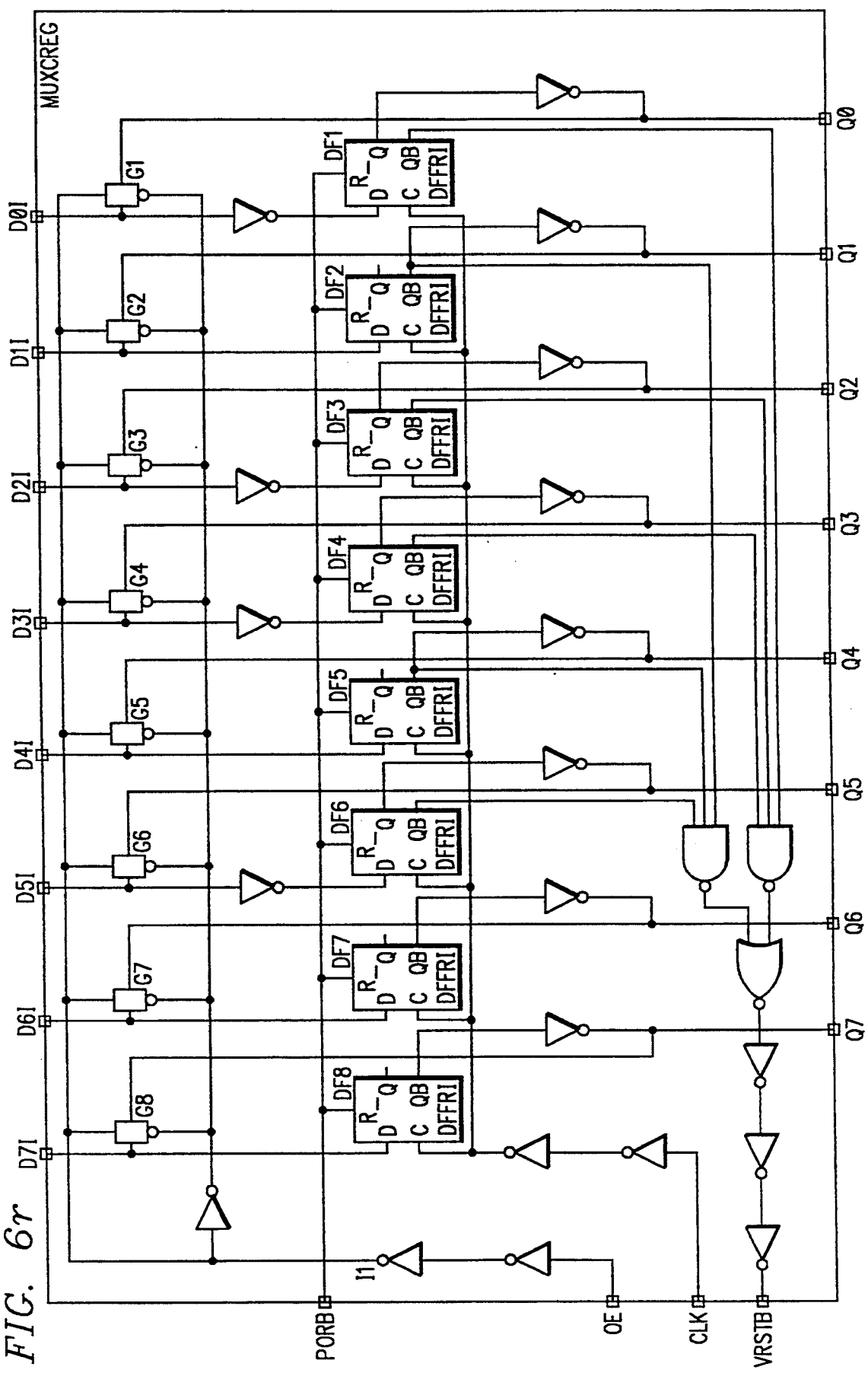
Figure 6S:
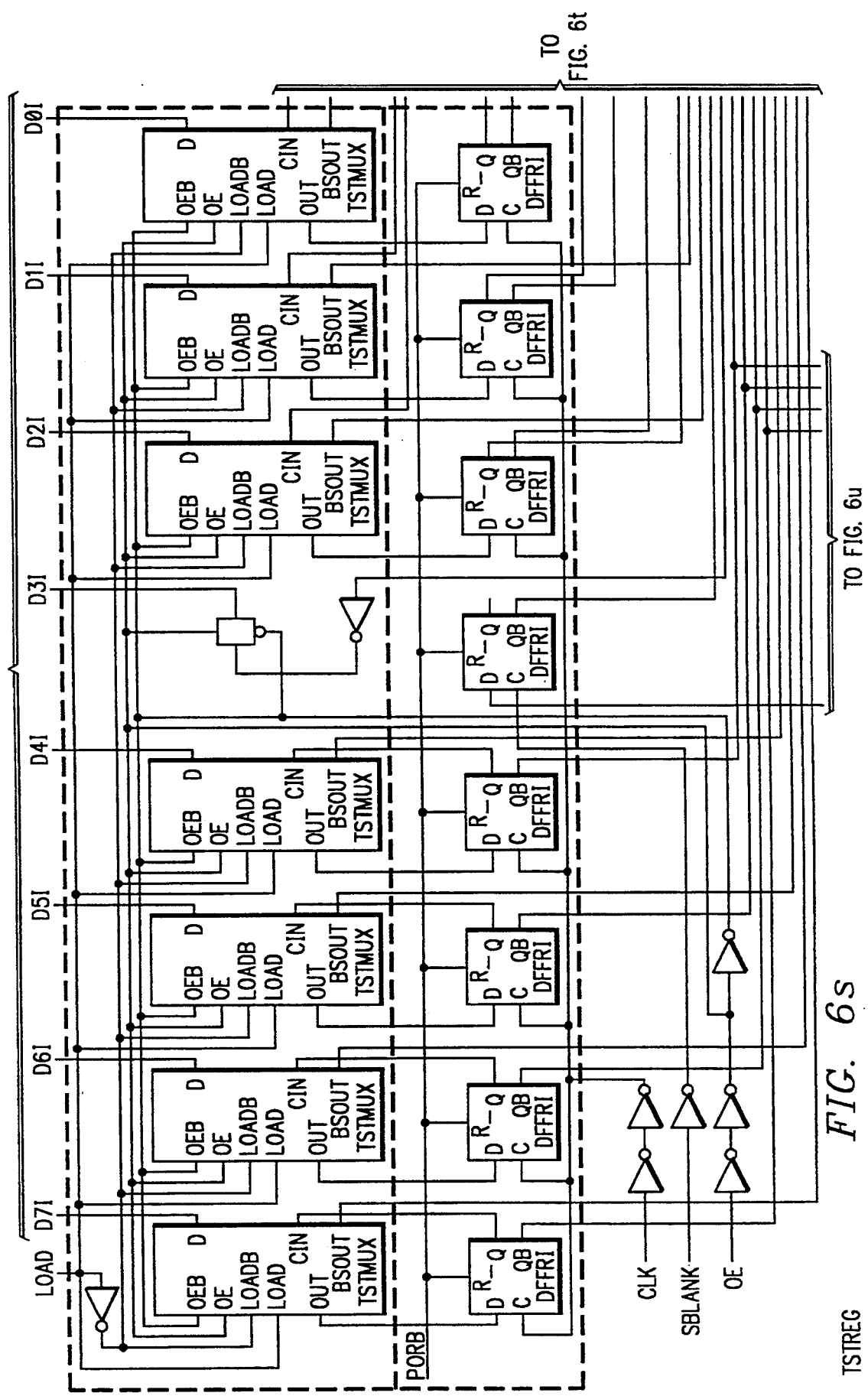
Figure 6W:
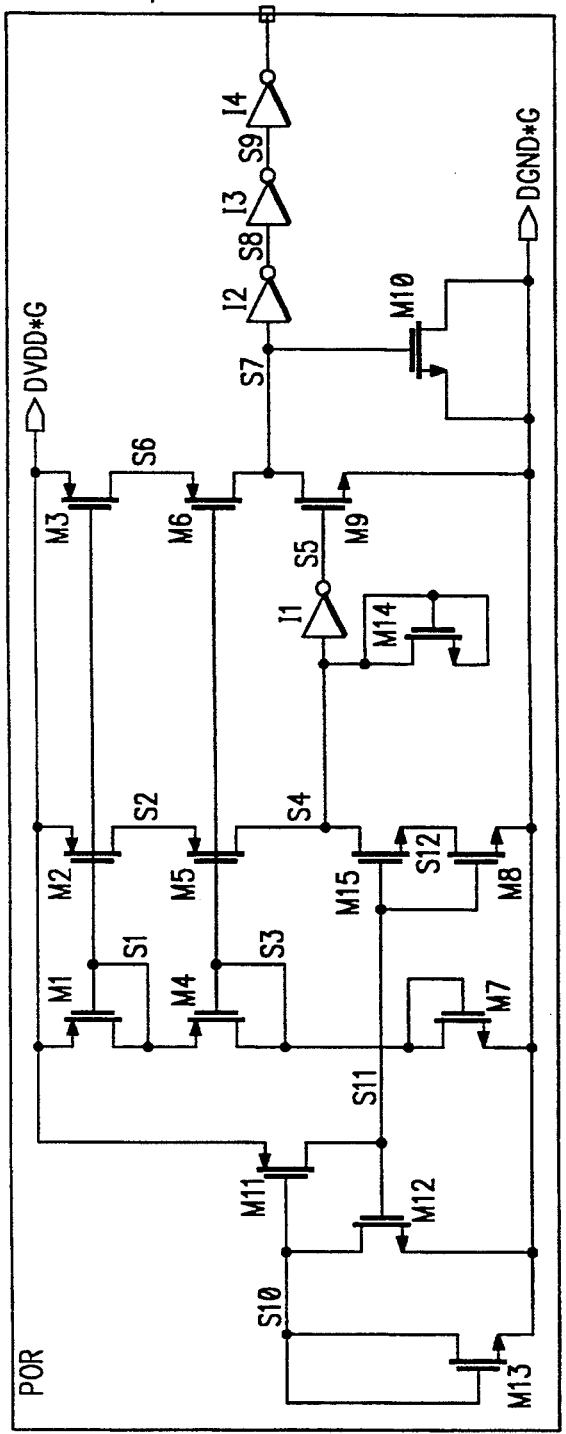
Figure 6X:
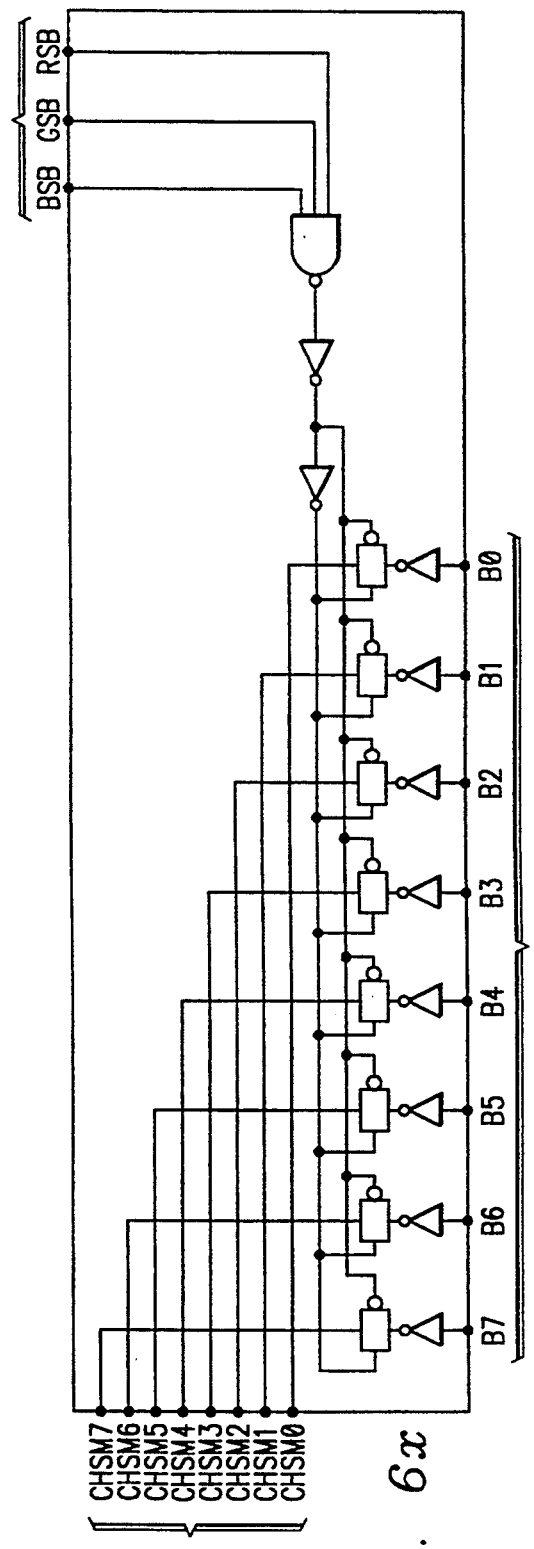
Figure 6Y:
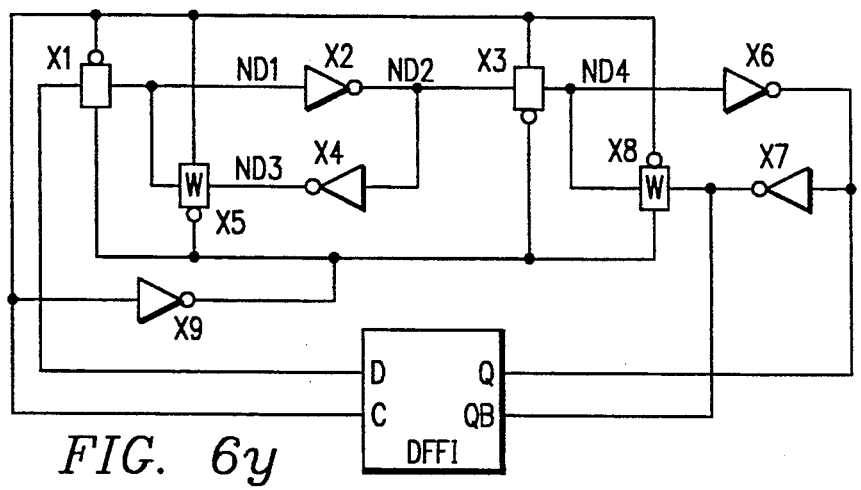
Figures 6A, 6Z:
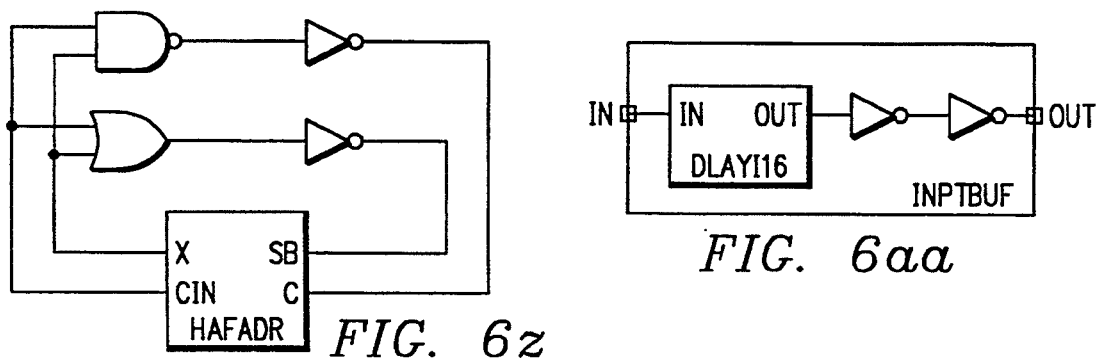
Figure 6A:
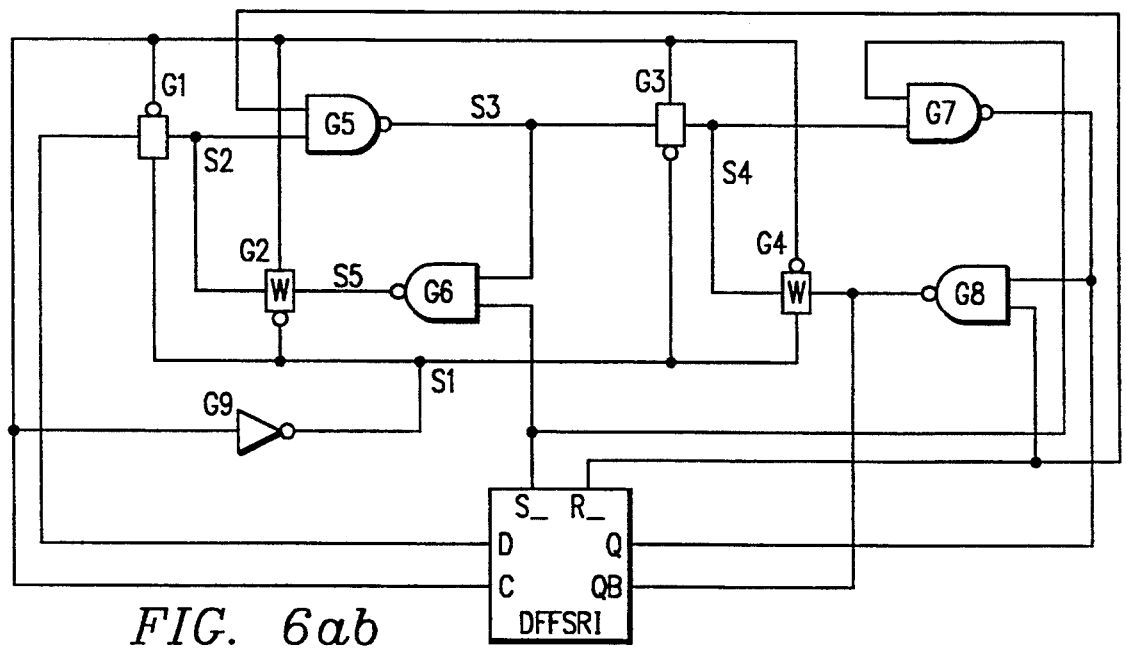
Figure 6A:
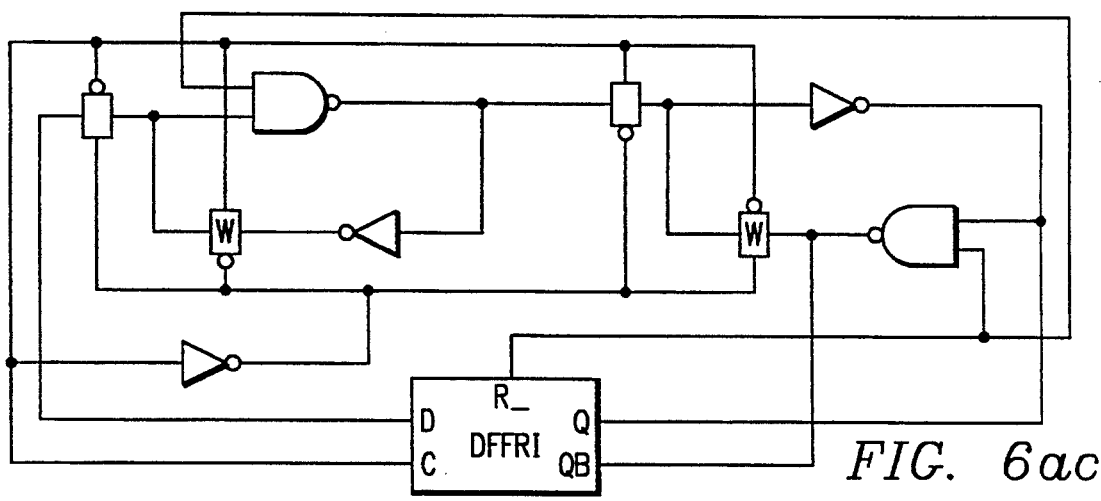
Figure 6A:
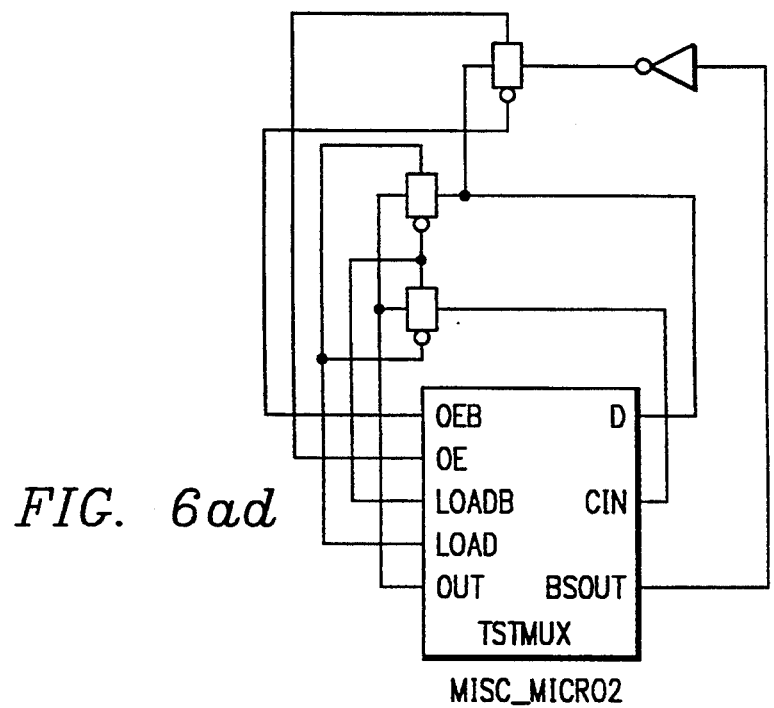
Figure 6A:
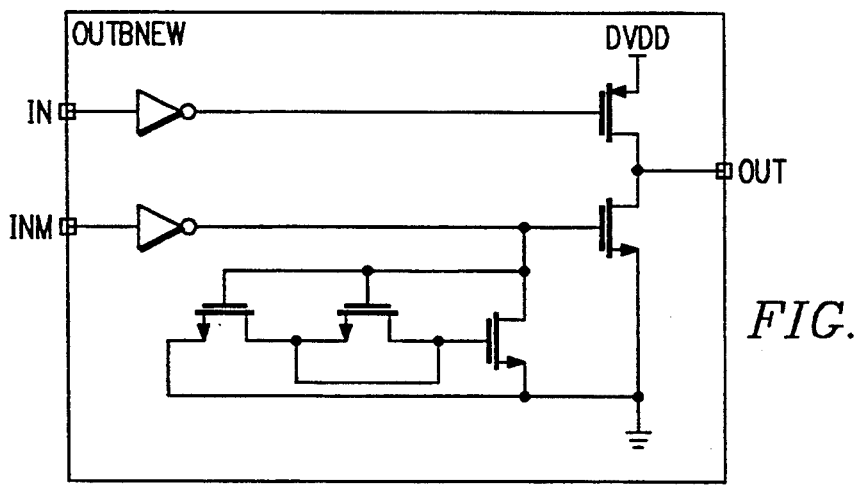
Figure 6A:
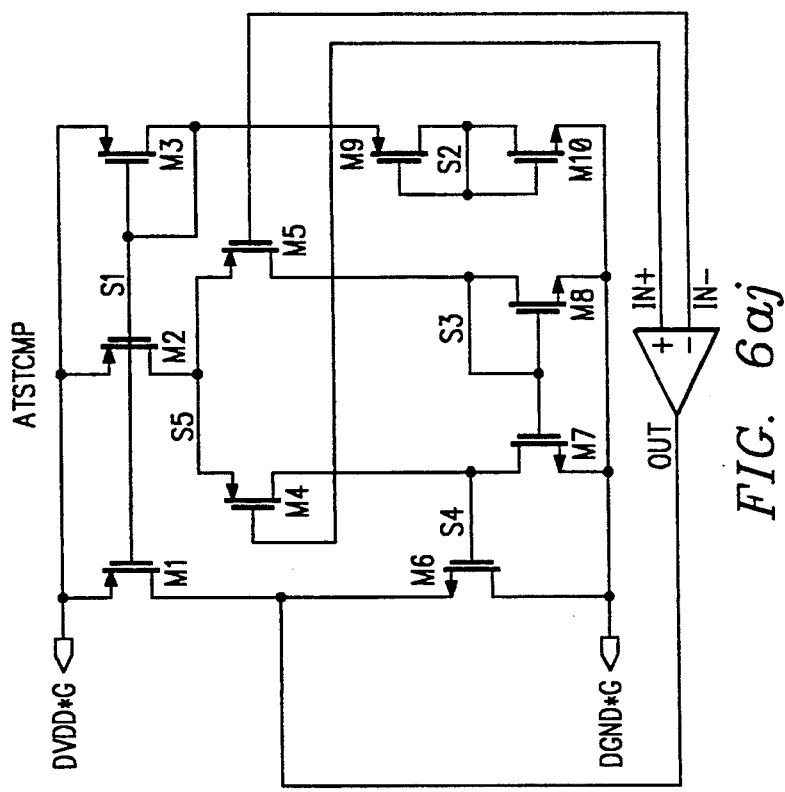
Figure 6A:
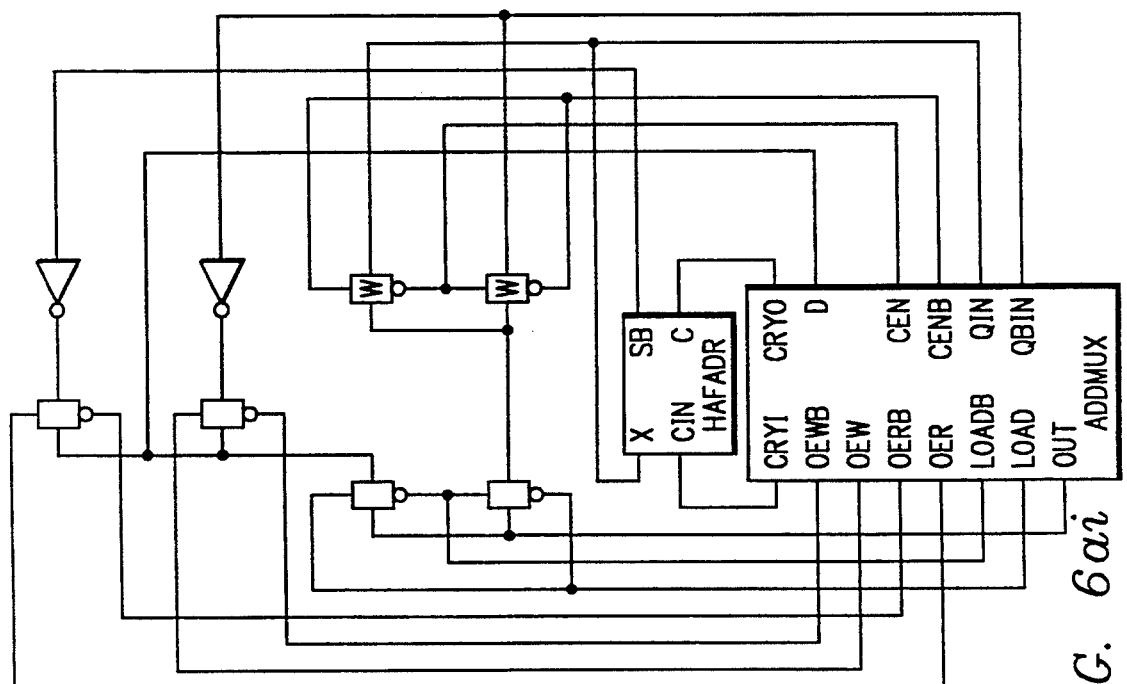

FIG. 6a–6aj are a complete set of block diagrams and schematics describing the microprocessor (MDU) interface 74 (labelled MCROINTF2 in FIG. 5). FIG. 6a and 6b are top level schematics of MPU registers and control circuitry 74 and include the data IO port DATAIO, the M_DECODE block, the address register (ADDREG), the checksum multiplexer (CHKSMMUX) the test register (TSTREG), the mode sequencer (MODESEQ), the palette page register (PPCREG), the read mask control register (RMCREG), the red and green data holding registers (RGREG3, two places), the general control register (GENCREG), the input clock selection register (ICSCREG), the MUX control register (MUXCREG), and the output clock selection control register (OSCREG). FIG. 6c is a detailed schematic of the data IO-block. The data IO-block controls the input and output of data through pins D0–D7 (See FIG. 4). The output enable and load signals which control the direction of data flow are provided by the M_DECODE block. FIG. 6d depicts the mode sequence block MODESEQ which controls the timing of the reads and writes into the palette RAM 84. The mode sequence block includes a three bit counter which determines when to increment to the next address. The sequencing of the sends and writes to RAM 84 are discussed in further detail below. FIGS. 6e-6i depict the detailed logic of the M_DECODE block. The M_DECODE block controls all the registers in the MPU registers and control circuitry 74 and receives its control signals from the graphics processor 18 on pins RS0-RS3, RD- and WR-. The M_DECODE block among other things steers data to the proper register and controls the timing thereof. FIGS. 6j and 6k depict the address register. The address register, discussed further below, controls the row selection to the palette RAM 84. The address register is bidirectional, allowing an address to be read into the RAM row decoder or read out of color palette 42 on pins D0-D7 to processor 18. FIG. 6l is a detailed schematic of the red and green holding registers, discussed further below. The red and green holding registers essentially hold the 8-bit red and green words being transferred into RAM 86 as a 24-bit word of red, green and blue data pending arrival of the 8-bits of blue data. FIG. 6m is a detailed schematic of the read mask register (the read mask). The read mask receives bits on inputs D0-D7 and in conjunction with the input multiplexer 78 and the pipeline delay PIPE2 allows for individual masking of the recall address into palette RAM 84. FIG. 6n is a detailed schematic of the general control register which receives and holds bits setting up the configuration of the color palette. 42, as discussed further below. FIG. 6o is a detailed schematic of the output clock selection register. As discussed further below, bits set in the oscillator select register control the selection of the divide ratios of the video clock (VCLK) and the shift clock (SCLK) as a function of the master (DOT) clock. FIG. 6p is a detailed schematic of the input clock selection register. As also discussed further below, the input clock selection register receives and holds bits which control the selection of one of five input clocks to color palette 42. FIG. 6q is a detailed schematic of the palette page register 80 shown in FIG. 4. The palette page register insures that an 8-bit address is always provided to color palette 84 even when the output from selector 78 is only 1-, 2-, or 4-bits. FIG. 6r is a detailed schematic of the MUX control register. The MUX control register sets up the mode of operation of the input selector 78 to control the manner in which selector 78 manipulates the bits received at its input and consequently outputs a recall address to the palette RAM 84. The MUX control register further provides decoding which places all registers into their default states, as discussed further below. FIGS. 6s-6v are complete electrical schematics of the test register, discussed further below. FIGS. 6s-6v, in particular allow for data being provided at the inputs of the digital-to-analog converters 88 to be tested by graphics processor 18 through the microport 74. FIG. 6w is an electrical schematic of the internal power-on reset circuitry which monitors the status of the power supply and provides a re-set pulse to each of the registers discussed above. FIG. 6x is an electrical schematic of the multiplexer port used for the check sum multiplexer. FIG. 6y is a detailed schematic of a master/slave flip-flop used throughout the upper level drawings provided as part of FIGS. 6a-6v. FIG. 6z is a detailed electrical schematic of the half-adder used in the address register address mux. FIG. 6aa is a schematic of an input buffer used in the data IO circuitry shown in FIG. 6a and 6c. FIG. 6ab is a set/re-set flip-flop used in the mode sequencer MODESEQ. FIG. 6ac depicts a resettable master/slave flip-flop used in all of the reconfigurable registers depicted in FIGS. 6a-6v. FIG. 6ad is an electrical schematic of the sub-block TSTMUX used in the test multiplexer. FIG. 6ae is an electrical schematic of the output driver used in the data IO block of FIG. 6c to drive data back to graphics processor 18. FIGS. 6af-6ah are electrical schematics of analog delay chains used in the MD code block. FIG. 6ai is a detailed schematic of the address multiplexer used in the address register. FIG. 6aj is an electrical schematic of the comparator used in the analog test feature of the test register, discussed further below.

The internal register map is shown in Table 1, each entry cross-referenced with the applicable register depicted in FIGS. 6a and 6b. The MPU interface operates asynchronously, with data transfers being synchronized by internal logic, also further discussed below. All the register locations support read and write operations.

TABLE 1

Internal Register Map.

| RS3 | RS2 | RS1 | RS0 | Register Addressed by Processor 18 |
|---|---|---|---|---|
| 0 | 0 | 0 | 0 | Palette address register-write mode (ADDREG) |
| 0 | 0 | 0 | 1 | Color palette holding registers (REDREG, GRNREG) |
| 0 | 0 | 1 | 0 | Pixel read mask (RMCREG) |
| 0 | 0 | 1 | 1 | Palette address register - read mode (ADDREG) |
| 0 | 1 | 0 | 0 | Reserved |
| 0 | 1 | 0 | 1 | Reserved |
| 0 | 1 | 1 | 0 | Reserved |
| 0 | 1 | 1 | 1 | Reserved |
| 1 | 0 | 0 | 0 | General control register (GENCREG) |
| 1 | 0 | 0 | 1 | Input clock selection register (ICSCREG) |
| 1 | 0 | 1 | 0 | Output clock selection register (OCSCREG) |
| 1 | 0 | 1 | 1 | MUX control register (MUXCREG) |
| 1 | 1 | 0 | 0 | Palette Page register (PPCREG) |
| 1 | 1 | 0 | 1 | Reserved |
| 1 | 1 | 1 | 0 | Test register (TSTREG) |
| 1 | 1 | 1 | 1 | Reset state |

Color Palette RAM 84

Figure 7A:
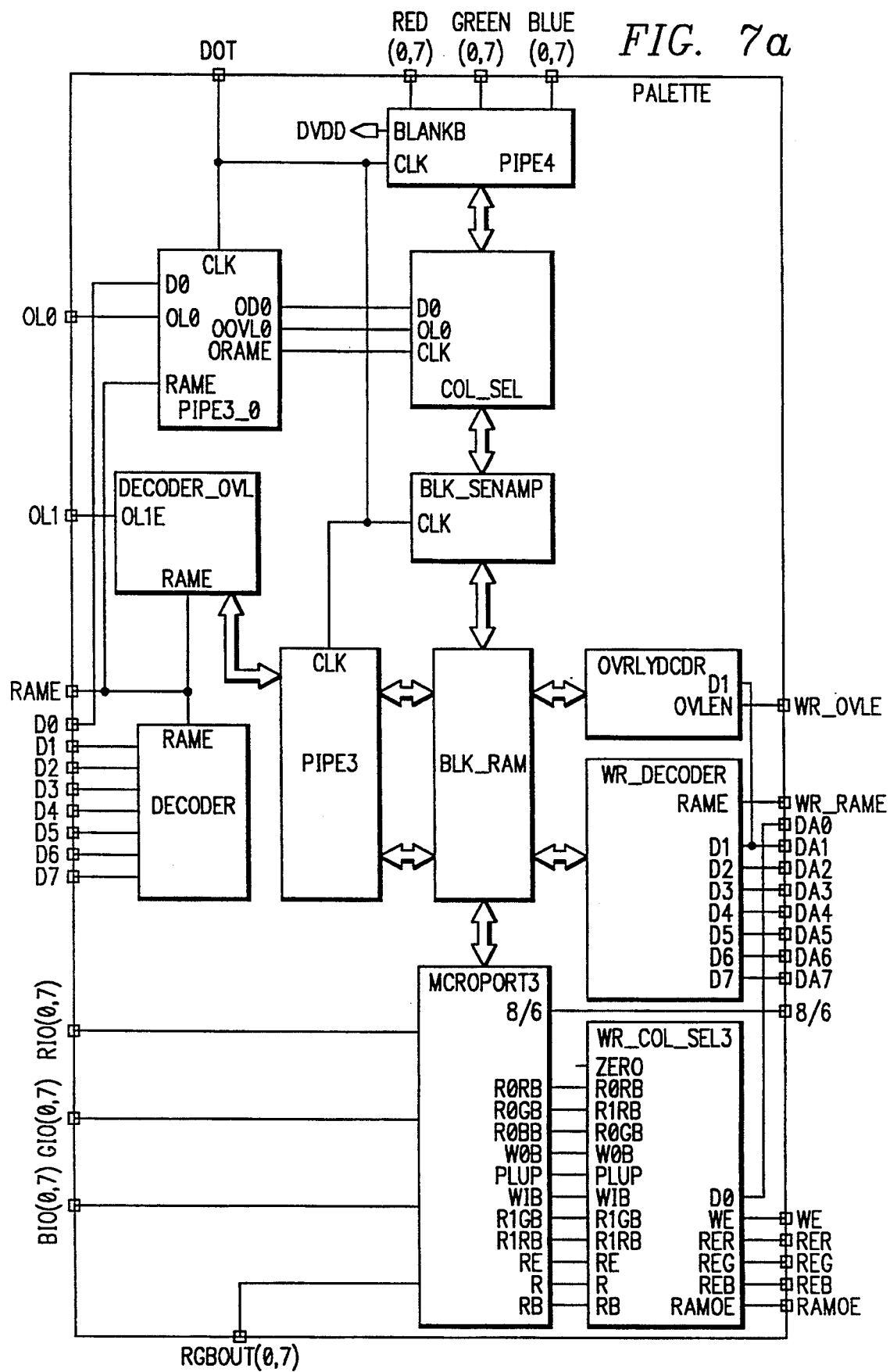
FIGS. 7a–7ae are a complete set of electrical schematic diagrams of color palette RAM 84 shown in FIG. 4 and as labeled PALETTE in FIG. 5.
Figures 7B, 7C:
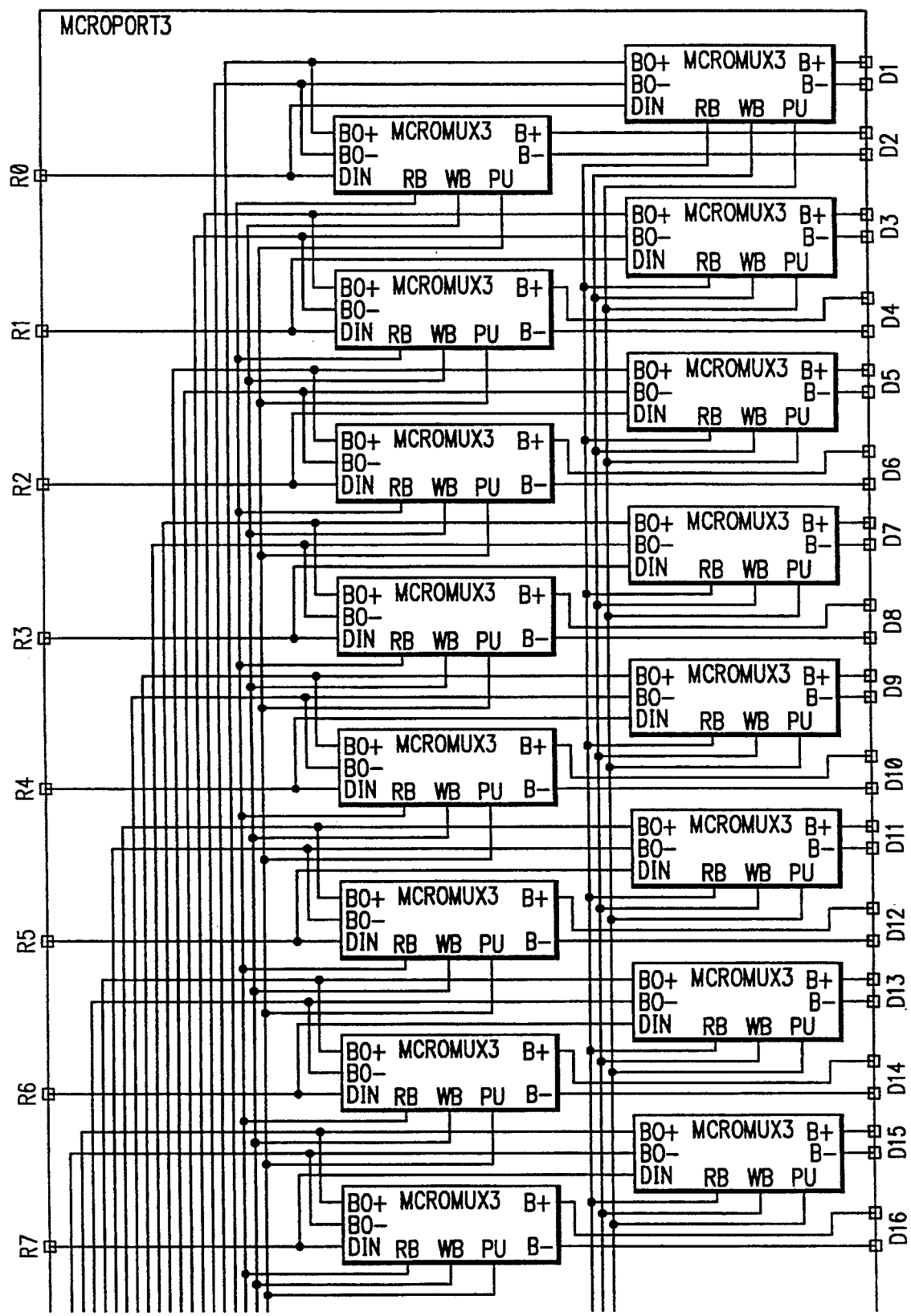
Figure 7C:
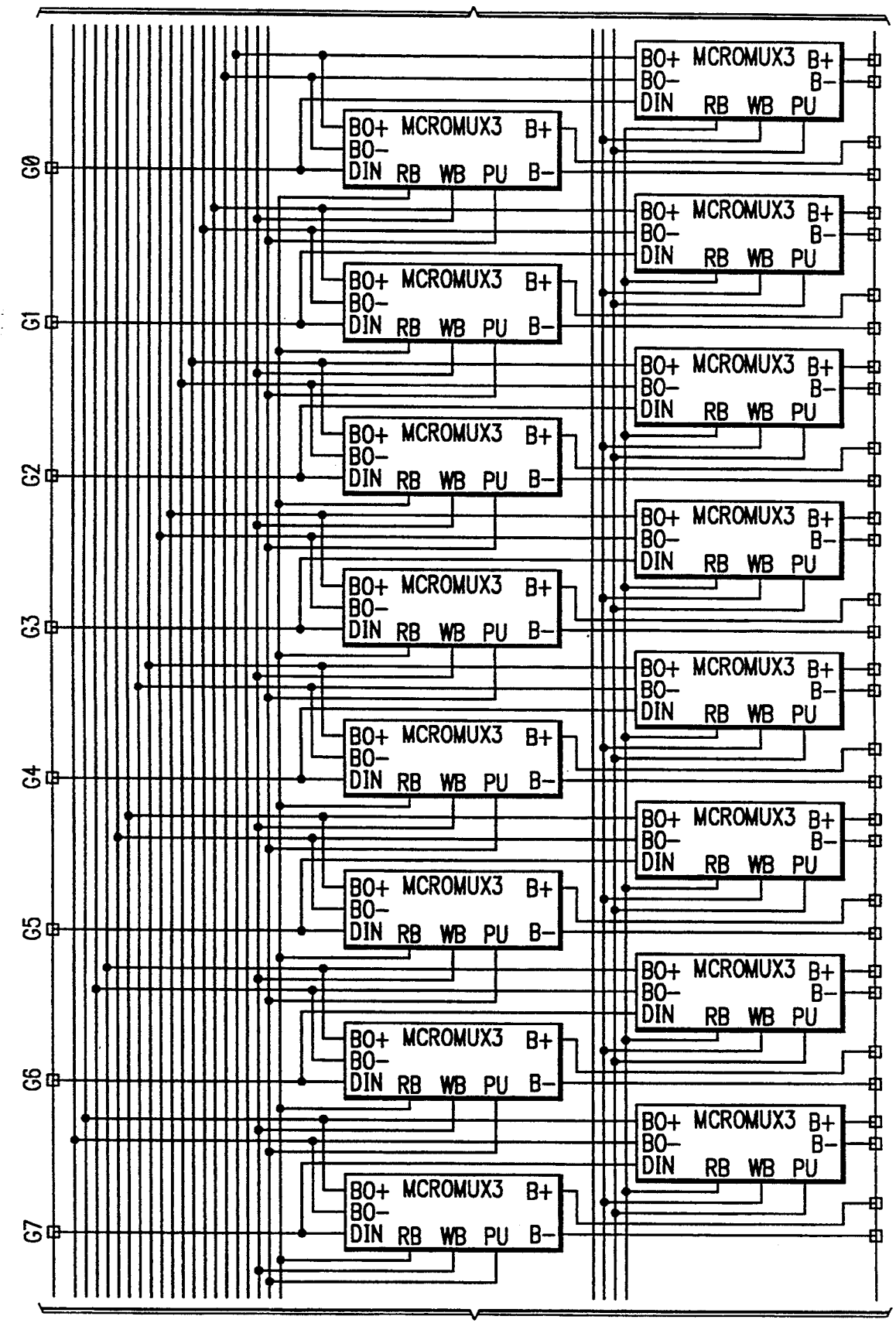
Figure 7E:
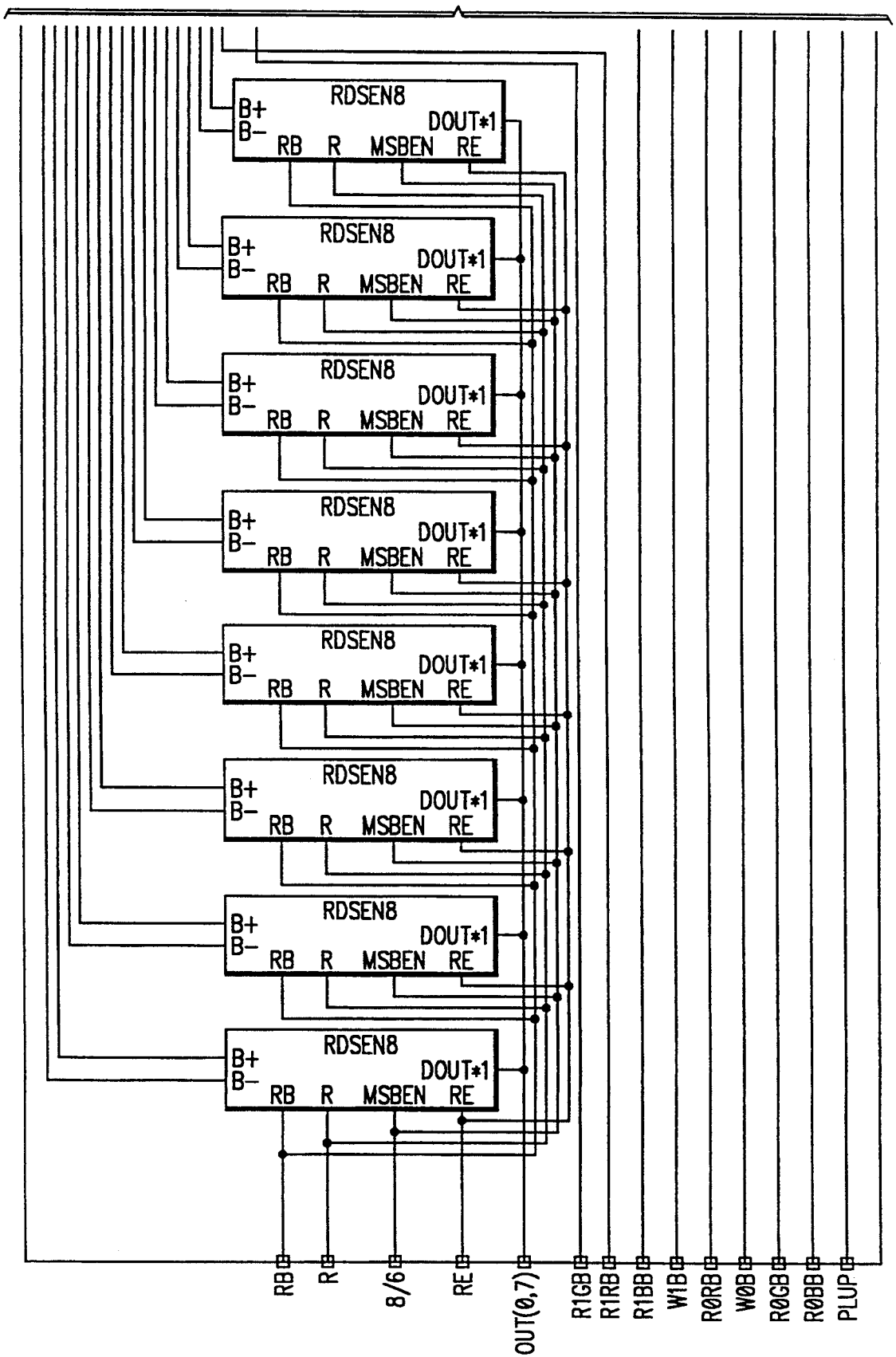
Figure 7F:
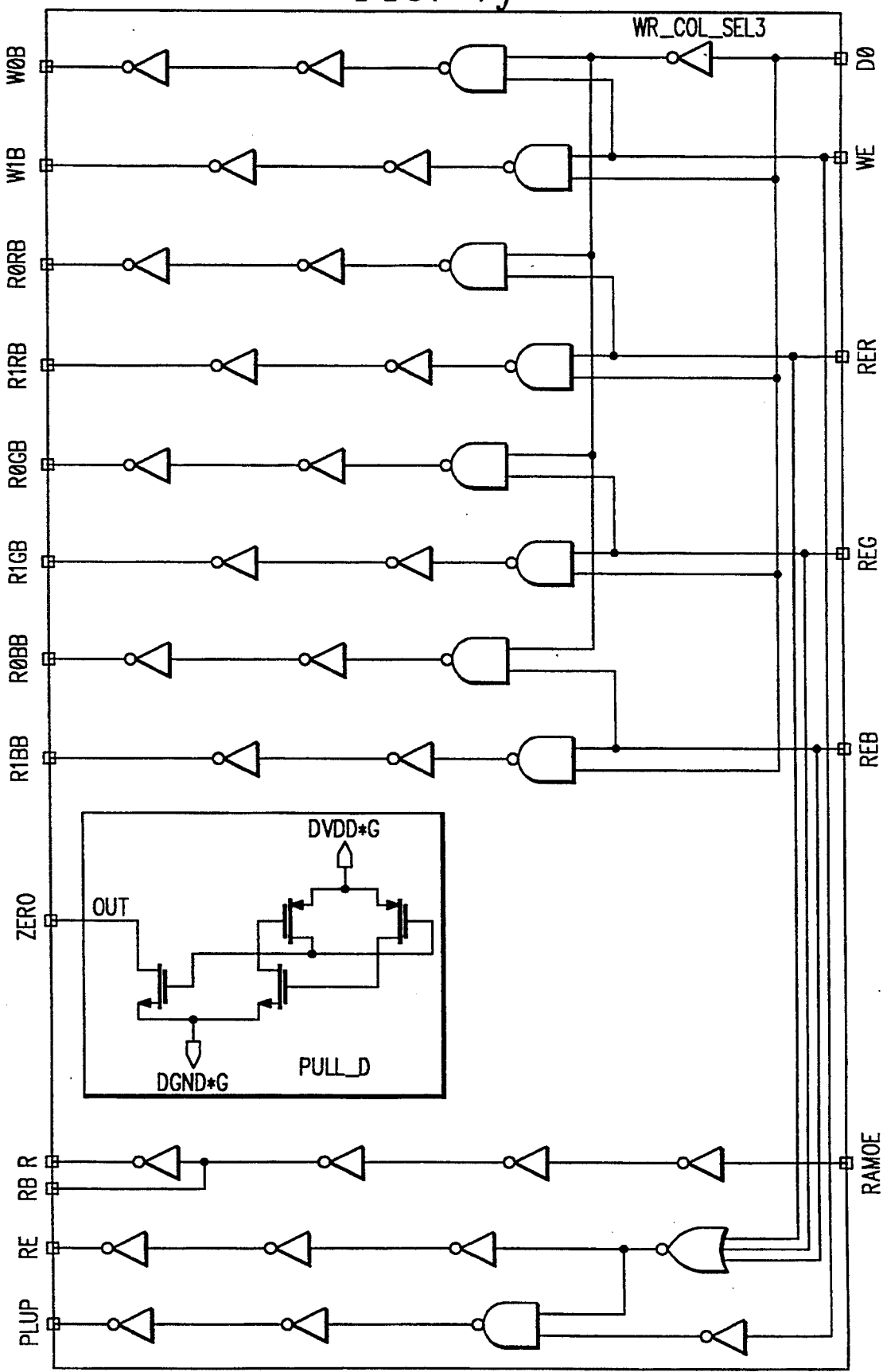
Figure 7G:
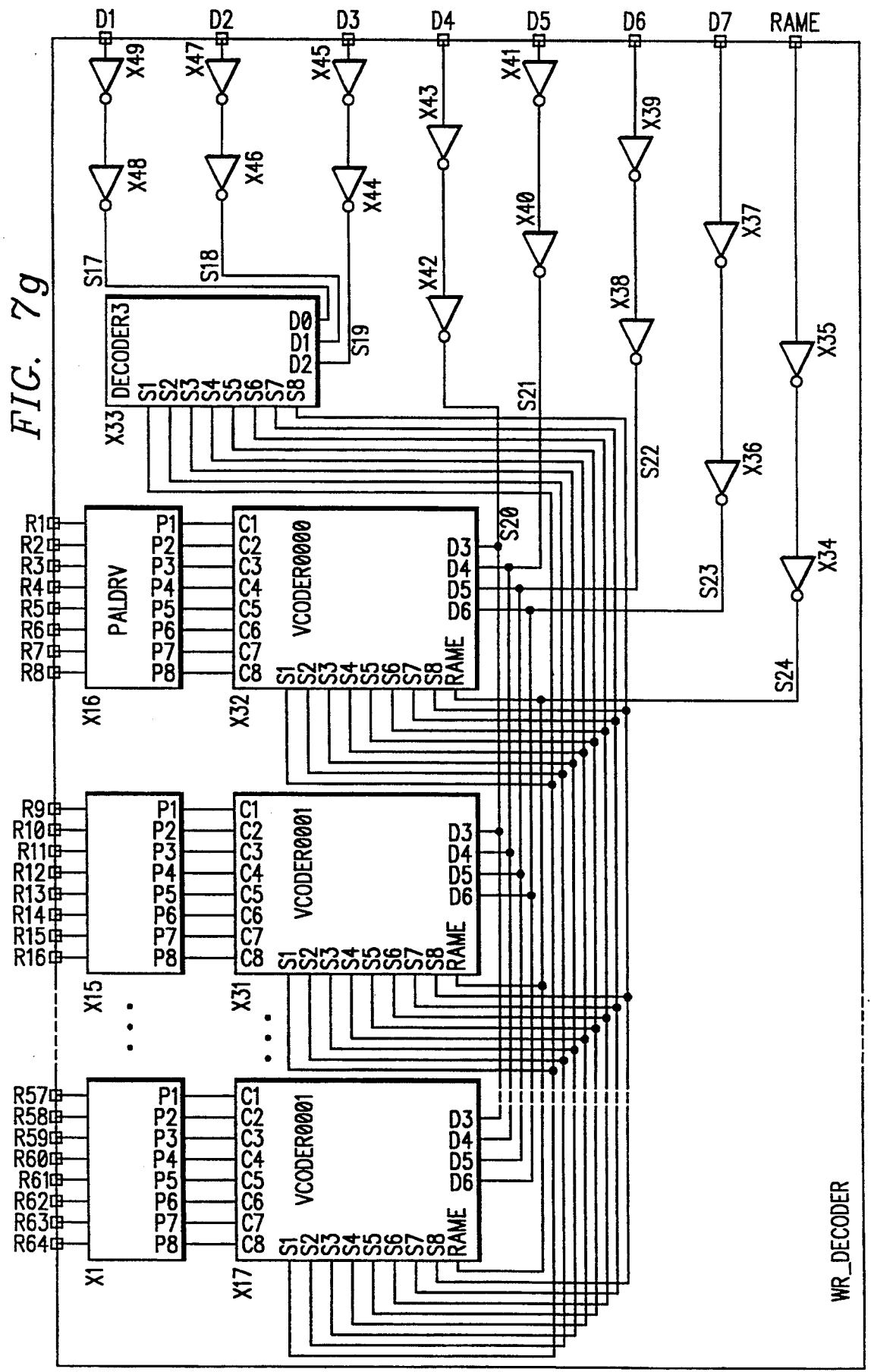
Figure 7H:
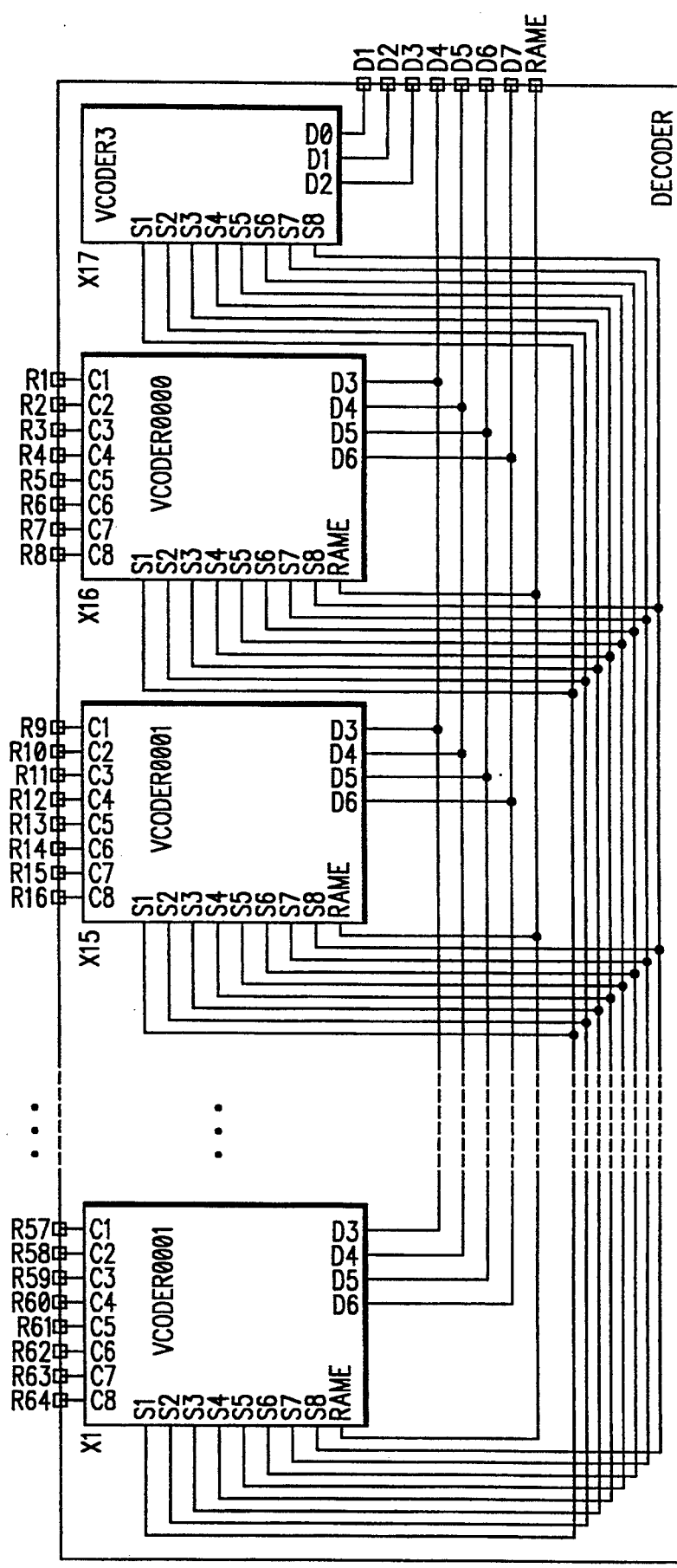
Figure 7I:
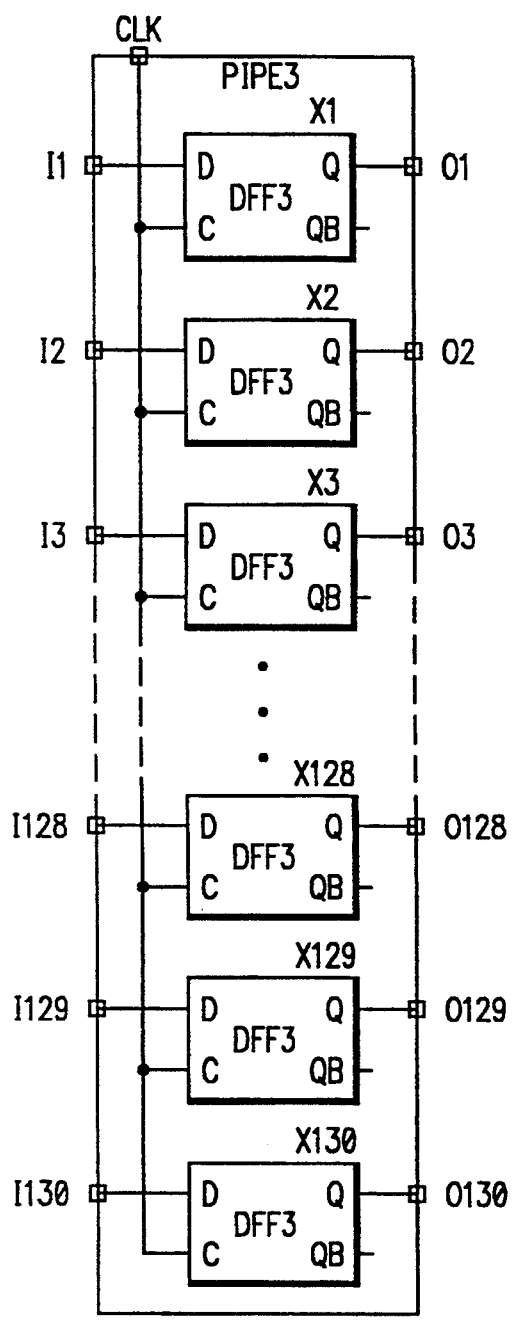
Figure 7O:
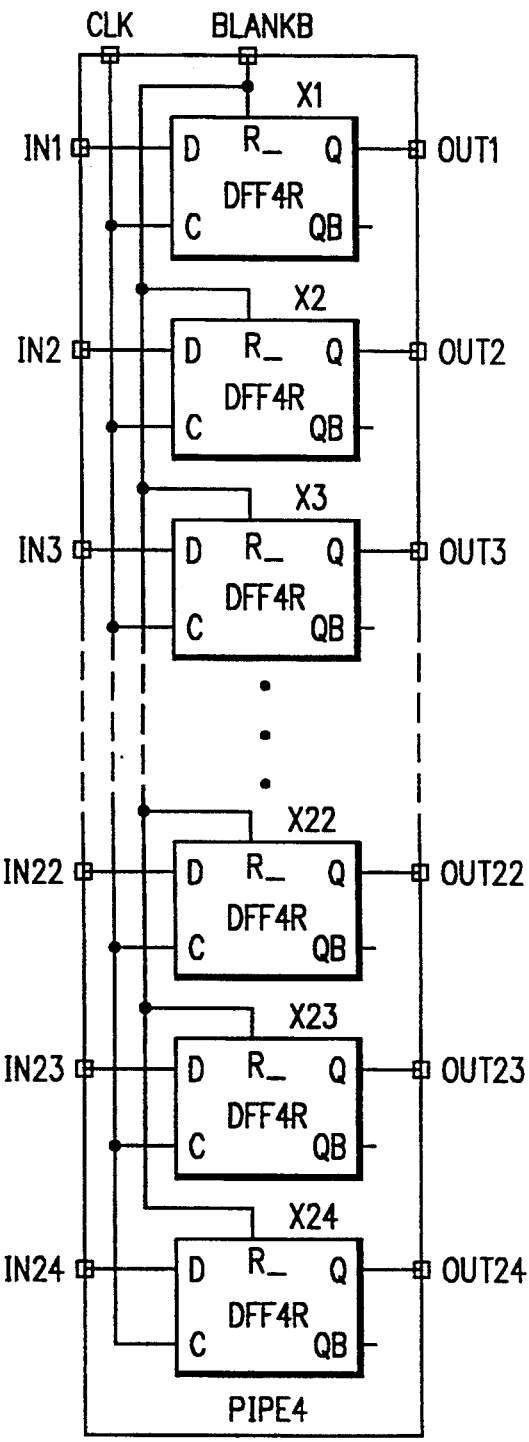
Figure 7J:
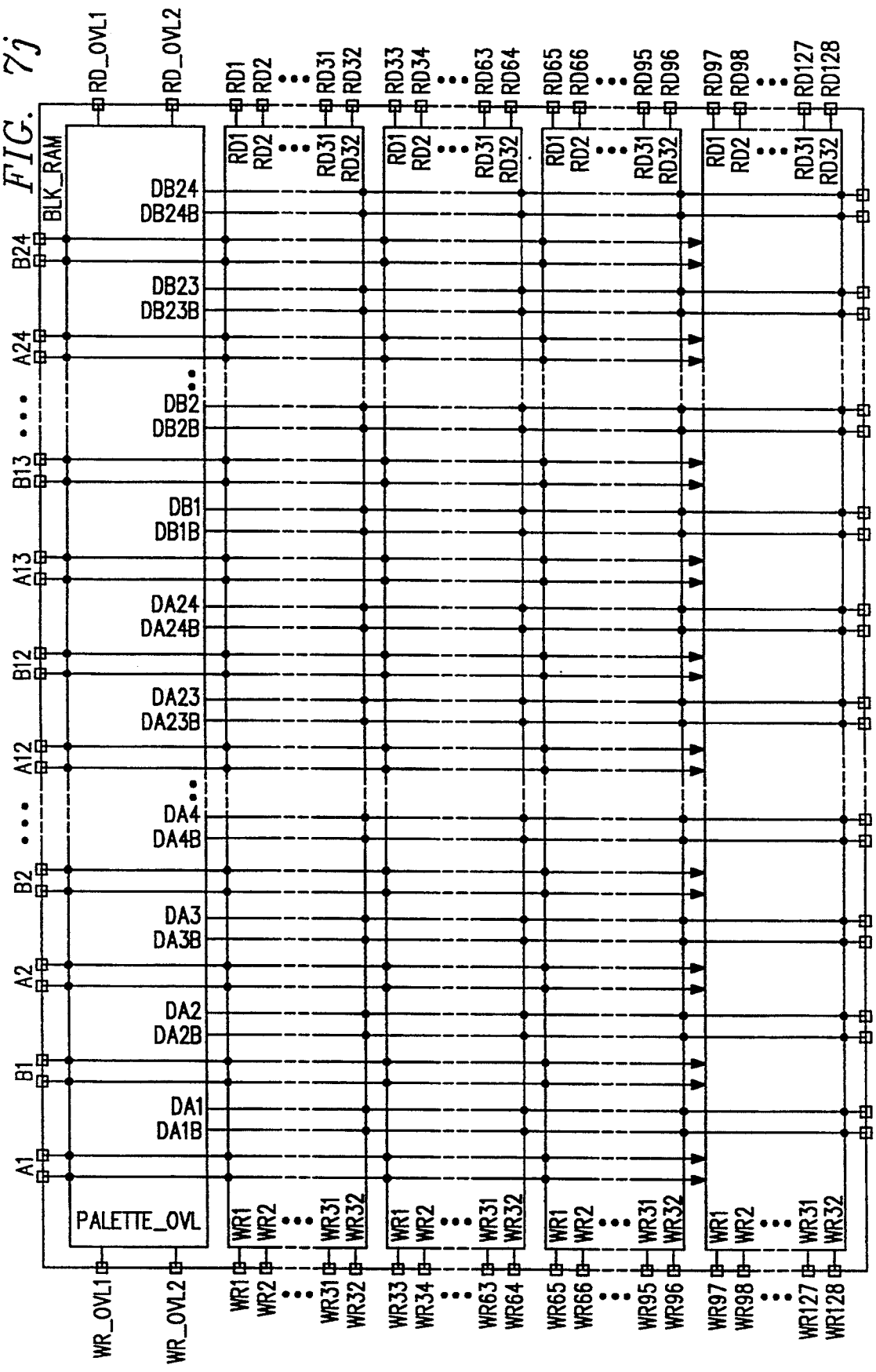
Figure 7K:
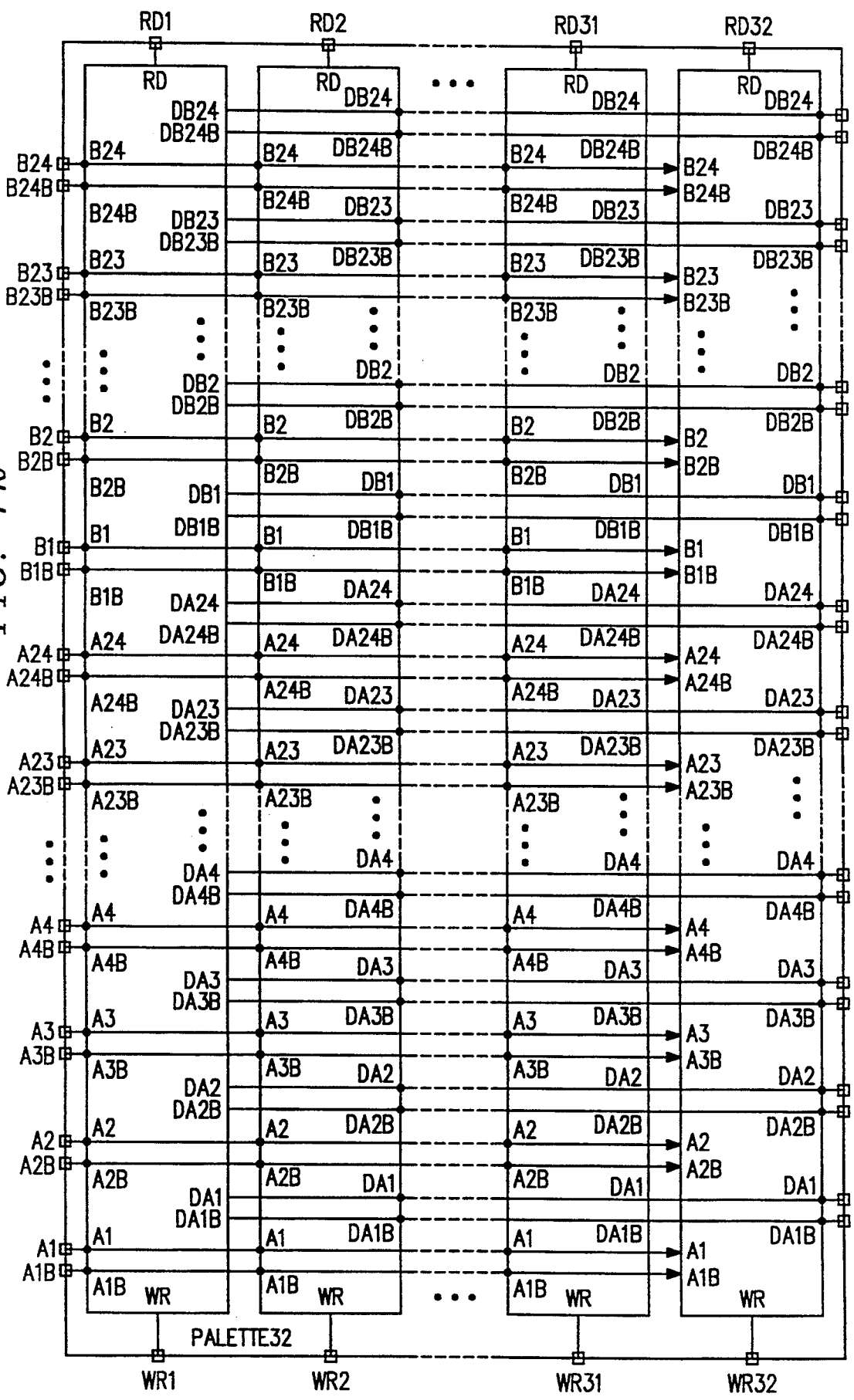
Figure 7L:
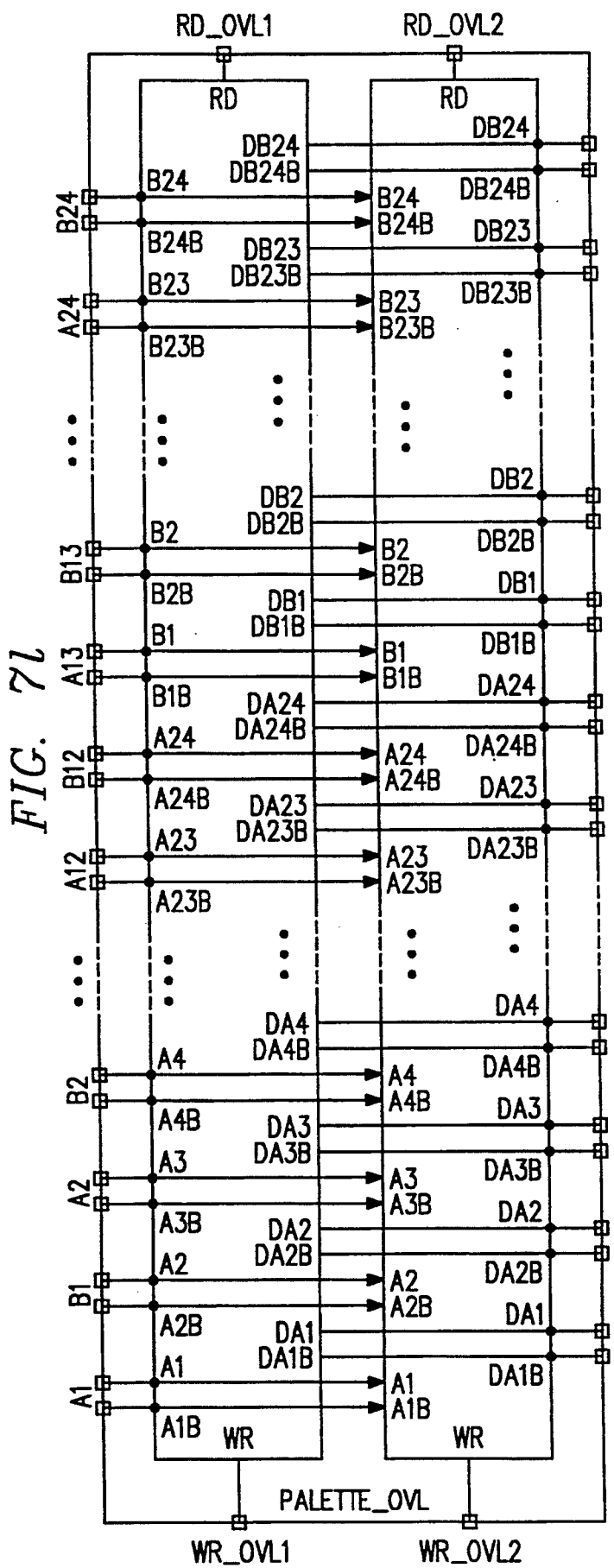
Figure 7M:
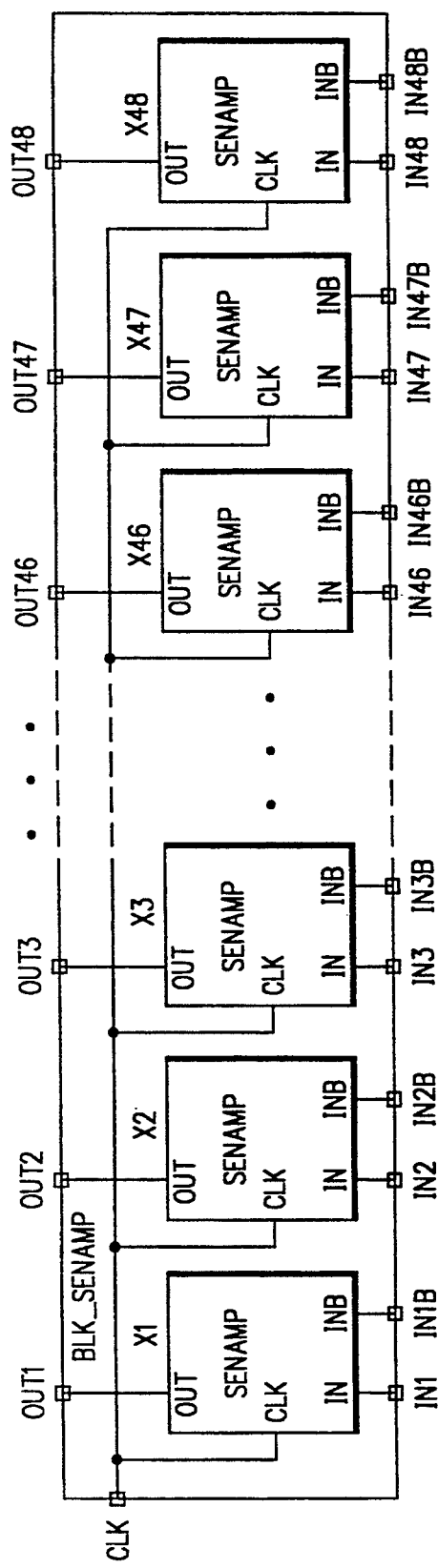
Figure 7M:
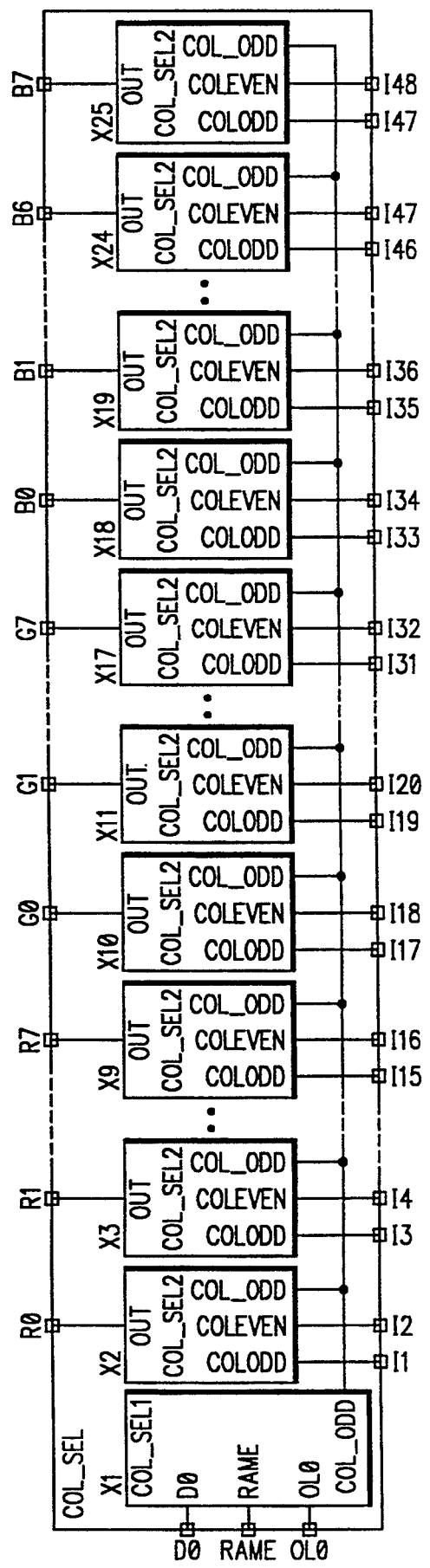
Figure 7P:
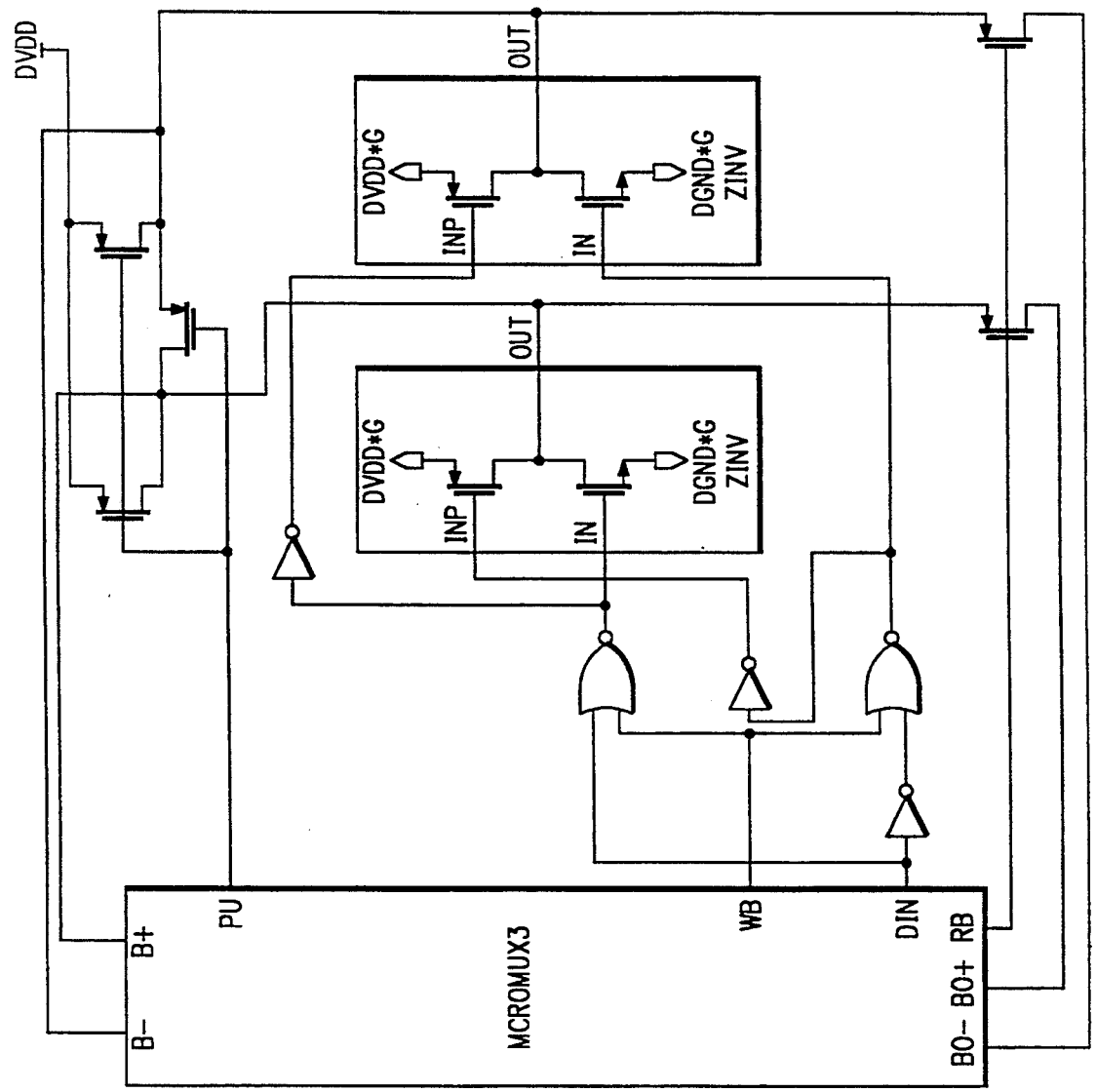
Figure 7Q:
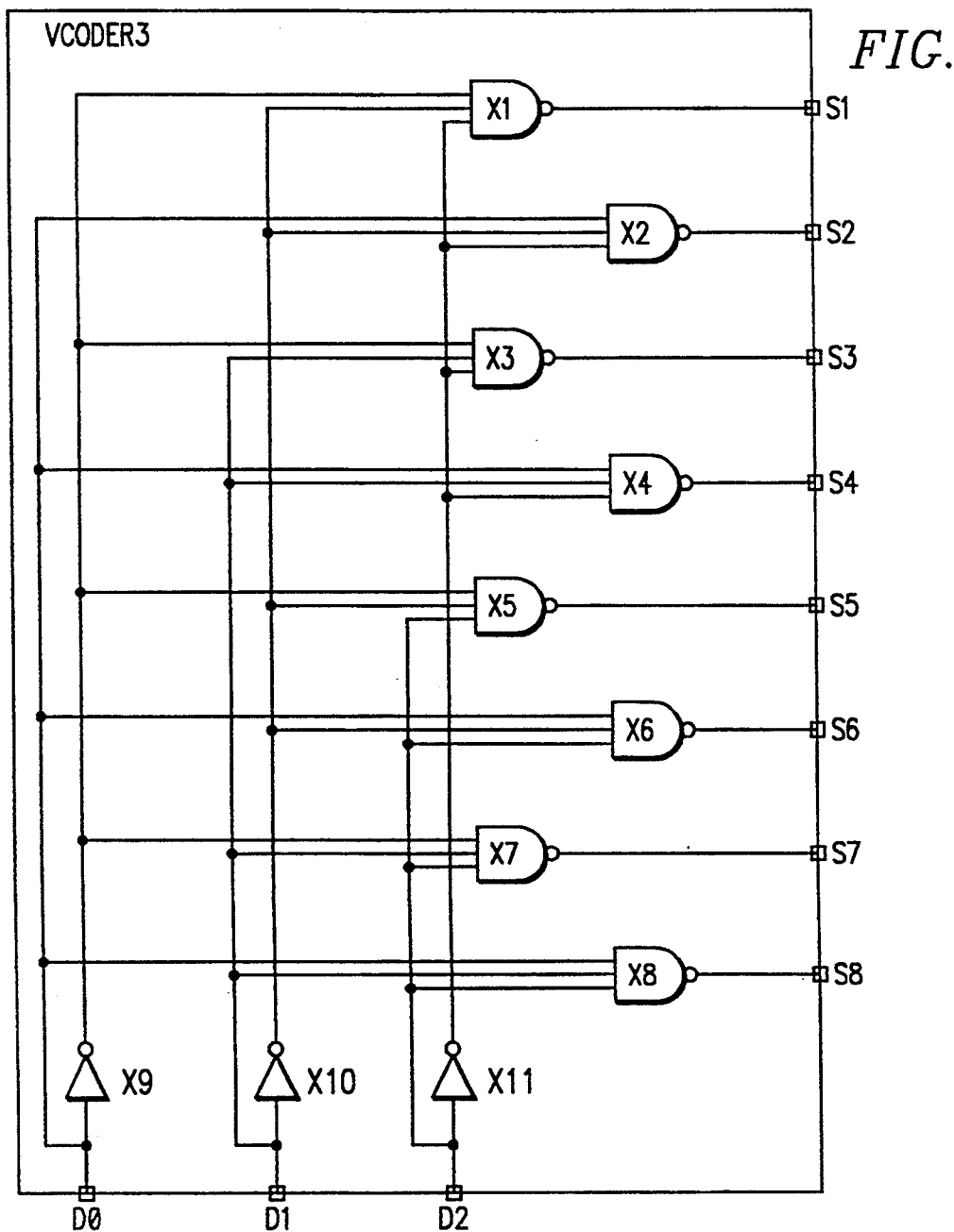
Figure 7R:
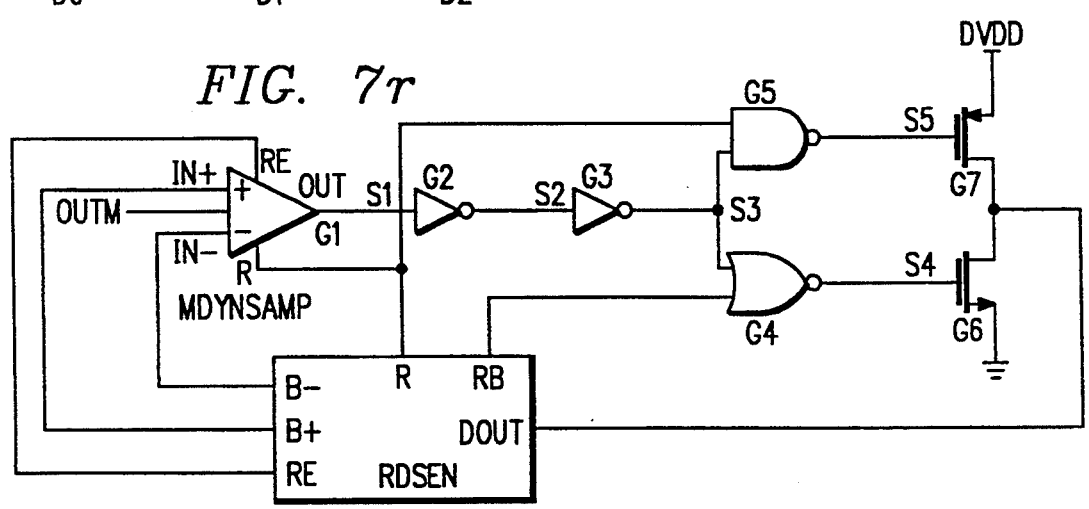
Figure 7S:
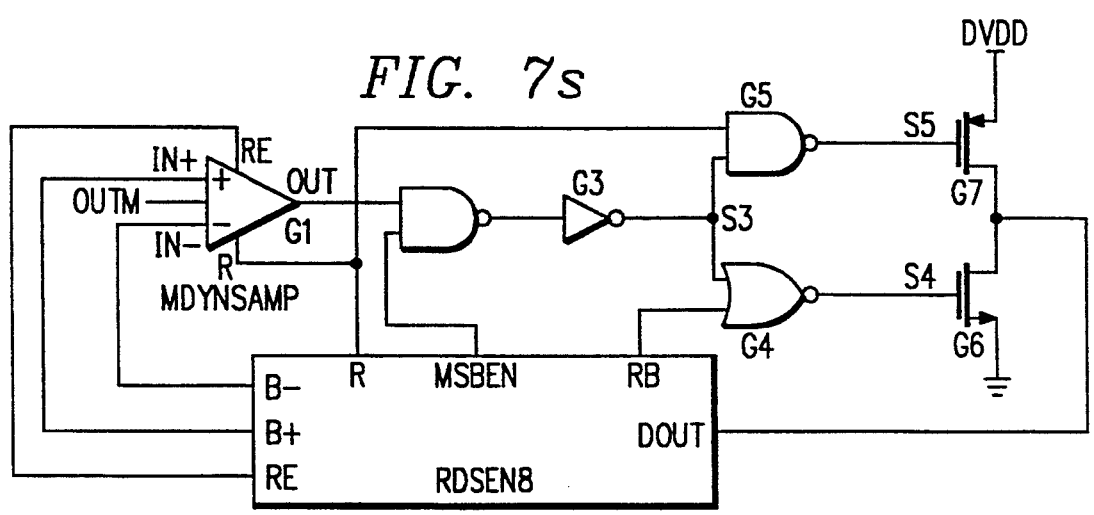
Figure 7T:
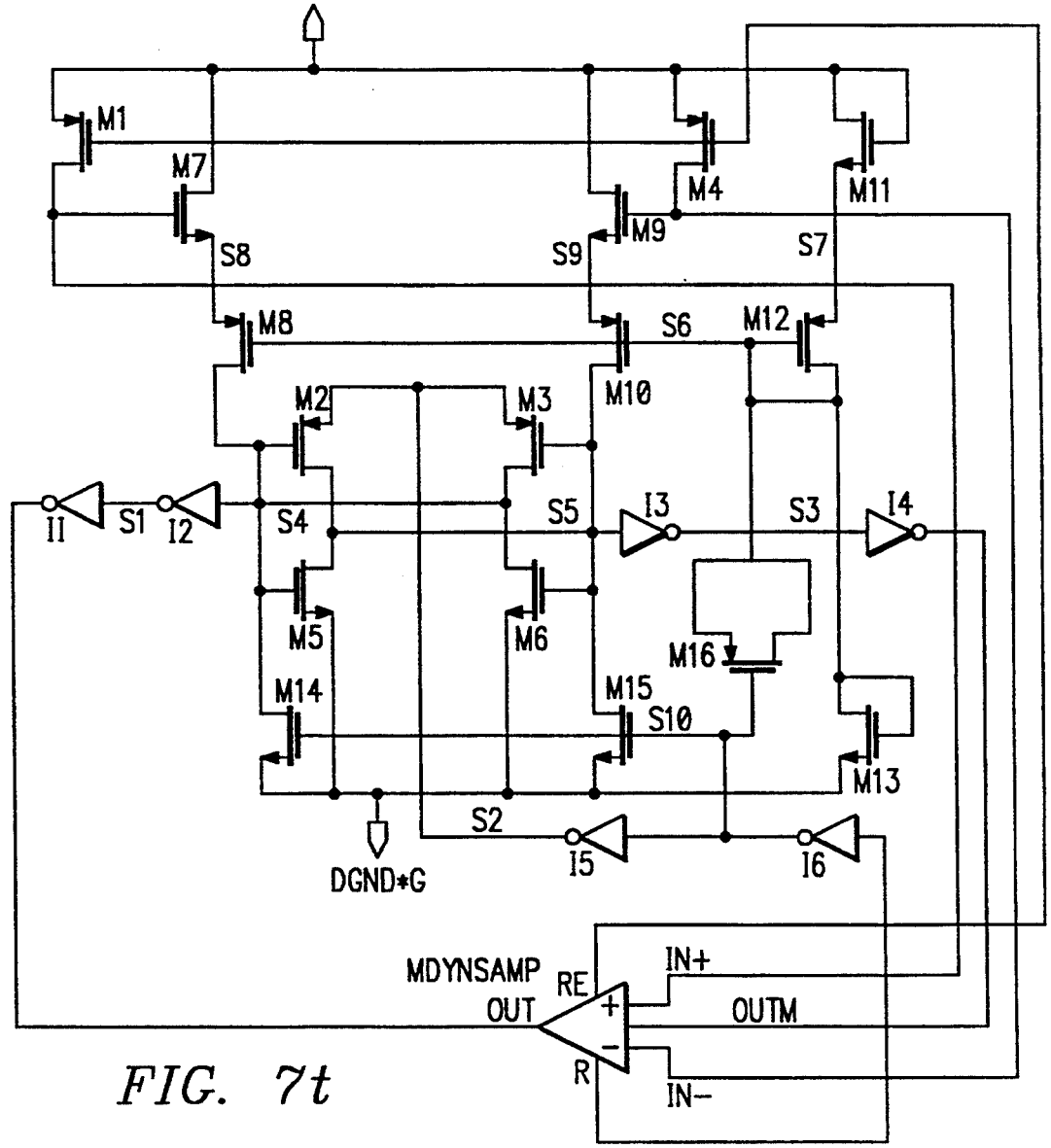
Figure 7U:
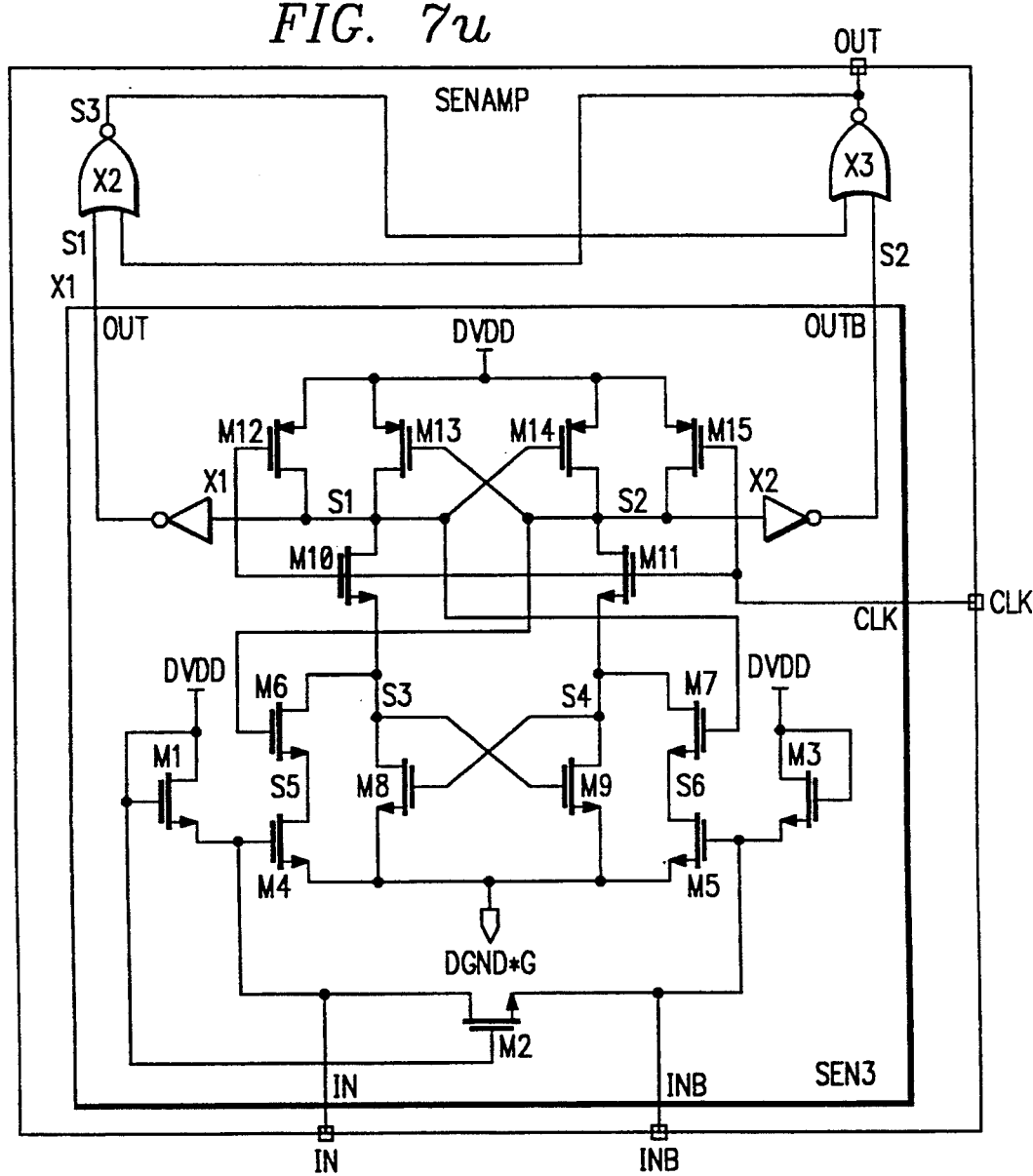
Figure 7W:
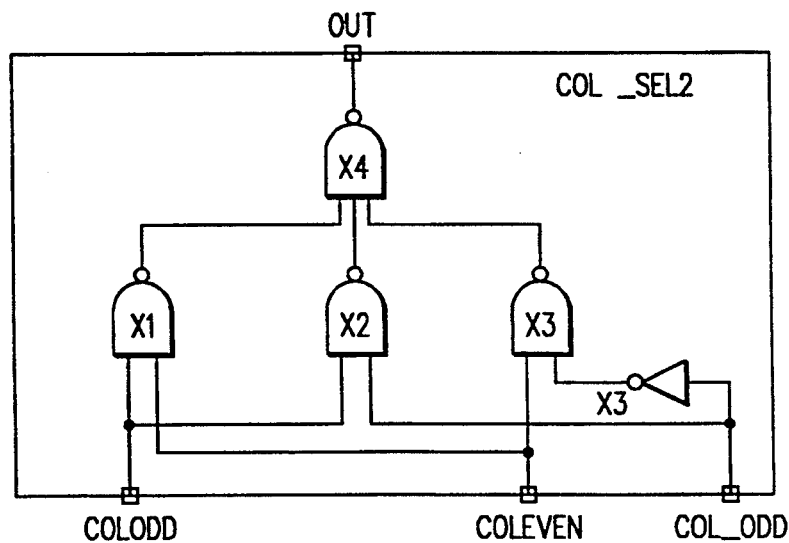
Figure 7X:
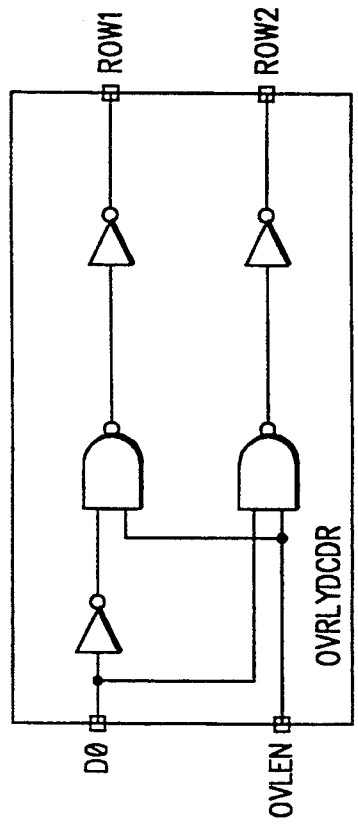
Figure 7Y:
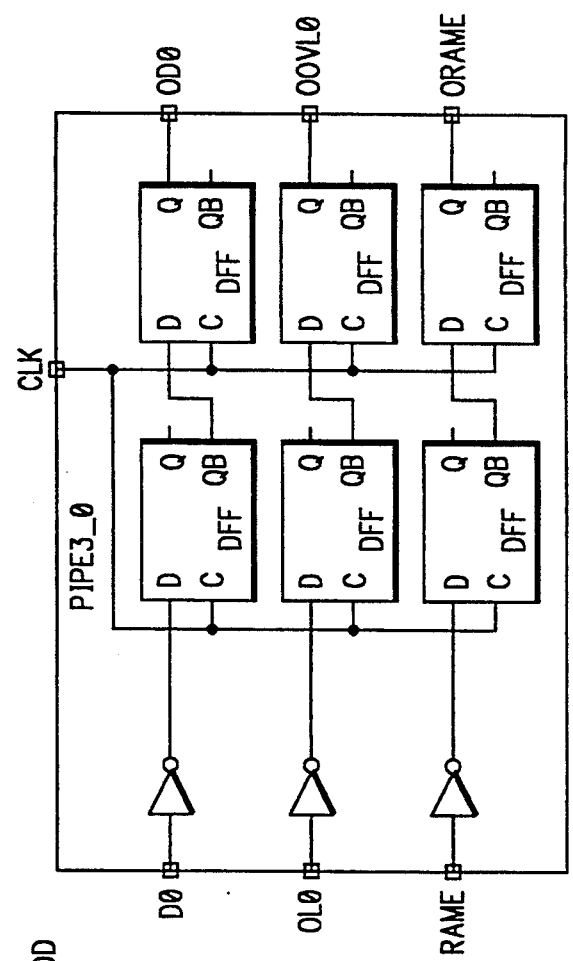
Figure 7V:
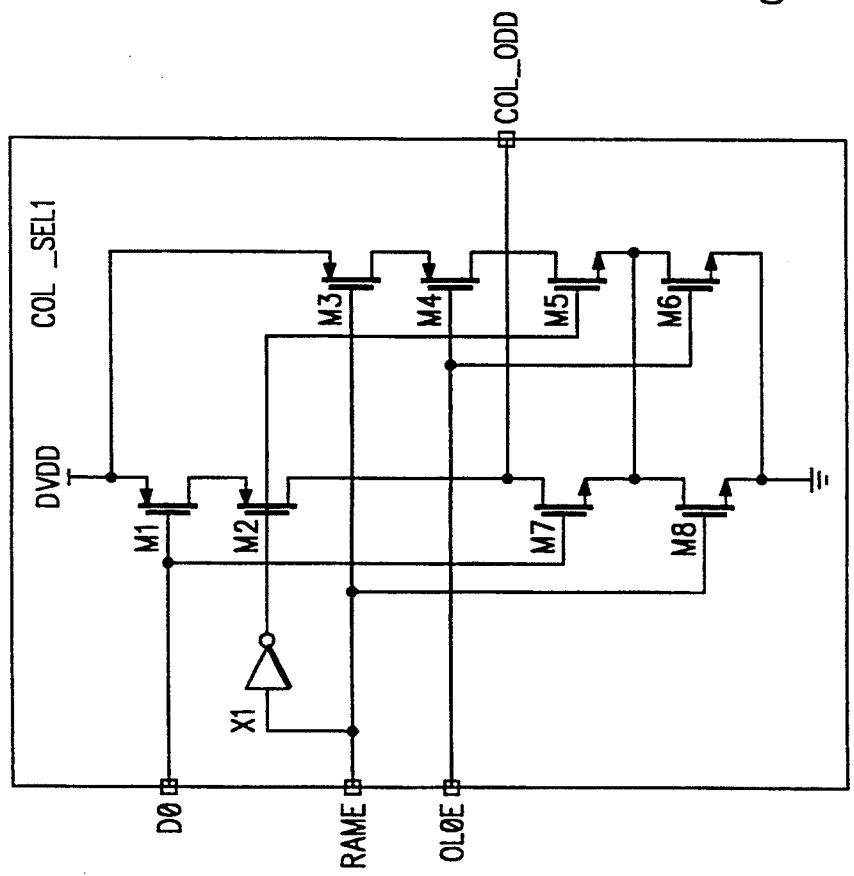
Figure 7Z:
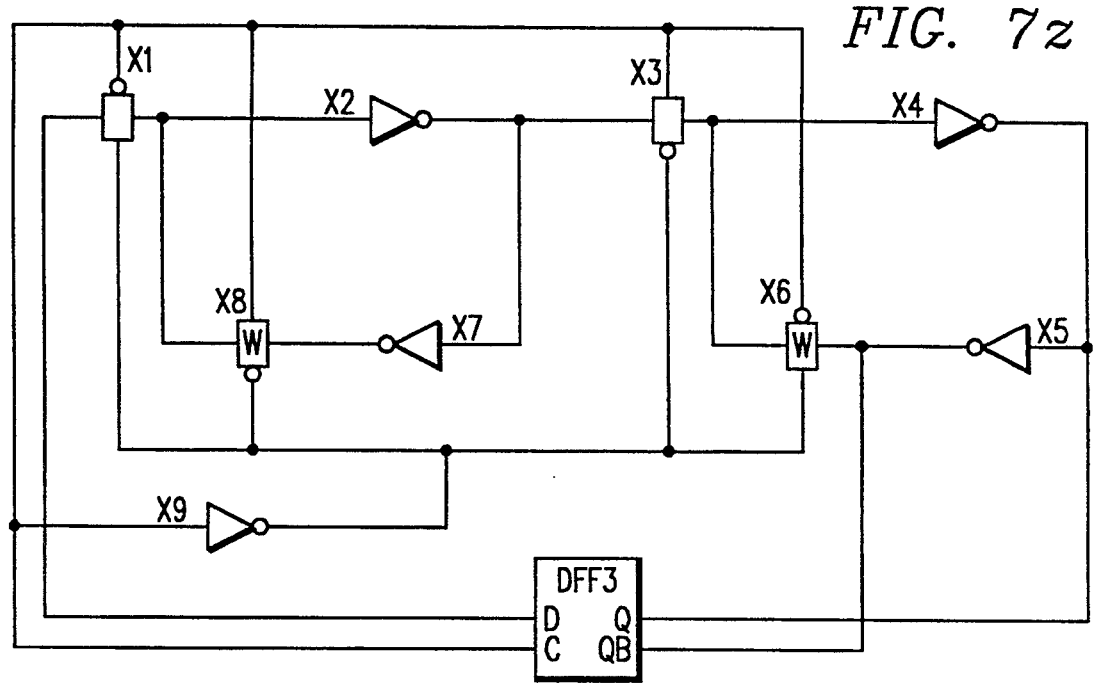
Figure 7A:
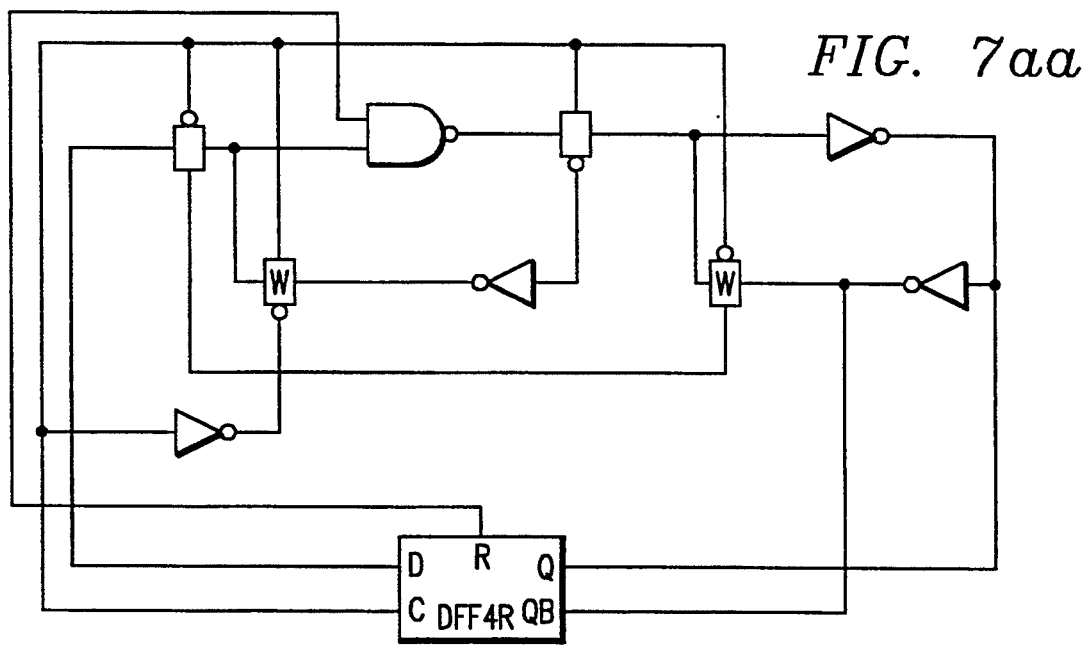
Figure 7A:
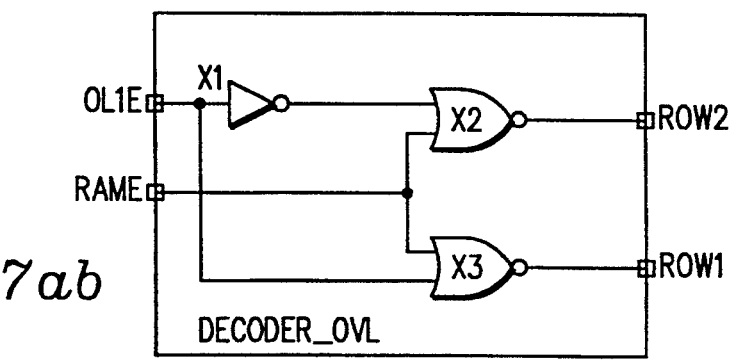
Figure 7A:
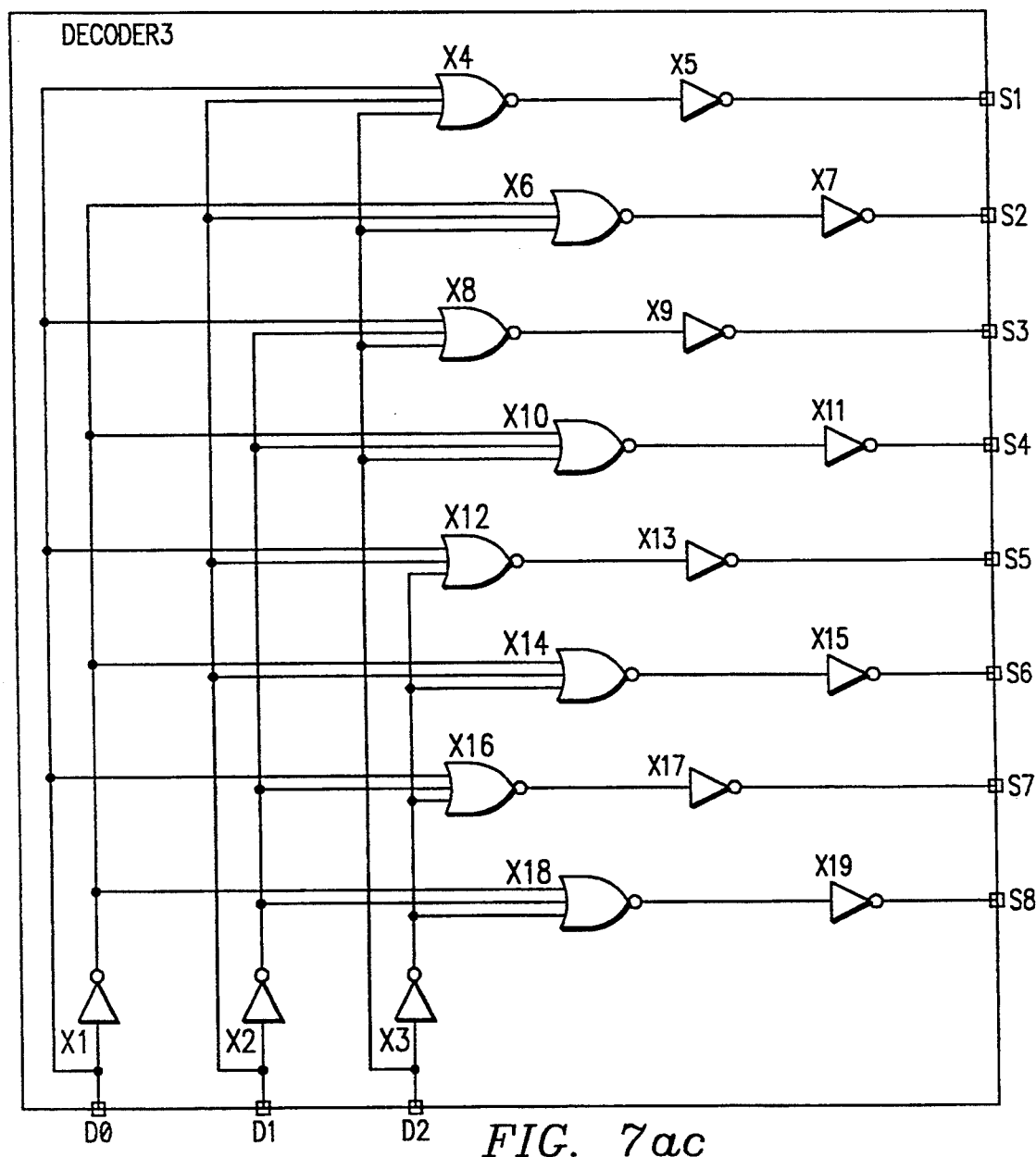
Figure 7A:
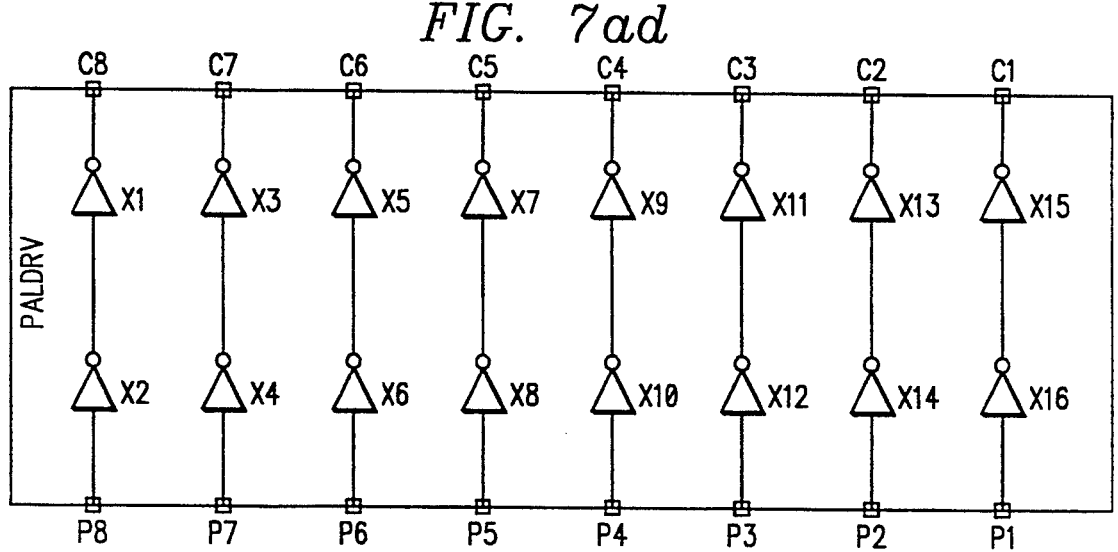
Figure 7A:
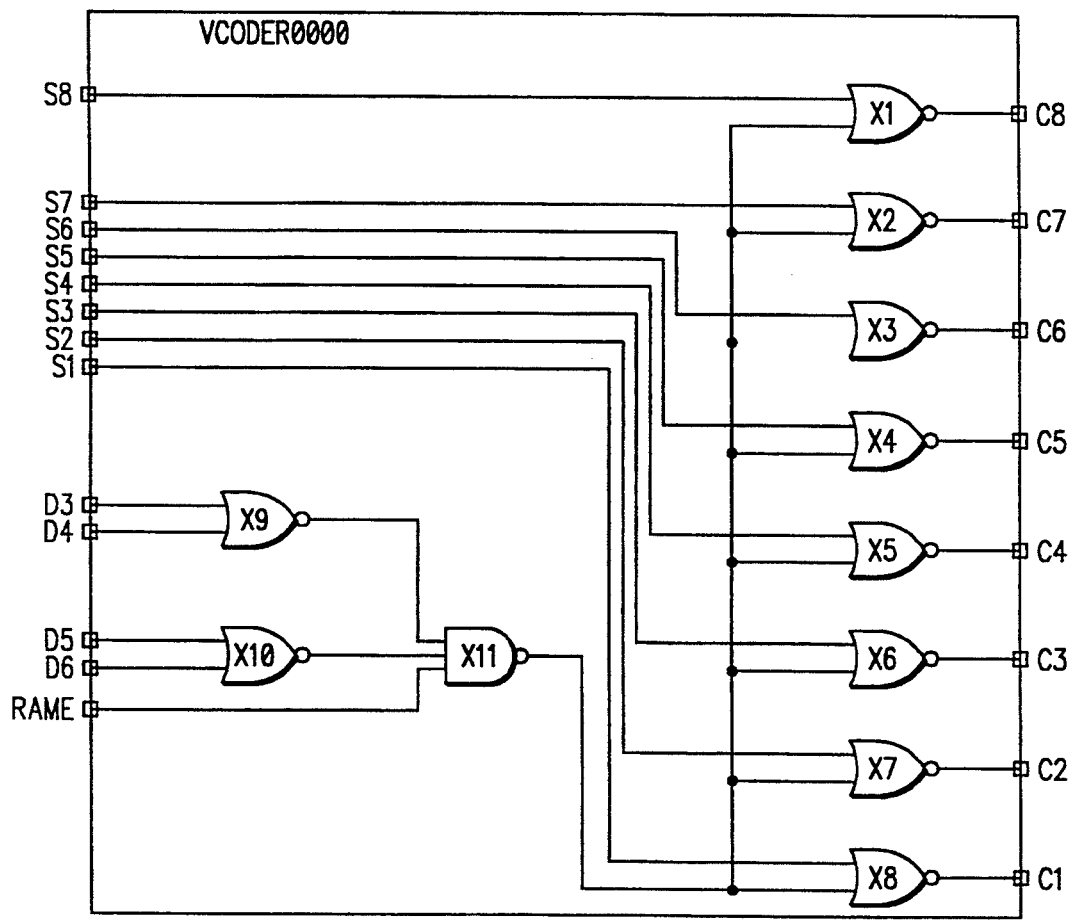

FIGS. 7a-7ae are a complete set of functional block diagrams and schematics of color palette RAM 84, including the memory array and the associated addressing and sensing circuitry. FIG. 7a is a top-level block diagram of color palette RAM 84 and the associated control circuitry. FIGS. 7b-7e are functional block diagrams of the microprocessor interface to the palette RAM which controls the input and output of data into individual RAM cells in palette RAM 84. FIG. 7f is the write column select control block which controls the microport block shown in FIGS. 7b-7e. The write column select block of FIG. 7f receives and decodes control signals received from the M_DECODE circuitry of control circuitry 74, discussed above. FIG. 7g depicts the write decoder for RAM 84 which receives its input from the address register and decodes rows in the RAM array. FIG. 7h illustrates the row decoder on the frame buffer interface side of the palette RAM 84. It receives its inputs directly from the pipe delay PIPE2 following read-masking by read mask 82 and in response decodes rows to RAM 84. FIG. 7i depicts pipeline delay stage PIPE3 which latches the output of the decoder block of FIG. 7h allowing for high speed data transfer operations. FIG. 7j depicts the top level architecture of the palette RAM 84 cell array. The cell array is configured in 4 blocks of 48×32 cells. FIG. 7j also includes an overlay block of RAM cells in a 48×2 cell architecture which are shown disabled in the illustrated embodiment. FIG. 7k is a more detailed drawing of one of the four 32×48 blocks of cells shown in FIG. 7j. FIG. 7l depicts the block of overlay data cells shown in FIG. 7j which is disabled in the present design. FIG. 7m is a block diagram of the sense amplifier architecture which is in a 1×48 configuration. FIG. 7n is a block diagram of the column selector with inputs fed from the outputs of the sense amps shown in FIG. 7m. The column select circuitry of FIG. 7n is controlled by the least significant bit D0 received from PIPE2 and selects between the 24 odd or 24 even columns in the array. In a decoded row of 48 cells therefore, either the odd or even 24 bits are taken by the column selector for output to digital to analog converters 88. FIG. 7o is a detailed block diagram of the pipe delay PIPE4 whose inputs are the 24 outputs of the column selector shown in FIG. 7n reclocking by PIPE4 allows for high speed data transfer without missing data cycle edges. FIG. 7p is an electrical schematic of the micromux (MCROMUX3) sub-block shown as part of the microport of FIGS. 7b–7c. The circuitry of 7p controls the flow of data into and out of the columns of the palette RAM 84. FIG. 7q is an electrical schematic of one of the decoders used in the decoder block of FIG. 7h. FIG. 7r is an electrical schematic diagram of the read sense amp and tri-state output buffer logic shown in FIG. 7e as part of the microport. The circuitry of FIG. 7r is used during the red, blue, and green read outs back to microprocessor 18 through pins D0–D7. FIG. 7s is a sense amp used in the MSB 8/6 mode in which the MSB is zeroed when in the 6-bit mode. FIG. 7t is a more detailed electrical schematic diagram of one of the sense amplifiers shown in FIGS. 7r and 7s. FIG. 7u is an electrical schematic diagram of one of the sense amplifiers shown in FIG. 7m. FIG. 7w is a detailed functional block of the column selector sub-blocks shown in FIG. 7n. FIG. 7x is a detailed functional block of the overlay decoder shown in FIG. 7a. The circuitry of FIG. 7x performs a row select. FIG. 7y is a detailed functional block of the column select control circuitry shown in FIG. 7a. FIG. 7v is a detailed electrical schematic of a sub-block COL_SEL1 shown in FIG. 7n. FIG. 7z is a detailed electrical schematic of the master/slave flip-flop used in pipeline circuitry PIPE3 shown in FIG. 7i. FIG. 7aa is a detailed electrical schematic diagram of the resettable master/slave flip-flop used in the pipeline PIPE4 circuitry shown in FIG. 7o. FIG. 7ab is a detailed functional block diagram of the overlay decoder on the frame buffer side as shown in FIG. 7a. The circuitry of FIG. 7ab performs a row decoder. FIG. 7ac is a detailed functional block diagram of an address decoder used in the write decoder circuitry shown in FIG. 7g. FIG. 7ad depicts driver/buffer circuitry shown in FIG. 7g. FIG. 7ae is a detailed functional block diagram of the decoder circuitry sub-blocks used in the write decoder shown in FIG. 7g.

The color palette RAM 84 is addressed by 8-bit register ADDREG (FIG. 6), which provides addresses both for reading from the RAM and one for writing to the RAM. These registers are automatically incremented following a RAM transfer allowing the entire palette 84 to be read/written with only one access of the address register. When the address register (ADDREG) increments beyond the last location in RAM it is reset to the first location (address 0). While all read and write accesses to the RAM 84 are asynchronous to the system shift clock (SCLK), the system video clock (VCLK) or the master (Dot) Clock, they are all performed within one Dot Clock cycle of each other and so do not cause any noticeable disturbance on the display.

The color RAM 84 is 24 bits wide for each location and 8 bits wide for each color. If 6 bit mode is chosen (8/6-=0), the 2 MSB's will still be written to the color palette. However, if they are read back in the 6 bit mode, the 2 MSB's will beset to 0 to maintain compatibility with G176 & Bt476. With the 8/6-pin held low, data on the lowest 6 bits (the 6 LSBs) of the word are shifted up by 2 bits to occupy the upper 6 bits (the 6 MSBs) at the output multiplexer 88, and the bottom 2 bits are zeroed.

Reading and writing into locations in the look-up table held by RAM 84 through the data port labelled MCROPORT3 as addressed through the read/write column select (WR_Col_SEL3) and read/write decoder (WR_DECODER). Recall of color data words stored in RAM 84 are made through an 8-bit address provided by selector 78, following read masking and paging. Recall is made through the decoder labelled DECODER in FIG. 7a, along with sense amplifiers (BLK_SENAMP) and column selector (COL_SEL). Pipeline delay circuitry (PIPE3 and PIPE4) is provided to account for timing delays through the RAM and RAM control circuitry of FIG. 7a.

Writing To Color Palette RAM 84

To load the color palette, the graphics processor 18 must first write to the address register (FIG. 6, ADDREG) (write mode) with the address where the modification is to start. Eight bits each of red and green data are first read into holding registers REDREG and GRNREG. When the 8 eight bits of blue data arrive, the three bytes of color data are concatenated into a 24-bit word and written via lines BIO, GIO and RIO to the RAM 84 location specified by address register ADDREG (on address lines DA0–DA7). The address register is then incremented to the next location which the processor 18 may modify by simply writing another sequence of red, green and blue data. A block of color values in consecutive locations may be written to by writing the start address and performing continuous Red, Green, and Blue write cycles until the entire block has been written.

Reading From Color Palette RAM 84

Reading from the palette is performed by writing to the address register ADDREG (read mode) with the location to be read. In the read mode, processor 18 can directly read either the red, green or blue data RAM output RGBOUT in an addressed location (Provided to RAM inputs DA0–DA7). Three successive reads by processor 18 will produce red, green, and blue color data (6 or 8 bits depending on the 8/6-mode). As with writing to the palette, a block of color values in consecutive locations may be read by writing the start address and performing continuous Red, Green, and Blue read cycles by incrementation of address register ADDREG until the entire block has been read.

Palette Page Register 80

The palette page register shown in FIG. 4 at designator 80 is implemented as part of circuitry MCROINTF2 in FIG. 5 and more specifically as an 8-bit register labelled PPCREG in FIG. 6. Its purpose is to provide high speed color changing by removing the need for palette reloading. When using 1, 2 or 4 bit planes (the number of bit planes being the number of bits of information received on inputs P0–P31 used as color data for each pixel on display 26, i.e. "bits per pixel") the additional planes are provided from the page register, e.g. when using 4 bit-planes, address data from selector 78 would specify the lower 4 bits of the palette address with the upper 4 bits being specified from the page register. This gives the user the capability of selecting from 16 'palette pages' with only one chip access, thus allowing all the screen colors to be changed at the line frequency. A bit-to-bit correspondence is used, therefore in the above configuration, page register 80 bits 7 through 4 would map onto palette address bits 7 through 4 respectively. The additional bits from the page register are inserted before the read mask 82 and are hence subject to masking.

TABLE 2

Allocation of Palette Page Register Bits.

| No. Bit Planes | msb | | | Palette Address Bits | | | | lsb |
|---|---|---|---|---|---|---|---|---|
| 8 | M | M | M | M | M | M | M | M |
| 4 | P7 | P6 | P5 | P4 | M | M | M | M |
| 2 | P7 | P6 | P5 | P4 | P3 | P2 | M | M |
| 1 | P7 | P6 | P5 | P4 | P3 | P2 | P1 | M |

Pn = n bit from page register
M = bit from pixel port (output from selector 78)

Input/Output Clock Selection & Generation Circuitry 90

Color palette 42 provides for the input of a maximum of five clock inputs through pins CLKO–CLK3B. Pins CLKO–CLK2 are dedicated to TTL inputs. Pins CLK3 and CLK3B can be selected as either one ECL input or two extra TTL inputs. The TTL inputs can be used for video rates up to 80 Mhz, above which an ECL clock source must be used, although the ECL clock may also be used at lower frequencies. The dual mode clock input (ECL/TTL) is primarily an ECL input but can be used as a TTL compatible input if the Input Clock Selection Register (labelled ICSCREG in FIG. 6) is so programmed. Each input is buffered by buffer circuitry TTL_INPUT_BUF (FIG. 5). When inputs CLK3 and CLK3B are used for receiving a differential ECL clock, ECLTOCMOS circuitry (FIG. 5) is used to convert the differential signal received at inputs pins CLK3 and CLK3B into a single line CMOS/TTL compatible signal. The clock source used at power-up is CLKO, an alternative source can be selected through the input clock selection register ICSCREG during normal operation.

Figure 8A:
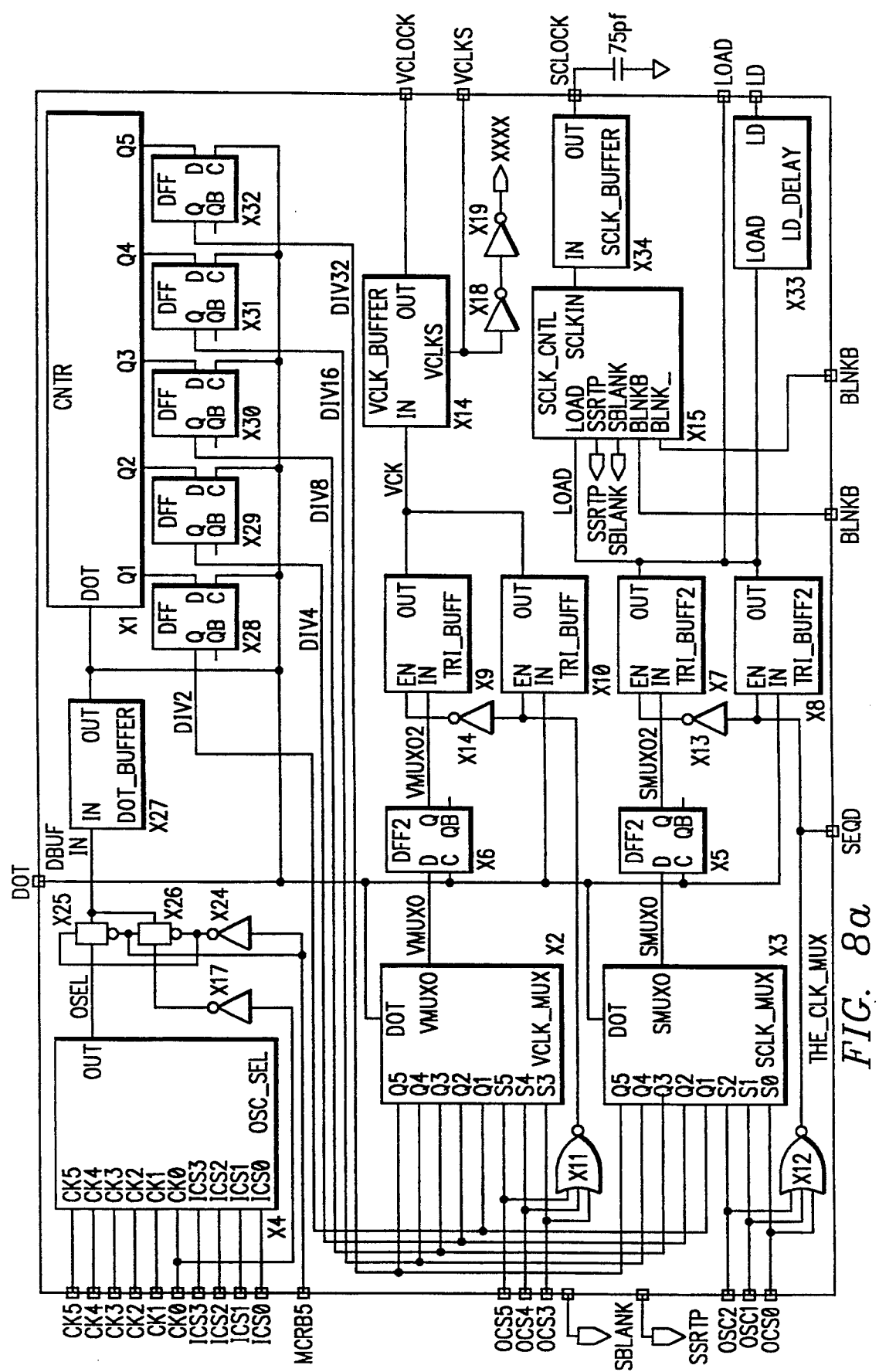
Figure 8B:
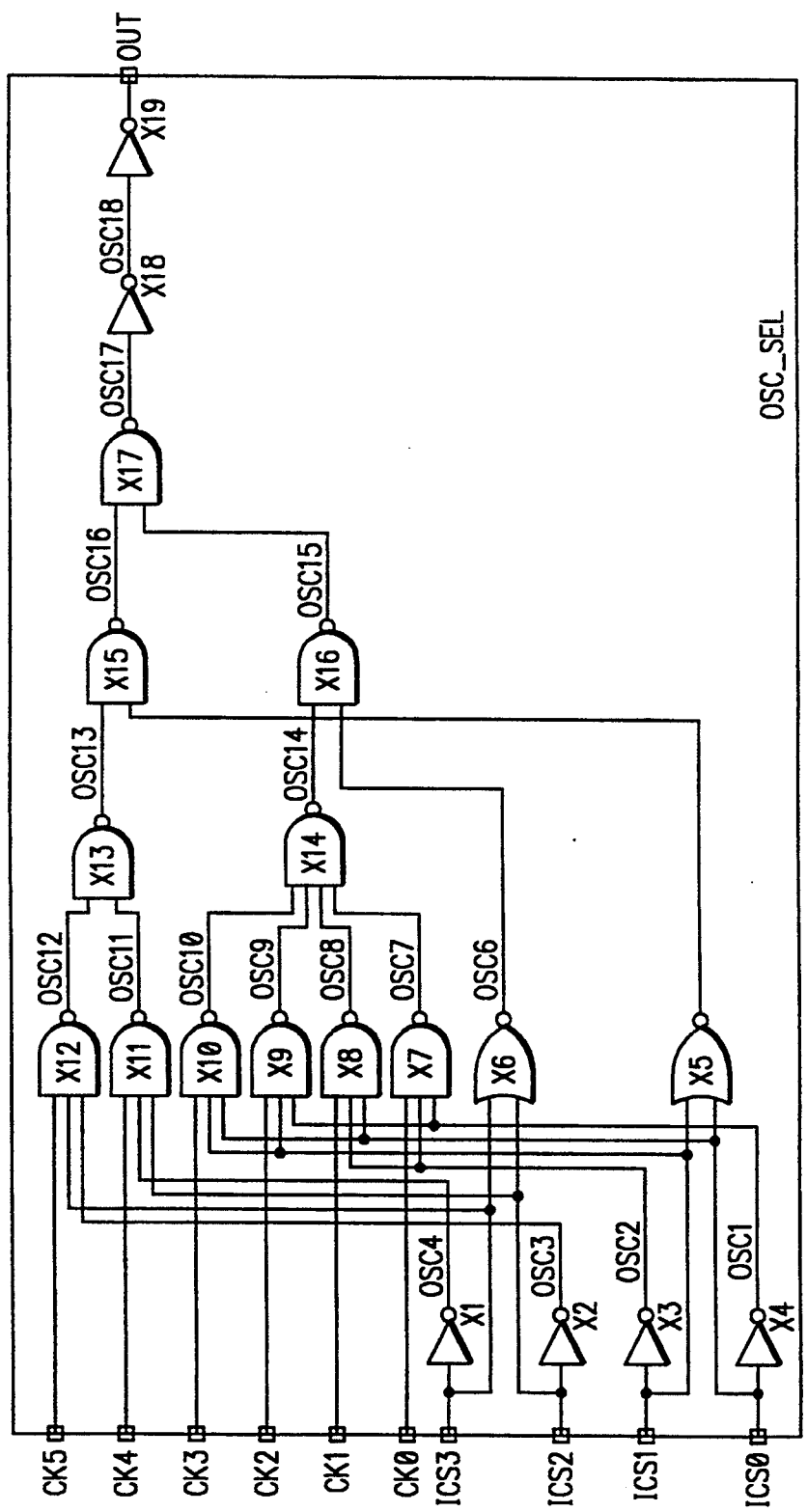
Figure 8C:
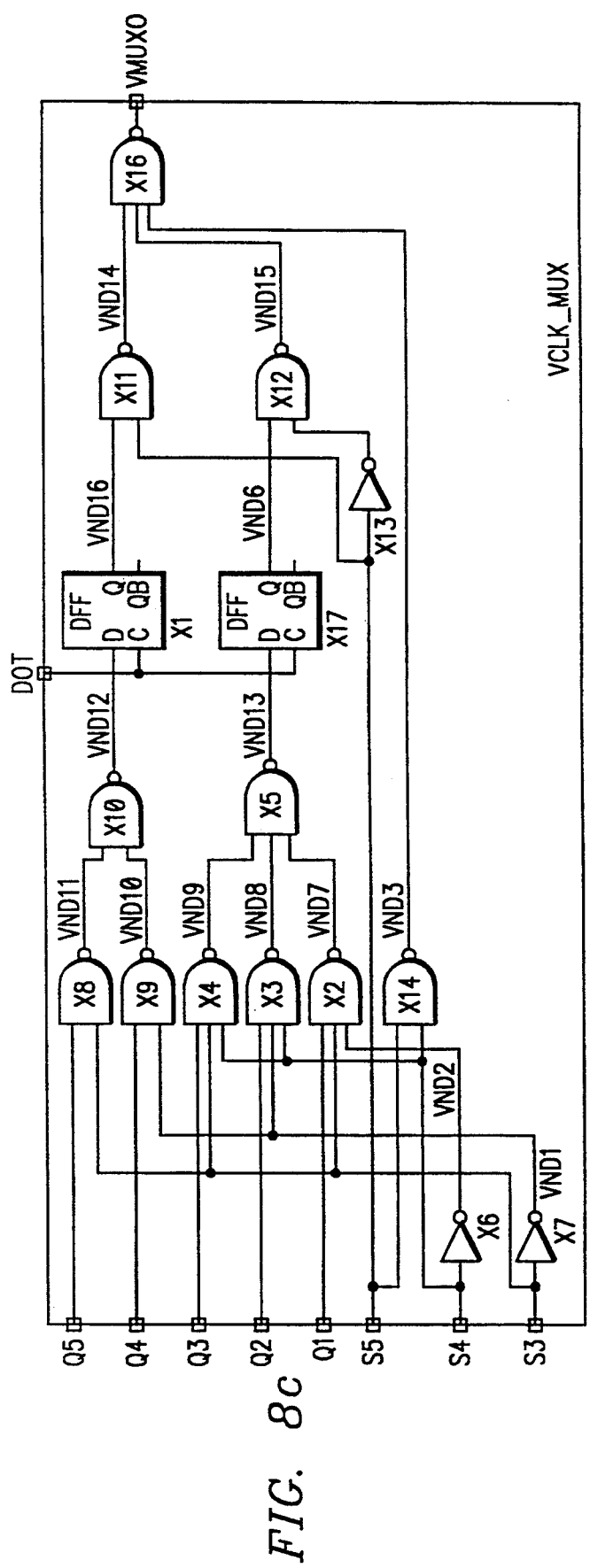
Figure 8F:
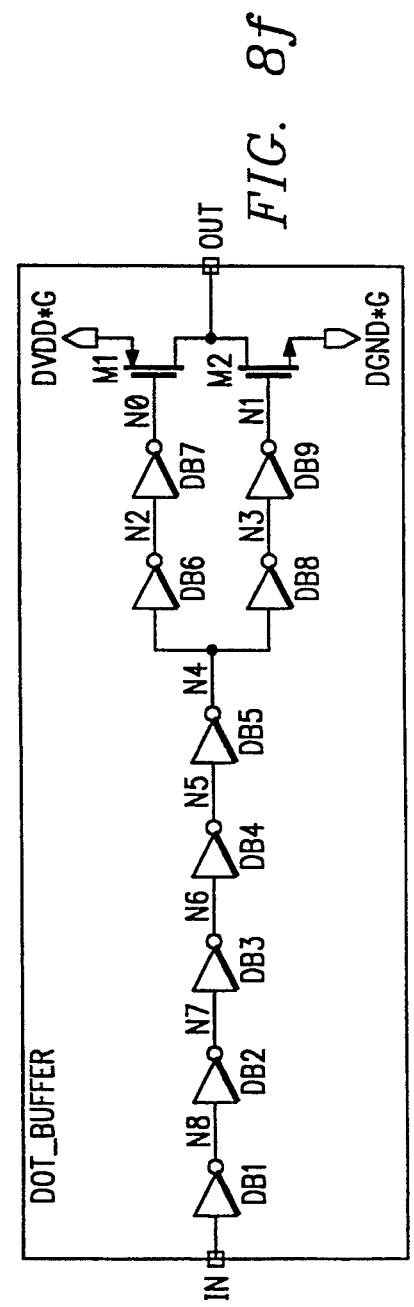
Figure 8D:
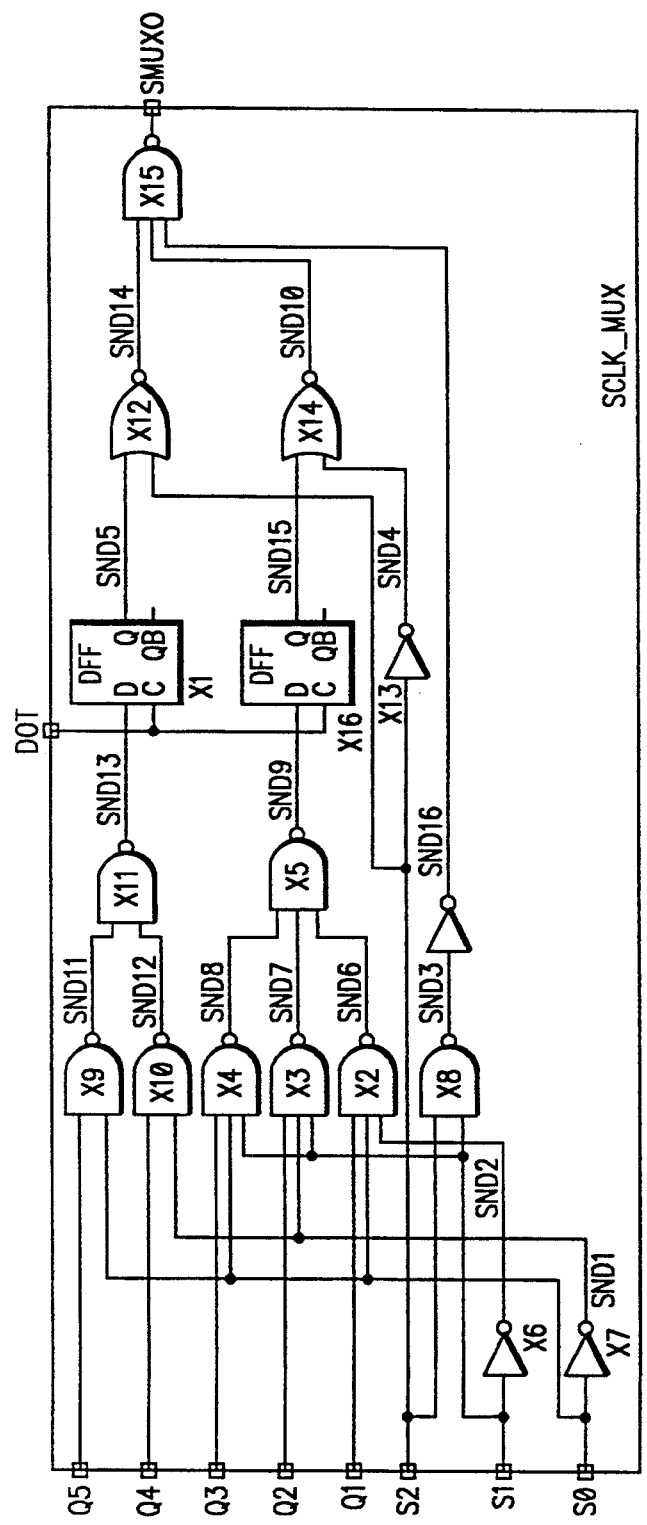
Figure 8G:
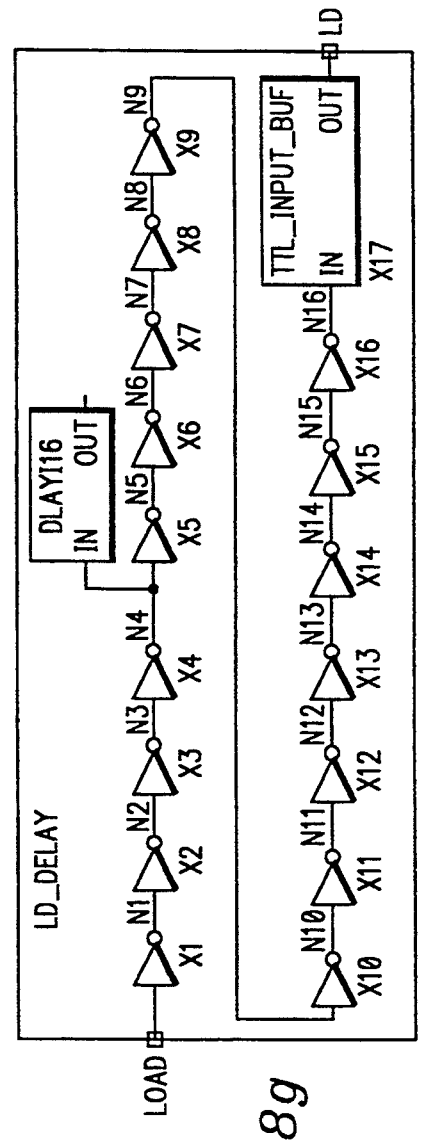
Figure 8J:
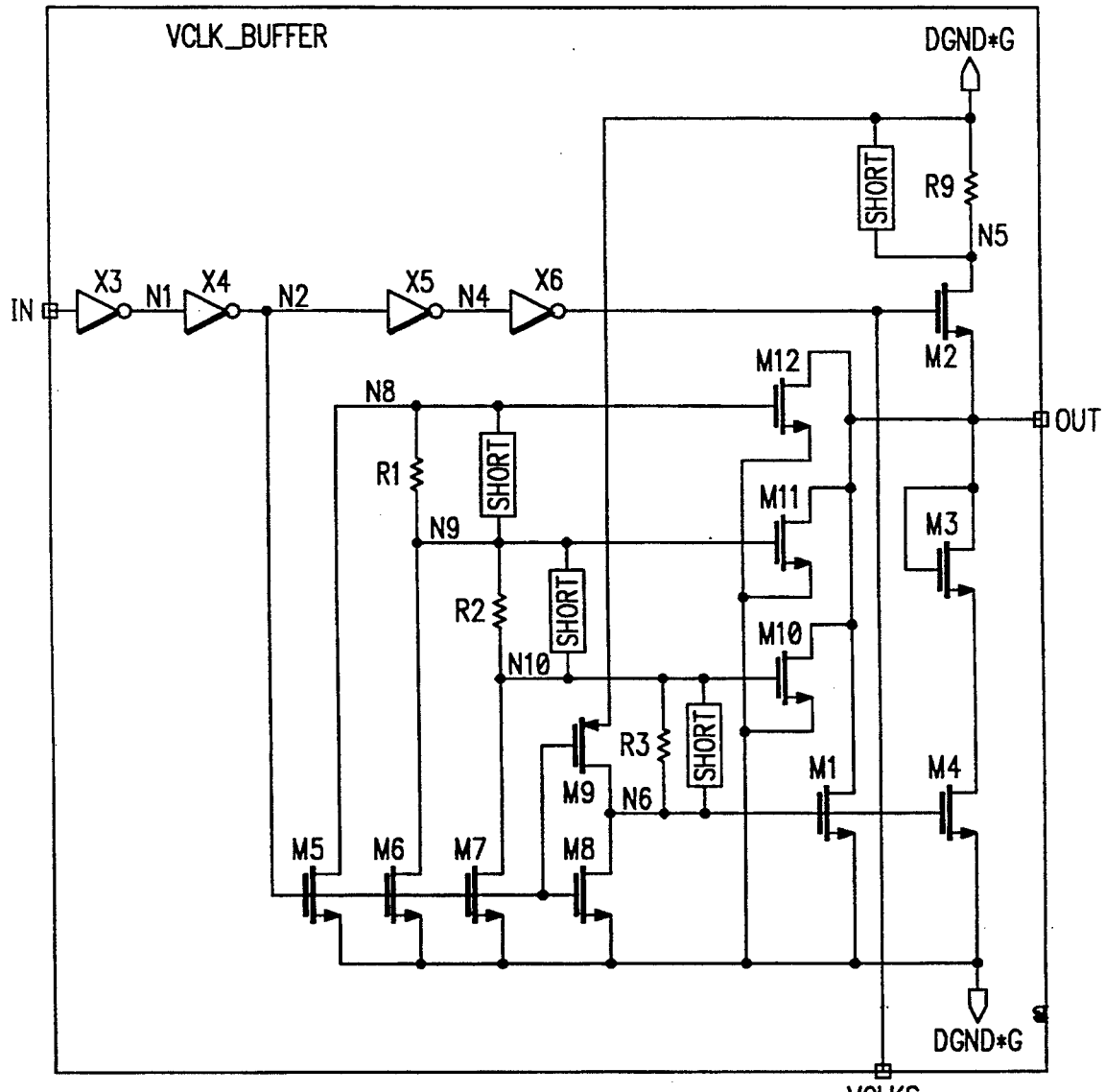
Figure 8K:
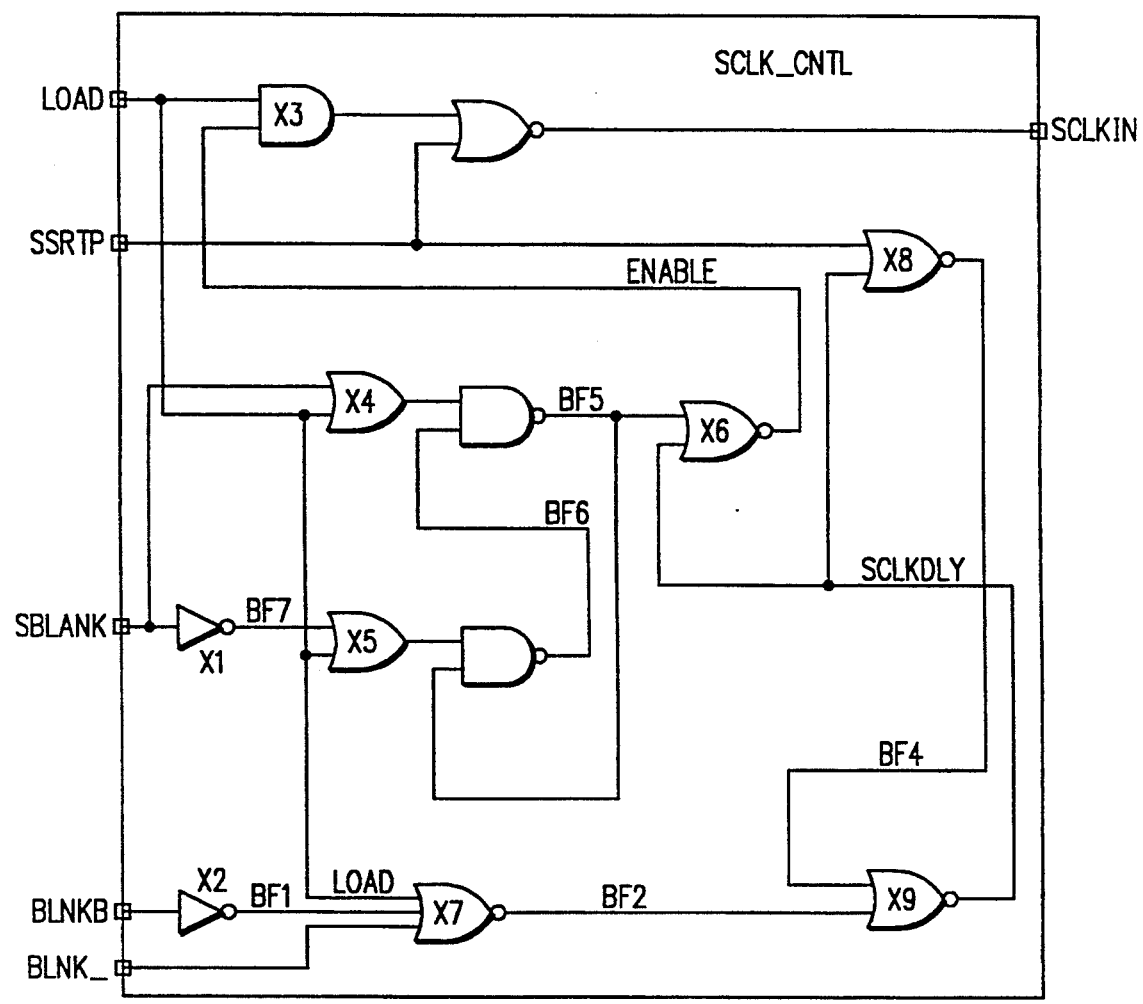

The values loaded into the input clock selection register (ICSCREG, FIG. 6) and the output clock selection register (OCSCREG, FIG. 6) are used by clock control circuitry 90 (THE_CLK_MUX in FIG. 5) to provide the palette master (DOT) clock and the system video and shift clocks. FIGS. 8a–8i are complete set of block diagrams and schematics describing clock control circuitry 90. FIG. 8a is an upper-level block diagram of clock control circuitry 90 (THE_CLK_MUX shown in FIG. 5a). FIG. 8b is a detailed functional block diagram of the oscillator select circuity shown in FIG. 8a which selects one of five input clocks to color palette 42 as a function of four bits from the input clock selection register ICSCREG of FIG. 6p. FIG. 8c is a detailed functional block diagram of the video clock (VCLK) multiplexer. The VCLK multiplexer selects for use as the VCLK one of five divided down ratios of the master (DOT) clock as a function of three bits received from the output clock selection register OCSCREG (FIG. 60). FIG. 8f is a detailed functional block diagram of the DOT clock buffer which has sufficient drive to provide the master (DOT) clock to all circuitry on color palette 42 without further local buffering. FIG. 8d is a detailed functional block diagram of the shift clock multiplexer which selects one of five divided down ratios of the DOT clock for use as the shift clock as a function of three bits from the output clock selection register. FIG. 8g is a detailed functional block diagram of the LD delay circuitry which provides a proper timing relationship between a signal LD and the shift clock to meet the set-up times required at the input latch 76 (signal LD being used to latch incoming pixel data). FIG. 8e is a detailed functional block diagram of the synchronous counter used to divide down the master clock into the necessary ratios for the shift clock and video clocks. FIG. 8h and 8i are detailed functional block diagrams of the tri-state buffers which allow for the bypass of the shift clock and/or the video clock multiplexers when the selected divide ratios are equal to the DOT clock. FIG. 8j is a detailed electrical schematic of the VCLK output buffer which provides drive for the video clock to off-chip devices. FIG. 8k is a detailed electrical schematic of the SCLK controller. The SCLK controller disables the shift clock during display blanking. Further, as discussed below, the shift clock control circuitry passes through a pulse SSRTP during a split register transfer event in video RAM 30 in the display blanking period and then delays the re-enable of the shift clock following return from blank by one shift clock pulse. FIG. 8l is a detailed electrical schematic of the shift clock buffer which provides the necessary drive for the shift clock to off-chip devices.

For a complete description of the operation of clock control circuitry 90, reference is now made to copending and coassigned U.S. patent application Ser. No. 07/789,725, Attorney's Docket No. TI-15784, incorporated herein by reference. The chosen clock input is used following buffeting as the Dot Clock (representing pixel rate to the monitor). (If the ECL clock input is used the clock input is converted to CMOS levels by circuitry ECLTOCMOS_NEW (FIG. 5j). If the clock input is feed through a TTL input, the TTL buffer (TTL_INPUT_BUF, FIG. 5a) will also convert the input levels to full CMOS.) The system shift clock (SCLK) and the system video clock (VCLK) outputs are selected through Output Clock Selection register labelled (OCSCREG in FIG. 6). The Input/Output Clock Selection registers operation is described in Tables 3a, 3b & 3c.

The DOT clock is buffered from a single source via circuity DOT_BUFFER (FIG. 8f) eliminating the need for localized buffering elsewhere on palette 42. SCLK is buffered by circuitry SCLK_BUFFER (FIG. 8l) to directly drive the VRAMs 30. VCLK is similarly buffered by circuitry VCLK_BUFFER (FIG. 8j) and is designed to work with the video control signals BLANK and SYNC's controlling display 26.

Internally both SCLK and VCLK are generated from a common clock counter (FIG. 8e) which is counted at the rising edge of the DOTCLK. Thus, when enabled, VCLK is in phase with SCLK as exemplified in FIG. 9.

TABLE 3a

Input Clock Selection Register Format
FIG. 2: DOTCLK/VCLK/SCLK relationship

| Input Clock Selection Register Bits (1) | | | | | |
|---|---|---|---|---|---|
| 3 | 2 | 1 | 0 | Hex (1) | Function (2) |
| 0 | 0 | 0 | 0 | 00 | Select CLK0 as clock source* |
| 0 | 0 | 0 | 1 | 01 | Select CLK1 as clock source |
| 0 | 0 | 1 | 0 | 02 | Select CLK2 as clock source |
| 0 | 0 | 1 | 1 | 03 | Select CLK3 as TTL clock source |
| 0 | 1 | 0 | 0 | 04 | Select CLK3- as TTL clock source |
| 1 | 0 | 0 | 0 | 08 | Select CLK3 & CLK3- as ECL clock source |

*CLK0 is chosen at power-up to support VGA pass-through.
Note 1: Register bits 4, 5, 6 & 7 have 'Don't Care' conditions.
Note 2: When the clocks are selected from one mode to the other, a minimum 30 ns is needed before the new clocks are stabilized and running.

TABLE 3b

Output Clock Selection Register Format

| Output Clock Selection Register Bits (1) | | | | | | |
|---|---|---|---|---|---|---|
| 5 | 4 | 3 | 2 | 1 | 0 | Function (2) |
| 0 | 0 | 0 | x | x | x | VCLK/1 output ratio |
| 0 | 0 | 1 | x | x | x | VCLK/2 output ratio |
| 0 | 1 | 0 | x | x | x | VCLK/4 output ratio |
| 0 | 1 | 1 | x | x | x | VCLK/8 output ratio |
| 1 | 0 | 0 | x | x | x | VCLK/16 output ratio |
| 1 | 0 | 1 | x | x | x | VCLK/32 output ratio |
| 1 | 1 | x | x | x | x | VCLK output held at Logic 1* |
| x | x | x | 0 | 0 | 0 | SCLK/1 output ratio |
| x | x | x | 0 | 0 | 1 | SCLK/2 output ratio |
| x | x | x | 0 | 1 | 0 | SCLK/4 output ratio |
| x | x | x | 0 | 1 | 1 | SCLK/8 output ratio |
| x | x | x | 1 | 0 | 0 | SCLK/16 output ratio |
| x | x | x | 1 | 0 | 1 | SCLK/32 output ratio |
| x | x | x | 1 | 1 | x | SCLK output switched off and held low* |

*These lines indicate the power-up conditions as are required for VGA pass-through.
NOTE 1: Register bits 6 & 7 have 'Don't Care' conditions.
NOTE 2: When the clocks are selected from one mode to the other, a minimum 30 ns is needed before the new clocks are stabilized and running.

TABLE 3c

VCLK/SCLK selection table
(Output Clock Selection Register in hex value)

| SCLK VCLK field | field divide | 000 /1 | 001 /2 | 010 /4 | 011 /8 | 100 /16 | 101 /32 |
|---|---|---|---|---|---|---|---|
| 000 | /1 | 00 | 01 | 02 | 03 | 04 | 05 |
| 001 | /2 | 08 | 09 | 0A | 0B | 0C | 0D |
| 010 | /4 | 10 | 11 | 12 | 13 | 14 | 15 |
| 011 | /8 | 18 | 19 | 1A | 1B | 1C | 1D |
| 100 | /16 | 20 | 21 | 22 | 23 | 24 | 25 |
| 101 | /32 | 28 | 29 | 2A | 2B | 2C | 2D |

Shift Clock

The system shift clock (SCLK) is selected, as discussed above, by loading output clock selection register OCSCREG. The selection is implemented by the SCLK multiplexer (SCLK_MUX) show in FIG. 6a which also provides the clocking signal LOAD. Clock control circuitry 90 further provides a clocking signal LD, through delay circuitry LD_DELAY, which has edges closely approximating those of SCLK. Data are latched inside the device by input latches 76 (complete schematics of which are provided as FIG. 11) on the rising 'LD' (which is basically the same as SCLK but not disabled during BLANK active period). Two multiplexer/buffers labeled TRI_BUFFER2 allow for the selection of an SCLK (and clocking signal LOAD) equal to the DOT clock by bypassing multiplexer SCLK_MUX. Thus, SCLK must be set as a function of the Pixel Bus width and the number of Bit Planes. SCLK can be selected as divisions of 1, 2, 4, 8, 16, or 32 of the Dot Clock. If SCLK is not used, the output is switched off and held low to protect against VRAM 'lock-up' due to invalid SCLK frequencies. SCLK is also held low during the BLANK active period by the shift clock control circuitry SCLK_CNTL shown in FIG. 8a. The control timing has been designed to bring the first pixel data ready from VRAM 30 when BLANK is disabled and ready for the display. As discussed further below, when the split shift register operation is used, the shift clock control circuitry (SCLK_CNTL in FIG. 8a) insures that an additional SCLK pulse is provided during the blanking period to properly time split shift register loading in VRAMs 30. The shift clock control circuitry SCLK_CNTL receives a pulse SSRTP from video multiplexer and control circuitry 92 (discussed below) which latches the output SCLOCK to the enable state for an additional SCLOCK period after the start of blanking. Through control signals BLNKB and BLNK_ which are each an additional SCLK pulse out from each other in time, SCLOCK re-enable is delayed one additional clock pulse to account for the extra clock period produced for the split shift register loading. The default setup is 1:1, as used in mode 0. Refer to FIGS. 8 and 10a for the following timing explanation of the control of the SCLK by clock circuitry 90.

The falling edge of VCLK is used internally by video mux and control circuitry 92 (see the complete set of schematics provided as FIG. 17 and the further discussion below) to sample and latch the BLANK- input (producing sampled blank signal SBLANK). When BLANK-becomes active, the SCLK will be disabled as'soon as possible. In other words, if the last SCLK is at the high level while the sampled BLANK- (SBLANK) is low, that SCLK will be allowed to finish its cycle to low level, then SCLK signal will be held low until the sampled BLANK- goes back high to enable it again. The shift register of VRAM is updated during BLANK- active period and the first SCLK used to clock the first pixel data valid from VRAM 30. The pipeline delay of BLANK- input (FIG. 17) is designed to be aligned with data at the DAC 88 output to monitors. The logic described above works with the situations when the SCLK period is shorter than, equal to and longer than VCLK period.

FIG. 10b shows the case when SSRT (Split Shift Register Transfer) function is enabled. One SCLK with minimum 15 ns pulse is generated from a rising edge at the SFLAG input with specified delay. This is designed to meet the VRAM 30 timing requirement. This SCLK will replace the first SCLK in the regular shift register transfer case as described above.

VCLK

The system video clock VCLK can be selected as divisions of 2, 4, 8, or 16 of the Dot Clock, and can also be held at logic 1. The default setup is VCLK held at logic 1 since it is not used in VGA pass-through mode. The selection of the video clock is implemented by the input clock selection register (ICSCREG, FIG. 6) and the video clock multiplexer, VCLK MUX, of FIG. 8a.

VCLK is mainly used to generate the display control signals (BLANK-, HSYNC- & VSYNC-) by graphics processor 18. As shown in FIG. 10A, 10B, 10C & 10D, since these control signals are sampled by VCLK (By video mux and control circuitry 92 see FIG. 17), VCLK is always enabled, while in normal made. In VGA mode the above control signals are sampled by CLK0.

Multiplexing Scheme

Color palette 42 includes a multiplexing scheme controlled by the multiplexer control register MUXCREG of FIG. 6 which allows the system to be reconfigured to the amount of system VRAM available. For example, if only 256K Bytes of memory was available, an 800 by 600 resolution with 4 bit-planes (4 bits per pixel) could be implemented using an 8-bit wide pixel bus. If at a later date a further 256K Bytes was added to another 8 bits of the pixel bus, the user could have the option of using 8 bit-planes at the same resolution or 4 bit planes at a 1024 by 768 resolution. When a further 512K Bytes is added to the remaining 16 bits of the pixel bus, the user could have the option of 8 bit-planes at 1024 by 768 or 4 bit-planes at 1280 by 1024. All of the above could be achieved without any hardware modification and without any increase in the speed of the pixel bus. Implementation through multiplexer control registers MUXCREG is demonstrated in Tables 4 and 5.

VGA Pass-through Mode

Mode 0 is, the VGA pass-through mode, is used to emulate the VGA modes of most Personal Computers. The advantage of this mode is that it can take data presented on the feature connector of most VGA compatible PC systems into palette 42 on a through VGA pins VGA0–VGA7 (FIG. 5) requiring no external multiplexing. VGA data is provided directly to the output latches of selector 78 as a direct address to RAM 84 (see FIG. 12b). This feature is particularly useful in systems where the existing graphics circuitry is on the mother board; in this instance it enables a drop in graphics card to be implemented which will maintain compatibility with all existing software by using the on-board VGA circuitry but routing the emerging bit-plane data through color palette 42. This is the default mode at power-up. When the VGA Pass-Through Mode is selected after the device is powered up, the clock selection register (OSCREG, FIG. 6), the general control register (GENCREG, FIG. 6) and the pixel read mask register (RMCREG, FIG. 6) will be set to their default states automatically.

Since this mode is designed with the feature connector philosophy, all the timing is referred to CLK0 which is being used by default for VGA pass through mode, while for all the other normal modes, the clocks provided to pins CLK0–CLK3 are selected and used to generate DOTCLK, VCLK, and SCLK.

Multiplexing Modes

Figure 11A:
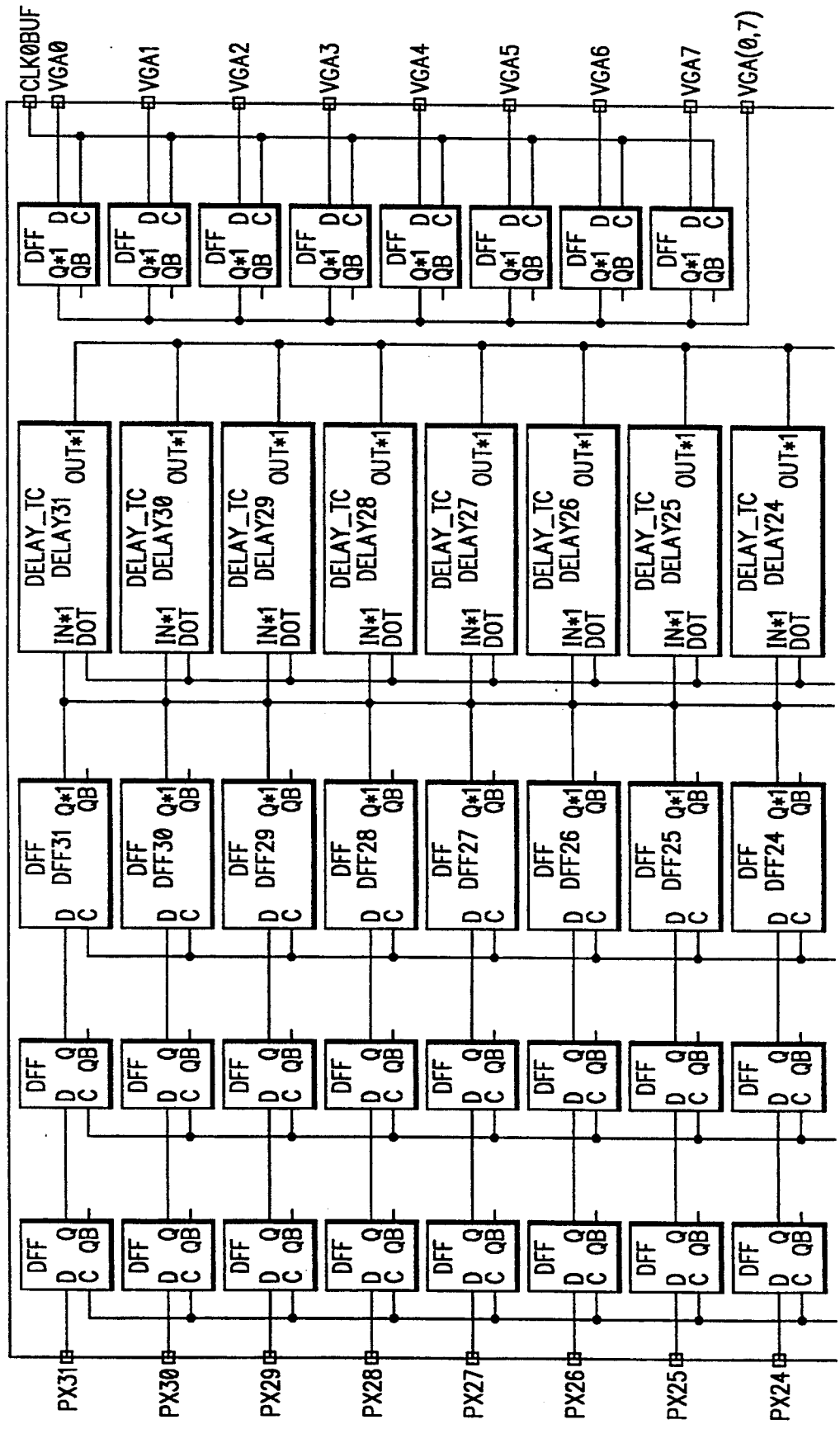
Figure 11D:
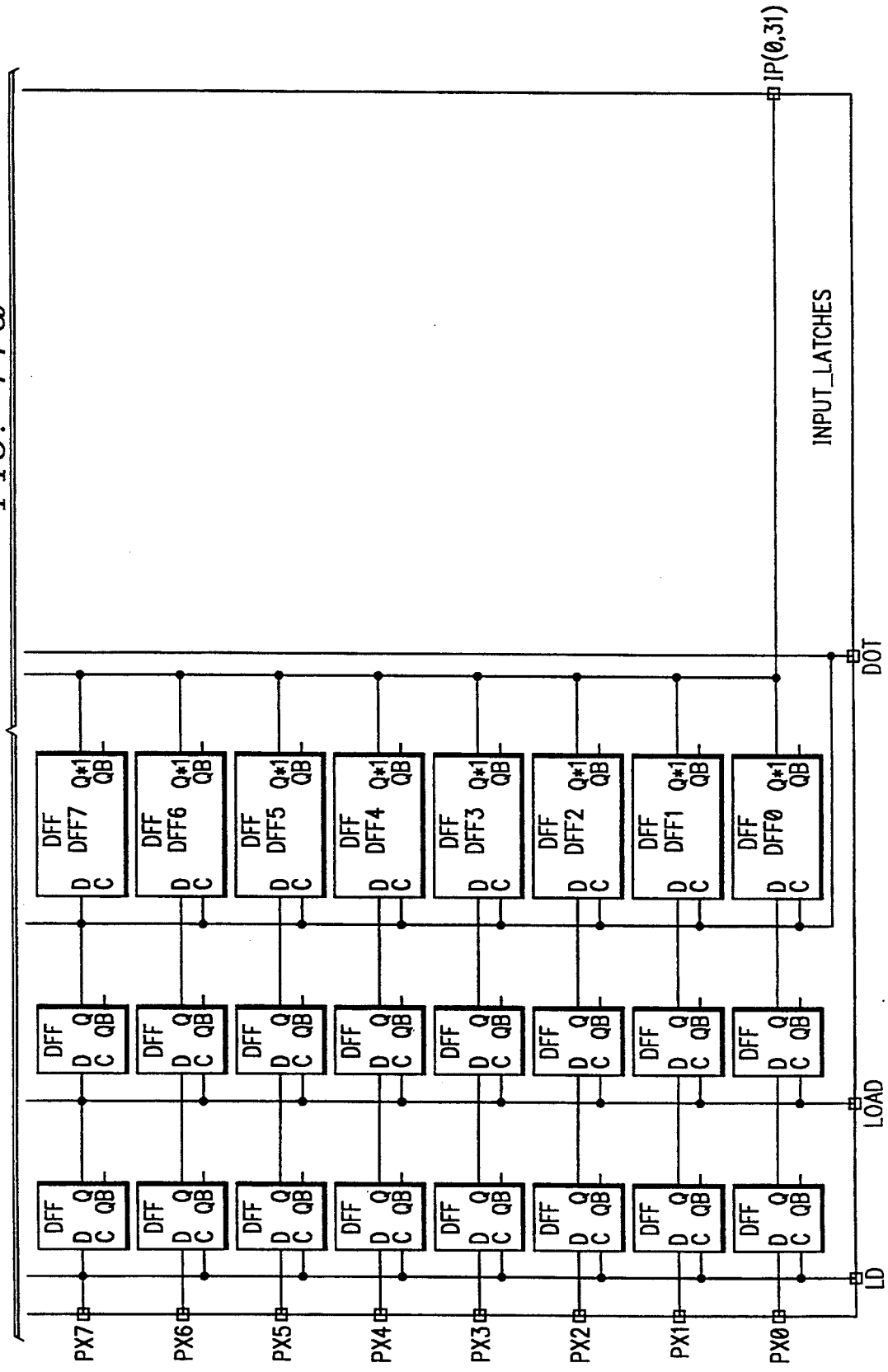
Figure 11E:
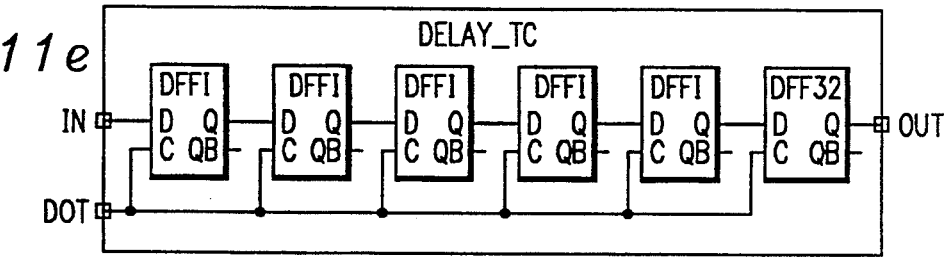
Figure 11F:
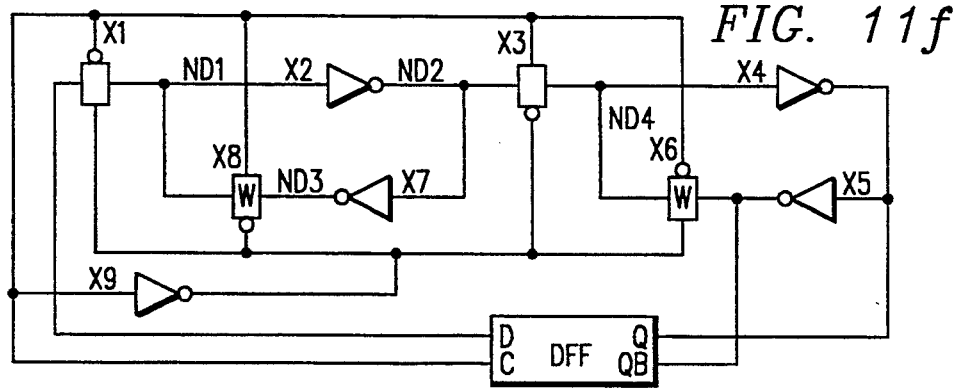
Figure 11G:
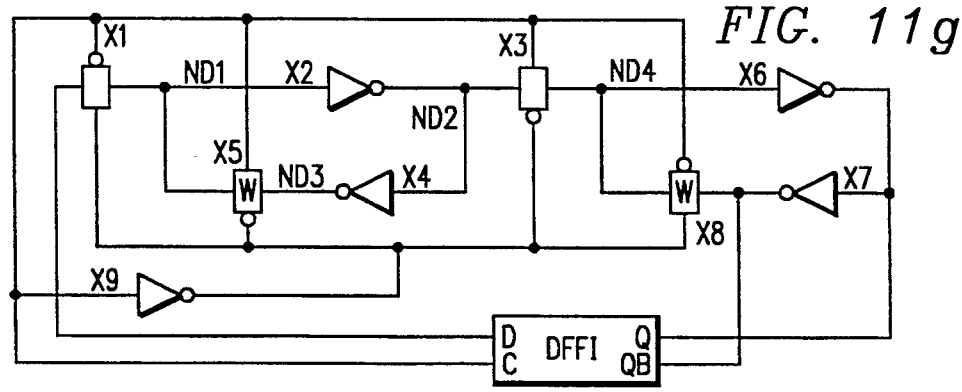
Figure 11H:
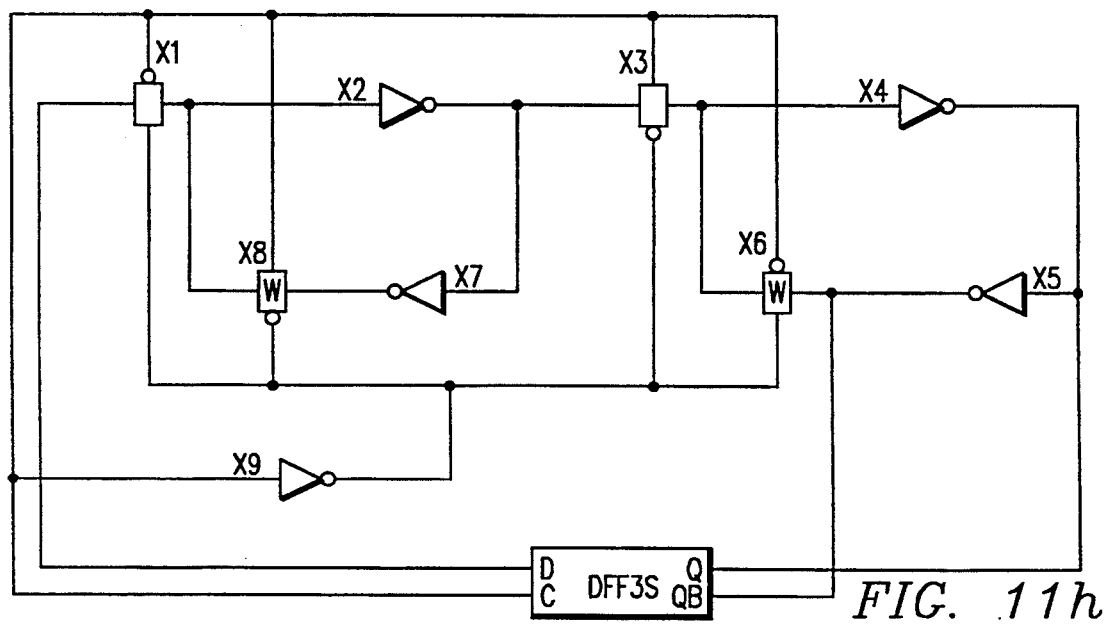
Figure 12A:
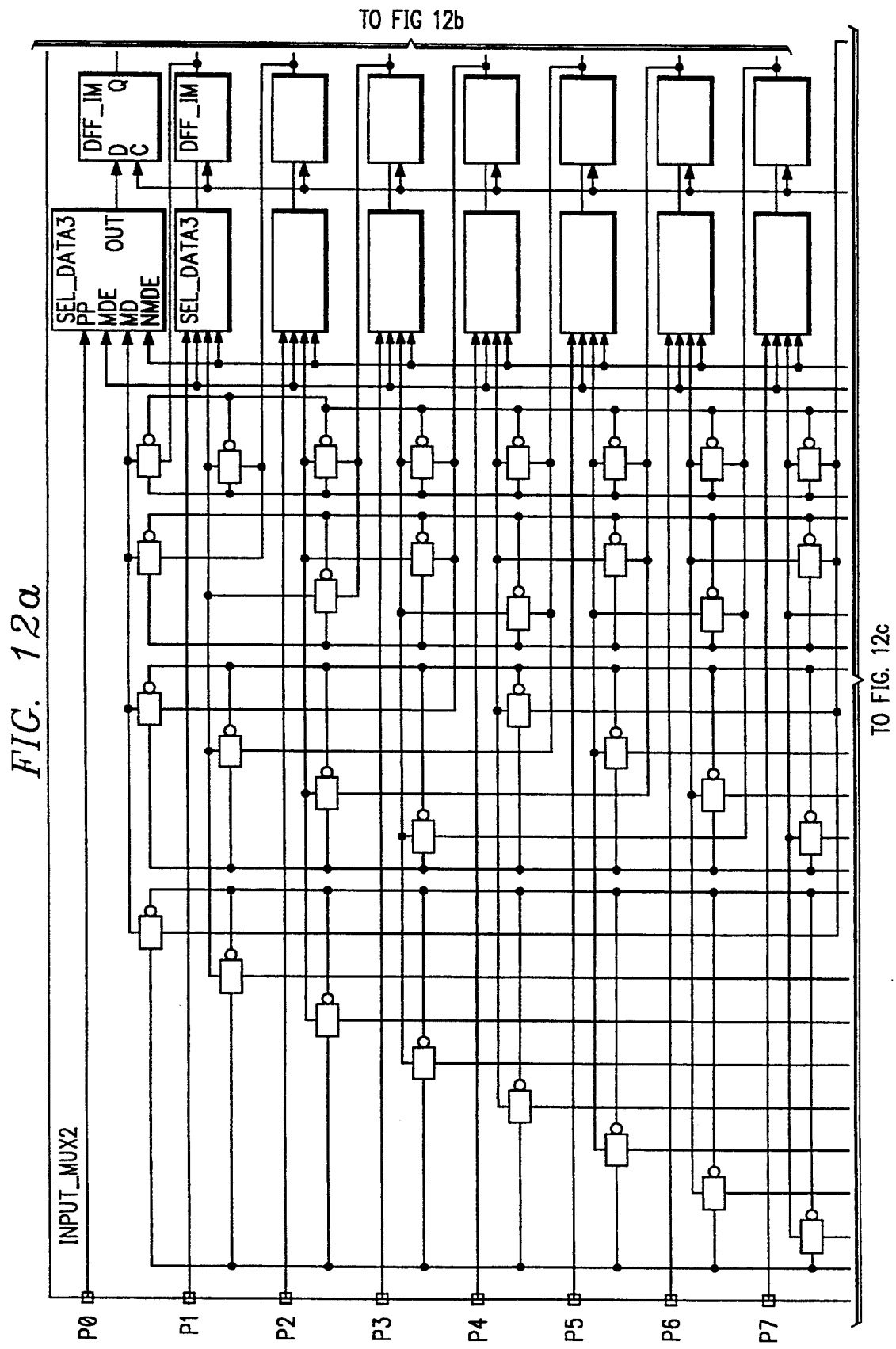
Figure 12B:
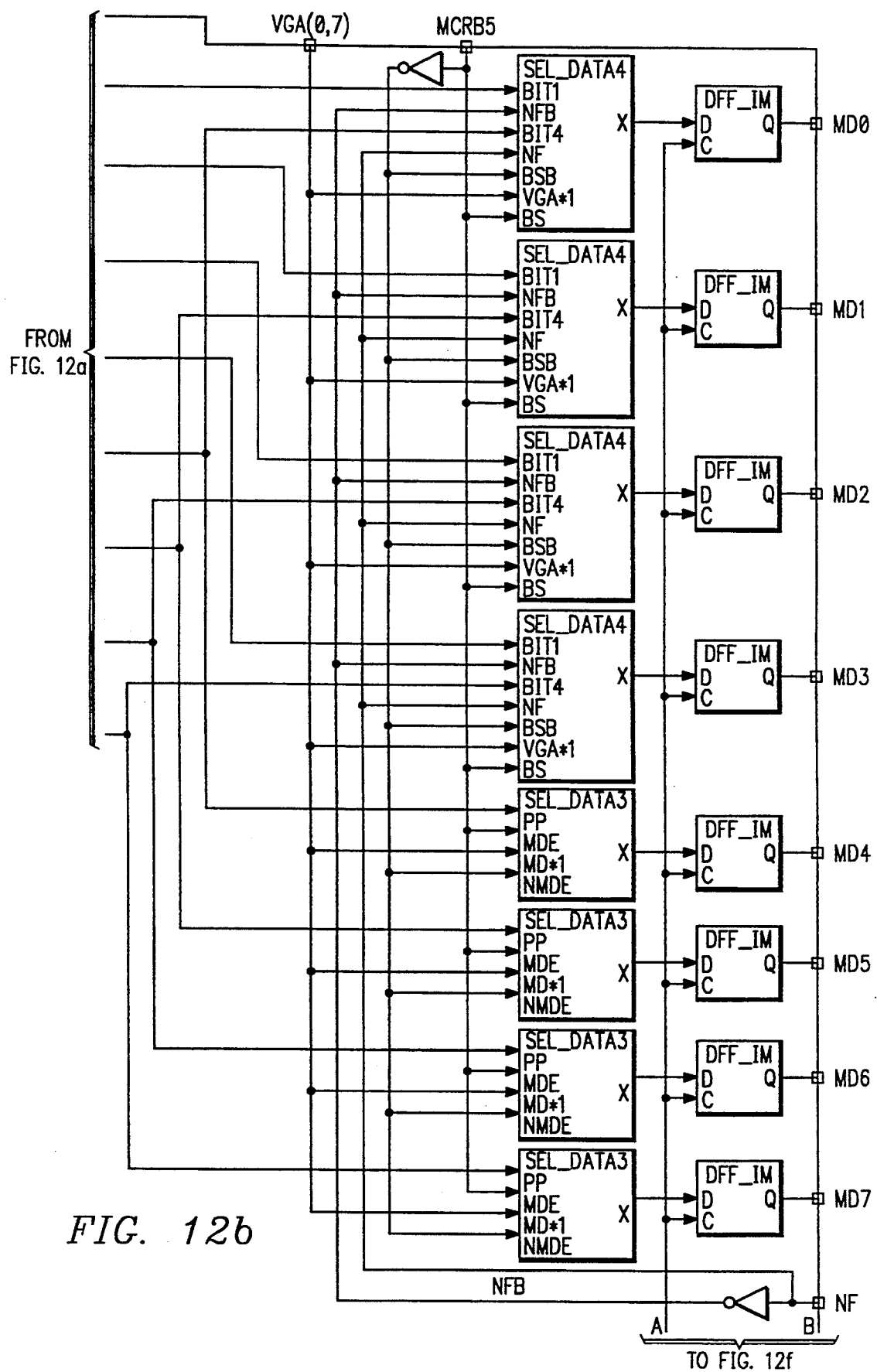
Figure 12D:
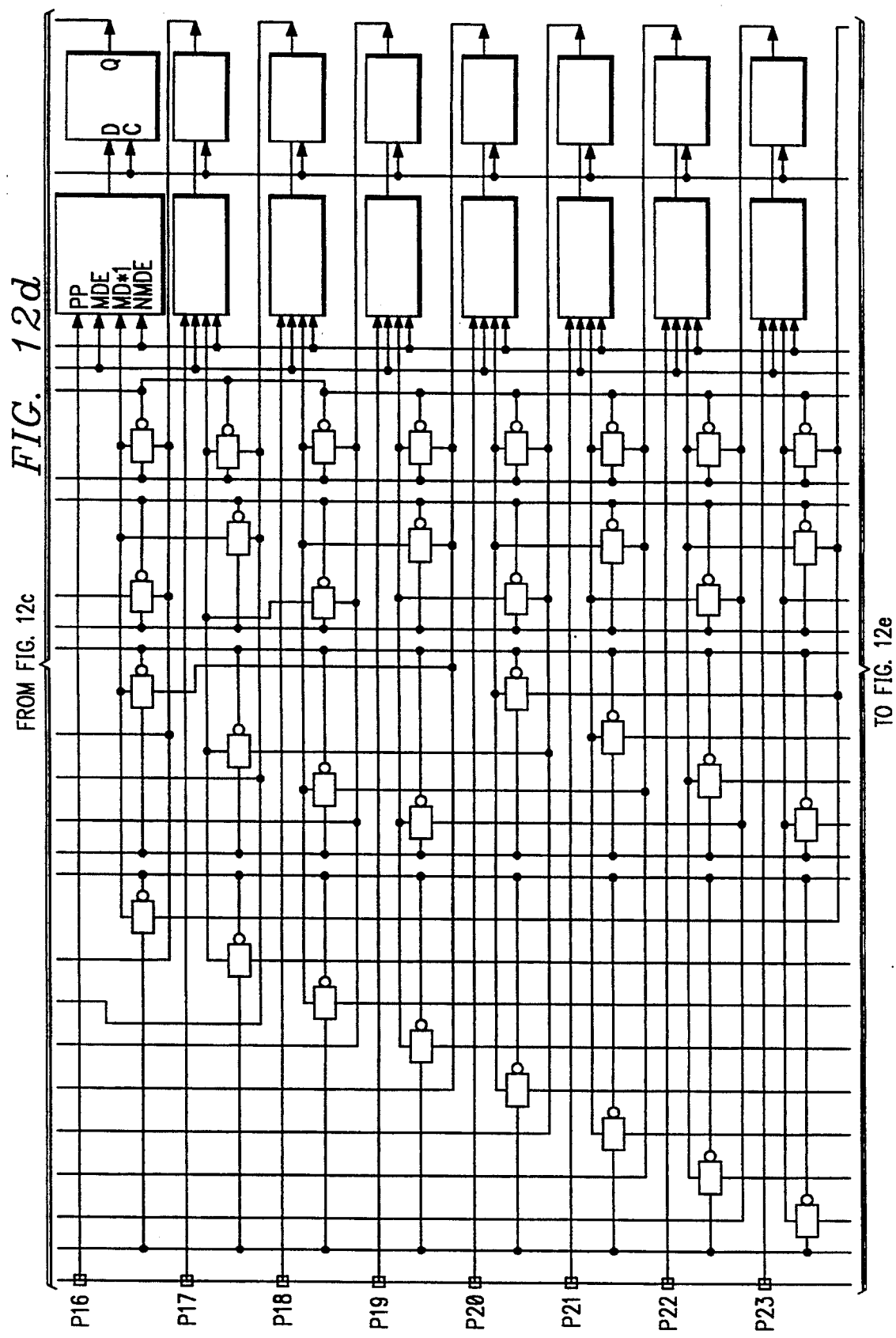
Figure 12F:
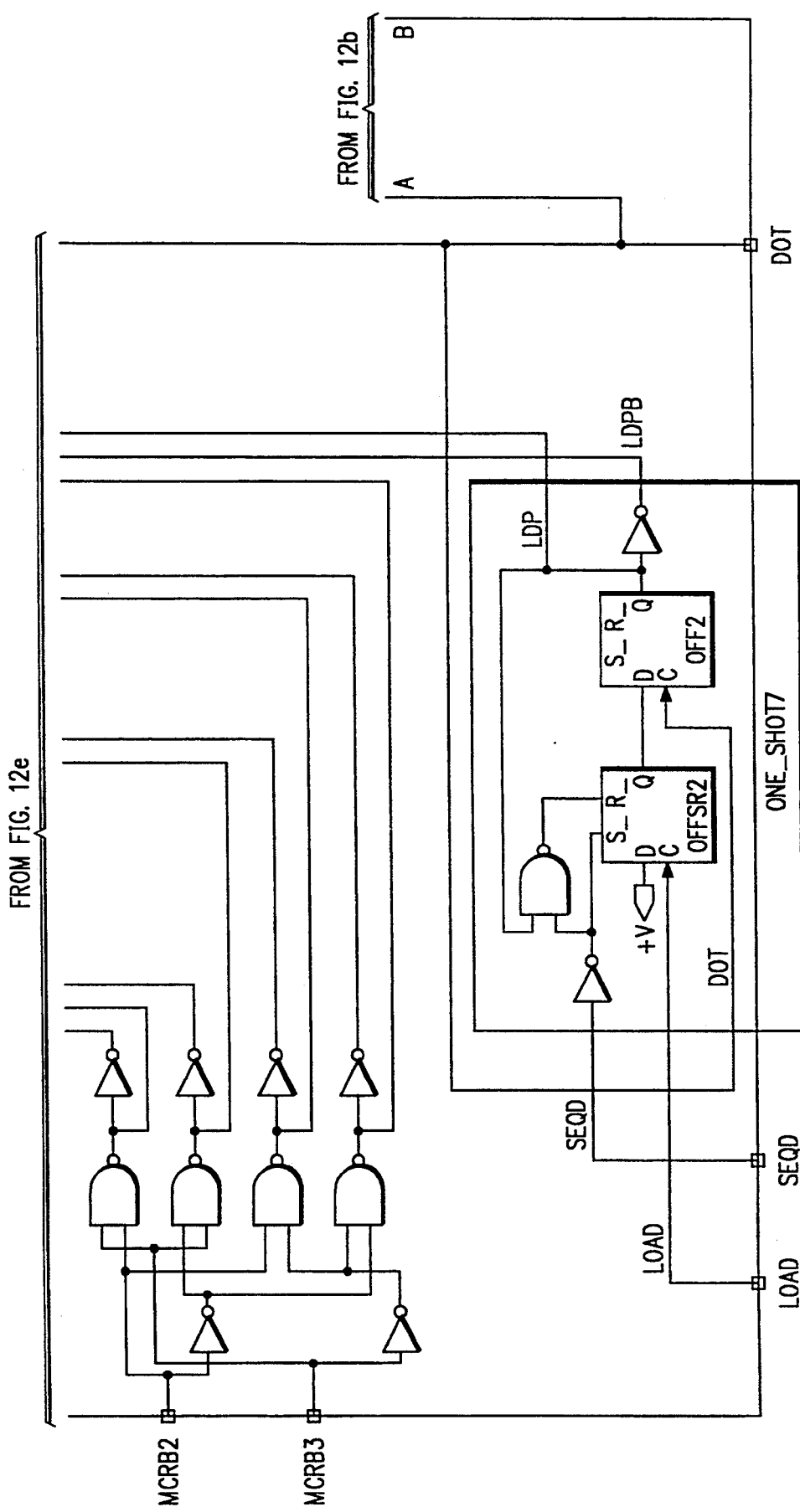

Multiplexing is handled through input latch 76 and selector 78, complete schematic diagrams of which are provided in FIGS. 11a–11d and 12a–12f. FIGS. 11a–11d are detailed block diagrams of the input latches 76. Input latches 76 provide synchronization of incoming pixel data (color code words) to the system DOT clock and for a true color delay, to ensure proper timing during the true color mode of operation, discussed below. Input latches 76 further latch VGA data received from the VGA input terminals VGA0–VGA7 to the input door (CLK0) used in the VGA mode. FIG. 11e is a detailed functional block diagram of a typical one of the delay stages used for each of the twenty-four bits used in the true color mode. FIG. 11f is a detailed electrical schematic of the master/slave flip-flop used in the input latches 74. FIG. 11g is a detailed electrical schematic diagram of the master/slave flip-flop used in the true color delay circuitry of FIG. 11e. FIG. 11h is a detailed electrical schematic diagram of the master/slave flip-flop also used in the true color delay circuitry of FIG. 11e.

FIGS. 12a–12f are detailed block-diagrams of the input selector 78. Input selector 78 is operable to receive thirty-two bits from input latches 76 and output addresses to color palette RAM 84 of either 1-, 2-, 4-, or 8-bits. Bit manipulation is controlled through control signals MCRB2 and MCRB3, received from the MUX control register MUXCREG, which sets the operating mode of palette 42, and an array of transmission gates. Barrel shifting is controlled by circuitry ONE_SHOT7 which receives signals LOAD and SEQD from the clock control circuitry 90 and outputs control signals LDP and LDPB in response.

In general, selector 78 is operable to receive color code words of 1, 2, 4, 16, 18 or 32 bits from VRAM 30 through inputs P0–P31 (post latching) and outputs 1, 2, 4 or 8 bit addresses to palette RAM 84 (pre-masking-/paging). For a complete description of the operation of selector 78, reference is made to copending and coassigned application Ser. No. 07/544,779, Attorneys' Docket No. TI-14523, incorporated herein by reference.

Other then the VGA pass-through, there are 4 multiplexing modes available which may be referred to as NORMAL mode. In each mode, a pixel bus width of 8, 16 or 32 bits may be used. Modes 1, 2 and 3, additionally support a pixel bus width of 4 bits. Data is always presented on the least significant bits of the pixel bus, i.e., when 16 bits are used, the pixel data must be presented on inputs P15–P0, 8 bits on inputs P7–P0, and 4 bits on inputs P3–P0.

Mode 1 uses a single bit plane to address the color palette. The each bit of the 32 bits received on data inputs P0–P31 is fed into bit 0 of the palette address by selector 78, with the 7 high order address bits (PPCREG, FIG. 6) being defined by the palette page register. This mode has uses in high resolution monochrome applications such as Desktop Publishing. Mode 1 allows the maximum amount of multiplexing with a 32:1 ratio thus giving a pixel bus rate of only 4 MHz at a screen resolution of 1280 by 1024. Although only a single bit is used, alteration of the palette page register at the line frequency would allow 256 different colors to be displayed simultaneously with 2 colors per line.

Mode 2 uses 2-bit-planes to address the color palette. The 2 bits of the 32-bits received at inputs P0–P31 are fed into the low order address bits of the palette by selector 78 with the 6 high order address bits being defined by the palette page register (PPCREG, FIG. 6). This mode allows a maximum divide ratio of 16:1 on the pixel bus and is essentially a 4 color alternative to mode 1.

Mode 3 uses 4 bit-planes to address the color palette. The each 4 bits received at inputs P0–P31 are fed into the low order address bits of the palette by selector 78 with the 4 high order address bits being defined by the palette page register. This mode provides 16 pages of 16 colors and can be used at SCLK divide ratios of /1 to/8 of the DOT clock. Mode 4 uses 8 bit-planes to address the color palette RAM 84. Since all 8 bits of palette address provided by selector 78 as specified from the pixel port, the page register is not used. This mode allows Dot Clock-to-SCLK ratios of 1:1 (8-bit bus), 2:1 (16-bit bus) or 4:1 (32-bit bus). Therefore in a 32-bit configuration, a 1024 by 768 pixel screen can be implemented with an external data rate of only 16 MHz.

True Color Mode

Figure 13A:
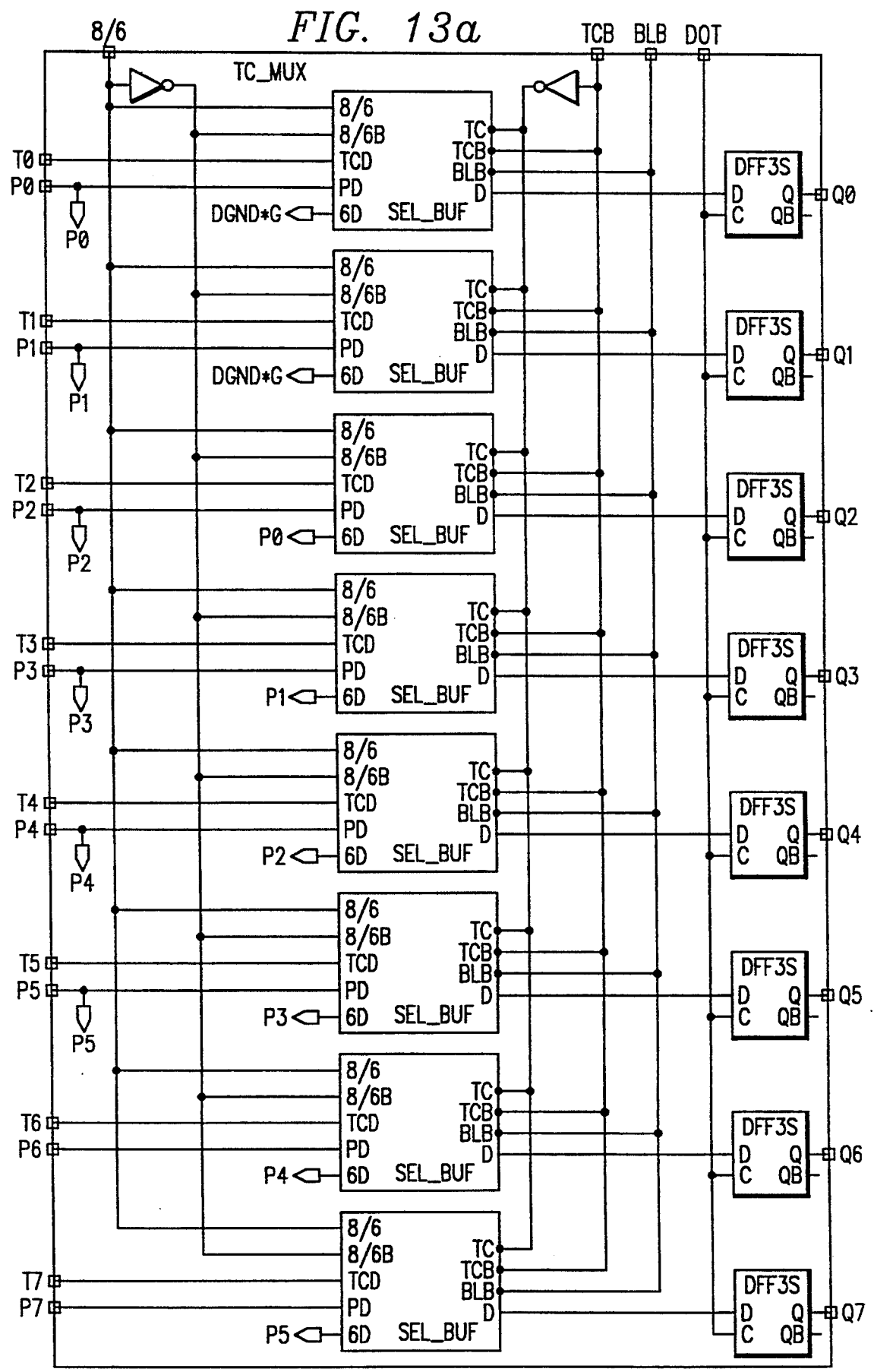
FIGS. 13a–13e are a complete set of electrical schematic diagrams of output multiplexer 86 as shown in FIG. 4 and as labeled TC_MUX and TCMX_EN as shown in FIG. 5.
Figure 13B:
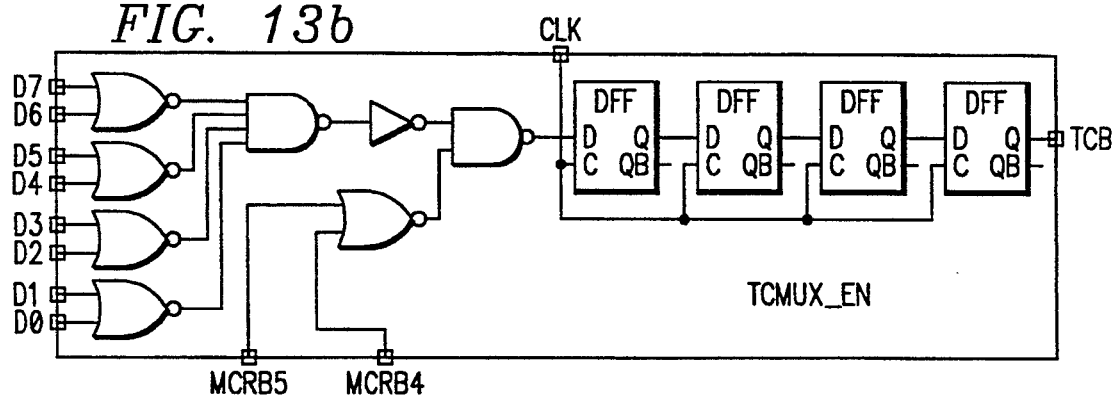
Figure 13C:
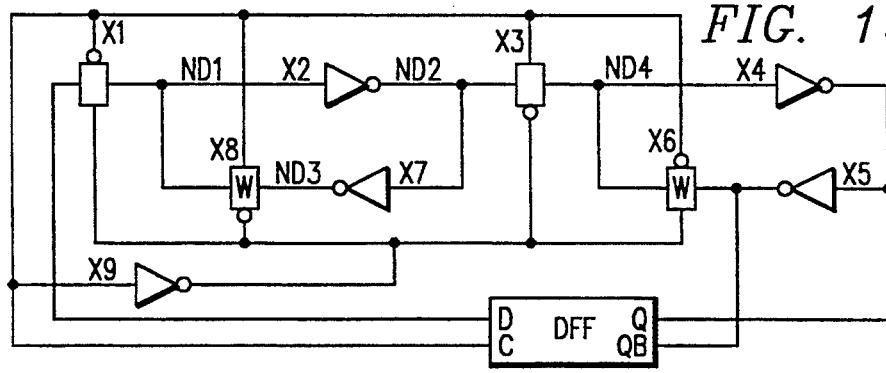
Figure 13D:
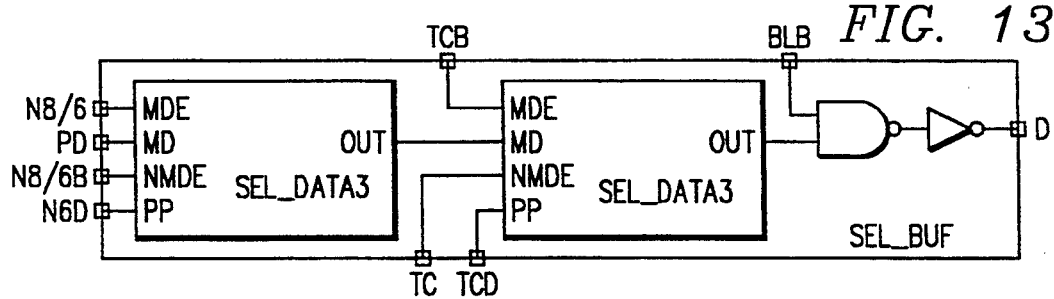
Figure 13E:
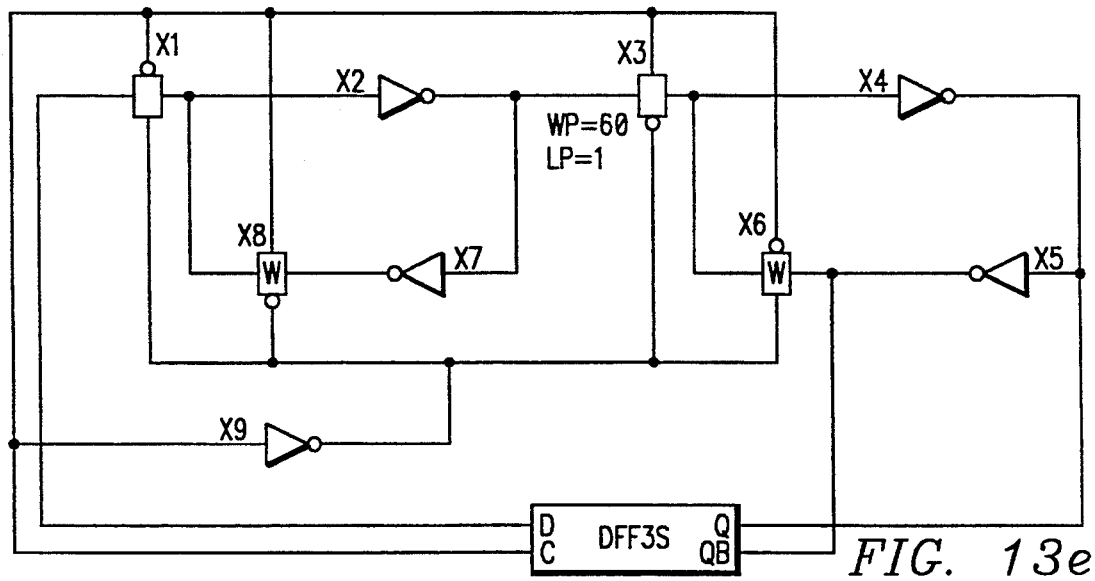

Mode 5 is "True Color Mode" in which 24 bits of data are transferred from the pixel port (after timing by input latch 76) directly to digital to analog converters 88). In this mode, overlay is provided by utilizing the remaining 8 bits of the pixel bus to address the palette RAM overlay data locations which results in a 24-bit RAM 84 output that is then used as overlay information to the DACs 88. Control of the output of true color data and overlay data is implemented through output multiplexer circuitry 86, complete schematics of which are provided as FIG. 13. FIG. 13a is a detailed functional block diagram of the output multiplexer 86 shown in FIG. 4. Output MUX 86 selects between true color data passed from the input latch delay circuitry of FIG. 11 and pseudo-color data output from RAM 84. Output multiplexer 86 further in the 6-bit mode shifts the 6-bits into the 6 MSBs of the 8-bit word passed to digital to analog convertors 88 and zeros out the remaining two bits normally used in the 8-bit mode. Finally, output multiplexer 86 latches 8 bits of data to the inputs of digital analog converters 88. It is important to note that the circuitry shown in FIG. 13a is used three times, one each for the red, blue, and green data being passed to digital analog converters 88. FIG. 13b is a detailed functional block diagram of the true color multiplexer enable circuitry. The true color MUX enable circuitry of FIG. 13b monitors the output from read mask 82 and determines if the data output therefrom has a zero or non-zero value. When the data output from read mask 82 has a zero value the true color data from batches 74 is selected for output and when that data has a non-zero value, the pseudo-color data from RAM 84 is selected. In conjunction with bits MCRB 5 and MCRB 4 received from the MUX control register, the true color MUX enable circuitry then delays the result by four pipeline delays to ensure that the output control signal TCB to output MUX 86 arrives at the appropriate time to pass the proper true color or pseudo-color data. FIG. 13c is a detailed electrical schematic of the master slave flip-flop used in the TCMUX enable circuitry of FIG. 13b. FIG. 13d is a detailed functional diagram of the select buffer sub-block shown in FIG. 13a. FIG. 13e is a detailed electrical schematic of the master slave flip-flop used in the TCMUX circuitry of FIG. 13a to latch the data output to digital to analog converters 88.

When all the overlay inputs (P7–P0) are at logic 0, no overlay information is displayed, whereas then a non-zero value is input, the color palette RAM is addressed and the resulting data is then fed through to DACs 88, receiving priority over the True Color data. True color pipeline delay circuitry 96, implemented in delay circuitry DELAY_TC as part of input latches 76 (see FIGS. 11a and 11e) provides for proper synchronization between the overlay data and the true color data by adding one clock delay to each bit of the true color data for each clock delay seen by the overlay data as it proceeds through the parallel path to output multiplexer 86. (Refer to FIG. 7a for a description of the clock delays seen through palette RAM 84).

The true color mode data input only works in the 8-bit mode. In other words, if only 6 bits will be used, the 2 MSB inputs for each color need to be tied to GND. However, the palette, RAM 84, which is used by overlay input, is still governed by 8/6-input pin and Output MUX 86 will select 8-bits data or 6-bits data or 6-bits data accordingly.

For the colors passed through, P15–P8 pass RED data, P23–P16 pass GREEN data, and P31–P24 pass BLUE data.

For a more complete description of the true color mode of operation and the associated circuitry, reference is made to copending and coassigned application Ser. No. 07/790,963, Attorneys' Docket number TI-15777, incorporated herein by reference.

Special Nibble Mode

Mode 6 is "Special Nibble Mode" which is enabled when the SNM bit (bit 3) is set and the SSRT bit (bit 2) is reset in the General Control Register (GENREG, FIG. 6). When Special Nibble Mode is enabled, the MUX Control Register (MUXCREG, FIG. 6) setup is ignored and it takes precedence over the other modes. The SFLAG/NFLAG input pin is then used to receive nibble flag to indicate which nibble of each byte holds the pixel data. Conceptually this Special Nibble Mode initiates an additional variation of the 4 bit pixel mode with a 16 bit bus width (while all 32 inputs P0 through P31 are connected additional variation of the 4 bit pixel mode with a 16 bit bus width (while all 32 inputs P0 through P31 are connected as 4 bytes), but in this case the 16 bit data bus is found on the lower/upper nibble of each of the 4 bytes. In Special Nibble Mode, multiplexer circuitry at the output of selector 78 (in particular see FIG. 12b) which selects the 4 bits of the eight bits to the output as lower order bits MD0–MD3. Since this mode uses 4 bit-planes for each pixel, they are fed into the low order address bits of the palette with the 4 high order address bits (MD4–MD7, FIG. 12b) being defined by the palette page register.

TABLE 4

| | Mode and Bus Width Selection | | | | | | | | | |
|---|---|---|---|---|---|---|---|---|---|---|
| | MUX CONTROL REGISTER BITS (1) | | | | | | DATA BITS PER PIXEL (2) | PIXEL BUS WIDTH | SCLK DIVIDE RATIO (3) | OV'LAY BITS per PIXEL (4) | PIXEL BUS PHYSICAL CONNECTION (5) | PIXEL BUS PHYSICAL CONNECTION (5) | TABLE REF (6) |
| MODE | 5 | 4 | 3 | 2 | 1 | 0 | | | | | | | |
| 0 | 1 | 0 | 1 | 1 | 0 | 1 | 8 | 8 | 1 | | 8 | NO | a |
| 1 | 0 | 1 | 0 | 0 | 0 | 0 | 1 | 4 | 4 | | 4 | NO | b |
| 1 | 0 | 1 | 0 | 0 | 0 | 1 | 1 | 8 | 8 | | 8 | NO | c |

TABLE 4-continued

| | | | | | | | Mode and Bus Width Selection | | | | | |
|---|---|---|---|---|---|---|---|---|---|---|---|---|
| | MUX CONTROL REGISTER BITS (1) | | | | | | DATA BITS PER PIXEL | PIXEL BUS WIDTH | SCLK DIVIDE RATIO | OV'LAY BITS per PIXEL | PIXEL BUS PHYSICAL CONNECTION | PIXEL BUS PHYSICAL CONNECTION | TABLE REF |
| MODE | 5 | 4 | 3 | 2 | 1 | 0 | (2) | | (3) | (4) | (5) | (5) | (6) |
| 1 | 0 | 1 | 0 | 0 | 1 | 0 | 1 | 16 | 16 | | 16 | NO | d |
| 1 | 0 | 1 | 0 | 0 | 1 | 1 | 1 | 32 | 32 | | 32 | NO | e |
| 2 | 0 | 1 | 0 | 1 | 0 | 0 | 2 | 4 | 2 | | 4 | NO | f |
| 2 | 0 | 1 | 0 | 1 | 0 | 1 | 2 | 8 | 4 | | 8 | NO | g |
| 2 | 0 | 1 | 0 | 1 | 1 | 0 | 2 | 16 | 8 | | 16 | NO | h |
| 2 | 0 | 1 | 0 | 1 | 1 | 1 | 2 | 32 | 16 | | 32 | NO | i |
| 3 | 0 | 1 | 1 | 0 | 0 | 0 | 4 | 4 | 1 | | 4 | NO | j |
| 3 | 0 | 1 | 1 | 0 | 0 | 1 | 4 | 8 | 2 | | 8 | NO | k |
| 3 | 0 | 1 | 1 | 0 | 1 | 0 | 4 | 16 | 4 | | 16 | NO | l |
| 3 | 0 | 1 | 1 | 0 | 1 | 1 | 4 | 32 | 8 | | 32 | NO | m |
| 4 | 0 | 1 | 1 | 1 | 0 | 0 | 8 | 8 | 1 | | 9 | NO | n |
| 4 | 0 | 1 | 1 | 1 | 0 | 1 | 8 | 16 | 2 | | 16 | NO | o |
| 4 | 0 | 1 | 1 | 1 | 1 | 0 | 8 | 32 | 4 | | 32 | NO | p |
| 5 | 0 | 0 | 1 | 1 | 0 | 1 | 24 | 32 | 1 | 8 | 32 | NO | q |
| 6 | 0 | 1 | 1 | 1 | 1 | 1 | 4 | 16 | 4 | | 32 | YES | r |

NOTE 1: Register bits 6 & 7 have "Don't Care" conditions.
NOTE 2: "DATA BITS per PIXEL" are the number of bits of pixel port information received at input pins P0-P31 used as color data for each displayed pixel, often referred to as the number of bit planes. This may be color palette address data (modes 0–4,6) or DAC data (mode 5).
NOTE 3: "SCLK DIVIDE RATIO" is the number used for Output Clock Selection register (OCSREG). It indicates the PIXELS per BUS LOAD which are the number of pixels that are generated from each SCLK. e.g. with a 32-bit pixel bus and 8 bit planes, 4 pixels will be generated every Bus Load (or SCLK).
NOTE 4: Overlay is implemented in true color mode with the remaining 8 bits of the pixel bus.
NOTE 5: Normally the "PIXEL BUS PHYSICAL CONNECTION" equals the "PIXEL BUS WIDTH". The only exception is the Special Nibble Mode.
NOTE 6: This column is a reference to a column of Table 5, where the actual manipulation of pixel information is illustrated. See below.

The use of Pixel and Overlay Busses in the above modes of operation is illustrated in Table 5. Table 5 shows what data is extracted from the pixel information at each stage. Operation is bound to one column of the table (see reference from Table 4). On each rising edge of SCLK, data is latched from the pixel input port by input latch 76 using clock signal LD generated by THE_CLOCK_MUX circuitry (Clock control) 90. This also initiates the first row of Table 5. Successive rows are executed on each pixel clock. Once the column has been completed, SCLK will activate another bus load and hence repeat the column.

that pins P7-P0 should be connected to the earliest displayed pixel plane, followed by P15-P8, P23-P16, and then P31-P24 is the latest displayed pixel plane. In order to set SCLK, the Output Clock Selection Register (OCSCREG, FIG. 6) also needs to be programmed. In this case, 0A (HEX) is used (assume VCLK is also programmed as DOTCLK/4). The Special Nibble Mode is disabled.

When the MUX Control Register is loaded with 2 D (HEX), palette 42 enters its VGA default condition which is the same condition as power-up.

Read Masking

TABLE 5

| | | | | Port Data to Pixel Distribution. (2) (3) | | | | | | |
|---|---|---|---|---|---|---|---|---|---|---|
| a | b | c | d | e | f | g | h | i | j | k | l |
| VGA7,..., VGA0 | P0 | P0 | P0 | P0 | P1, P0 | P1, P0 | P1, P0 | P1, P0 | P3,..., P0 | P3,.., P0 | P3,.., P0 |
| | P1 | P1 | P1 | P1 | P3, P2 | P3, P2 | P3, P2 | P3, P2 | P7,...,P4 | P7,..,P4 | P7,...,P4 |
| | P2 | P2 | P2 | P2 | | P5, P4 | P5, P4 | P5, P4 | | P11,..., P8 | P11,..., P8 |
| | P3 | . | . | . | | P7, P6 | . | . | | P15,..., P12 | . |
| | | . | . | | | . | . | . | | . | . |
| | | P7 | P15 | | | P15, P14 | P31, P30 | | | | P31,..., P28 |

| | | | | | | r | |
|---|---|---|---|---|---|---|---|
| | m | n | o | p | q(1) | NFLAG = 0 | NFLAG = 1 |
| | P3,..., P0 | P7,..., P0 | P7,..., P0 | P7,..., P0 | P31,..., 98 | P3,..., P9 | P7,..., P4 |
| | P7,..., P4 | | P15,..., P8 | P15,..., P8 | | P11,...., P8 | P15,..., P12 |
| | P11,..., P8 | | | P23,..., P16 | | P19,..., P16 | P23,..., P20 |
| | . | | | P31,.., P24 | | P27,..., P24 | P31,..., P28 |
| | P31,..., P28 | | | | | | |

NOTE 1: In this mode of operation the input pins P7-P0 are used to generate overlay data. This operation can be disabled by either grounding the pixel inputs P7-P0 or by clearing the read mask (discussed below). For the colors passed-through, P15-P8 will be passed to the RED DAC, P23-P16 to the GREEN DAC and P31-P24 to the BLUE DAC.
NOTE 2: The low number is the LSB and the high number is the MSB. E.G. in the configuration o (MUX Control Register = 1D (HEX)), P8 is the LSB and P15 is the MSB in the 2nd channel, and to address palette RAM location 21 (HEX), P8 and P13 need to be high. The input data are shifted from low-numbered channels to high-numbered channels. E.G. if configuration p is programmed (MUX selection register = 1E (HEX)), channel P7-P0 will be shifted first, followed by P15-P8, P23-P16, and the last channel shifted will be P31-P24. Same rule applied to VGA7-0.

As an example of how to use Tables 4 & 5, if the user wants to design a system with 8 data bits per pixel, and he wants to use the lowest possible SCLK rate, the maximum pixel bus width should be used, which is 32 bits and the SCLK divide ratio should be set to 1:4. From Table 4 indicates a write of 1E (HEX) to the MUX Control Register (MUXCREG, FIG. 6). The configuration p then should be used in Table 5, indicates The read mask 82 is used to enable or disable a pixel address bit output from selector 78 from addressing the color palette RAM 84 under control of the read mask control register (RMCREG, FIG. 6). Each palette address bit is logically ANDed with the corresponding bit from the read mask register RMCREG before addressing the palette RAM 84.

Figure 14A:
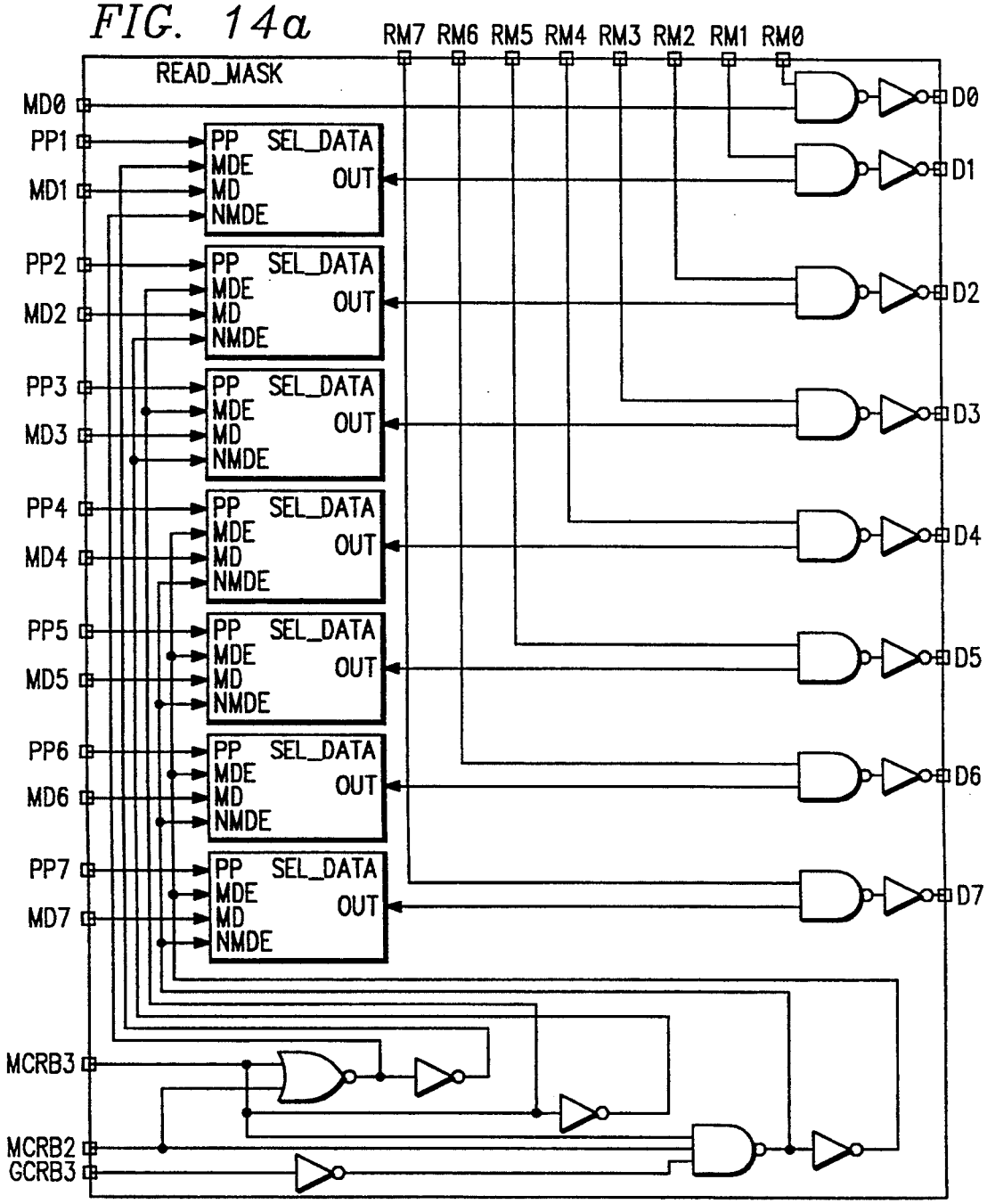
FIG. 14a–14b are a complete set of electrical schematic diagrams of read mask 82 as shown in FIG. 4 and as labelled READ_MASK in FIG. 5.
Figure 14B:
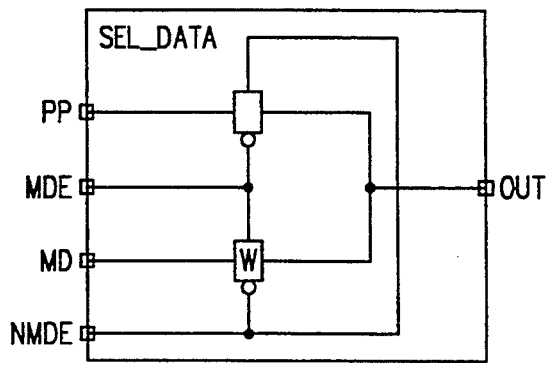

A complete set of schematics of read mask 82 are provided as FIG. 14. FIG. 14a is a detailed block diagram of the read mask 82 shown in FIG. 4. The read mask 82 receives 8 bits MD0–MD7 from selector 78 and 8 bits PP1–PP7 from the palette page register 80 (PPCREG, FIG. 6a). In conjunction with control signals MCRB 3 and MCRB 2 received from the mux control register MUXCREG, (FIG. 6a) and signal GCRB 3 received from the general control register GENCREG (FIG. 6a), read mask 82 selects between the data from the page register 80 or the data from the selector 78. Signals RM0–RM7 received from the read mask register RMCREG (FIG. 6a) are then used to mask out selected bits forming the word D0–D7 addressing RAM 84. FIG. 14b is a detailed electrical schematic of the select data block shown in FIG. 14a.

This function is performed after the addition of the page register bits and therefore a zeroing of read mask 82 will result in one unique palette location (location 0) and will not be affected by the palette page register contents. Writing '0' value into read mask register (RMCREG) can also be used to disable the overlay function in true color mode.

Reset

There are 3 ways to reset the color palette 42:
A. Power-on reset
B. Hardware reset
C. Software reset

POWER-ON RESET

POR (Power-On-Reset) circuit (POR) built into the palette 42 and provided as part of the control and register circuitry depicted in FIG. 6. (A complete set of schematics for the power on reset circuitry are shown as FIG. 6w). This POR works at power-on only.

Once the voltage is stabilized, the default condition for all registers is VGA mode.

Hardware Reset

Color palette 42 resets each time inputs RS3–0 are at 1111 (binary) and a rising edge of WR-occurs. The more "WR-" edges, the more reliably color palette 42 gets reset. This scheme (bursting "WR-" strobes until the power supply voltage stabilizes) is suggested at power-up if the hardware reset structure is used.

The default reset conditions is VGA mode, and the values for each register are shown above.

Software Reset

Anytime the MUX Control Register (MUXCREG, FIG. 6) is set VGA mode after power-up, all registers are initialized accordingly. Since VGA mode is the default condition at power-up and hardware reset, VGA mode selection in the MUX Control Register is defined as a software reset. Therefore, any time the MUX Control Register is set to 2 D (HEX), the color palette 42 initiates a software reset.

VGA Default Conditions

The condition for each register after reset is shown below:

| | |
|---|---|
| MUX Control Register (MUXCREG) | 2D (HEX) |
| Input Clock Selection Register (ICSCREG) | 00 (HEX) |
| Output Clock Selection Register (OCSREG) | 3F (HEX) |
| Palette Page Register (PPECREG) | 00 (HEX) |
| General Control Register (GENCREG) | 03 (HEX) |
| Pixel Read Mask Register (RMCREG) | FF (HEX) |
| Palette Address Register (ADDREG) | xx (HEX) |
| Palette Holding Register (REDREG, CRNREG) | xx (HEX) |
| Test Register (TSTREG) | (Pointing to color palette Red value) |

Frame Buffer Interface

As discussed above, clock control circuitry 90 provides 2 clock signals for controlling the frame buffer interface: SCLK and VCLK. SCLK can be used to clock out data from VRAM 30 shift registers directly. Split Shift Register Transfer functionality is also supported. VCLK is used to clock and synchronize the control signals like HSYNC-, VSYNC- and BLANK-.

The pixel data presented at the inputs are latched by input latches 76 at the rising edge of SCLK in Normal mode using clock signal LD, or the rising edge of CLK0 in VGA mode. Control signals HSYNC-, VSYNC-, and BLANK- are sampled and latched at the falling edge of VCLK in Normal mode, while HSYNC-, VSYNC-, and VGABLANK- are latched at the rising edge of CLK0. (Discussed below in connection with the discussion of video mux and control circuitry 92). Both data and control signals are lined up at the DAC outputs to monitors through pipeline delay, so external glue logic are not required. The outputs of the DACs are capable of directly driving a 37.5 Ω load, as in the case of a doubly terminated 75 Ω cable.

Analog Output

Figure 15A:
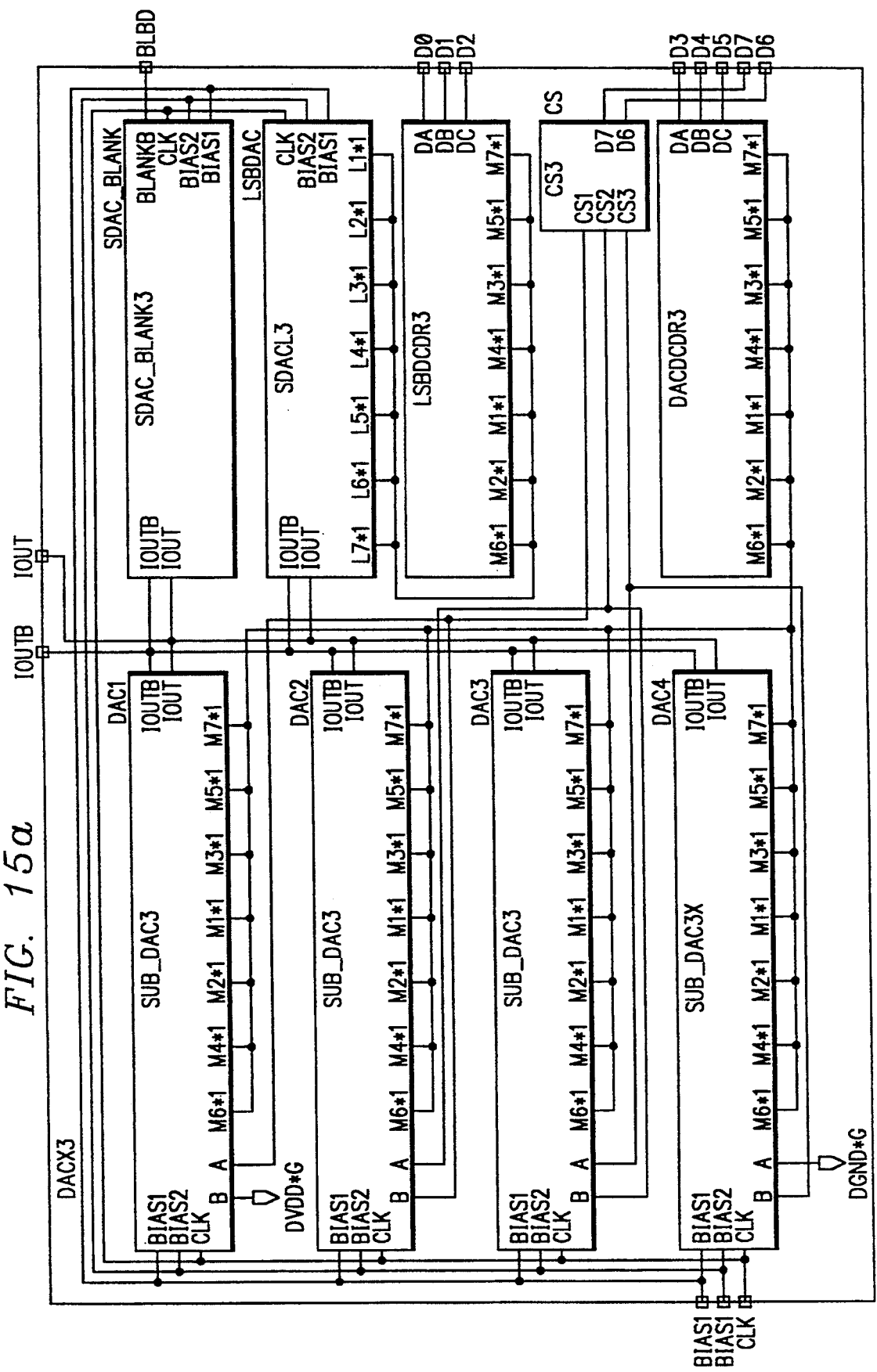
FIGS. 15a–15n are a complete set of electrical schematic diagrams of digital to analog converters 88 as shown in FIG. 4 and as labeled DACX3 (red, green, and blue) in FIG. 5.
Figure 15B:
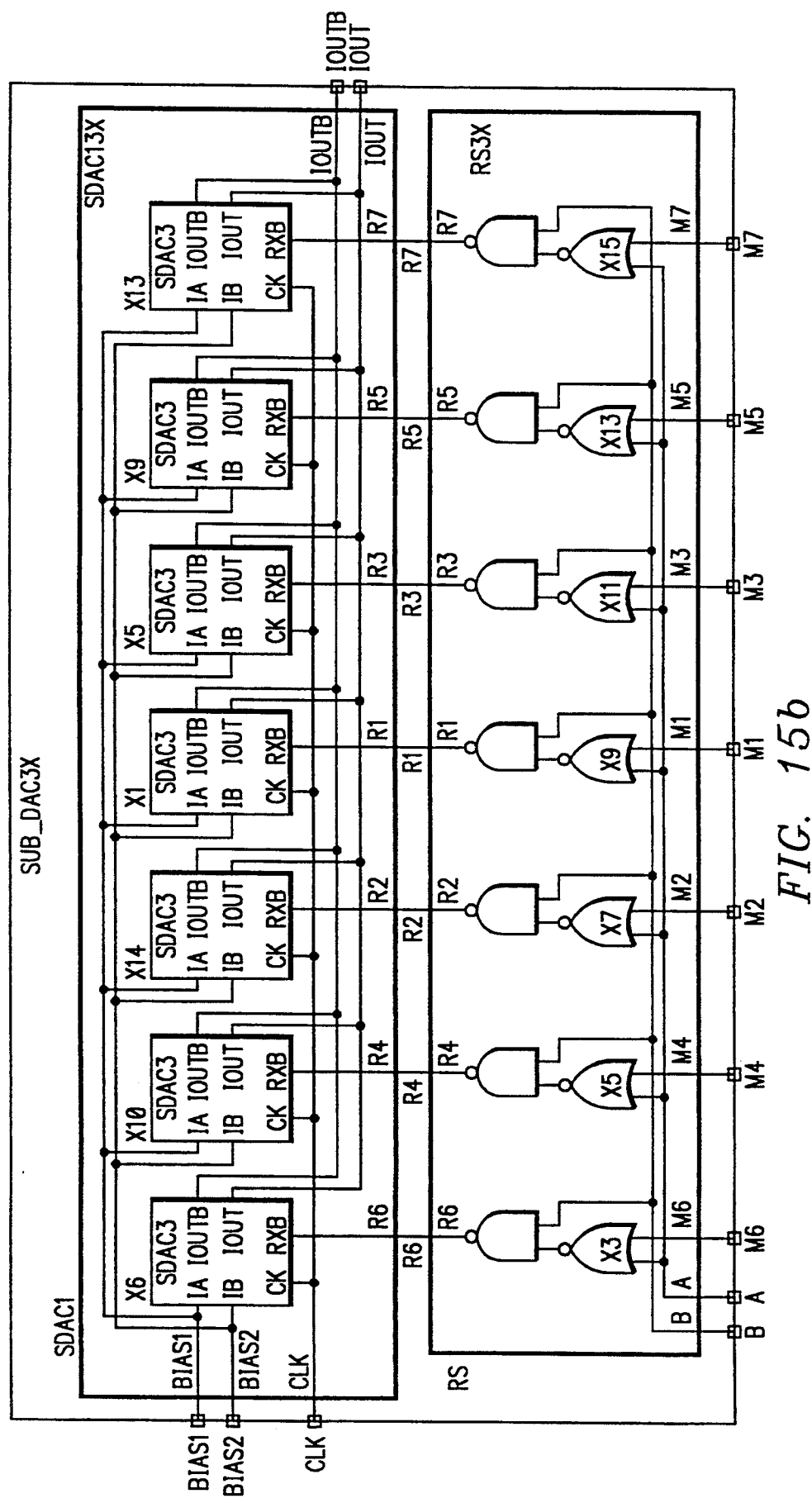
Figure 15C:
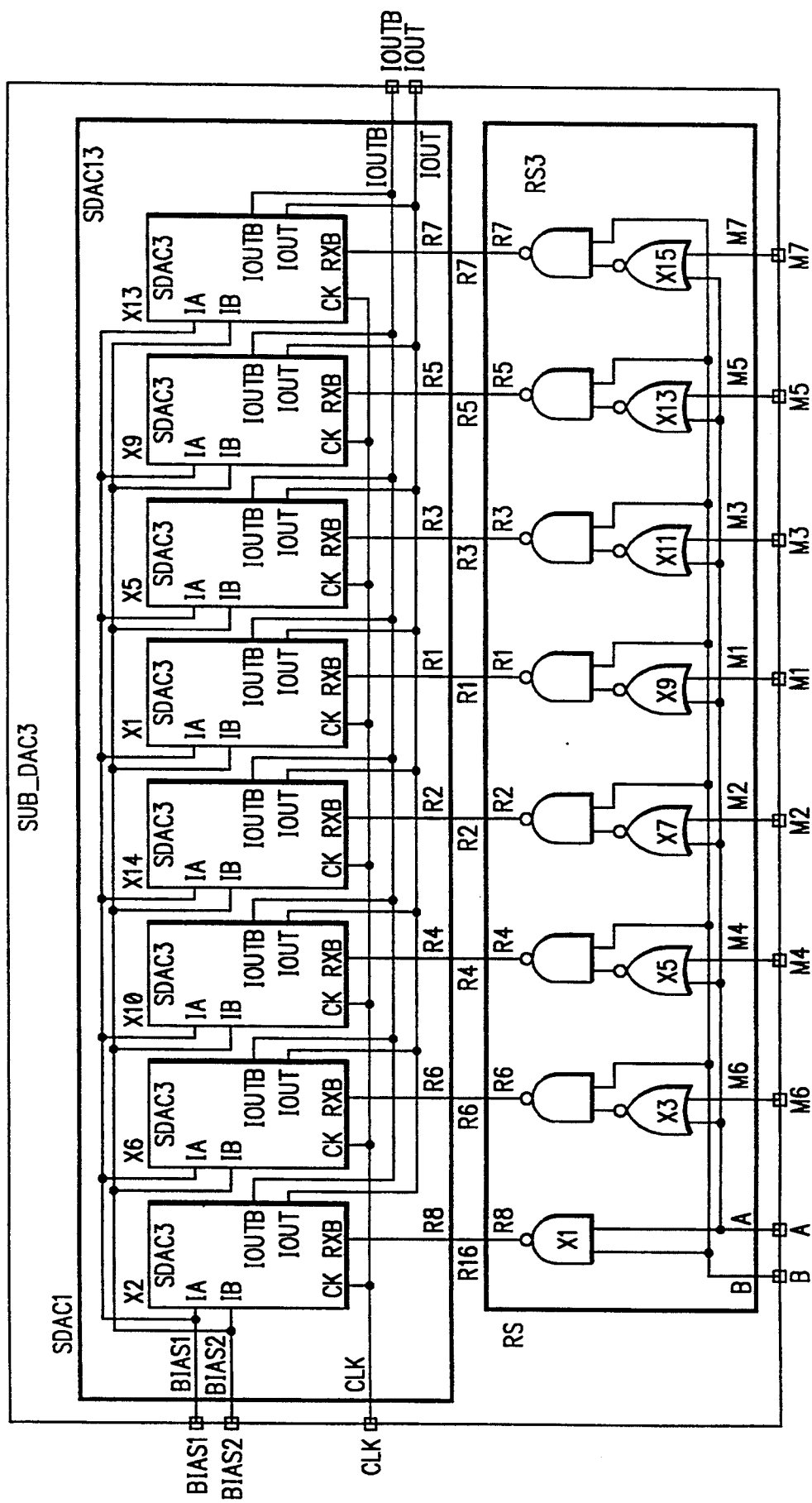
Figure 15D:
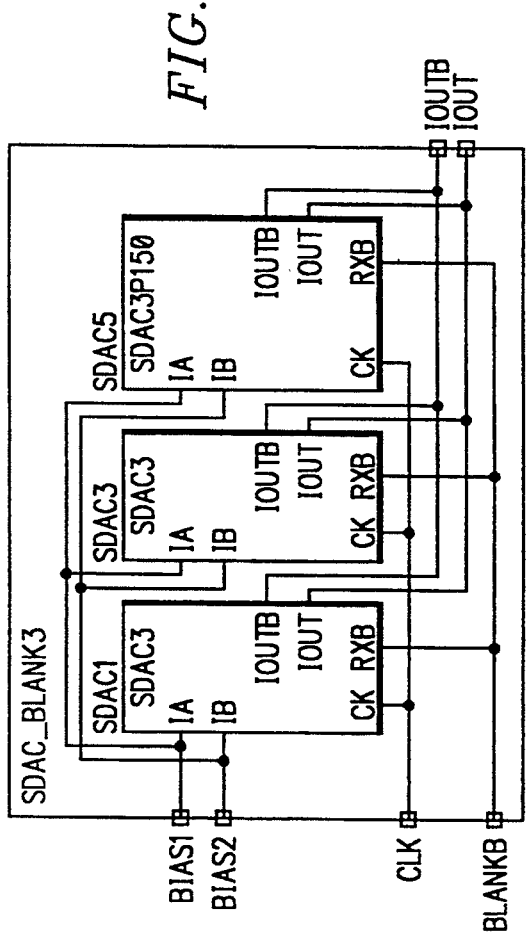
Figure 15E:
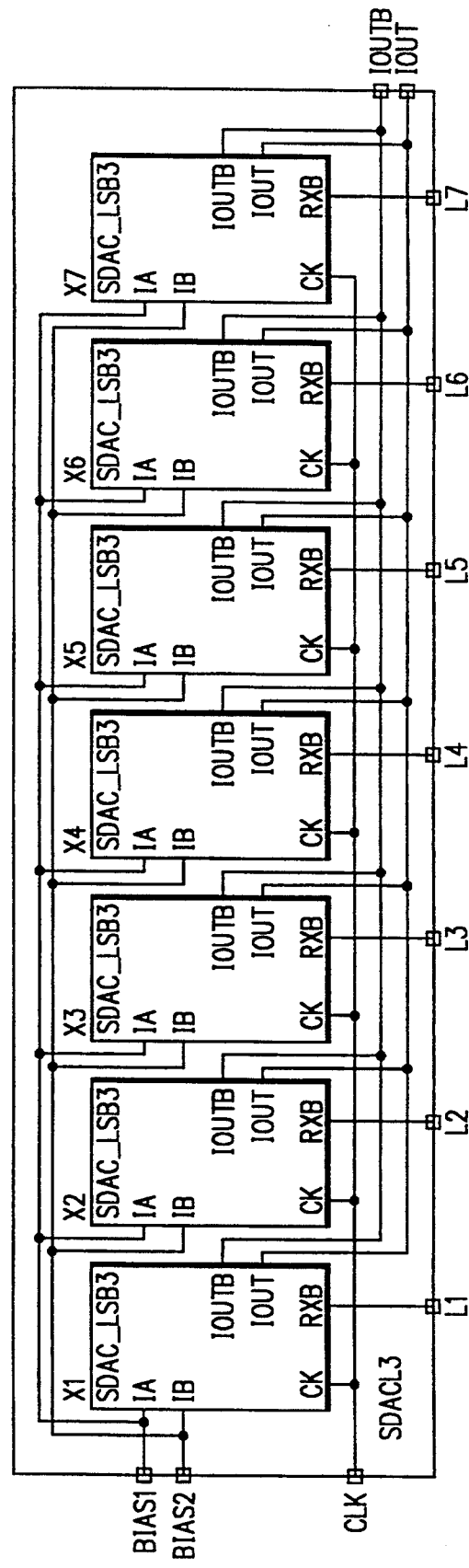
Figure 15F:
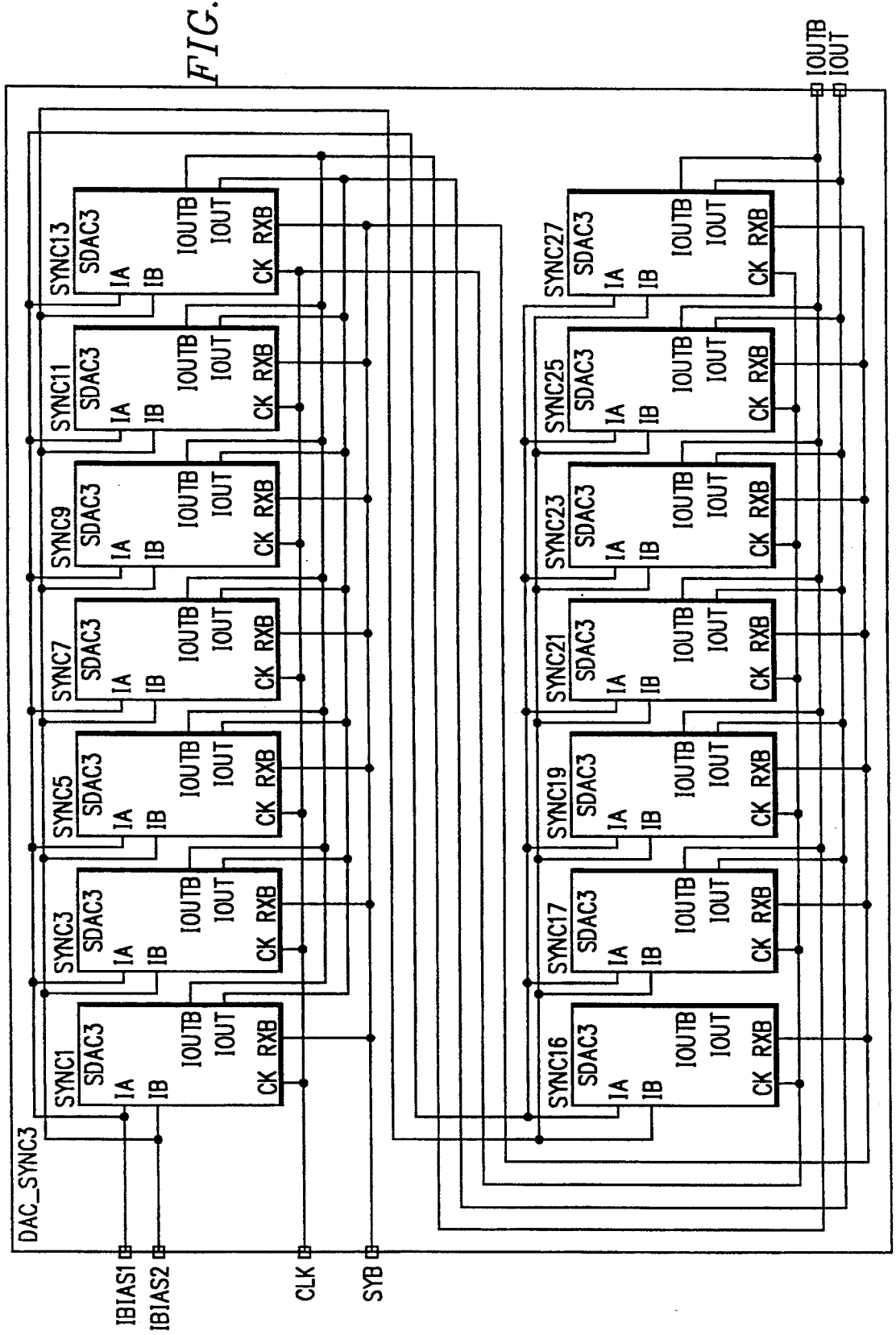
Figure 15G:
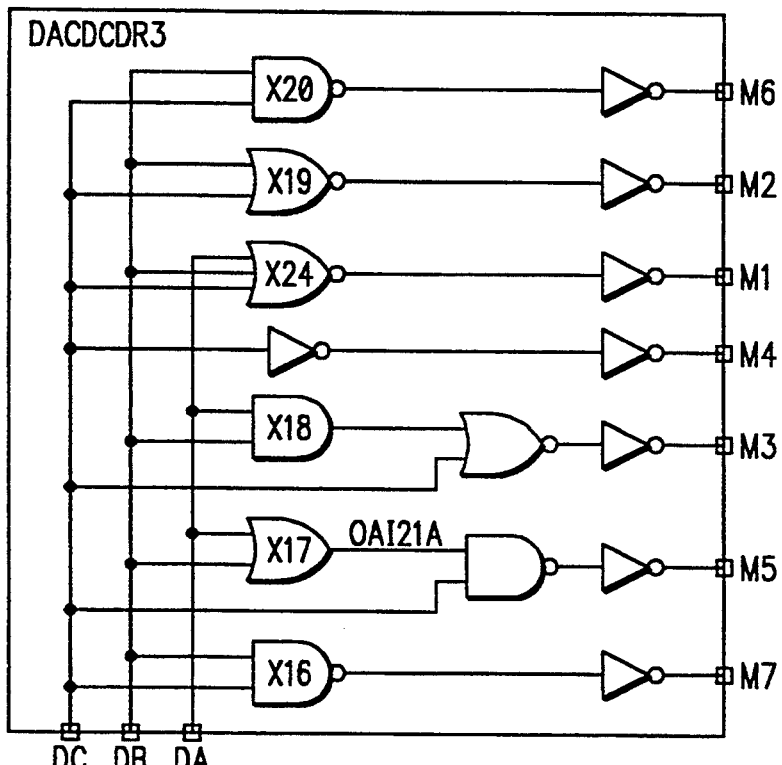
Figure 15H:
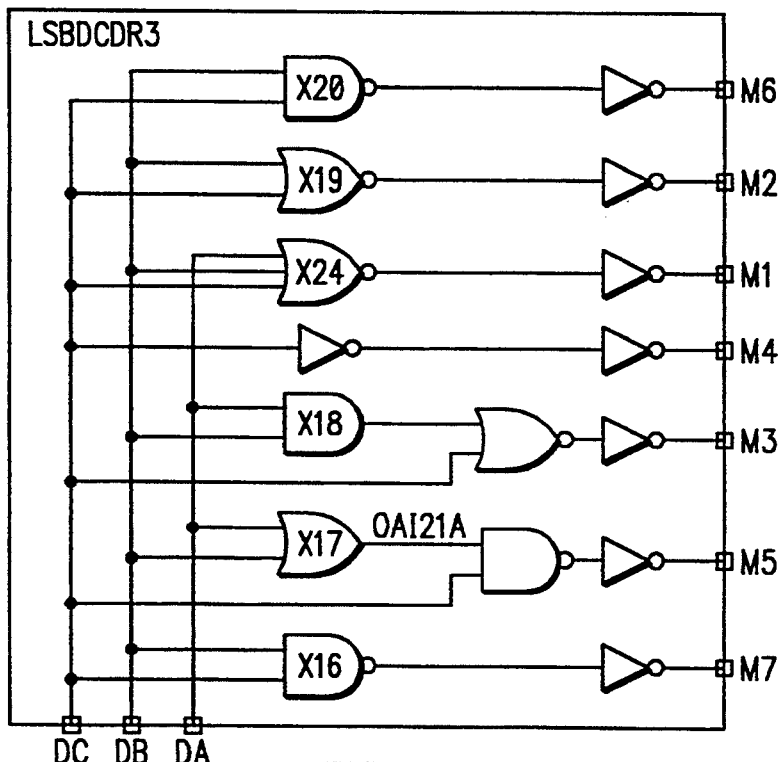
Figure 15I:
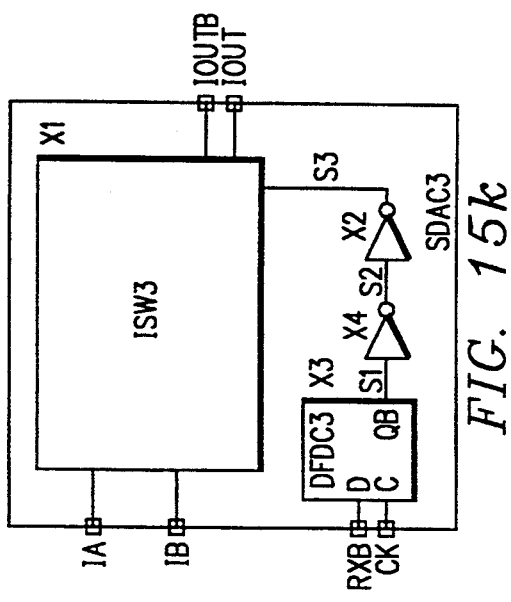
Figure 15J:
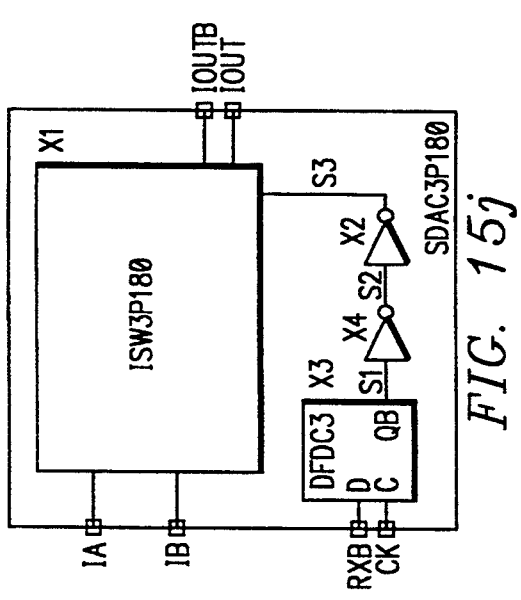
Figure 15K:
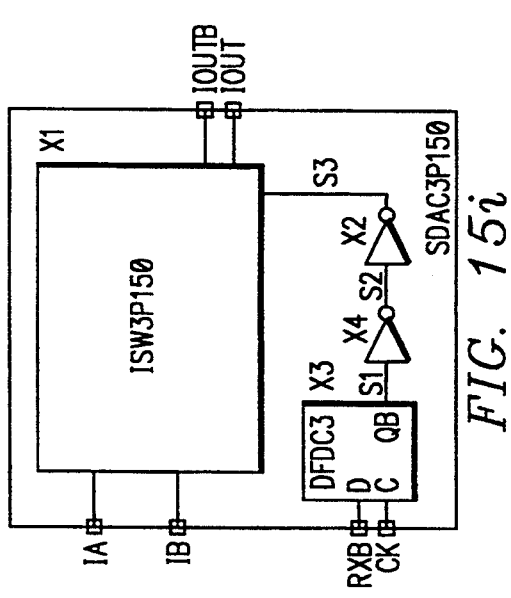
Figure 15L:
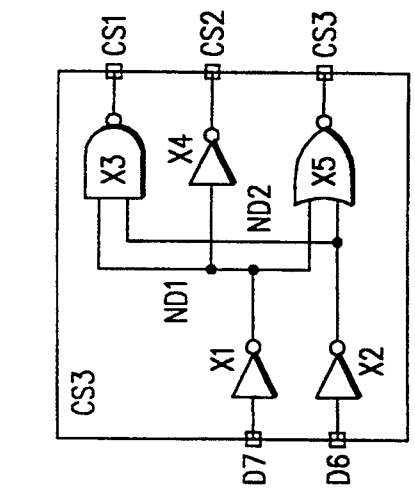
Figure 15M:
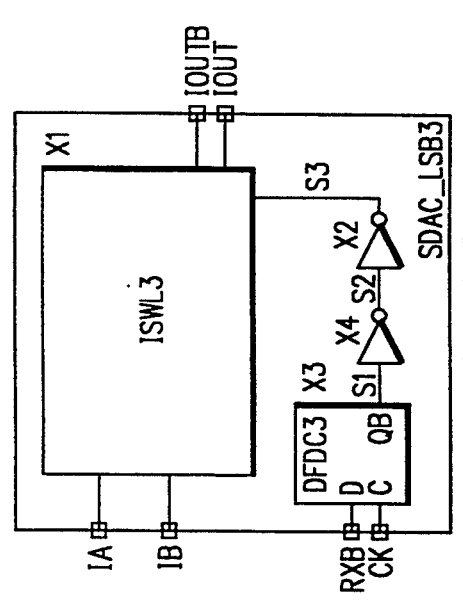
Figure 15N:
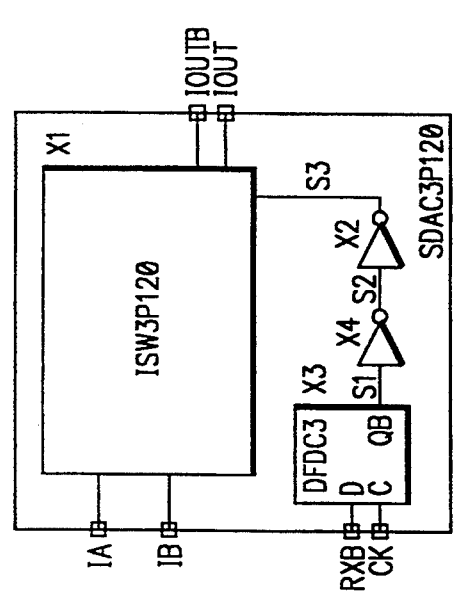

FIGS. 15A–15T are complete electrical schematics for each of the digital to analog converters 88. FIG. 15a depicts the major sub-blocks of one of the digital analog converters 88. The blocks labeled SUB_DAC3 are arrays of current sources. The block SDAC_BLANK3 is current source making up the 7.5 IRE level from blank to black as shown in FIG. 16b. Block SDACL3 is a current source of LSB bits. Blocks SUB_DAC3 in conjunction with block SDACL3 make up the entire analog output level between black and white (a level of 92.5 IRE as shown in FIG. 16b). Block LSBDCDR3 is a current source decoder which receives bits D0–D2 from output multiplexer 86. Block DACDCDR3 receives and decodes bits D3–D5 from output MUX 86. Block CS3 receives and decodes bits D6 and D7 from output MUX 86. The array of current sources making up the entire analog output IOUT are controlled by the three decoders LSBDCDR3, CS3, and DACDCDR3. FIG. 15b is a detailed functional block diagram of one of the blocks SUB_DAC3X shown in FIG. 15a. The circuitry of FIG. 15b includes a decoder RS3X and seven current sources SDAC3. FIG. 15c depicts one of the sub-blocks SUB_DAC3 which includes a decoder and 8 current sources SDAC3. FIG. 15d is a detailed functional block diagram of sub-block SDAC_BLANK3 depicted in FIG. 15a. FIG. 15e is a detailed functional block diagram of sub-block SDACL3 shown in FIG. 15a. Sub-block SDACL3 includes seven current source sub-blocks SDAC_LSB3 for each of the lease significant bits. FIG. 15f is a detailed functional block diagram of sub-block DAC_SYNC3 shown in FIG. 5b. Block DAC_SYNC3 includes current source sub-blocks which make up the analog level between SYNC and BLANK or 40 IRE as shown in FIG. 16b. Block DAC_SYNC3 includes 14 current source sub-blocks SDAC3. FIG. 15g is a detailed functional block diagram of sub-block DACDCDR3 shown in FIG. 15a. Block DACDCDR3 decodes 3 input bits and provides output control signals to the current source arrays. FIG. 15h is a detailed functional block diagram of sub-block LSBDCDR3 which also receives 3 input bits and provides output control signals to the current source arrays in response as shown in FIG. 15a. FIGS. 15i-15m are functional block diagrams of the current source sub-blocks shown in FIGS. 15b-15e. Each of the current source sub-blocks shown in FIGS. 15i-15m include a flip-flip which latches the control signal RXB. The output from the flip-flop controls a current steering circuit which appropriately steers the output current between either terminal IOUT or terminal IOUTB. FIG. 15n is a detailed logic diagram of the flip-flop shown in FIGS. 15i-15m.

FIG. 16A is a diagram showing Equivalent Circuit of the Current Output (IOG).

The DAC outputs are controlled by three current sources shown as TBIAS3, IAMP3 and DAC_SYNC3 in FIG. 5. The requisite reference voltage VREF is provided by circuitry REF shown in FIG. 5. In the normal case, there is 7.5 IRE difference between blank and black levels, which is shown in FIG. 16b (FIG. 15b shows the composite video signal output into a 75-ohm doubly-terminated bond. VREF=1,235 V and RSET=523 ohms). If 0 IRE pedestal is wanted, it can be so selected by resetting bit 4 of General Control Register. The video output for 0 IRE is shown in FIG. 16c (FIG. 16c depicts the composite video output into a 75-ohm doubly terminated load, VREF=1.235 V, RSET=523 ohms).

A resistor (RSET) is needed to connect FS ADJ pin and GND to control the magnitude of the full scale video signal. The IRE relationships in FIG. 16b & 16c are maintained regardless of the full scale output current.

The relationship between RSET and the full scale output current IOG is:

$$RSET\ (ohms) = K1 * VREF\ (v) / IOG\ (m^a)$$

The full scale output current on IOR and IOB for a given RSET is:

$$IOR, IOB\ (m^a) = K2 * VREF\ (v) / RSET\ (ohms)$$

where K1 and K2 are defined as:

| | IOG | | IOR, IOB | |
|---|---|---|---|---|
| Pedestal | 8-bit output | 6-bit output | 8-bit output | 6-bit output |
| 7.5 IRE | K1 = 11,294 | K1 = 11,206 | K2 = 8,067 | K2 = 7,979 |
| 0 IRE | k1 = 10,684 | K1 = 10,600 | K2 = 7,462 | K2 = 7,374 |

HSYNC-, VSYNC-, and BLANK-

Figure 17A:
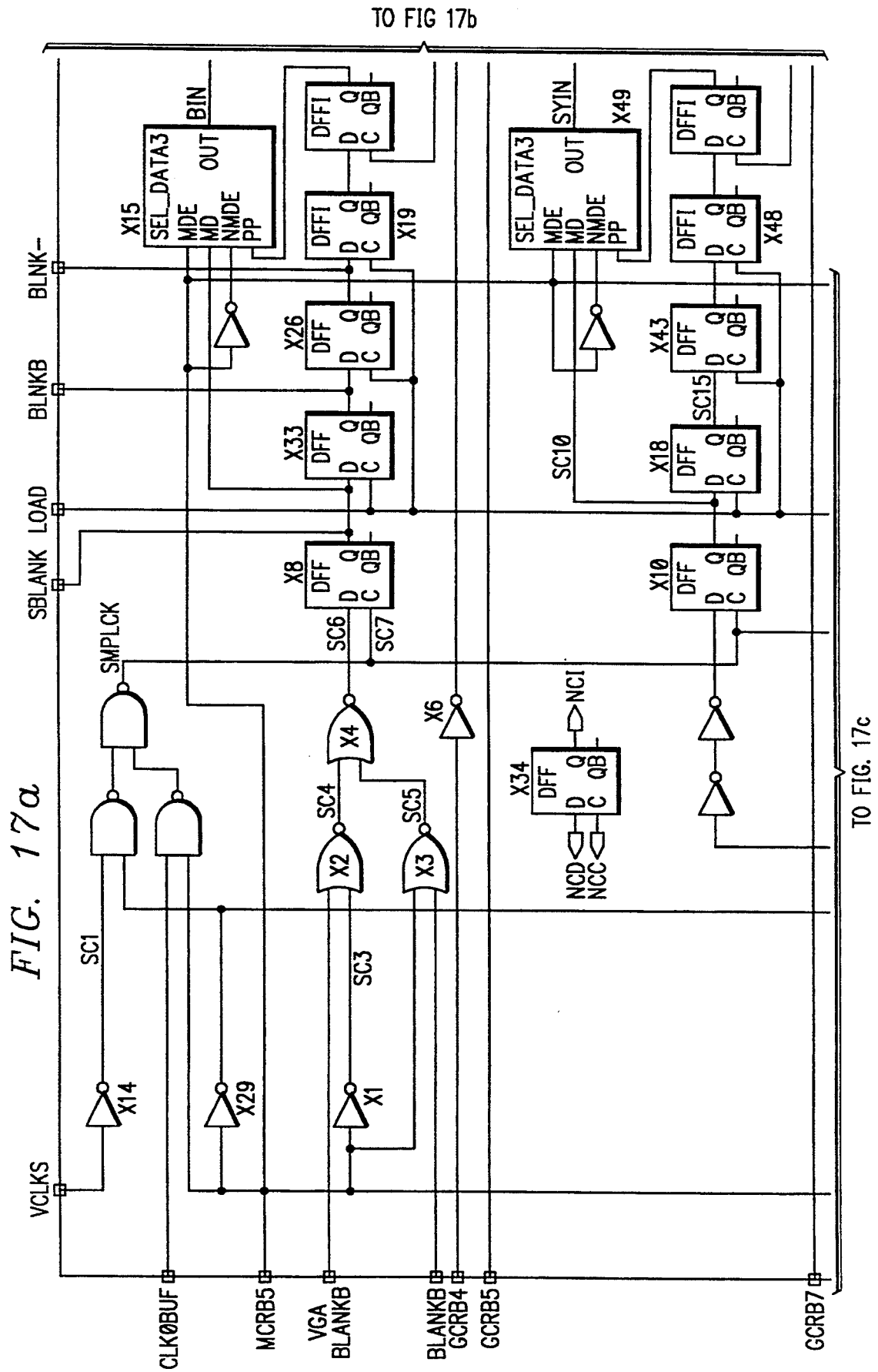
FIG. 17a–17r are a complete set of electrical schematic diagrams of video multiplexer and control circuitry 92 shown in FIG. 4 and as labeled SYNC_CNTL2 in FIG. 5.
Figure 17B:
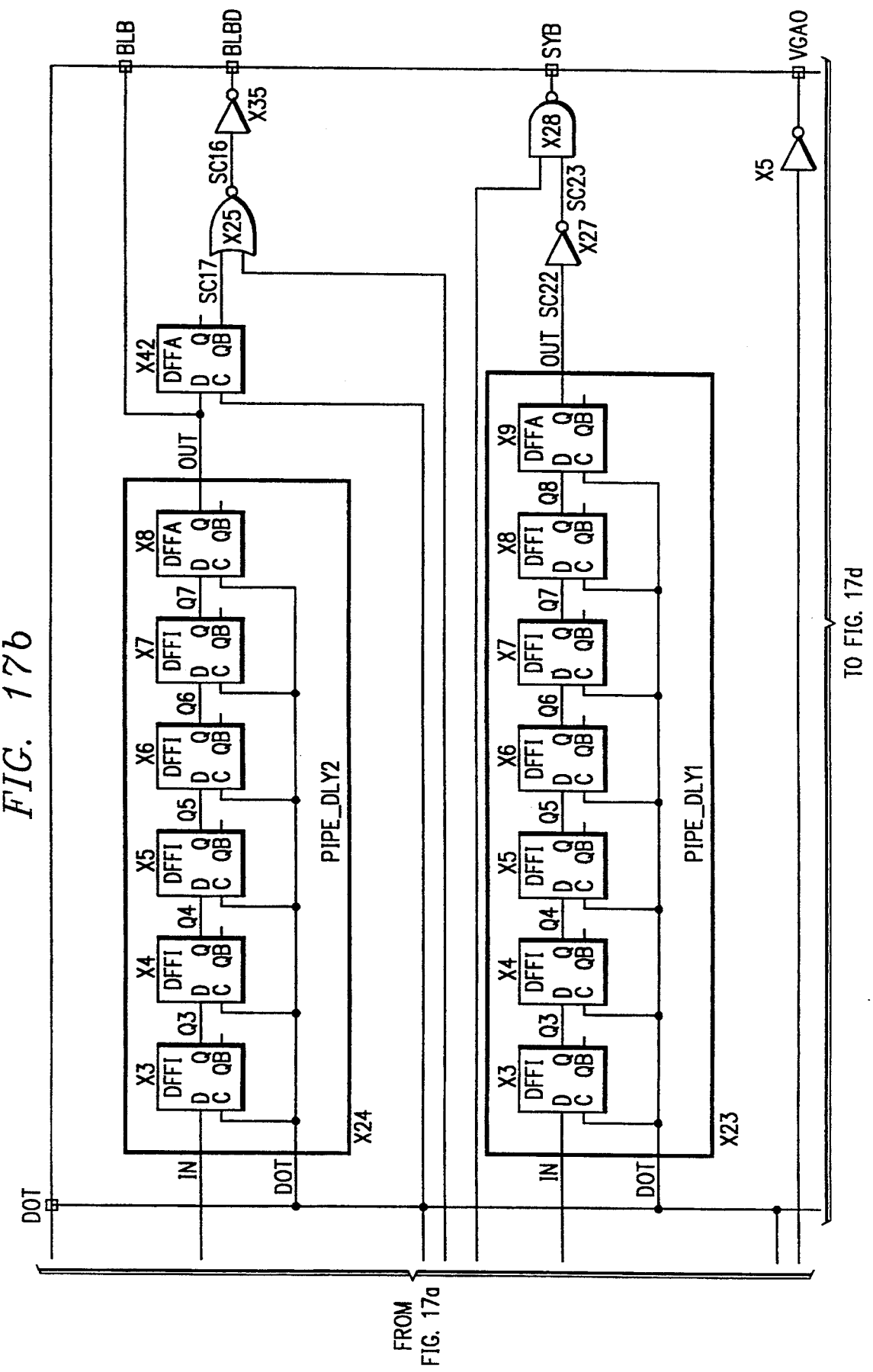
Figure 17D:
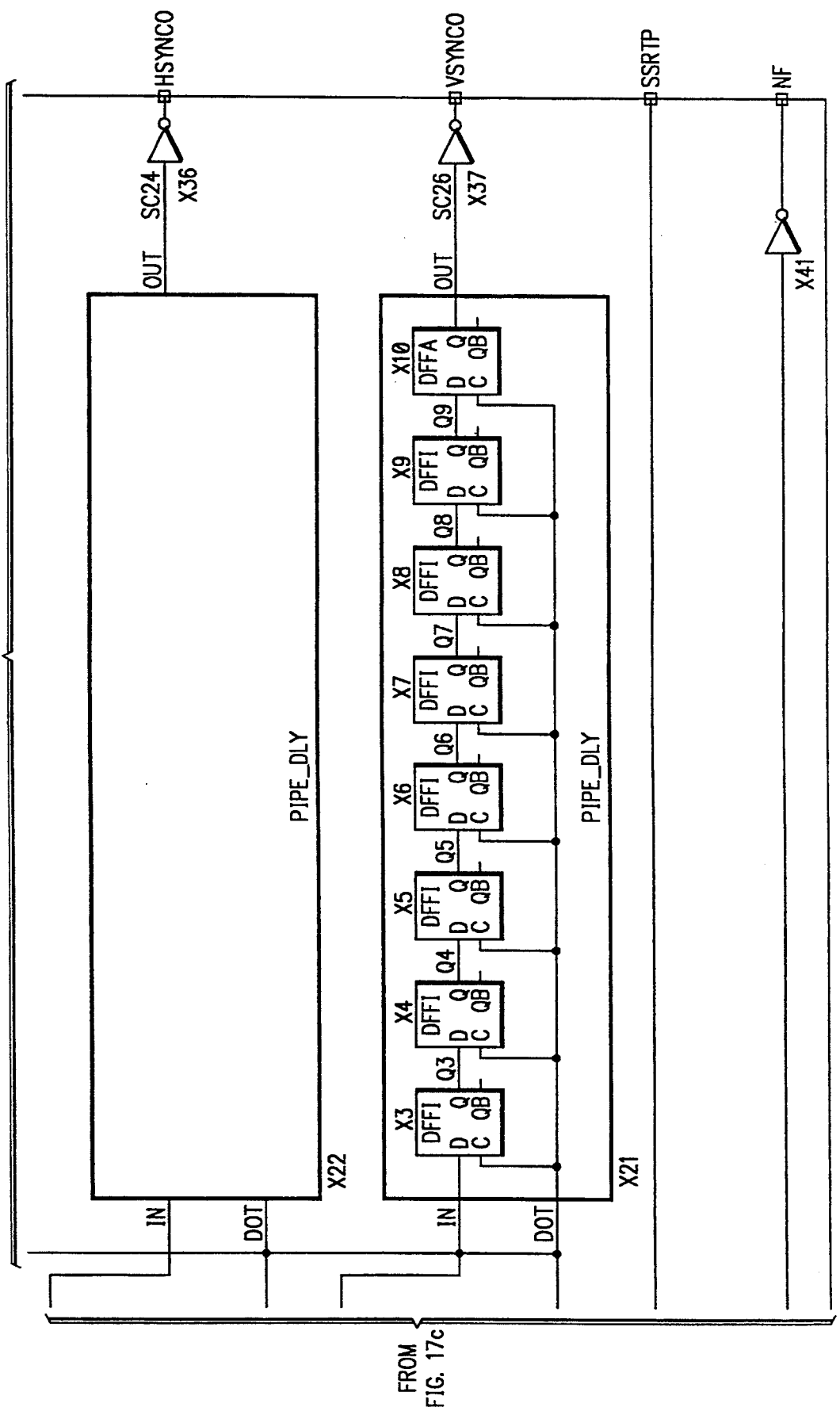
Figure 17K:
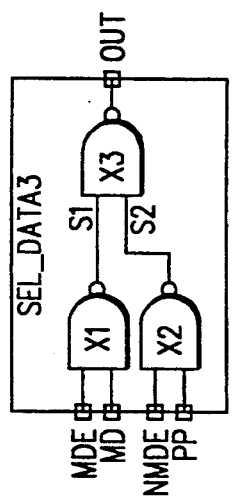
Figure 17E:
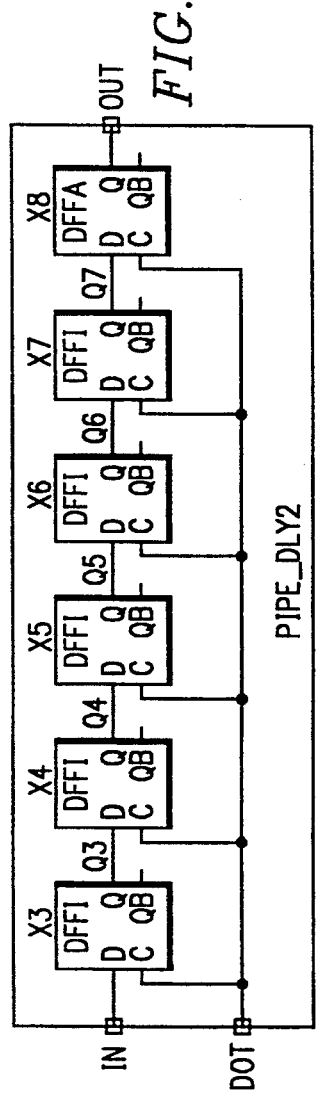
Figure 17F:
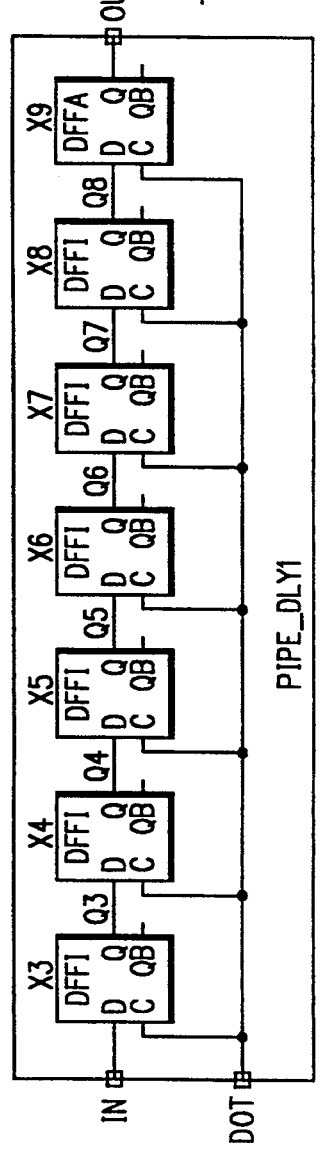
Figure 17G:
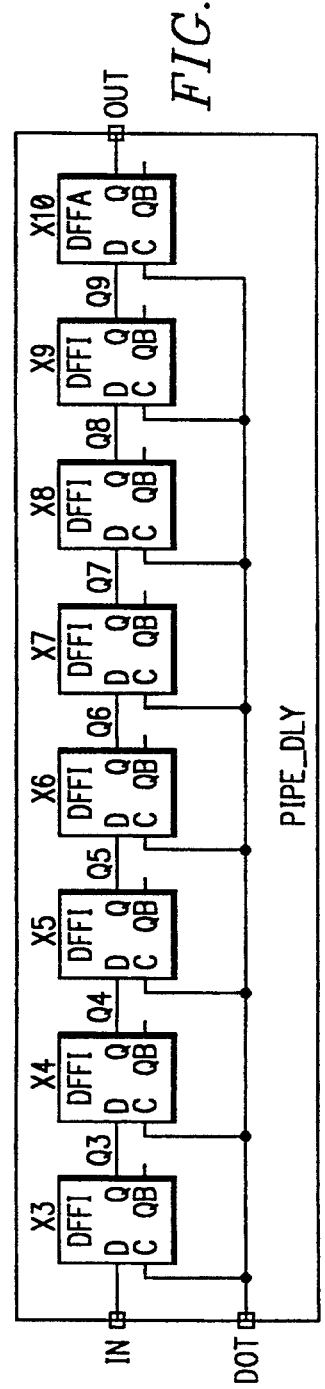
Figure 17H:
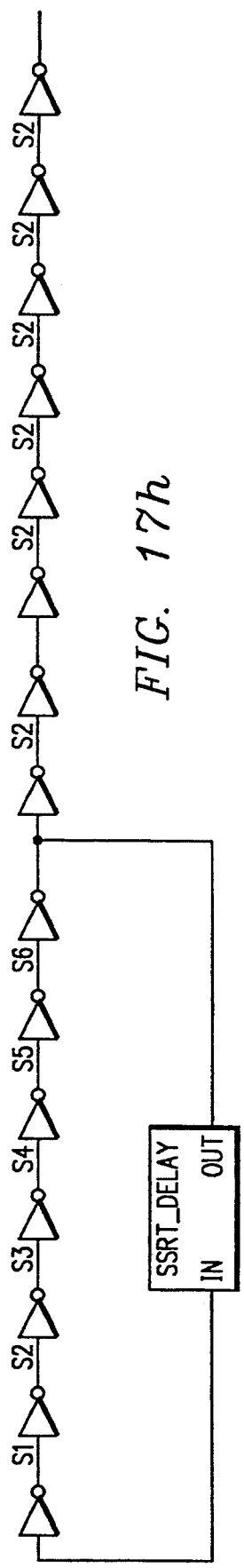
Figure 17I:
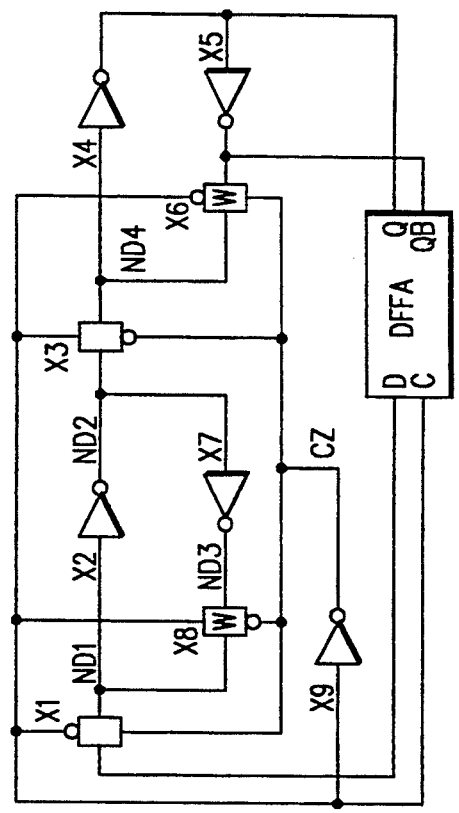
Figure 17J:
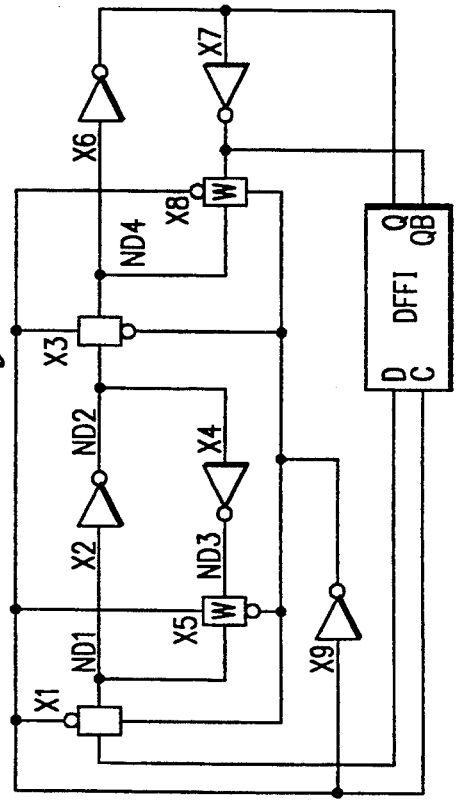

Video control signals HSYNC, VSYNC-, and BLANK- are received through video mux and control circuitry 92, complete schematics of which are provided as FIG. 17a-17k. FIG. 17a-17d are an upper level diagram of video multiplexer and control circuitry 92. Video mux and control 92 circuitry samples the video control signals VGA BLANK_, BLANK-, VSYNC-, and HSYNC- with the video clock (VCLKS) in the normal mode and with the clock CLK0 in the VGA mode. The sampled data is immediately latched and then synchronized with the pixel data passing through input latches 76. Once the control signals are synchronized with the data, each signal is passed through a corresponding pipeline delay circuitry which ensures that the data passing through input latch 76 is fully utilized prior to the re-activation of the video control signals. Following delay, signals HSYNC and VSYNC are output off chip. Signals VSYNC and HSYNC are also subject to a polarity reversal as defined by general control register bits GCRB0 and GCRB1. Signals VSYNC and HSYNC are further OR'd together to provide a composite SYNC control signal which, following delay, is applied to the SYNCDAC current sources discussed in conjunction with FIG. 15f. Video mux and control circuitry 92 also receives signal SFLAG/NFLAG which is used to generate the SSTRP pulse indicating a split shift register transfer function, the pulse being sent to clock control circuitry 90 to modify shift clock output. General control register bits GCRB2 and GCRB3 are used to defeat split shift register transfer operations in the special nibble mode and vice versa. FIG. 17e is a detailed functional block diagram of the pipeline delay PIPE_DLY2 used for the blanking control signals BLB and BLBD. FIG. 17f is a detailed block diagram of PIPE_DLY1 which is used for pipeline delay timing of control signals SYB. FIG. 17g is a detailed functional block of pipeline delay PIPE_DLY used for pipeline delay timing of the HSYNC and VSYNC video control signals. FIG. 17h is a detailed logic diagram of the analog delay chain used in the split shift register logic control circuitry shown in FIG. 17c. FIG. 17i is a detailed electrical schematic diagram one of the flip-flops used in the pipeline delay blocks of FIGS. 17e-17g. FIG. 17j is a detailed electrical schematic diagram of one of the flip-flops used in the pipeline delay circuits of FIGS. 17e-17g. FIG. 17k is a detailed functional block diagram of the data selector SEL_DATA3 used in FIG. 17c.

For the normal mode, HSYNC- and VSYNC- are active low pulses, and they are passed through true/complement gates to HSYNCOUT and VSYNCOUT outputs. The output polarities of HSYNCOUT and VSYNCOUT can be programmed through the General Control Register (GENCREG, FIG. 6). However, for the VGA mode, the needed polarities to monitors are already provided at the feature connector which HSYNC- and VSYNC- are sourced from, so video mux/control circuitry 92 passes them directly through to HSYNCOUT and VSYNCOUT without polarity change. As described above, the BLANK-, HSYNC- & VSYNC- inputs are sampled and latched by video mux/control circuitry 92 at the falling edge of VCLK in the normal mode, and they are latched at the rising edge of CLK0 input in the VGA mode. Please refer to FIG. 18 for the detailed timings.

Due to the pin count limitation, HSYNC- and VSYNC-inputs are used for both VGA and normal modes. If both modes are used, an external MUX is needed to select HSYNC- & VSYNC- between VGA mode and normal mode. The MUXOUT- pin is designed for this purpose.

HSYNC-, VSYNC- and BLANK- are passed through pipeline delays to align the data at the outputs. Due to the sample and latch timing delay, it is possible to have active SCLK's after the BLANK- input becomes active. The relationship between VCLK and SCLK, and the internal VCLK sample and latch delay need to be carefully reviewed and programmed as previously discussed.

As shown in FIG. 16a, active HSYNC- and VSYNC- will turn off the sync current source (DAC_SYNC3, FIG. 5) (after pipeline delay). They are not qualified by the BLANK- signal. In other words, HSYNC- and VSYNC- are normally active only during the BLANK active time to ensure the proper operation.

To alter the polarity of the HSYNCOUT and VSYNCOUT outputs in the normal mode, the processor 18 must set or clear the corresponding bits in General Control Register (GENREG). Again, these two bits will affect the normal mode only, not the VGA mode. These bits default to 1 which is active high output.

Split Shift Register Transfer VRAMs and Special Nibble Mode

SPLIT SHIFT REGISTER TRANSFER VRAMs

As discussed above, color palette 42 has direct support for Split Shift Register Transfer (SSRT) VRAMs. In order to allow the VRAMs 30 to perform a split register transfer, an extra SCLK cycle must be inserted during the blank sequence. This is initiated when the SSRT enable bit (bit 2) in the general control register is set to 1, the SNM (bit 3) is reset to 0, and a rising edge on the SFLAG/NFLAG input pin is detected. Video mux/control circuitry 92 then generates a pulse SSRTP which is sent to clock control circuitry 90 to latch the SCLOCK output for an additional SCLK period. An SCLK pulse will be generated within 20 ns of the rising edge of the SFLAG/NFLAG signal by clock control circuitry 90. A minimum 15 ns logic high duration is provided to satisfy all of the −15 VRAM requirements. The rising edge of the SFLAG/NFLAG input pin is detected. An SCLK pulse will be generated within ns of the rising edge of the SFLAG/NFLAG signal. A minimum 15 ns logic high duration is provided to satisfy all of the −15 VRAM requirements. The rising edge of the SFLAG/NFLAG input triggers SCLK, but it needs to stay high for a minimum duration of 30 ns. By controlling the SFLAG rising timing, the delay time from the rising edge of VRAM TRG-signal to SCLK can be satisfied. The waveform and the relationship of the SCLK, SFLAG input and the BLANK- is shown in FIG. 10a.

If SFLAG is designed as an R-S latch which is set by split shift register transfer timing but reset by BLANK- going high, the delay from BLANK- high to SFLAG low cannot exceed one half of one SCLK cycle. Otherwise, the SCLK generation logic could fail.

If the SSRT function is enabled but SFLAG/NFLAG is held low, the SCLK will run as if the SSRT function were disabled. The SFLAG/NFLAG input is not qualified by BLANK- signal within palette 42. It must be held low any other time the SSRT SCLK pulse is not intended.

Special Nibble Mode

Special Nibble Mode is enabled when the SNM bit (Bit 3) of the General Control Register is set to i and the SSRT (bit 2) is reset to 0. Conceptually this Special Nibble Mode initiates an additional variation of the 4 bit pixel mode with a 16 bit bus width (while all 32 inputs P0 through P31 are connected as 4 bytes), but in this case the 16 bit data bus is found on the lower/upper nibble of each of the 4 bytes. The SFLAG/NFLAG input is then used as a nibble flag to indicate which nibble of each byte holds pixel data at the input. The pixel data is distributed as shown in the following table:

| SNM = 1, SSRT = 0 ||
| SFLAG/NFLAG = 1 | SFLAG/NFLAG = 0 |
| P7,...,P4 | P3,...,P0 |

| SNM = 1, SSRT = 0 ||
| SFLAG/NFLAG = 1 | SFLAG/NFLAG = 0 |
| P15,...,P12 | P11,...,P8 |
| P23,...,P20 | P19,...,P16 |
| P31,...,P28 | P27,...,P24 |

Figure 18:
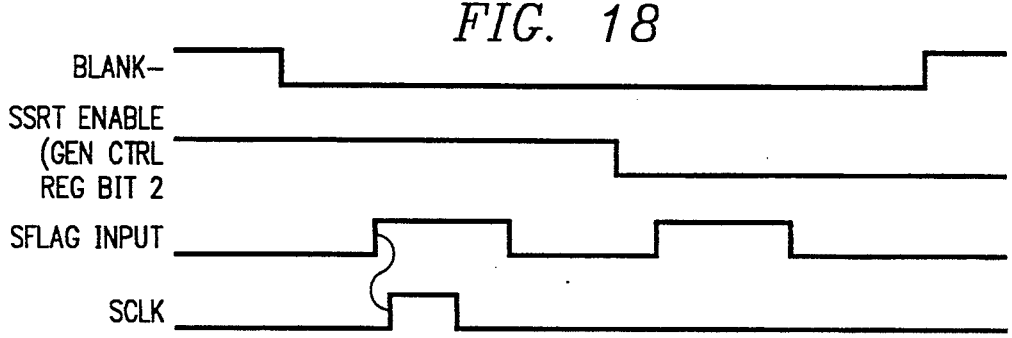
FIG. 18 is a timing diagram describing the relationship between the system blank signal, the split shift register transfer enable signal, Sflag input signal and the shift clock.
Figure 19:
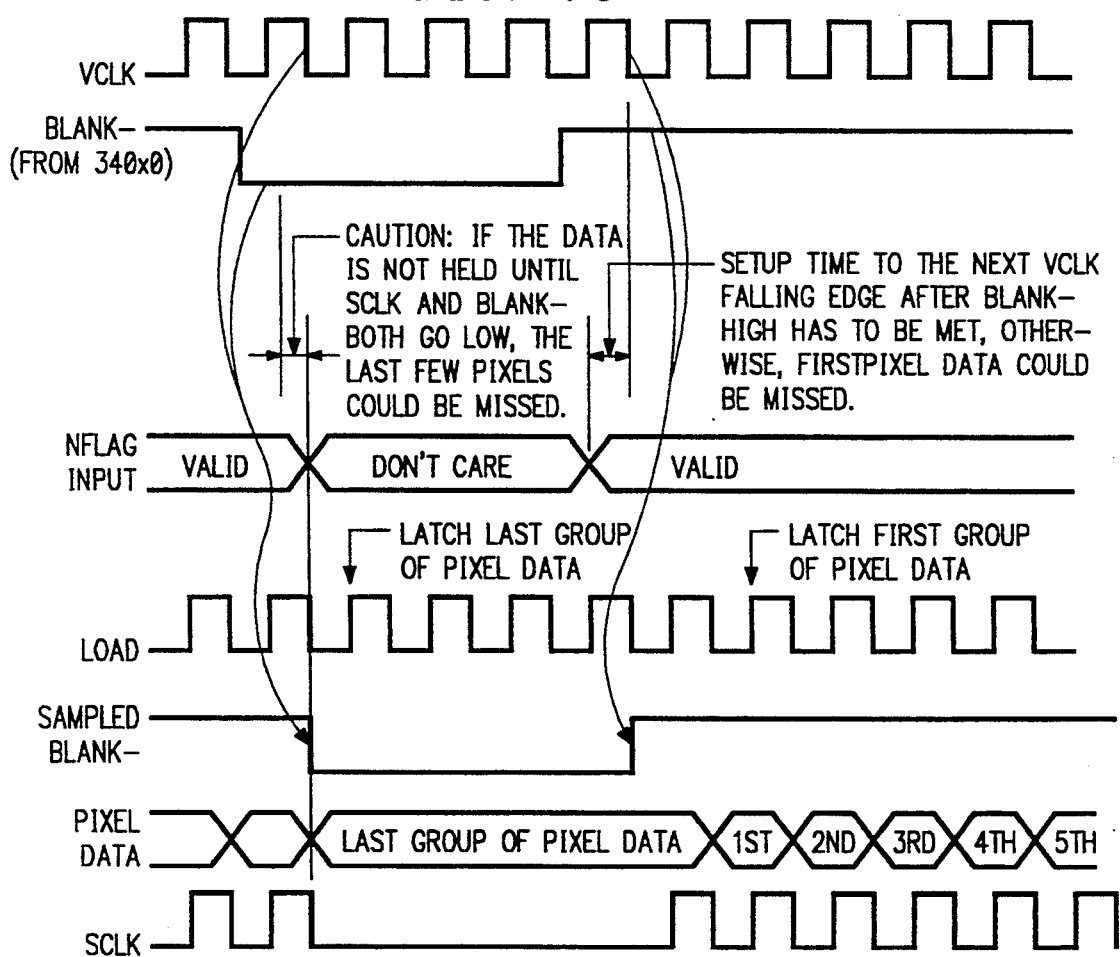
FIG. 19 is a timing diagram describing the relationship between the system video clock, the system blank signal, the N flag input signal, the LOAD signal, the sampled blank signal, the pixel data, and the system shift clock (SCLK)
Figure 20:
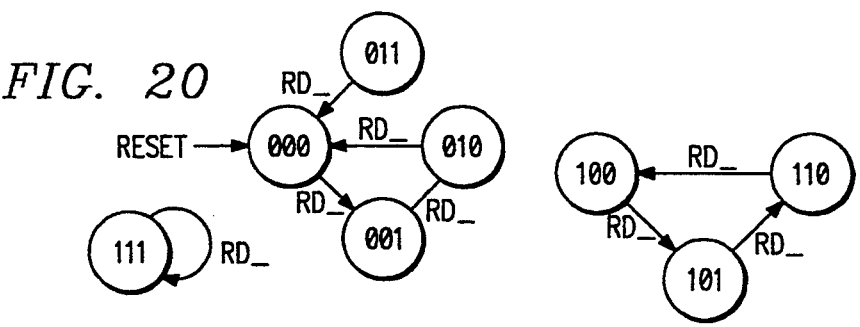
FIG. 20 depicts a series of state diagrams describing the functioning of the test register 90 as shown in FIG. 4.

The NFLAG is not latched within the color palette 42. Therefore it should stay the same level during the whole active display period and only change level during BLANK- active time. The NFLAG has to meet the setup time and hold the data long enough to ensure no pixel data are missed. NFLAG timing in the Special Nibble Mode is depicted in FIG. 18.

Special Nibble Mode will operate at line frequency when BLANK- is active. However, the typical application of this mode would be double frame buffers with data of pixel width of 4 bits. While one frame buffer is displaying on the monitor, the other frame can be used to accept new picture information. NFLAG is used to indicate which frame buffer is displaying.

It must be noted that SNM and SSRT have to be mutually exclusive. Unpredictable operation would occur if both SNM and SSRT bits are set high. The MUX Control Register (MUXCREG, FIG. 6) needs to be set up as shown in Table 4. However, the SNM takes precedence over the other MUX selections. In other words, if MUX Control Register is set up for another mode but SNM is still enabled in General Control Register, the input multiplex circuit will take what ever the SCLK divide ratio MUX Control Register specified and perform the nibble operation which will cause operational failure.

During SNM, the selector 78 (FIG. 11) circuit will latch all 8-bit inputs but only pass on the specified nibble. The specified nibbles are stored in the 4 LSB's of the next selector 78 output register pipe, and the 4 MSB's are zero'ed in that register. For a complete description of this function, reference is again made to copending and coassigned application Ser. No. 07/723,342, Attorneys' Docket No. TI-15776, incorporated herein by reference. This pipe register is then passed to the read mask. With this structure, Palette Page Register will still function as normal.

Muxout—Output Pin

The MUXOUT-pin is a TTL compatible output. It is software programmable and is used to control external devices. The typical application would be to select the HSYNC- and VSYNC-inputs between the VGA mode and the normal mode. This pin will be set low at power-up or when VGA mode is selected. Since this pin is controlled by bit 7 of the General Control Register and involves no other circuit, it may be programmed for anything after power-up or VGA mode set (2 D HEX in Mux Control Register).

General Control Register

The general control register (GENCREG, FIG. 6) is used to control HSYNC- and VSYNC- polarity, split register transfer enabling, special nibble mode, sync on green enable, sync control, and the VGA Pass-through indicator. The bit field definitions are as follows:

| GENERAL CONTROL REGISTER BIT ||||||||  |
|---|---|---|---|---|---|---|---|---|
| 7 | 6 | 5 | 4 | 3 | 2 | 1 | 0 | FUNCTION |
| X | X | X | X | X | X | X | 0 | HSYNCOUT active low |

-continued

GENERAL CONTROL REGISTER BIT

| 7 | 6 | 5 | 4 | 3 | 2 | 1 | 0 | FUNCTION |
|---|---|---|---|---|---|---|---|---|
| X | X | X | X | X | X | X | 1 | HSYNCOUT active high |
| X | X | X | X | X | X | 0 | X | VSYNCOUT active low |
| X | X | X | X | X | X | 1 | X | VSYNCOUT active high |
| X | X | X | X | X | 0 | X | X | Split shift register transfer disable |
| X | X | X | X | 0 | 1 | X | X | Split shift register transfer enable |
| X | X | X | X | 0 | X | X | X | Special Nibble Mode Disable |
| X | X | X | X | 1 | 0 | X | X | Special Nibble Mode Enable |
| X | X | X | 0 | X | X | X | X | 0 IRE Pedestal |
| X | X | X | 1 | X | X | X | X | 7.5 IRE Pedestal |
| X | X | 0 | X | X | X | X | X | Sync Disable |
| X | X | 1 | X | X | X | X | X | Sync Enable |
| X | 0 | X | X | X | X | X | X | Not defined (RESERVED) |
| X | 1 | X | X | X | X | X | X | Not defined (RESERVED) |
| 0 | X | X | X | X | X | X | X | MUXOUT- low (default) |
| 1 | X | X | X | X | X | X | X | MUXOUT- high |

HSYNCOUT and VSYNCOUT (bit 0 and 1)

HSYNCOUT and VSYNCOUT polarity inversion is provided to allow indication to monitors of the current screen resolution. Since the polarities for VGA pass-through mode are provided at the feature connector, the inputs to the TLC 34075 will have the right polarities for monitors already, so video mux/control circuitry 90 just passes them through with pipeline delay (FIG. 17). These two bits only work under the normal mode, and the input Horizontal and Vertical Syncs are assumed to be active low incoming pulses.

Split Shift Register Transfer Enable (SSRT) and Special Nibble Mode Enable (SNM)(bit 2 and 3).

Pedestal Enable Control (Bit 4)

This bit specified whether a 0 or 7.5 IRE blanking pedestal is to be generated on the video outputs. 0 IRE specifies that the black and blank levels are the same.

0: 0 IRE pedestal (default)
1: 7.5 IRE pedestal

Sync Enable Control (Bit 5)

This bit specifies whether SYNC information is to be output onto IOG or not.

0: Disable sync (default)
1: Enable sync

Muxout—(Bit 7)

The MUXOUT bit is essentially an output bit which provides an indication to external circuitry that the device is running VGA pass-through mode. This bit does not affect the operation of the device, it is only an output bit.

0: MUXOUT—is low (default in VGA mode)
1: MUXOUT—is high

Test Register

There are three test functions provided in color palette and they are all controlled and monitored through this Test Register (TSTREG, FIGS. 6s–6v): data flow check, DAC analog test, screen integrity test. For a complete description of the test functions of color palette 42, reference is now made to copending and coassigned application Ser. No. 07/334,344, Attorneys' Docket No. TI-16453, incorporated herein by reference.

This register has a multiplexed input port (inputs D0–D7) for receiving a control word from processor 19, by writing to the register location, and for outputing a data word to processor 18, by reading from the register location. Depending on the channel written in the control word, the data read will present the information for that channel.

The control register is 3 bits long, occupying bits 0, 1 and 2 (as accessed by inputs D0–D2 on FIGS. 6s–6v). These specify which of the eight channels to inspect. The following table and the state machine shown in FIG. 19 will show how each channel is addressed:

| D2 | D1 | D0 | CHANNEL |
|---|---|---|---|
| 0 | 0 | 0 | Color palette RED value |
| 0 | 0 | 1 | Color palette GRN value |
| 0 | 1 | 0 | Color palette BLU value |
| 0 | 1 | 1 | identification code |
| 1 | 0 | 1 | One's accumulation RED value |
| 1 | 0 | 1 | One's accumulation GRN value |
| 1 | 1 | 0 | One's accumulation BLU value |
| 1 | 1 | 1 | Analog Test |

Frame Buffer Data Flow Test

For all the data entering the DAC (But before the Output MUX 8/6- shift), the color palette 42 provides a means to check them. When accessing these color channels, the data entering the DACs is kept constant for the entire processor 18 read cycle. This can be done either by slowing down the Dot Clock, or ensuring the data is constant for a sufficiently long series of pixels. The value read will be the one stored in the color palette pointed by selector 78. The resulting data is fed through test register TSTREG to processor 18 via bus 34. The read operation also will cause a post-increment to point to the next color channel, and the post-increment of BLUE will wrap back to RED as shown in the state diagram of FIG. 19. E.G. if D2, D1 & D0 was written as 001 (binary), then followed by 3 successive reads, the values read out will be of 8-bits GREEN, BLUE, RED color data in that sequence for the 24-bits stored in the painted location in RAM 84.

Identification Code

The ID code circuitry shown in FIG. 6v can be used for software identification for different versions. The ID code is static and may be read without consideration to the Dot Clock or Video signals. The read post-increment applies to the ID register too, but once it falls into the color channel, it will not come back pointing to ID unless the user writing 011 (binary) to D2, D1 & D0 again. Thus, if the Test Register was first written as 011 (binary) in D2, D1 & D0, the followed by 6 successive reads, the first value read will be the ID, and the last value read will be the GREEN.

The ID value defined in FIG. 6v is 75 (HEX).

One's Accumulation

Figure 21A:
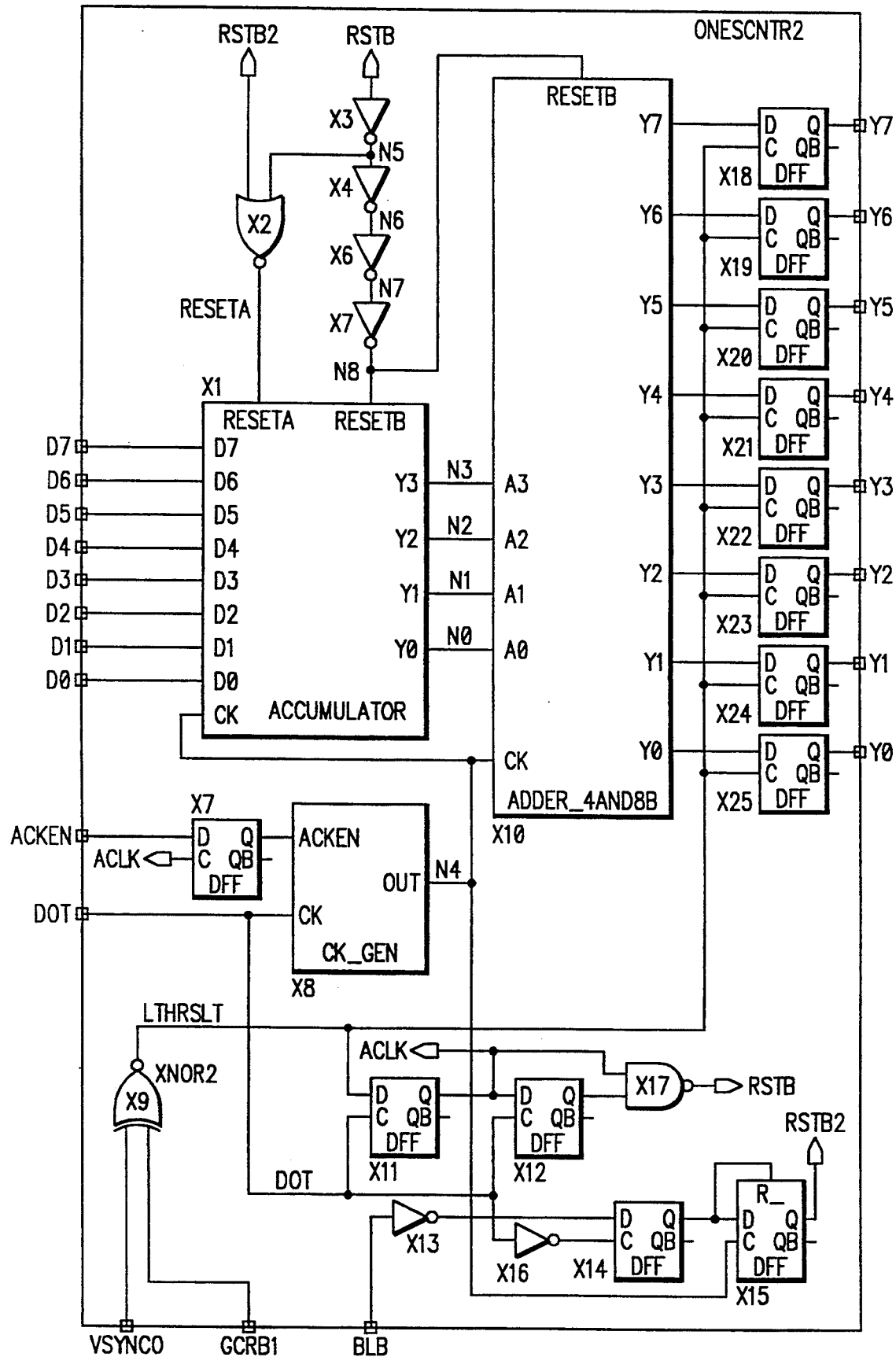
FIG. 21a–21p are a complete set of electrical schematic diagrams of a portion of test circuitry 90 shown in FIG. 4 and as labeled ONESCNTR2 in FIG. 5.
Figure 21B:
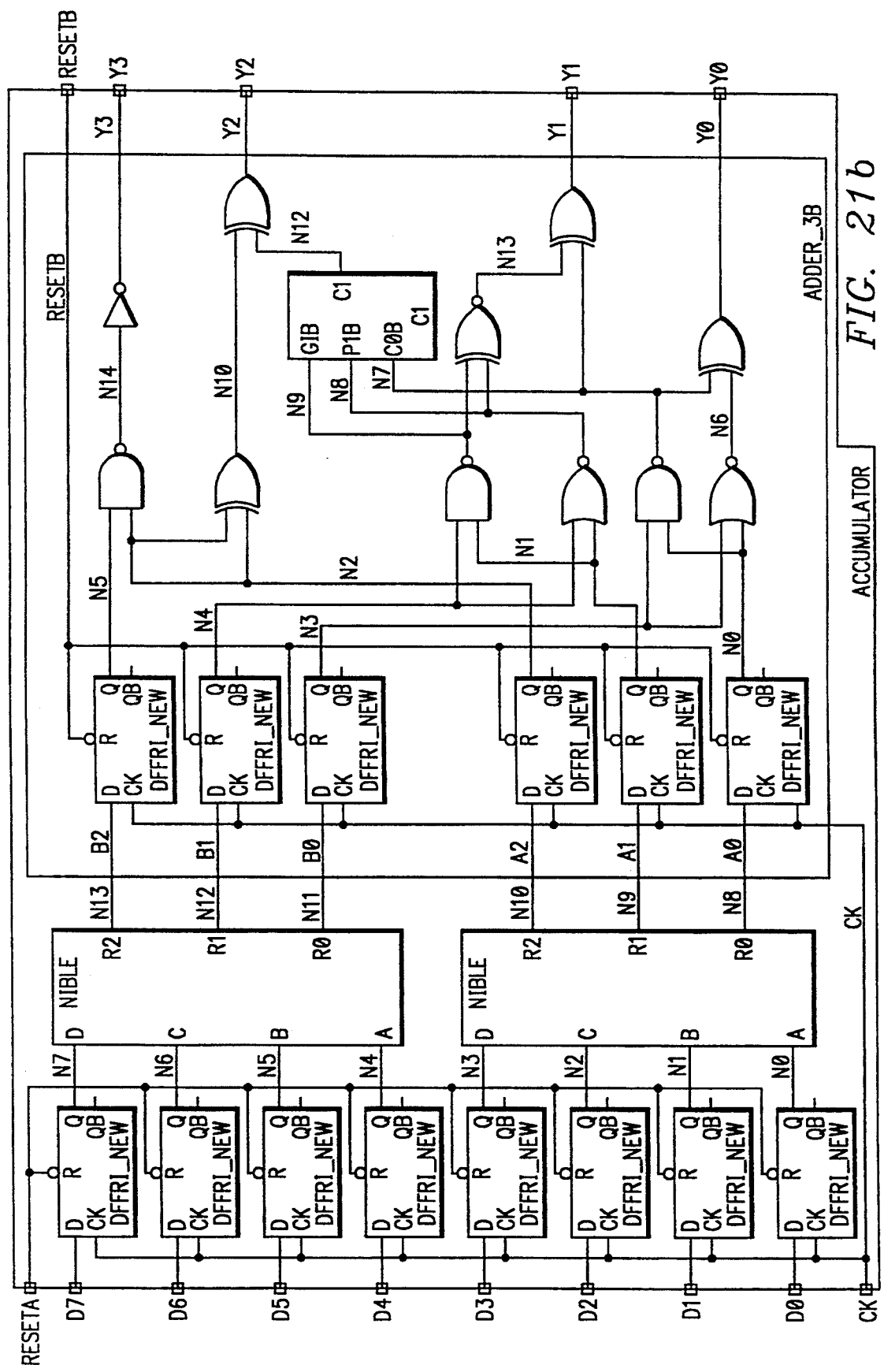
Figure 21C:
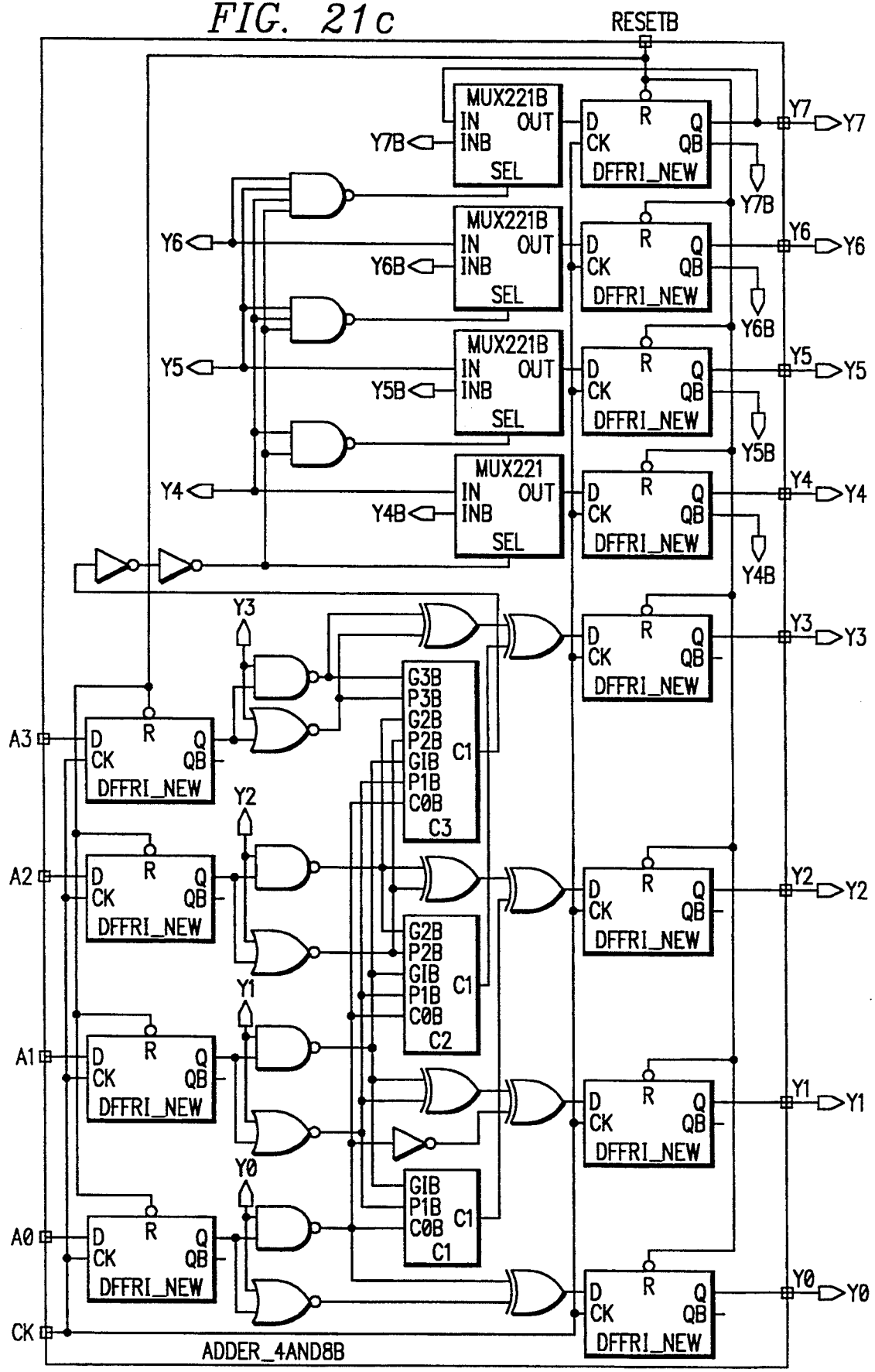
Figure 21D:
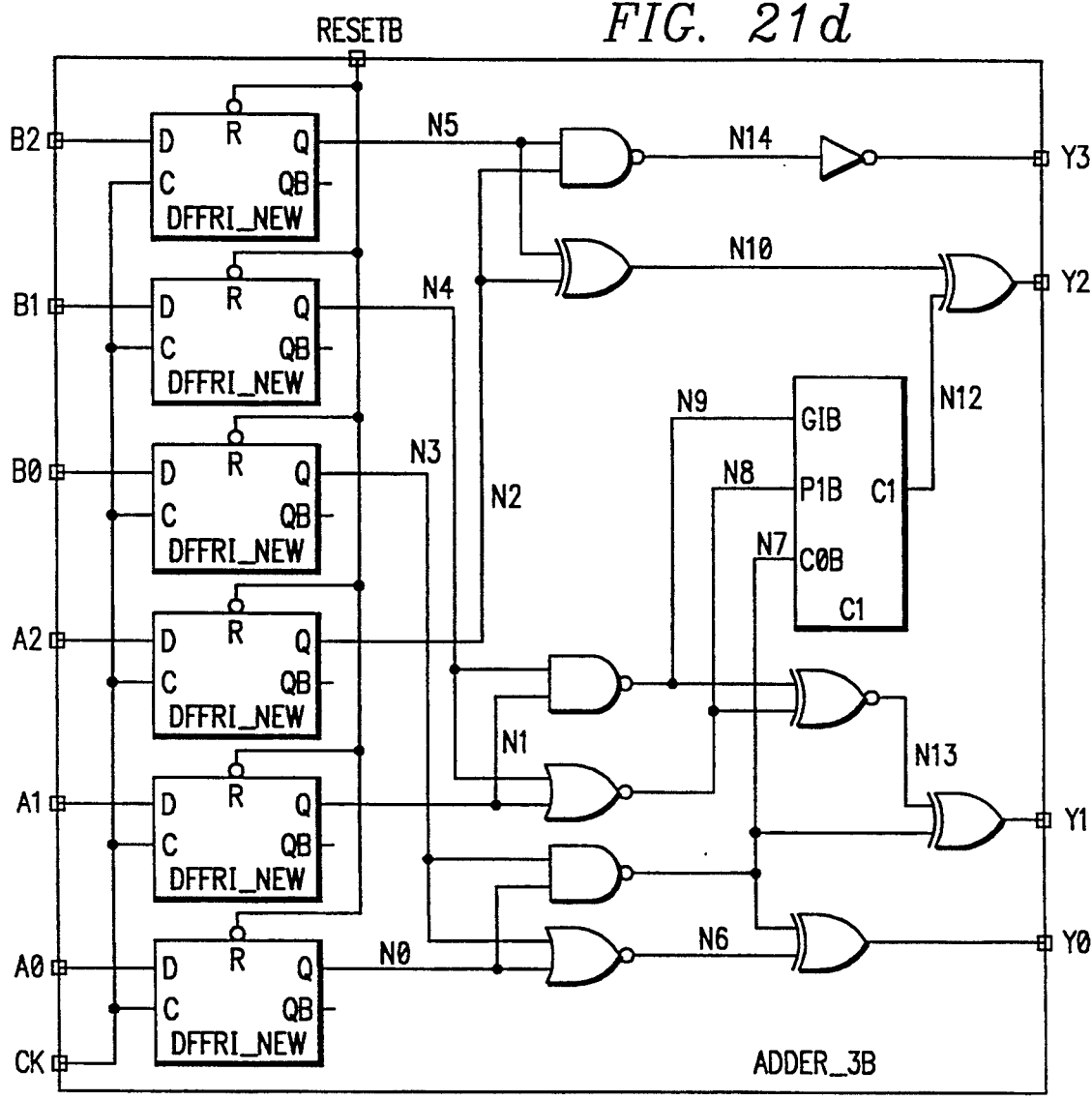
Figure 21M:
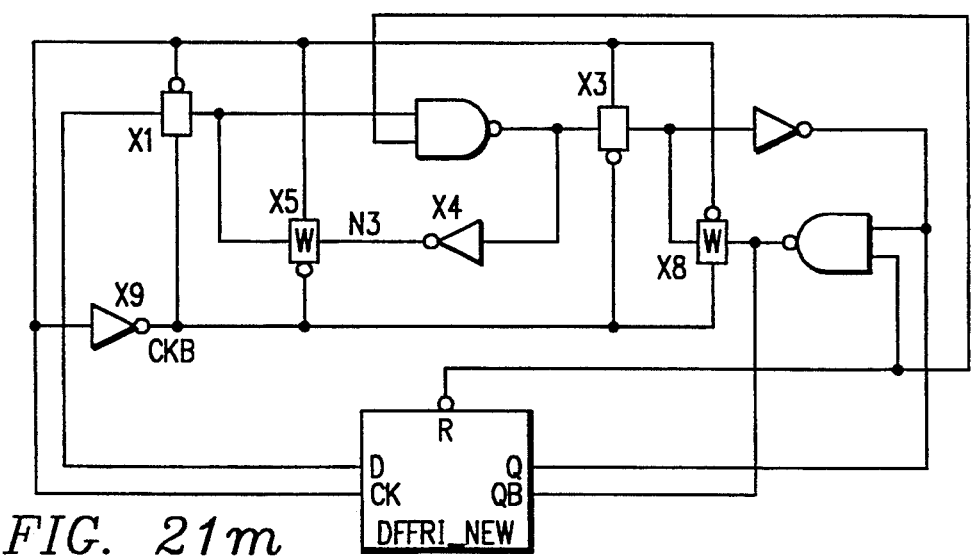
Figure 21E:
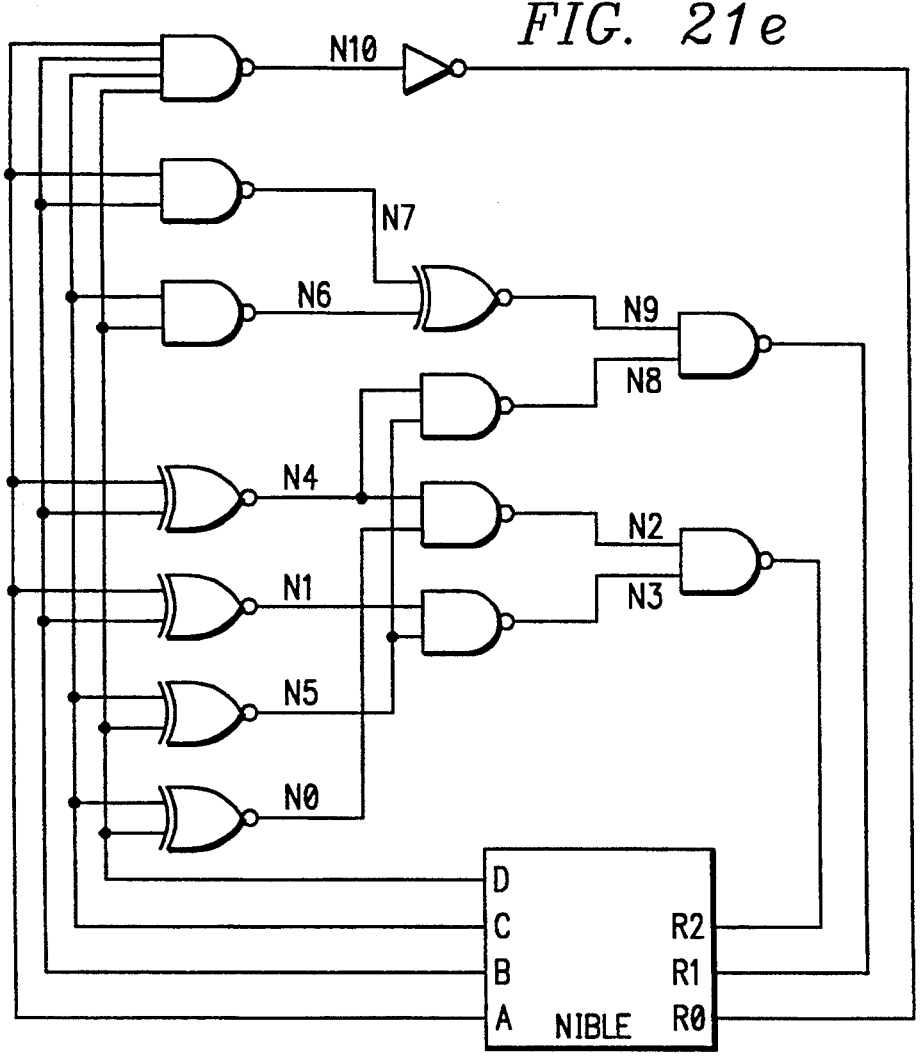
Figure 21N:
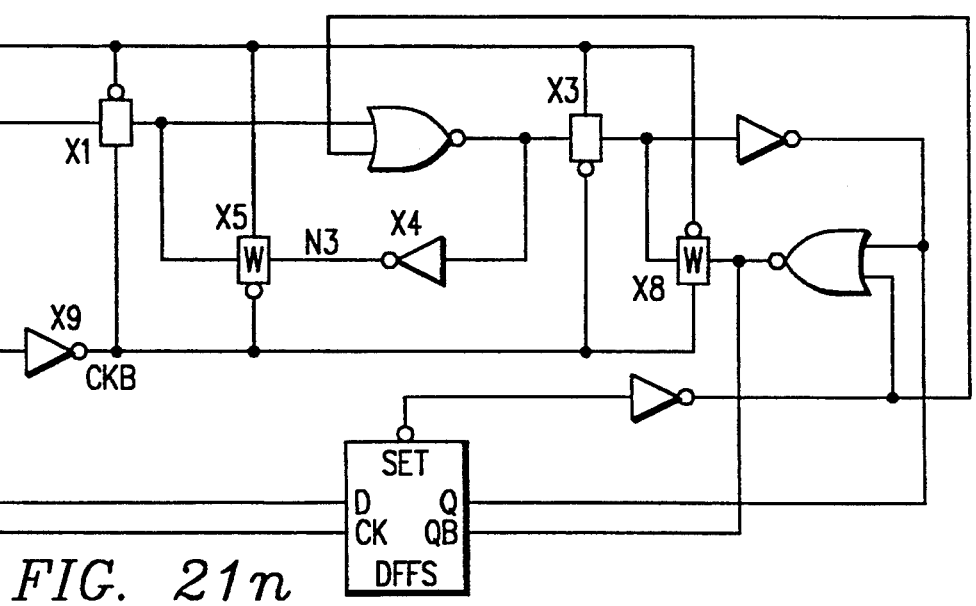
Figure 21F:
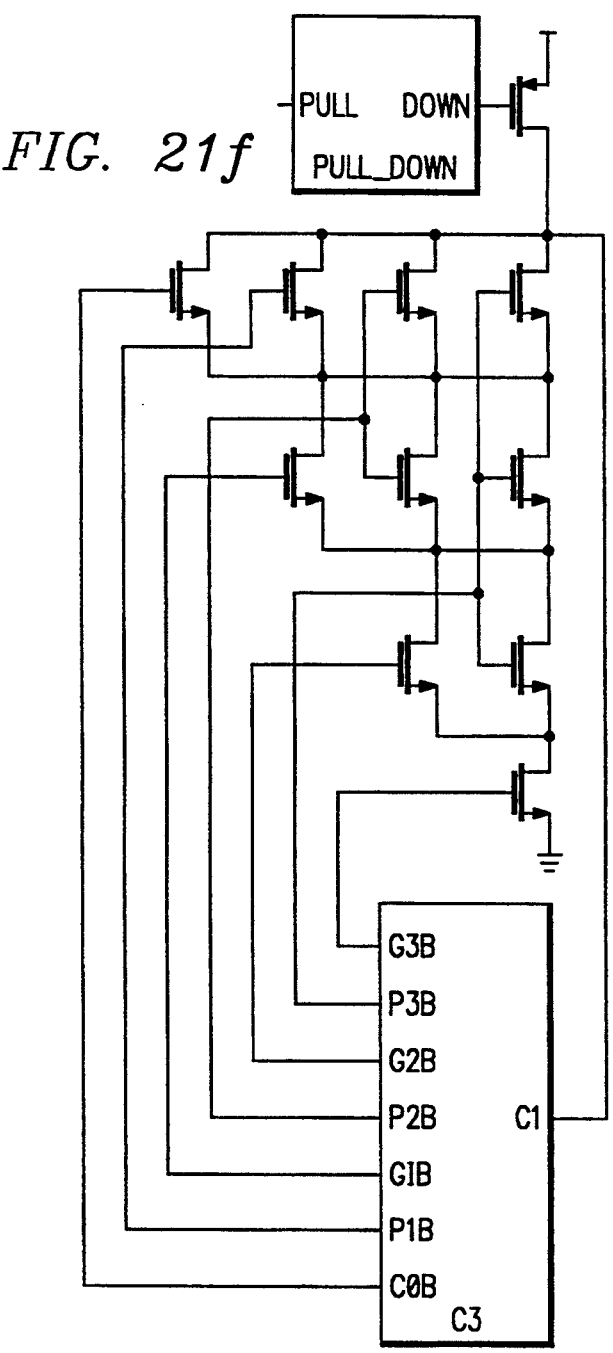
Figure 21G:
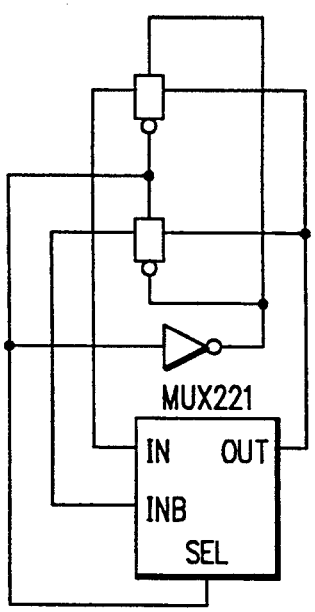
Figure 21H:
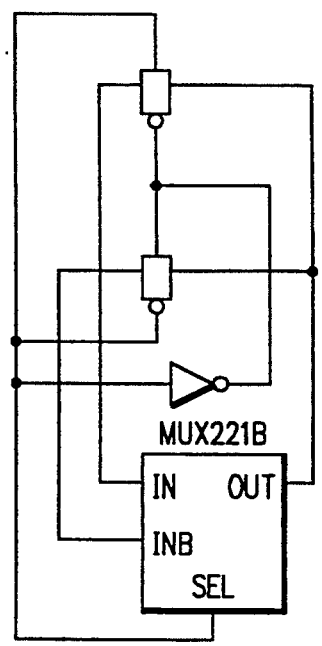
Figure 21I:
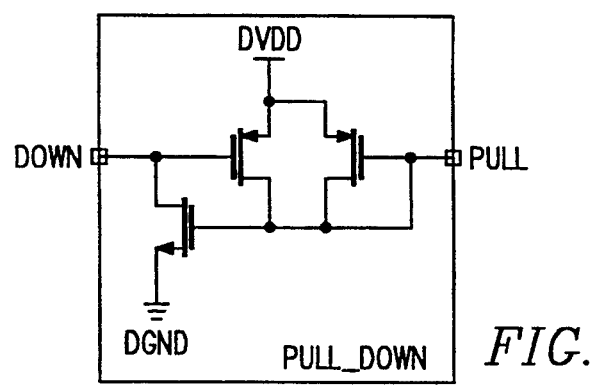

After the One's accumulation for a specified color is selected by D2, D1 and D0, the specified digital color value from the color palette (before the Output MUX 8/6-shift operation) to the DAC is monitored. This function is implemented by the circuitry labelled ONESCNTR2 in FIG. 5 and ACCUMULATOR_MUX. Complete schematics of circuitry ONESCNTR2 and ACCUMULATOR_MUX are provided as FIGS. 21 and 22 respectively. FIG. 21a is an overall functional block diagram of the ones accumulation circuitry ONESCNTR2 shown in FIG. 5c. The ones accumulator circuitry is used by processor 18 to test the operation of RAM 84 through a ones accumulation test. FIG. 21b is a more detailed functional block diagram of the accumulator shown in FIG. 21a. The accumulator takes a running sum of the number of logic ones being output from palette RAM 84. FIG. 21c is a more detailed block diagram of the adder shown in FIG. 21a. The adder of FIG. 21c adds the number of ones accumulated by the accumulator shown in FIG. 21a and provides the appropriate carry to the successive MSBs. FIG. 21d is a detailed block diagram of the sub-block ADDER_3B shown in the accumulator circuit of FIG. 21b. This circuit is a lower bit adder adding the LSBs received from palette RAM 84. FIG. 21e is a detailed functional block diagram of the sub-block NIBLE which does a 4-bit to 3-bit addition as part of the accumulator circuitry shown in FIG. 21b. FIG. 21f is a detailed electrical schematic of sub-block C3 shown in the adder circuitry of FIG. 21c. The circuitry of FIG. 21f provides for the carry function. FIG. 21g is a detailed electrical schematic of a simple data selector used in the adder circuitry of FIG. 21c. FIG. 21h similarly is a simple data selector used in the adder circuitry of FIG. 21c. FIG. 21i is a detailed electrical schematic diagram of an electrical circuit which provides a DC bias to the transistor circuitry of FIGS. 21f, 21k, and 21l. FIG. 21j is a detailed electrical schematic diagram of the exclusive OR function used in the accumulator adder of FIG. 21b and the adder circuitry of FIG. 21c. FIG. 21k is a detailed electrical schematic diagram of the carry function C1 used in the adder circuitry of FIG. 21c and FIG. 21d. FIG. 21l is a detailed electrical schematic diagram of the carry circuitry found in FIG. 21c. FIG. 21m is a detailed electrical schematic diagram of the resettable flip-flop used in the adder circuitry of FIG. 21d. FIG. 21n is a detailed electrical schematic diagram of the settable flip-flop used in the clock generator shown in FIG. 21o. FIG. 21o is a detailed functional block diagram of the clock generator which provides a divide by two of the master clock to the accumulator shown in FIG. 21b. FIG. 21p is a detailed electrical schematic diagram of the exclusive NOR function used in the adder circuitry of FIG. 21d.

Figure 22A:
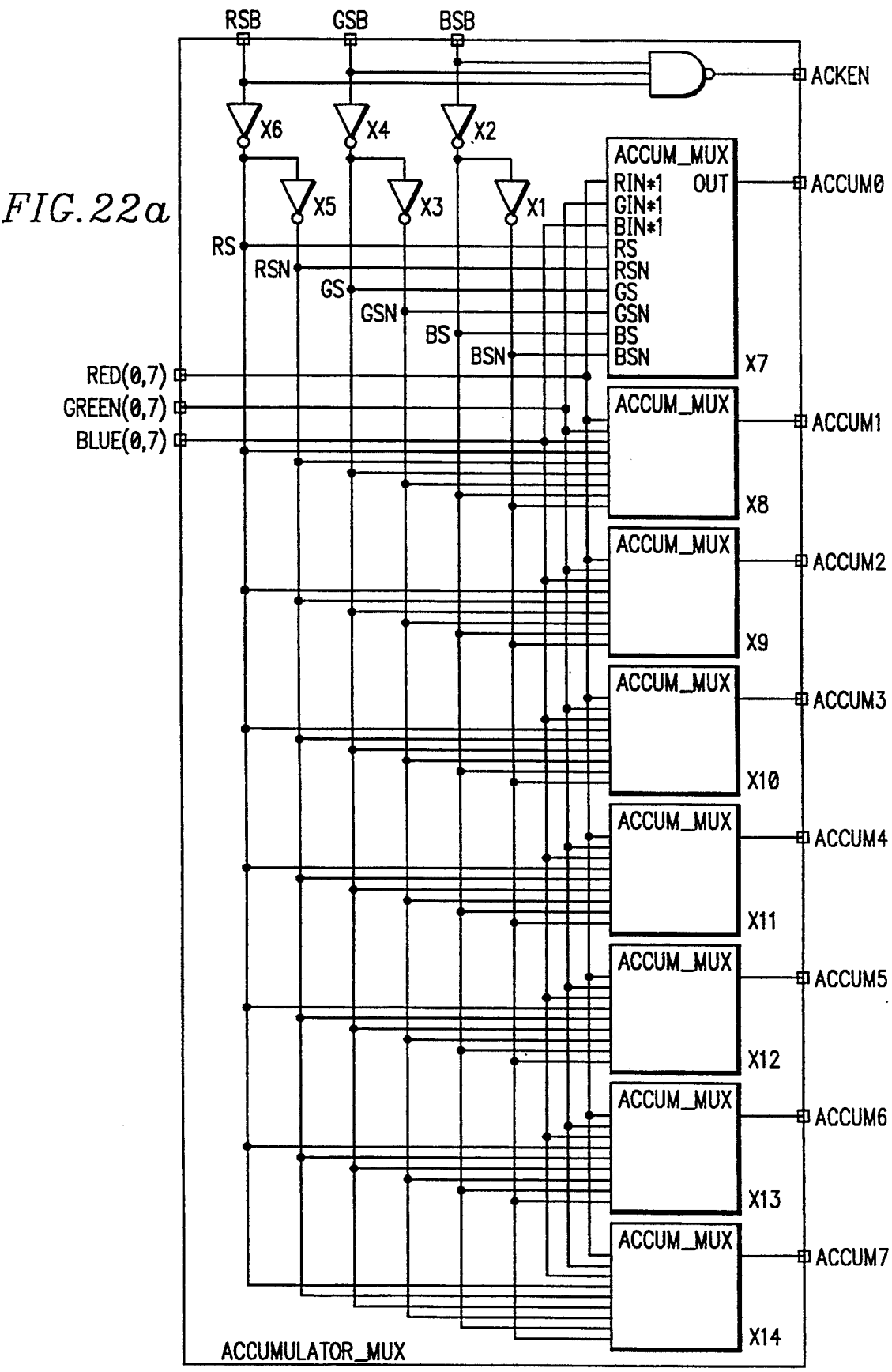
FIG. 22a–22b are a complete set of electrical schematic diagrams of a portion of test circuitry 90 shown in FIG. 4 and labeled ACCUMULATOR_MUX in FIG. 5.
Figure 22B:
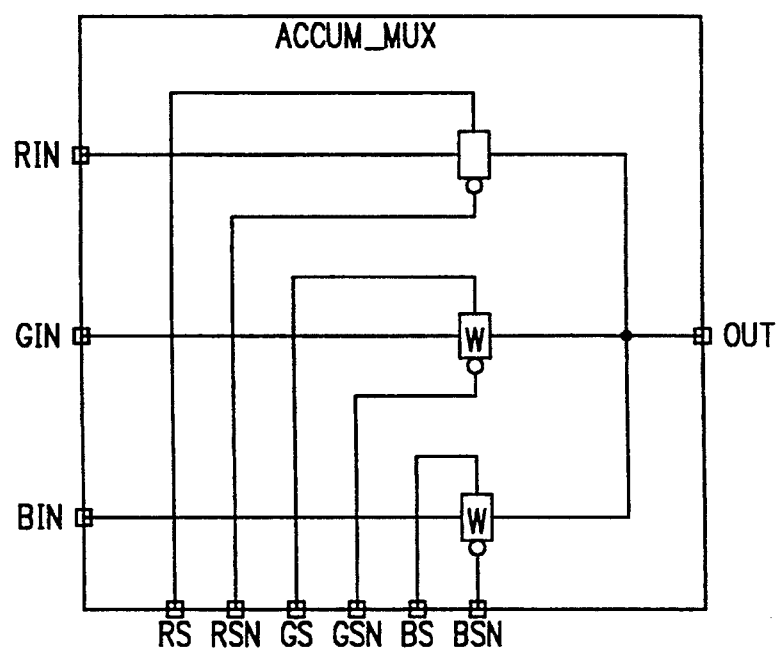

FIG. 22a is a detailed functional block diagram of the accumulator mux shown in FIG. 5c. The accumulator mux shown in FIG. 22a takes 8 bits of either red, green, or blue data of the 24 bits output from color palette RAM 84 and provides the selected 8 bits to the accumulator shown in FIG. 21a. FIG. 22b is a detailed electrical schematic diagram of the one of three selectors used in the accumulator multiplexer shown in FIG. 22a.

The number of ones for the addressed color value is added to a temporary accumulator. E.g. 41 (HEX) has two ones, so two will be added to the temporary accumulator if the color palette addressed by the selector 78 contains 41 (HEX). The falling edge of the VSYNC- after the internal pipeline delay will be used to transfer the final value to the One's Accumulation Register and the temporary accumulator will be reset for the next screen. The one's accumulation is calculated only when the specified color is selected, i.e. D2–D0=100, 101 or 110 (binary), and its operation is disabled when not being selected to save power. The user needs to wait long enough for the complete screen to be displayed at least once before reading the value. The post-increment after each read has also been designed in as shown in the above state diagram of FIG. 20. After the value is read, the test register will point to the next color and calculate the number of one's for the whole screen. The result is passed through the TEST REGISTER (TSTREG) to processor 18 via bus 34 for comparison against the expected value and resulting error detection (or lack thereof). The overflow after 255 is truncated. Due to the speed limitation, one's accumulation is calculated at DOTCLK/2 rate. As long as the display pattern for each screen is fixed, the one's accumulation value should stay the same, otherwise, an error should be assumed. Since the One's accumulation value is calculated before the Output MUX, 8-bit values are read and calculated. If 6-bit mode is selected and the 2 MSB's in the color palette are not initialized with O's, the One's accumulation value will still be calculated from the 8-bit values. This provides additional checking capability for the color palette.

Analog Test

Analog Test is used to compare the analog RGB outputs to each other and to a 145 mv reference (provided by the reference voltage circuit REF in FIG. 5). This enables the processor 18 to determine whether the CRT monitor is connected to the analog RGB outputs or not, and whether the DAC's are functional. Before the Analog Test is performed, D7 through D4 need to be set for desired comparison while D2 through D0 are set as 111 (binary). When the Test Register is read, bit D3 will reflect the result. The bit definition is shown as follows:

| Bit definition | Read/Write |
| --- | --- |
| D7: RED select | R/W |
| D6: GREEN select | R/W |
| D5: BLUE select | R/W |
| D4: 145 my reference select | R/W |
| D3: Result | R |
| D2: 1 | R/W |
| D1: 1 | R/W |
| D0: 1 | R/W |

| D7-D4 | OPERATION | IF D3 = 1 | IF D3 = 0 |
| --- | --- | --- | --- |
| 0000 | Normal operation | don't care | don't care |
| 1010 | RED DAC compared to BLUE DAC | RED > BLUE | RED < BLUE |
| 1001 | RED DAC compared to 145 mv reference | RED > 145 mv | RED < 145 mv |
| 0110 | GREEN DAC compared to BLUE DAC | GREEN > BLUE | GREEN < BLUE |
| 1010 | GREEN DAC compared to 145 mv reference | GREEN > 145 mv | GREEN < 145 mv |

| PIN ASSIGNMENTS | |
| --- | --- |
| Pin Name | Description |
| CLK0–CLK2 | Dot Clock inputs. Any of the three clocks can be used to drive the dot clock frequencies up to 80 Mhz. When VGA mode is active, CLK0 is used by default. |
| CLK3, CLK3- | Dual mode Dot Clock input. This input is essentially an ECL compatible input but a TTL clock may be used on either CLK3 or CLK3- if so selected in the input Clock Selection Register. This input may be selected as the dot clock for any frequency of operation up to the device limit while in the ECL mode, but may only be used up to 80MHz in the TTL mode. |
| P0–P31 | Pixel input port. The port can be used in various modes as shown in the MUX Control Register. All the unused pins need to be tied to GND. |
| VGA0–VGA7 | VGA pass-through bus. This bus can be selected as the pixel bus for VGA mode. It does not allow for any multiplexing. |
| IOR, IOG, IOB | Analog current outputs. These outputs can drive a 37.5Ω load directly (doubly terminated 750Ω line), thus eliminating the requirement for any external buffering. |
| VREF | Voltage reference for DACs. An internal voltage reference of |

-continued

| | |
|---|---|
| | nominally 1.23V is designed. A 0.1 of ceramic capacitor between this pin and GND is recommended for noise filtering using either the internal or an external reference voltage. However, the internal reference voltage can be overridden by an externally supplied voltage. |
| COMP | Compensation input pin. This pin provides compensation for the internal reference amplifier. A resistor and ceramic capacitor are reflected between this pin and $V_{dd}$. |
| FS ADJUST | Full scale adjustment pin. A resistor connected between this pin and ground controls the full scale range of the DACs. |
| SCLK | Shift clock output. This output is selected as a division of the dot clock input. The output is gates off during Blank. |
| VCLK | Video clock output. User programmable output for synchronization to graphics processor. |
| SFLAG/NFLAG | Split shift register transfer flag or Nibble flag input. This pin has dual function. When the General Control Register bit 3 = 0 & bit 2 = 1, Split shift register transfer function is enabled and low to high transition on this pin during a blank sequence initiates an extra SCLK cycle to allow a split register transfer in the VRAMS. When the General Control Register bit 3 = 1 & bit 2 = 0, Special Nibble Mode is enabled and this input is sampled at the falling edge of VCLK. A high value sampled indicates the next SCLK rising edge should latch the high nibble of each byte pixel data and low value indicates low nibble. When the General Control Register bit 3 = 1 & bit 2 = 1 is not allowed, and the operation is unpredictable if they are set so. |
| RS0–RS3 | Register select inputs. These pins specify the location in the register map that is to be accessed, as shown in Table 1. |
| D0–D7 | MPU interface data bus. Used to transfer data in and out of the register map and palette overlay RAM. |
| RD- | Read strobe input. A logic 0 on this pin initiates a read from the register map. Reads are performed a synchronously and are initiated on the low going edge of RD-. |
| WR- | Write strobe input. A logic 0 on this pin initiates a write to the register map. As with RD- write transfers are a synchronous and initiated on the low going edge of WR-. |
| 8/6- | DAC resolution selection. This pin is used to select the data bus width (8 or 6 bits) for the DAC's and is essentially provided in order to maintain compatibility with the IMSG176. When this pin is a logical 1, 8-bit bus transfers are used with D7 being the MSB and D0 the LSB. For 6-bit bus operation, while the color palette still has the 8-bit information, D5 shifts to the bit 7 position with D0 shifted to the bit 2 position and the two LSB's are filled with zero's at the Output MUX to DAC. The palette holding register will zero the 2 MSB's when it's read in the 6-bit mode. |
| HSYNC-, VSYNC- | Horizontal and vertical synce inputs. These signals are used to generate the sync level on the green current output. They are active low inputs for the normal mode and passed through a true/complement gate. For the VGA mode, they will be passed through to HSYNCOUT & VSYNCOUT without polarity change as specified by the control register. |
| HSYNCOUT | Horizontal sync output of the true/complement gate mentioned above. |
| BLANK-, VGABLANK- | Blanking inputs. Two blank inputs are provided in order to remove any external multiplexing of the signals which may cause data and blank to skew. When the VGA mode is set in the MUX Control Register (2D HEX), the VGABLANK- input is used for blanking, otherwise, BLANK- is used. |
| MUXOUT- | MUX output control. This output pin is software programmable. It is set low to indicate to external devices that VGA mode is being used when MUX Control Register is entered with 2D (HEX). If bit 7 of the General Control Register is set high after the mode is set, the output will become high. This pin in only used for external control and it affects no internal circuitry. |
| VDD | Power. All VDD pins must be connected. The analog and digital VDD are connected internally. |
| GND | Ground. All GND pins must be connected. The analog and digital GND are connected internally. |

Although the present invention and its advantages have been described in detail, it should be understood that various changes, substitutions and alterations can be made herein without departing from the spirit and scope of the invention as defined by the appended claims.

What is claimed is:

1. A color palette comprising:
a plurality of clock input terminals;
a plurality of register selection control terminals;
a plurality of video control terminals;
a plurality of control data terminals;
a plurality of color code input terminals;
register selection circuitry coupled to said register selection control terminals for selecting a register from among a plurality of registers in response to register selection signals received at said register selection control terminals;
clock control circuitry comprising:
an input clock selection control register coupled to said register selection circuitry and said plurality of control data terminals for receiving and holding an input clock selection control word received at said control data terminals when said input clock selection control circuitry has been selected by said register selection circuitry;
input clock selection circuitry, coupled to said input clock selection control register and said clock input terminals, and operable to provide at an output a master clock bypassing an input clock signal received at one of said clock input terminals selected in accordance with said input clock selection control word held in said input clock selection control register;

a counter having an input coupled to said output of said input clock selection circuitry and a plurality of counter outputs, said counter providing at each said counter output a divided down clock signal having a clock frequency of a selected divide ratio of said master clock;

an output clock selection control register coupled to said register selection circuitry and said plurality of control data terminals for receiving and holding an output clock selection control word received at said control data terminals when said output clock selection control register has been selected by said register selection circuitry;

shift clock select circuitry coupled to said counter outputs and said output clock selection control register, said shift clock select circuitry operable to select a shift clock from among said plurality of divided down clock signals provided at said plurality of counter outputs in accordance with at least some bits of said output clock selection control word held by said output clock selection control register;

shift clock control circuitry coupled to said shift clock select circuitry and operable to enable the output of said shift clock in response to first blanking data and disable the output of said shift clock in response to second blanking data;

video clock select circuitry coupled to said outputs of said counter and said output clock selection control register, said video clock select circuitry operable to select a video clock from among said plurality of divided down clock signals provided at said counter outputs in accordance with at least some bits of said output clock selection control word held in said output selection control register; and color palette data input clock generation circuitry coupled to said shift clock select circuitry for generating at least one data input clock;

input latching circuitry coupled to said plurality of color code input terminals and said clock control circuitry for receiving multiple bit words of color codes and synchronizing each one of said multiple bit words of color codes with at least one said data input clocks and said master clock;

a selector coupled to said input latching circuitry and said clock circuitry, said selector operable to output at least one memory recall address a first preselected number of periods of said master clock after receiving one of said multiple bit words of color code;

color palette memory circuitry coupled to said selector and said clock control circuitry and including a memory array having a plurality of data storage locations, each of said data storage locations having an associated said memory recall address, said color palette memory circuitry operable to output a color data word written into one of said data storage locations a second preselected number of periods of said master clock after receiving said associated recall address from said selector;

memory write circuitry coupled to a plurality of control data input terminals for selectively writing said color data word into said data storage locations in said memory array, said memory write circuitry comprising:

at least one color data holding register coupled to said register select circuitry and said control data terminals for receiving and holding at least some bits of said color data word received at said control data terminals when said data holding register has been selected by said register selection circuitry;

an address register coupled to said control data terminals and said memory circuitry for receiving and storing a write address corresponding to said location in said memory array; and circuitry coupled to said holding register and said control data terminals for transferring a color data word, including bits received at said control data terminals and said bits being held in said at least one color data holding register, to said location in said memory addressed by said write address being held in said address register;

video control circuitry coupled to said video control terminals and said clock control circuitry, said video control circuitry operable to receive video control signals applied to said video control terminals and synchronize said video control signals with said video clock and said master clock, said video control circuitry further operable to provide said first and second blanking data to said shift clock control circuitry;

digital data output control circuitry comprising:

first delay circuitry coupled to said input latching circuitry and operable to delay true color data received at least some of said plurality of color code inputs by a number of periods of said master clock signal equal to the total of said first preselected number of periods of said master clock and said second preselected number of periods of said master clock;

an output multiplexer coupled to said memory circuitry and said delay circuitry and operable to select for output delayed said true color data from said delay circuitry in response to a first control signal and color data words from said memory in response to a second control signal; and output select circuitry operable to provide said first and second control signals, said output select circuitry comprising:

discriminator circuitry coupled to said selector and operable to output said first control signal in response to a first value of said memory recall address output from said selector and said second control signal in response to a second value of said memory recall address output from said selector; and second delay circuitry coupled to said discriminator circuitry and said output multiplexer and operable to delay said first and second control signals by said second preselected number of periods of said master clock;

analog output circuitry including a plurality of digital to analog converters coupled to said output multiplexer for converting said color data words and said true color data to analog color data; and test circuitry comprising:

a test register coupled to said control data terminals and said register selection circuitry for receiving and holding a test selection control word when said test register has been selected by said register selection circuitry;

data flow test circuitry coupled to said test register and said memory circuitry for passing said color data word output from said memory array to said control data terminals in accordance with a first test selection control word being held in said test register;

one's accumulation test circuitry coupled to said test register and said memory circuitry for accumulating a number of ones of said color data words output from said memory array and passing a result to said control data terminals in response to a second test selection control word held in said test register; and analog output test circuitry coupled to said test register and said digital to analog converters for comparing a voltage output from a selected one of said digital to analog converters with a reference in accordance with a third test selection control word held in said test register.

2. The color palette of claim 1 and further comprising a page register coupled to said selector for providing a said recall address of a preselected number of bits independent of a number of bits of said recall address output from said selector.

3. The color palette of claim 1 and further comprising a read mask coupled to said selector for selectively masking bits of said recall address output from said selector.

4. The color palette of claim 1 wherein said memory write circuitry further comprises circuitry coupled to sand address register for stepping said address in said address register to another address corresponding to another location in said memory at the conclusion of a cycle such that another color data word can be read into said another location during another write cycle.

5. The color palette of claim 1 wherein said video control circuitry is further operable to receive a split shift register transfer signal and provide a split shift register transfer pulse in response, said shift clock control circuitry further is operable to receive said pulse and in response pass through an additional shift clock period during a period when said shift clock is disabled.

6. The color palette of claim 1 wherein said selector comprises:

a sequentially ordered array of r multiplexers each having first and second data inputs and a data output and operable to pass data appearing at said first data input in response to a control signal and operable to pass data appearing at said second data input in response to a first one of a sequence of clocking signals occurring after said control signal;

a sequentially ordered array of r latches, each said latch having an input coupled to said output of a respective said multiplexer and a latch output, said plurality of latches operable to latch data appearing at said outputs of said multiplexers to said latch outputs in response to said sequence of clocking signals; and a sequentially ordered array of j transmission gates, an mth one of said transmission gates associated with an $(n-2^{m-1})^{th}$ one of said multiplexers and operable to couple said latch output of a $n^{th}$ one of said latches with said second data input of a $(n-2^{m-1})^{th}$ said multiplexer, where j, r, m and n are positive integers, j and r being constants, m being a variable between 1 and r, n being a variable between 1 and j.

7. The color palette of claim 1 wherein said test circuitry further comprises state machine circuitry coupled to said test register for incrementing at least some bits of said first test selection control word held in said test register to produce a new test selection control word, said data flow test circuitry passing another color data word from said memory array in accordance with said new test selection control word.

8. The color palette of claim 1 wherein said one's accumulation test circuitry comprises:

an accumulator multiplexer coupled to said memory circuitry and said test register for passing said color data word output from said memory circuitry in response to said second test selection control word being held in said test register;

an accumulator coupled to said accumulator multiplexer for determining the number of logic ones comprising said color data word passed by said multiplexer;

another state machine circuitry coupled to said test register for incrementing at least some bits of said second test selection control word held in said test register to produce a new test selection control word, said accumulator multiplexer and said control circuitry passing another color data word to said accumulator in response to said new test selection control data word;

an adder coupled to said accumulator for taking a running total of the number of logic ones determined for each said color data word passed to said accumulator; and a checksum multiplexer coupled to said control circuitry for selectively passing said running total to said test register for output.

9. The color palette of claim 1 and further comprising a multiplex control register coupled to said register selection circuitry, said control data terminals and said selector, said multiplex control register operable to receive and hold multiplex control words appearing at said control data terminals, when said multiplex control register has been selected by said register selection circuitry, each said multiplex control word controlling the number of bits of each one of said multiple bit words of color code input by said selector and the number of bits comprising each said memory recall address output by said selector.

10. The color palette of claim 9 and further comprising a plurality of VGA pass through terminals coupled to said selector, said selector operable to pass VGA data appearing at said VGA pass through terminals as said recall address to said memory circuitry in response to a VGA select control word held in said multiplex control register.

11. The color palette of claim 9 wherein said output multiplexer is operable to select for output said time color data in response to a true color select control word held in said multiplex control register.

12. The color palette of claim 1 wherein said output multiplexer is operable to output said color data word of a first number of bits to each one of said digital to analog converters in response to a first output control signal received at an associated output control terminal and said color data word of a second number of bits output to each one of said digital to analog converters in response to a second output control signal received at said associated output control terminal.

13. A color palette comprising:
a plurality of clock input terminals;
a plurality of video control terminals;
a plurality of control data terminals;
a plurality of color code input terminals;

circuitry for selecting a master clock from a plurality of clock signals provided at said clock input terminals in response a master clock selection control word received at said control data terminals;

circuitry for providing a plurality of divided down clock signals, each having a clock frequency of a selected divide ration of said master clock;

circuitry for selecting a shift clock from among said plurality of divided down clock signals in response to at least some bits of an output clock selection control word received at said control data terminals;

circuitry for selectively enabling and disabling said shift clock in response to blanking data;

circuitry for selecting a video clock from among said plurality of divided down clock signals in response to at least some bits of said output clock selection control word received at said data terminal;

circuitry for synchronizing multiple bit words of color code received at said color code input terminals with said master clock;

circuitry for outputting at least one memory recall address in response to receiving one of said multiple bit words of color code synchronized by said circuitry for synchronizinq;

circuitry for storing color data words in a plurality of data storage locations, each one of said data storage locations having an associated memory recall address, and further operable to output a color data word written into one of said data storage locations after receiving said associated memory recall address;

circuitry for selectively writing said color data words into said plurality of locations;

circuitry for synchronizing video control signals received at said video control terminals with said master clock and further operable to provide said blanking data; and circuitry for selecting for output between said color data words, output from said circuitry having a plurality of data storage locations and true color data received at said color code input terminals.

14. The palette of claim 13 wherein said circuitry for selecting said master clock comprises a multiplexer controlled by an input clock selection control register coupled to said control data terminals.

15. The color palette of claim 13 wherein said circuitry for providing said plurality of divided down clock signals comprises a counter.

16. The color palette of claim 13 wherein said circuitry for selecting said shift clock comprised a multiplexer controlled by an output shift clock selection control register coupled to said control data terminals.

17. The color palette of claim 13 wherein said circuitry for selecting said video clock comprises a multiplexer under the control of an output clock selection control register coupled to said control data terminals.

18. The color palette of claim 13 wherein said circuitry for synchronizing said words of color codes with said master clock comprises a plurality of latches.

19. The color palette of claim 13 wherein said circuitry storing color data words comprises a random access memory.

20. The color palette of claim 19 wherein said circuitry for writing comprises at least one color data holding register for holding at some bits of said color data word to be written into said location in said memory and an address register for storing a write address corresponding to said location into which said bits held in said holding register are to be written.

21. The color palette of claim 13 wherein said circuitry for selecting for output comprises a multiplexer operable to select said true color data in response to a first control signal and said color data words in response to a second control signal.

22. The color palette of claim 13 and further comprising circuitry for converting said color data words and said true color data words to analog color data.

23. A color palette of claim 22 and further comprising circuitry for testing said analog color data output from said circuitry for converting.

24. The color palette of claim 23 wherein said circuitry for testing said analog color data is controlled by a test register coupled to said control data terminals.

25. The circuitry of claim 13 and further comprising circuitry for testing the data flow of said color data words output from said circuitry for storing.

26. The circuitry of claim 25 and further comprising circuitry for accumulating a number of ones of said color data words output from said circuitry for storing.

27. The circuitry of claim 26 wherein said circuitry for testing data flow and said circuitry for accumulating a number of ones is controlled by a test register coupled to said control data terminals.

* * * * *